(12) United States Patent  (10) Patent No.: US 8,723,787 B2
Jung et al.  (45) Date of Patent: May 13, 2014

(54) METHODS AND SYSTEMS RELATED TO AN IMAGE CAPTURE PROJECTION SURFACE

(75) Inventors: Edward K. Y. Jung, Bellevue, WA (US);
Eric C. Leuthardt, St. Louis, MO (US);
Royce A. Levien, Lexington, MA (US);
Richard T. Lord, Tacoma, WA (US);
Robert W. Lord, Seattle, WA (US);
Mark A. Malamud, Seattle, WA (US);
John D. Rinaldo, Jr., Bellevue, WA (US); Lowell L. Wood, Jr., Bellevue, WA (US)

(73) Assignee: The Invention Science Fund I, LLC, Bellevue, WA (US)

( * ) Notice: Subject to any disclaimer, the term of this patent is extended or adjusted under 35 U.S.C. 154(b) by 431 days.

(21) Appl. No.: 12/454,184

(22) Filed: May 12, 2009

(65) Prior Publication Data

US 2009/0324138 A1 Dec. 31, 2009

Related U.S. Application Data

(63) Continuation-in-part of application No. 12/214,422, filed on Jun. 17, 2008, and a continuation-in-part of application No. 12/217,118, filed on Jun. 30, 2008, now Pat. No. 8,403,501, and a continuation-in-part of (Continued)

(51) Int. Cl.
*G09G 5/00* (2006.01)

(52) U.S. Cl.
USPC .......................................... 345/156; 345/173

(58) Field of Classification Search
USPC ................................................. 345/156–173
See application file for complete search history.

(56) References Cited

U.S. PATENT DOCUMENTS 3,622,223 A 11/1971 Brakell
3,623,804 A 11/1971 Spreitzer
(Continued)

FOREIGN PATENT DOCUMENTS

JP 2005-165129 A 6/2005
WO WO 2006/027855 A1 3/2006
(Continued)

OTHER PUBLICATIONS

Allen, Danny; "Before Nikon's S1000pj: The Cine-Twin Was the First Camera/Projector Hybrid"; printed on Nov. 25, 2009; pp. 1-2; gizmodo.com; located at http://gizmodo.com/5347564/before-nikons-s1000pi-the-cine+twin-was-the-first-cameraprojector-hybrid.

(Continued)

*Primary Examiner* — Viet Pham

(57) ABSTRACT

The present disclosure relates generally to systems and methods that are related to an image capture projection surface. For example, in some implementations, a method includes receiving at least one projected image on at least one image capture projection surface, capturing at least a portion of the at least one projected image from the at least one image capture projection surface to form a captured image, and communicating at least a portion of the captured image.

54 Claims, 56 Drawing Sheets

Related U.S. Application Data application No. 12/217,116, filed on Jun. 30, 2008, now Pat. No. 8,430,515, and a continuation-in-part of application No. 12/217,115, filed on Jun. 30, 2008, now Pat. No. 8,262,236, and a continuation-in-part of application No. 12/217,123, filed on Jun. 30, 2008, now Pat. No. 8,540,381, and a continuation-in-part of application No. 12/217,135, filed on Jun. 30, 2008, now Pat. No. 8,376,558, and a continuation-in-part of application No. 12/217,117, filed on Jun. 30, 2008, now Pat. No. 8,608,321, and a continuation-in-part of application No. 12/218,269, filed on Jul. 11, 2008, now Pat. No. 8,384,005, and a continuation-in-part of application No. 12/218,266, filed on Jul. 11, 2008, and a continuation-in-part of application No. 12/218,267, filed on Jul. 11, 2008, and a continuation-in-part of application No. 12/218,268, filed on Jul. 11, 2008, and a continuation-in-part of application No. 12/220,906, filed on Jul. 28, 2008, and a continuation-in-part of application No. 12/229,534, filed on Aug. 22, 2008, and a continuation-in-part of application No. 12/229,518, filed on Aug. 22, 2008, and a continuation-in-part of application No. 12/229,505, filed on Aug. 22, 2008, now Pat. No. 8,602,564, and a continuation-in-part of application No. 12/229,519, filed on Aug. 22, 2008, and a continuation-in-part of application No. 12/229,536, filed on Aug. 22, 2008, and a continuation-in-part of application No. 12/229,508, filed on Aug. 22, 2008, and a continuation-in-part of application No. 12/286,731, filed on Sep. 30, 2008, and a continuation-in-part of application No. 12/286,750, filed on Sep. 30, 2008, and a continuation-in-part of application No. 12/290,240, filed on Oct. 27, 2008, now Pat. No. 8,267,526, and a continuation-in-part of application No. 12/290,241, filed on Oct. 27, 2008, now Pat. No. 8,308,304, and a continuation-in-part of application No. 12/291,019, filed on Oct. 30, 2008, and a continuation-in-part of application No. 12/291,024, filed on Oct. 30, 2008, and a continuation-in-part of application No. 12/291,023, filed on Oct. 30, 2008, and a continuation-in-part of application No. 12/291,025, filed on Oct. 30, 2008, and a continuation-in-part of application No. 12/322,063, filed on Jan. 27, 2009, and a continuation-in-part of application No. 12/322,875, filed on Feb. 5, 2009, and a continuation-in-part of application No. 12/322,876, filed on Feb. 5, 2009, and a continuation-in-part of application No. 12/380,595, filed on Feb. 27, 2009, and a continuation-in-part of application No. 12/380,571, filed on Feb. 27, 2009, and a continuation-in-part of application No. 12/380,582, filed on Feb. 27, 2009.

(56) References Cited

U.S. PATENT DOCUMENTS

| | | | |
|---|---|---|---|
| 3,644,027 A | 2/1972 | Bennett | |
| 3,874,787 A | 4/1975 | Taylor | |
| 3,905,695 A | 9/1975 | Taylor | |
| 4,012,133 A | 3/1977 | Burton | |
| 4,320,664 A | 3/1982 | Rehn et al. | |
| 4,684,136 A | 8/1987 | Turner | |
| 4,739,567 A | 4/1988 | Cardin | |
| 4,779,240 A | 10/1988 | Dorr | |
| 5,026,152 A | 6/1991 | Sharkey | |
| 5,469,258 A | 11/1995 | Grasso | |
| 5,515,079 A | 5/1996 | Hauck | |
| 5,581,637 A | 12/1996 | Cass et al. | |
| 5,581,783 A | 12/1996 | Ohashi | |
| 5,602,566 A | 2/1997 | Motosyuku et al. | |
| 5,635,725 A | 6/1997 | Cooper | |
| 5,689,287 A | 11/1997 | Mackinlay et al. | |
| 5,747,690 A | 5/1998 | Park et al. | |
| 5,757,490 A | 5/1998 | Martin | |
| 5,793,470 A | 8/1998 | Haseltine et al. | |
| 5,838,889 A | 11/1998 | Booker | |
| 5,902,030 A | 5/1999 | Blanchard | |
| 5,914,756 A | 6/1999 | Maeda et al. | |
| 5,951,015 A | 9/1999 | Smith et al. | |
| 6,002,505 A | 12/1999 | Kraenert et al. | |
| 6,115,022 A | 9/2000 | Mayer, III et al. | |
| 6,266,048 B1 | 7/2001 | Carau, Sr. | |
| 6,272,231 B1 | 8/2001 | Maurer et al. | |
| 6,310,650 B1 | 10/2001 | Johnson et al. | |
| 6,310,988 B1 | 10/2001 | Flores et al. | |
| 6,334,063 B1 | 12/2001 | Charlier et al. | |
| 6,340,976 B1 | 1/2002 | Oguchi et al. | |
| 6,362,797 B1 | 3/2002 | Dehmlow | |
| 6,414,672 B2 | 7/2002 | Rekimoto et al. | |
| 6,424,998 B2 | 7/2002 | Hunter | |
| 6,456,339 B1 | 9/2002 | Surati et al. | |
| 6,489,934 B1 | 12/2002 | Klausner | |
| 6,498,651 B1 | 12/2002 | Loil | |
| 6,516,666 B1 | 2/2003 | Li | |
| 6,527,395 B1 | 3/2003 | Raskar et al. | |
| 6,549,487 B2 | 4/2003 | Gualtieri | |
| 6,550,331 B2 | 4/2003 | Fujii et al. | |
| 6,551,493 B2 | 4/2003 | Mori et al. | |
| 6,554,431 B1 | 4/2003 | Binsted et al. | |
| 6,563,504 B1 | 5/2003 | Rose et al. | |
| 6,573,883 B1 | 6/2003 | Bartlett | |
| 6,573,887 B1 | 6/2003 | O'Donnell, Jr. | |
| 6,577,496 B1 | 6/2003 | Gioscia et al. | |
| 6,583,864 B1 | 6/2003 | Stanners | |
| 6,595,644 B2 | 7/2003 | Kostrzewski et al. | |
| 6,601,037 B1 | 7/2003 | Kolls | |
| 6,611,252 B1 | 8/2003 | DuFaux | |
| 6,611,253 B1 | 8/2003 | Cohen | |
| 6,614,422 B1 | 9/2003 | Rafii et al. | |
| 6,626,543 B2 | 9/2003 | Derryberry | |
| 6,636,203 B1 | 10/2003 | Wong et al. | |
| 6,665,100 B1 | 12/2003 | Klug et al. | |
| 6,675,630 B2 | 1/2004 | Challoner et al. | |
| 6,695,451 B1 | 2/2004 | Yamasaki et al. | |
| 6,708,087 B2 | 3/2004 | Matsumoto | |
| 6,710,754 B2 | 3/2004 | Hanson et al. | |
| 6,710,770 B2 | 3/2004 | Tomasi et al. | |
| 6,727,864 B1 | 4/2004 | Johnson et al. | |
| 6,733,138 B2 | 5/2004 | Raskar | |
| 6,750,849 B2 | 6/2004 | Potkonen | |
| 6,755,537 B1 | 6/2004 | Raskar et al. | |
| 6,760,075 B2 | 7/2004 | Mayer, III et al. | |
| 6,760,442 B1 | 7/2004 | Scott | |
| 6,764,185 B1 * | 7/2004 | Beardsley et al. | 353/122 |
| 6,793,350 B1 | 9/2004 | Raskar et al. | |
| 6,798,401 B2 | 9/2004 | DuFaux | |
| 6,802,614 B2 | 10/2004 | Haldiman | |
| 6,811,264 B2 | 11/2004 | Raskar et al. | |
| 6,840,627 B2 | 1/2005 | Olbrich | |
| 6,844,893 B1 | 1/2005 | Miller et al. | |
| 6,857,746 B2 | 2/2005 | Dyner | |
| 6,909,670 B1 | 6/2005 | Li | |
| 6,919,892 B1 | 7/2005 | Cheiky et al. | |
| 6,955,297 B2 | 10/2005 | Grant | |
| 6,984,039 B2 | 1/2006 | Agostinelli | |
| 6,997,563 B1 | 2/2006 | Wang et al. | |
| 7,013,029 B2 | 3/2006 | Keskar et al. | |
| 7,016,711 B2 | 3/2006 | Kurakane | |
| 7,036,936 B2 | 5/2006 | Hattori et al. | |
| 7,043,987 B2 | 5/2006 | Jeong et al. | |
| 7,071,924 B2 | 7/2006 | Wilbrink et al. | |
| 7,088,352 B2 | 8/2006 | Wampler | |
| 7,088,440 B2 | 8/2006 | Buermann et al. | |
| 7,103,313 B2 | 9/2006 | Heinonen et al. | |
| 7,118,220 B2 | 10/2006 | Castaldi et al. | |

(56) References Cited

U.S. PATENT DOCUMENTS

| | | |
|---|---|---|
| 7,134,078 B2 | 11/2006 | Vaarala |
| 7,151,530 B2 | 12/2006 | Roeber et al. |
| 7,151,764 B1 | 12/2006 | Heinonen et al. |
| 7,155,978 B2 | 1/2007 | Lo et al. |
| 7,159,441 B2 | 1/2007 | Challoner et al. |
| 7,173,605 B2 | 2/2007 | Fong et al. |
| 7,185,987 B2 | 3/2007 | Tamura |
| 7,191,653 B2 | 3/2007 | Park et al. |
| 7,193,241 B2 | 3/2007 | Hayashi et al. |
| 7,195,170 B2 | 3/2007 | Matsumoto et al. |
| 7,209,569 B2 | 4/2007 | Boesen |
| 7,216,799 B2 | 5/2007 | Amemiya |
| 7,231,063 B2 | 6/2007 | Naimark et al. |
| 7,232,700 B1 | 6/2007 | Kubena |
| 7,234,119 B2 | 6/2007 | Wu et al. |
| 7,239,445 B2 | 7/2007 | Pouslen |
| 7,242,388 B2 | 7/2007 | Lieberman et al. |
| 7,245,381 B2 | 7/2007 | Marino et al. |
| 7,248,151 B2 | 7/2007 | McCall |
| 7,252,002 B2 | 8/2007 | Zerbini et al. |
| 7,256,923 B2 | 8/2007 | Liu et al. |
| 7,257,255 B2 | 8/2007 | Pittel |
| 7,259,658 B2 | 8/2007 | Noguchi et al. |
| 7,266,391 B2 | 9/2007 | Warren |
| 7,270,003 B2 | 9/2007 | Sassolini et al. |
| 7,282,712 B2 | 10/2007 | Shibayama |
| 7,284,866 B2 | 10/2007 | Buchmann |
| 7,287,428 B2 | 10/2007 | Green |
| 7,290,885 B2 | 11/2007 | Salvatori et al. |
| 7,301,648 B2 | 11/2007 | Foxlin |
| 7,305,368 B2 | 12/2007 | Lieberman et al. |
| 7,328,616 B2 | 2/2008 | Won et al. |
| 7,330,269 B2 | 2/2008 | Zurn et al. |
| 7,332,717 B2 | 2/2008 | Murata et al. |
| 7,336,271 B2 | 2/2008 | Ozeki et al. |
| 7,337,669 B2 | 3/2008 | Nozoe |
| 7,350,923 B2 | 4/2008 | Olson et al. |
| 7,355,583 B2 | 4/2008 | Beardsley et al. |
| 7,355,584 B2 | 4/2008 | Hendriks et al. |
| 7,355,796 B2 | 4/2008 | Robinson |
| 7,358,986 B1 | 4/2008 | Knighton et al. |
| 7,361,899 B2 | 4/2008 | Iida |
| 7,363,816 B2 | 4/2008 | Judy et al. |
| 7,373,833 B2 | 5/2008 | Hopper et al. |
| 7,379,630 B2 | 5/2008 | Lagakos et al. |
| 7,382,599 B2 | 6/2008 | Kikuiri et al. |
| 7,460,185 B2 | 12/2008 | Saletta |
| 7,484,855 B2 | 2/2009 | Kobayashi et al. |
| 7,549,754 B2 | 6/2009 | Furui |
| 7,595,809 B2 | 9/2009 | Widdowson |
| 7,630,522 B2 | 12/2009 | Popp et al. |
| 7,647,613 B2 | 1/2010 | Drakoulis et al. |
| 7,690,797 B2 | 4/2010 | Higashi |
| 7,742,949 B2 | 6/2010 | Evangelist et al. |
| 7,783,892 B2 | 8/2010 | Russell et al. |
| 7,810,114 B2 | 10/2010 | Flickinger et al. |
| 7,870,592 B2 | 1/2011 | Hudson et al. |
| 7,874,679 B2 | 1/2011 | Stonier |
| 7,891,826 B2 | 2/2011 | Fujinawa et al. |
| 7,936,943 B2 | 5/2011 | Way et al. |
| 7,967,445 B2 | 6/2011 | Hamano et al. |
| 7,980,707 B2 | 7/2011 | Murphy |
| 8,024,762 B2 | 9/2011 | Britt |
| 8,049,721 B2 | 11/2011 | Tagawa |
| 8,055,907 B2 | 11/2011 | Deem et al. |
| 2001/0000300 A1 | 4/2001 | Haile-mariam |
| 2001/0012001 A1 | 8/2001 | Rekimoto et al. |
| 2001/0024231 A1 | 9/2001 | Nakamura et al. |
| 2002/0039177 A1 | 4/2002 | Fukushima et al. |
| 2002/0055892 A1 | 5/2002 | Brown et al. |
| 2002/0105624 A1 | 8/2002 | Quori |
| 2002/0135739 A1 | 9/2002 | Standard et al. |
| 2002/0154091 A1 | 10/2002 | Uchida et al. |
| 2002/0184098 A1 | 12/2002 | Giraud et al. |
| 2002/0186676 A1 | 12/2002 | Milley et al. |
| 2003/0017846 A1 | 1/2003 | Estevez et al. |
| 2003/0018539 A1 | 1/2003 | La Poutre et al. |
| 2003/0038925 A1 | 2/2003 | Choi |
| 2003/0038927 A1 | 2/2003 | Alden |
| 2003/0038928 A1 | 2/2003 | Alden |
| 2003/0051256 A1 | 3/2003 | Uesaki et al. |
| 2003/0061607 A1 | 3/2003 | Hunter et al. |
| 2003/0088463 A1 | 5/2003 | Kanevsky et al. |
| 2003/0216185 A1 | 11/2003 | Varley |
| 2004/0003398 A1 | 1/2004 | Donian et al. |
| 2004/0012849 A1 | 1/2004 | Cruz-Uribe et al. |
| 2004/0027539 A1 | 2/2004 | Plunkett |
| 2004/0051704 A1 | 3/2004 | Goulthorpe |
| 2004/0075820 A1 | 4/2004 | Chu et al. |
| 2004/0141162 A1 | 7/2004 | Olbrich |
| 2004/0158865 A1 | 8/2004 | Kubler et al. |
| 2004/0181807 A1 | 9/2004 | Theiste et al. |
| 2004/0183896 A1 | 9/2004 | Takamine et al. |
| 2004/0184010 A1 | 9/2004 | Raskar et al. |
| 2004/0184013 A1 | 9/2004 | Raskar et al. |
| 2004/0222983 A1 | 11/2004 | Kakemura |
| 2004/0239884 A1 | 12/2004 | Nagashima et al. |
| 2004/0243482 A1 | 12/2004 | Laut |
| 2005/0030486 A1 | 2/2005 | Lee et al. |
| 2005/0036117 A1 | 2/2005 | Kobayashi |
| 2005/0043060 A1 | 2/2005 | Brandenberg et al. |
| 2005/0046803 A1 | 3/2005 | Akutsu |
| 2005/0060210 A1 | 3/2005 | Levi et al. |
| 2005/0068501 A1 | 3/2005 | Nonaka et al. |
| 2005/0076372 A1 | 4/2005 | Moore et al. |
| 2005/0086056 A1* | 4/2005 | Yoda et al. .................. 704/246 |
| 2005/0091671 A1 | 4/2005 | Deem et al. |
| 2005/0099432 A1 | 5/2005 | Chavis et al. |
| 2005/0117130 A1 | 6/2005 | Bohn et al. |
| 2005/0128437 A1 | 6/2005 | Pingali et al. |
| 2005/0153759 A1 | 7/2005 | Varley |
| 2005/0153760 A1 | 7/2005 | Varley |
| 2005/0179875 A1 | 8/2005 | Aoyanagi |
| 2005/0184958 A1* | 8/2005 | Gnanamgari et al. ........ 345/157 |
| 2005/0206856 A1 | 9/2005 | Ishii |
| 2005/0219467 A1 | 10/2005 | Nomizo et al. |
| 2005/0237492 A1 | 10/2005 | Shinozaki |
| 2005/0240417 A1 | 10/2005 | Savage |
| 2005/0253776 A1 | 11/2005 | Lee et al. |
| 2005/0259084 A1 | 11/2005 | Popovich et al. |
| 2005/0259231 A1 | 11/2005 | Salvatori et al. |
| 2005/0280628 A1 | 12/2005 | Adams et al. |
| 2006/0001543 A1 | 1/2006 | Raskar et al. |
| 2006/0015375 A1 | 1/2006 | Lee et al. |
| 2006/0017890 A1 | 1/2006 | Inazumi |
| 2006/0020481 A1 | 1/2006 | Lee et al. |
| 2006/0020515 A1 | 1/2006 | Lee et al. |
| 2006/0022214 A1 | 2/2006 | Morgan et al. |
| 2006/0028624 A1 | 2/2006 | Kaise et al. |
| 2006/0038814 A1 | 2/2006 | Rivera |
| 2006/0038965 A1 | 2/2006 | Hennes |
| 2006/0044513 A1 | 3/2006 | Sakurai |
| 2006/0059002 A1 | 3/2006 | Shibata et al. |
| 2006/0059739 A1 | 3/2006 | Sondergaard |
| 2006/0066564 A1 | 3/2006 | Yee et al. |
| 2006/0075019 A1 | 4/2006 | Donovan et al. |
| 2006/0087555 A1 | 4/2006 | Boyd et al. |
| 2006/0095515 A1 | 5/2006 | Forstadius |
| 2006/0103811 A1 | 5/2006 | May et al. |
| 2006/0109237 A1 | 5/2006 | Morita et al. |
| 2006/0129551 A1 | 6/2006 | Teicher |
| 2006/0146291 A1 | 7/2006 | Olson et al. |
| 2006/0158425 A1 | 7/2006 | Andrews et al. |
| 2006/0158623 A1 | 7/2006 | Kobayashi et al. |
| 2006/0158626 A1 | 7/2006 | Baselmans et al. |
| 2006/0164526 A1 | 7/2006 | Suzuki et al. |
| 2006/0170875 A1 | 8/2006 | Falck et al. |
| 2006/0170885 A1 | 8/2006 | Kitahara |
| 2006/0171008 A1 | 8/2006 | Mintz et al. |
| 2006/0181510 A1 | 8/2006 | Faith |
| 2006/0184977 A1 | 8/2006 | Mueller et al. |
| 2006/0187421 A1 | 8/2006 | Hattori et al. |
| 2006/0198550 A1 | 9/2006 | Jung et al. |
| 2006/0234784 A1 | 10/2006 | Reinhorn |

(56) References Cited

U.S. PATENT DOCUMENTS

| | | |
|---|---|---|
| 2006/0256076 A1 | 11/2006 | Liou et al. |
| 2006/0266135 A1 | 11/2006 | Nishikawa et al. |
| 2006/0271486 A1 | 11/2006 | Cross et al. |
| 2007/0005450 A1 | 1/2007 | Krishnamoorthy et al. |
| 2007/0005809 A1 | 1/2007 | Kobayashi et al. |
| 2007/0024580 A1 | 2/2007 | Sands et al. |
| 2007/0024763 A1 | 2/2007 | Chung |
| 2007/0040989 A1 | 2/2007 | Weng et al. |
| 2007/0064208 A1 | 3/2007 | Giegerich et al. |
| 2007/0074906 A1 | 4/2007 | Tanaka et al. |
| 2007/0075982 A1 | 4/2007 | Morrison et al. |
| 2007/0085977 A1 | 4/2007 | Fricke et al. |
| 2007/0091277 A1 | 4/2007 | Damera-Venkata et al. |
| 2007/0091278 A1 | 4/2007 | Zakoji et al. |
| 2007/0103652 A1 | 5/2007 | Nijim et al. |
| 2007/0106950 A1 | 5/2007 | Hutchinson et al. |
| 2007/0109500 A1 | 5/2007 | Kobori et al. |
| 2007/0109505 A1 | 5/2007 | Kubara et al. |
| 2007/0109509 A1 | 5/2007 | Lee |
| 2007/0115440 A1 | 5/2007 | Wiklof et al. |
| 2007/0146321 A1 | 6/2007 | Sohn et al. |
| 2007/0178973 A1 | 8/2007 | Camhi |
| 2007/0180409 A1 | 8/2007 | Sohn et al. |
| 2007/0188450 A1 | 8/2007 | Hernandez et al. |
| 2007/0199108 A1 | 8/2007 | Angle et al. |
| 2007/0218432 A1 | 9/2007 | Glass et al. |
| 2007/0219928 A1 | 9/2007 | Madhogarhia |
| 2007/0220575 A1 | 9/2007 | Cooper et al. |
| 2007/0242033 A1 | 10/2007 | Cradick et al. |
| 2007/0242233 A1 | 10/2007 | Sokeila et al. |
| 2007/0247422 A1 | 10/2007 | Vertegaal et al. |
| 2007/0266412 A1 | 11/2007 | Trowbridge et al. |
| 2007/0273842 A1 | 11/2007 | Morrison et al. |
| 2007/0273848 A1 | 11/2007 | Fan et al. |
| 2007/0282564 A1 | 12/2007 | Sprague et al. |
| 2008/0002159 A1 | 1/2008 | Liu et al. |
| 2008/0022328 A1 | 1/2008 | Miller |
| 2008/0036969 A1 | 2/2008 | Otsuka et al. |
| 2008/0056544 A1 | 3/2008 | Aikawa et al. |
| 2008/0060014 A1 | 3/2008 | Bentley et al. |
| 2008/0066111 A1 | 3/2008 | Ellis et al. |
| 2008/0079752 A1 | 4/2008 | Gates et al. |
| 2008/0121701 A1 | 5/2008 | Gabriel |
| 2008/0129647 A1 | 6/2008 | Canova |
| 2008/0136976 A1 | 6/2008 | Ajito et al. |
| 2008/0168523 A1 | 7/2008 | Ansari et al. |
| 2008/0180519 A1 | 7/2008 | Cok |
| 2008/0183820 A1 | 7/2008 | Golovchinsky et al. |
| 2008/0186255 A1 | 8/2008 | Cohen et al. |
| 2008/0192017 A1 | 8/2008 | Hildebrandt et al. |
| 2008/0212039 A1 | 9/2008 | Taylor |
| 2008/0224251 A1 | 9/2008 | Troost et al. |
| 2008/0227500 A1 | 9/2008 | Heyworth et al. |
| 2008/0256453 A1 | 10/2008 | Fein et al. |
| 2008/0275769 A1 | 11/2008 | Shao |
| 2008/0291213 A1 | 11/2008 | Bhogal et al. |
| 2008/0303747 A1 | 12/2008 | Velicescu |
| 2008/0319857 A1 | 12/2008 | Dobbins et al. |
| 2009/0019078 A1 | 1/2009 | Chisholm et al. |
| 2009/0021162 A1 | 1/2009 | Cope et al. |
| 2009/0031027 A1 | 1/2009 | Abernethy, Jr. et al. |
| 2009/0037382 A1 | 2/2009 | Ansari et al. |
| 2009/0051961 A1 | 2/2009 | Ohsawa |
| 2009/0063274 A1 | 3/2009 | Dublin, III et al. |
| 2009/0070276 A1 | 3/2009 | Kodimer et al. |
| 2009/0070881 A1 | 3/2009 | Yellepeddy et al. |
| 2009/0079945 A1 | 3/2009 | Klosowiak et al. |
| 2009/0088204 A1 | 4/2009 | Culbert et al. |
| 2009/0091714 A1 | 4/2009 | Aufranc et al. |
| 2009/0096994 A1 | 4/2009 | Smits |
| 2009/0106671 A1 | 4/2009 | Olson et al. |
| 2009/0117846 A1 | 5/2009 | Mavrakakis |
| 2009/0136212 A1* | 5/2009 | Klein .................. 386/117 |
| 2009/0149246 A1 | 6/2009 | Opaluch |
| 2009/0150947 A1 | 6/2009 | Soderstrom |
| 2009/0164575 A1 | 6/2009 | Barbeau et al. |
| 2009/0181645 A1 | 7/2009 | Chan et al. |
| 2009/0186700 A1 | 7/2009 | Konkle |
| 2009/0217320 A1 | 8/2009 | Aldrey |
| 2009/0228937 A1 | 9/2009 | Williams |
| 2009/0295712 A1 | 12/2009 | Ritzau |
| 2009/0295835 A1 | 12/2009 | Husoy |
| 2009/0310099 A1 | 12/2009 | Jung et al. |
| 2009/0310101 A1 | 12/2009 | Jung et al. |
| 2009/0310102 A1 | 12/2009 | Jung et al. |
| 2009/0311965 A1 | 12/2009 | Jung et al. |
| 2009/0316671 A1 | 12/2009 | Rolf et al. |
| 2010/0082743 A1 | 4/2010 | Zeng et al. |
| 2010/0132034 A1 | 5/2010 | Pearce et al. |
| 2010/0153999 A1 | 6/2010 | Yates |
| 2010/0257569 A1 | 10/2010 | O'Hanlon |
| 2011/0037953 A1 | 2/2011 | Nizani et al. |
| 2011/0093340 A1 | 4/2011 | Kramer et al. |
| 2011/0179440 A1 | 7/2011 | Anderson, Jr. et al. |
| 2011/0195790 A1 | 8/2011 | Konkle |
| 2011/0255059 A1 | 10/2011 | Furui |
| 2011/0294569 A1 | 12/2011 | Tone et al. |
| 2012/0151562 A1 | 6/2012 | Ortiz et al. |
| 2012/0156983 A1 | 6/2012 | Ortiz et al. |
| 2012/0323676 A1 | 12/2012 | Dublin, III et al. |
| 2013/0067519 A1 | 3/2013 | Yates |
| 2013/0117818 A1 | 5/2013 | Diem |
| 2013/0182117 A1 | 7/2013 | Arseneau et al. |
| 2013/0219076 A1 | 8/2013 | Islam et al. |

FOREIGN PATENT DOCUMENTS

| | | | |
|---|---|---|---|
| WO | WO 2006/040725 A1 | 4/2006 | |
| WO | WO 2007/111382 A2 | 10/2007 | |

OTHER PUBLICATIONS

Allen, Danny; "Ericsson's Spider PC Concept Projects the Keyboard and Screen"; printed on Nov. 25, 2009; pp. 1-3;gizmodo.com; located at http://gizmodo.corn/5392667/ericssons-spider-pc-concept-projects-the-keyboard-and-screen.

Herrman, John; "Nikon S1000pj Projector Camera Review: Screw You All, I Love This Thing"; printed on Nov. 25, 2009; pp. 1-5; gizmodo.com; located at http://gizmodo.corn/5402528/nikon-s1000pj-projector-camera-review-screw-you-all-i-love-this-thing.

Miller, Paul; "Optoma's screen-in-a-bag actually makes a lot of sense"; bearing a date of Nov. 12 2009; printed on Nov. 25, 2009; pp. 1-5; engadget.com; located at http://www.engadget.com/2009/11/12/optomas-screen-in-a-bag-actually-rnakes-a-lot-of-sense.

Diaz, Jesus; "Is There an iPad Cinema in Your Future?"; Bearing a date of Mar. 16, 2010, printed on Mar. 19, 2010; pp. 1-2; Gizmodo.com; located at http://gizmodo.com/5494787/is-there-an-ipad-cinema-in-your-future.

Hannaford, Kat; "Pico Projector From Light Blue Optics Throws Up a 10-inch Touchscreen Laser Projection"; Bearing a date of Jan. 5, 2010, printed on Jan. 19, 2010; pp. 1-2, Gizmodo.com; located at http://gizmodo.com/5440651/pico-projector-from-light-blue-optics-throws-up-a-10+inch-touchscreen-laser-projection.

Loftus, Jack; "Dell Froot Concept Design Does Away with Keyboard, Monitor"; Bearing a date of Jan. 17, 2010, printed on Jan. 19, 2010; pp. 1-2; Gizmodo.com; located at http://gizmodo.com/5450176/dell-froot-concept-design-does-away-with-keyboard-monitor.

Blass, Evan; "Hands-On With Texas Instruments' Cellphone Projector"; Engadget; Bearing a date of Sep. 20, 2007; pp. 1-7; Weblogs, Inc.; located at: http://www.enadget.com/2007/09/20/hands-on-with-texas-instruments-cellphone-projector/; printed on Apr. 10, 2008.

Browne et al.; "Using Motion Control to Guide Augmented Reality Manufacturing Systems"; Motion Control Technology; Bearing a date of 2006; pp. 1-4; ABP International, Inc.; located at: http://www.nasatech.com/motion/features/feat_1007.htrnl; printed on May 8, 2008.

"Cell Phone With Built-in Projector"; Physorg; Bearing a date of Mar. 24, 2005; p. 1; located at: http://www.physorg.corn/news3505.html; printed on Apr. 10, 2008.

(56) References Cited

OTHER PUBLICATIONS

"Concepts: Cellphone Projector Concept Allows Impromptu Sales Meetings"; Gizmodo; pp. 1-3; located at: http://gizmodo.com/gadgets/concepts/cellphone-projector-concept-allows-impromtu-sales-meetings-311590.php; printed on Apr. 10, 2008.
Harding, Margaret; "Futuristic Windshield Helps Drivers See the Road"; Siliconvalley.com; Bearing a date of Jul. 18, 2008; pp. 1-2; located at: http://www.siliconvalley.com/ci_9919977?IADID=Search-www.siliconvalley.com-www.siliconvalley.com; printed on Aug. 18, 2008.
"Hybrid Technology"; InterSense; p. 1; InterSense, Inc.; located at: http://www.isense.com/products.aspx?id=43; printed on May 8, 2008.
"6-DOF Tracking (IS-900, IS-1200 Product Families)"; InterSense; p. 1; InterSense, Inc.; located at: http://www.isense.com/products.aspx?id=45&; printed on May 8, 2008.
"Precision Motion Tracking Solutions"; InterSense; p. 1; InterSense, Inc.; located at: http://www.isense.com/; printed on May 8, 2008.
"Is That a Projector in Your Pocket or a . . . Cell phone?"; Gadget Review; Bearing a date of Mar. 27, 2007; pp. 1-6; located at: http:www.gadgetreview.com/2007/03/is-that-a-projector-in-your-pocket-or-acell-phone.html: printed on Apr. 10, 2008.
June, Laura; "Toshiba Announces TDP-F10U Pico Projector"; Engadget; Bearing a date of Jan. 7, 2009; pp. 1-2; Weblogs, Inc.; located at: http://www.engadget.com/2009/01/07/toshiba-announces-tdp-f10u-pico-projector/; printed on Jan. 15, 2009.
Kanellos, Michael; "TI Demos its Movie Projector in a Phone"; CNET News; Bearing a date of Mar. 26, 2007; pp. 1-2; CNET Networks, Inc.; located at: http://earthlink.com/TI+demos+its+rnovie+projector+in+a+phone/2100-1041_3-6170619.html; printed on Apr. 10, 2008.
Lagorio, Christine; "Weird Science! NYU Student Invents Virtual Girlfriend"; New York Magazine; Bearing a date of May 14, 2008; pp. 1-2; New York Media LLC; located at: http://nymag.com/daily/intel/2008/05/weird_science_nyu_student_inve.html; printed on May 15, 2008.
Lam, Brian; "Bug Labs Open Source Gadgets Getting Pico Projector, 3G Modules and More"; Gizmodo; Bearing a date of Jan. 7, 2009; pp. 1-2; located at: http://i.gizmodo.com/5125563/bug-labs-open-source-gadgets-getting-pico-projector-3g-modues-and-more; printed on Jan. 15, 2008.
"LCD Projector Cell Phone Next April"; Gadget Review; Bearing a date of Apr. 13, 2006; pp. 1-6; located at: http://www.gadgetreview.com/2006/04/lcd-project-cell-phone-next-april.html; printed on Apr. 10, 2008.
Menon, Anuradha; "Flexible Computers Conform to Any Shape"; The Future of Things; Bearing a date of Jul. 3, 2008; pp. 1-3; located at: http://thefutureofthings.com/news/1222/flexible-computers-able-to-conform-any-shape.html; printed on Jul. 9, 2008.
"Micro Piezo Gyro"; Heli-Max Performance Parts; Bearing a date of 1998; pp. 1-2; located at: http://manuals.hobbico.com/hmx/hmxm1010-manual.pdf.
Miller, Ross; "WowWee Cinemin Swivel, Stick, and Station Pico PJs Hands-On"; Engadget; Bearing a date of January 7, 2009; pp. 1-3; Weblogs, Inc.; located at: http:www.engadget.com/2009/01/07/wowwee-cinemin-swivel-stick-and-station-pico-pjs-hands-on/; printed on Jan. 15, 2009.
"Mint V 10: World's Smallest Pocket Projector"; Gizmodo; Bearing a date of Aug. 18, 2008; pp. 1-3; located at: http://gizmodo.com/5031873/mint-v10-worlds-smallest-pocket-projector; printed on Aug. 18, 2008.
Mooney, Allison; "Mobile Phone Projectors"; PSFK; Bearing a date of Oct. 22, 2007; pp. 1-6; located at: http://www.pstk.com/2007/10/mobile-phone-projectors.html; printed on Apr. 10, 2008.
Murph, Darren; "3M Reveals MPro110 Pocket Projector: Ships This Month"; Engadget; Bearing a date of Sep. 13, 2008; pp. 1-5; Weblogs, Inc.; located at: http://www.engadget.com/2008/09/13/3m-reveals-mpro110-pocket-projector-ships-this-month/; printed on Sep. 22, 2008.
Murph, Darren; "TI's DLP Pico Technology Unveiled in New Round of Pico Projectors"; Engadget; Bearing a date of Jan. 7, 2009; pp. 1-2; Weblogs, Inc.; located at: http://www.engadget.com/2009/01/07/tis-dlp-pico-technology-unveiled-in-new-round-of-pico-projector/; printed on Jan. 15, 2009.
"Nano Projector Now in Cellphones"; Ubergizmo; Bearing a date of Jul. 2, 2007; pp. 1-4; located at: http://www.ubergizmo.com/15/archives/2007/07/nano_projector_now_in_cellphones.html; printed on Apr. 10, 2008.
"PicoP: Mobile Phone Projector From Microvision"; Planet Cell Phone Blog; Bearing a date of Sep. 23, 2006; pp. 1-9; located at: http://blog/planet-cell-phone.com/2006/09/23/picop-mobile-phone-projector-from-microvision/; printed on Apr. 10, 2008.
"Pico: Optoma To Launch 'World's First' Pico Projector in 2008"; Gizmodo; Bearing a date of Jun. 18, 2008; pp. 1-3; located at: http://gizmodo.com/5017516/optoma-to-launch-worlds-first-pico-projector-in-2008; printed on Jun. 23, 2008.
"Projectors: LG Projector Phone is Like a Media-Throwing Web Shooter"; Gizmodo; Bearing a date of Jul. 9, 2008: pp. 1-3; located at: http://gizmodo.com/5022626/lg-projector-phone-is-like-a-media+throwing-web-shooter; printed on Jul. 9, 2008.
"Projectors: 18 Super Small Projectors"; Gizmodo; Bearing a date of Aug. 18, 2008; pp. 1-3; located at: http://gizmodo.com/5031238/18-super-small-projectors; printed on Aug. 18, 2008.
Ricker, Thomas; "Video: Camera-Based Concept Turns any Surface into a DJ Deck"; Engadget; Bearing a date of Jul. 31, 2008; pp. 1-5; Weblogs, Inc.; located at: http://www.engadget.com/2008/07/31/video-camera-based-concept-turns-any-surface-into-a-dj-deck/; printed on Aug. 18, 2008.
Sakata et al.; "Digital Annotation System for Printed Paper Documents Using Camera-Projector Systems"; ACTA Press; Bearing a date of 2007; p. 1; located at: http://www.actapress.com/Abstract.aspx?paperId=27986; printed on May 2, 2008. (Abstract Only).
"Silicon Gyroscopes"; Boeing; pp. 1-3; located at: http://www.boeing.com/defense-space/space/bss/factsheets/gyro/gyro.html; printed on Apr. 25, 2008.
Svensson, Peter; "Projectors to Magnify Cell-Phone Cinema"; Physorg; Bearing a date of Apr. 3, 2008; pp. 1-2; The Associated Press; located at: http://www.physorg.com/news126457642.html; printed on Apr. 10, 2008.
"Technology: Micro Projectors:: Nice and Steady; Vibration-Compensated Mini Projectors"; Symbian-freak; Bearing a date of Jun. 14, 2007; pp. 1-3; Symbian Freak; located at: http://www.symbian-freak.com/news/007/06/tiny_projector_nice_and_steady.htm; printed on Apr. 28, 2008.
Topolsky, Joshua; "SenseSurface Sticks Knobs Onto Screens, Turns Virtual Controls Physical"; Engadget; Bearing a date of Jul. 16, 2008; pp. 1-7; Weblogs, Inc.; located at: http://www.engadget.com/2008/07/16/sensesurface-sticks-knobs-onto-screens-turns-virtual-controls-p/; printed on Aug. 18, 2008.
Wilson, Mark; "Logic Bolt: The US's First Projecting Cellphone"; Gizmodo; Bearing a date of Jan. 8, 2009; pp. 1-3; located at: http://i.gizmodo.com/5126754/logic-bolt-the-uss-first-projecting-cellphone; printed on Jan. 15, 2009.
Wilson, Andrew D.; Benko, Hrvoje; "Combining Multiple Depth Cameras and Projectors for Interactions on, Above, and Between Surfaces"; UIST'10; 10 total pages; bearing a date of Oct. 3-6, 2010; ACM.
U.S. Appl. No. 12/459,581, Jung et al.
U.S. Appl. No. 12/459,580, Jung et al.
U.S. Appl. No. 12/380,595, Jung et al.
U.S. Appl. No. 12/380,582, Jung et al.
U.S. Appl. No. 12/380,571, Jung et al.
U.S. Appl. No. 12/322,876, Jung et al.
U.S. Appl. No. 12/322,875, Jung et al.
U.S. Appl. No. 12/322,063, Jung et al.
U.S. Appl. No. 12/291,025, Jung et al.
U.S. Appl. No. 12/291,024, Jung et al.
U.S. Appl. No. 12/291,023, Jung et al.
U.S. Appl. No. 12/291,019, Jung et al.
U.S. Appl. No. 12/290,241, Jung et al.
U.S. Appl. No. 12/290,240, Jung et al.
U.S. Appl. No. 12/286,750, Jung et al.

(56) References Cited

OTHER PUBLICATIONS

U.S. Appl. No. 12/286,731, Jung et al.
U.S. Appl. No. 12/229,536, Jung et al.
U.S. Appl. No. 12/229,534, Jung et al.
U.S. Appl. No. 12/229,519, Jung et al.
U.S. Appl. No. 12/229,518, Jung et al.
U.S. Appl. No. 12/229,508, Jung et al.
U.S. Appl. No. 12/229,505, Jung et al.
U.S. Appl. No. 12/220,906, Jung et al.
U.S. Appl. No. 12/218,269, Jung et al.
U.S. Appl. No. 12/218,268, Jung et al.
U.S. Appl. No. 12/218,267, Jung et al.
U.S. Appl. No. 12/218,266, Jung et al.
U.S. Appl. No. 12/217,135, Jung et al.
U.S. Appl. No. 12/217,123, Jung et al.
U.S. Appl. No. 12/217,118, Jung et al.
U.S. Appl. No. 12/217,117, Jung et al.
U.S. Appl. No. 12/217,116, Jung et al.
U.S. Appl. No. 12/217,115, Jung et al.
U.S. Appl. No. 12/214,422, Jung et al.
"2010 Toyota Prius Touch Tracer Display"; KickingTires; printed on Mar. 4, 2009; pp. 1-5; located at http://blogs.cars.com/kickingtires/2009/03/2010-toyota-prius-touch-tracer-display.html.
Foo, Juniper; "MIT's 6$^{th}$ Sense device could trump Apple's multitouch"; Crave; bearing a date of Feb. 9, 2009; printed on Feb. 19, 2009; pp. 1-4; located at http://news.cnet.com/8301-17938_105-10159601-1.html.
Frucci, Adam; "MiLi Pro Turns Your iPhone Into a Projector"; Gizmodo; bearing a date of Jun. 26, 2009; printed on Jul. 8, 2009; pp. 1-3; located at http://gizmodo.com/5302942/mili-pro-turns-your-iphone-into-a-projector/gallery/.
Hereld, Mark et al.; "Introduction to Building Projection-based Tiled Display Systems"; pp. 1-9; Computer Science Department, University of Chicago.
Melanson, Donald; "Apple patent filing suggests a safer in-car touchscreen"; Engadget; bearing a date of Mar. 30, 2009; printed on Apr. 10, 2009; pp. 1-8; located at http://www.engadget.com/2009/03/30/apple-patent-filing-suggests-a-safer-in-car-touchscreen/.
Melanson, Donald; "Light Blue Optics promises tough-interface pico projectors"; Engadget; bearing a date of Jun. 3, 2009; printed on Jun. 8, 2009; pp. 1-4; located at http://www.engadget.com/2009/06/03/light-blue-optics-promises-touch-interface-pico-projectors/.
Nosowitz, Dan; "Official Specs and Prices for New Nikon Coolpix Line, Including Mutant Projector-Camera"; Gizmodo; bearing a date of Aug. 4, 2009; printed on Aug. 4, 2009; pp. 1-4; located at http://gizmodo.com/5329376/official-specs-and-prices-for-new-nikon-coolpix-line-including-mutant-projector+camera.
Oliver, Sam; "Apple may add micro projectors to iPhones, iPod touches"; Applelnsider; bearing a date of Jul. 6, 2009; printed on Jul. 8, 2009; pp. 1-8; located at http://www.appleinsider.com/articles/09/07/06/apple_may_add_micro_projectors_to iphones_ipod-touches.html/.
"Rear Projection Products and Technology"; Christie Digital; printed on Feb. 13, 2009; pp. 1-2; located at http://controlrooms.christiedigital.com/Products/RearScreenTilingProjectors/.
"Science on a Sphere"; printed on Mar. 4, 2009; pp. 1-2; located at http://sos.noaa.gov/about/.
Wilson, Mark; "New Pico Projectors Offer DVD-Quality Resolution"; Gizmodo; bearing a date of Feb. 17, 2009; printed on Feb. 19, 2009; pp. 1; located at http://i.gizmodo.com/5155132/new-pico-projectors-offer-dvd+quality-resolution.
Diaz, Jesus; "Rear-Projection Urinal Lets You Pee Over Football Games or Bill O'Reilly"; Gizmodo; bearing a date of Aug. 10, 2009; pp. 1; located at http://gizmodo.com/5333854/; printed on Aug. 10, 2009.
Lee et al.; "Automatic Projector Calibration with Embedded Light Sensors"; UIST '04; dates of Oct. 24-27, 2004; pp. 1-4; ACM.
Panasonic; "Electronic Print Board (Interactive Panaboard) Operating Instructions with Installation Manual"; bearing a date of 2001; pp. 1-86; Kyushu Matsushita Electric Co., Ltd.
U.S. Appl. No. 60/990,851, Klein, Scott V.
Lanxon, Nate; "Ubi turns any wall into a touchscreen using Microsoft Kinect;" Wired.co.uk; http://www.wired.co.uk/news/archive/2012-05/25/ubi-interactive; May 25, 2012.
"Ubi: Turn any surface into a multi-touch display;" Ubi-Interactive; http:www.ubi-interactive.com; Jan. 31. 2014.

\* cited by examiner

FIG. 40

4000 A system comprising:

4002 a signal-bearing medium bearing

4004 one or more instructions for receiving at least one projected image on at least one image capture projection surface;

one or more instructions for capturing at least a portion of the at least one projected image from the at least one image capture projection surface to form a captured image;

one or more instructions for communicating at least a portion of the captured image;

one or more instructions for receiving at least one user input on the at least one image capture projection surface;

one or more instructions for capturing the at least one user input on the at least one image capture projection surface; and one or more instructions for communicating the at least one user input 4006 a computer-readable medium 4008 a recordable medium 4010 a communications medium

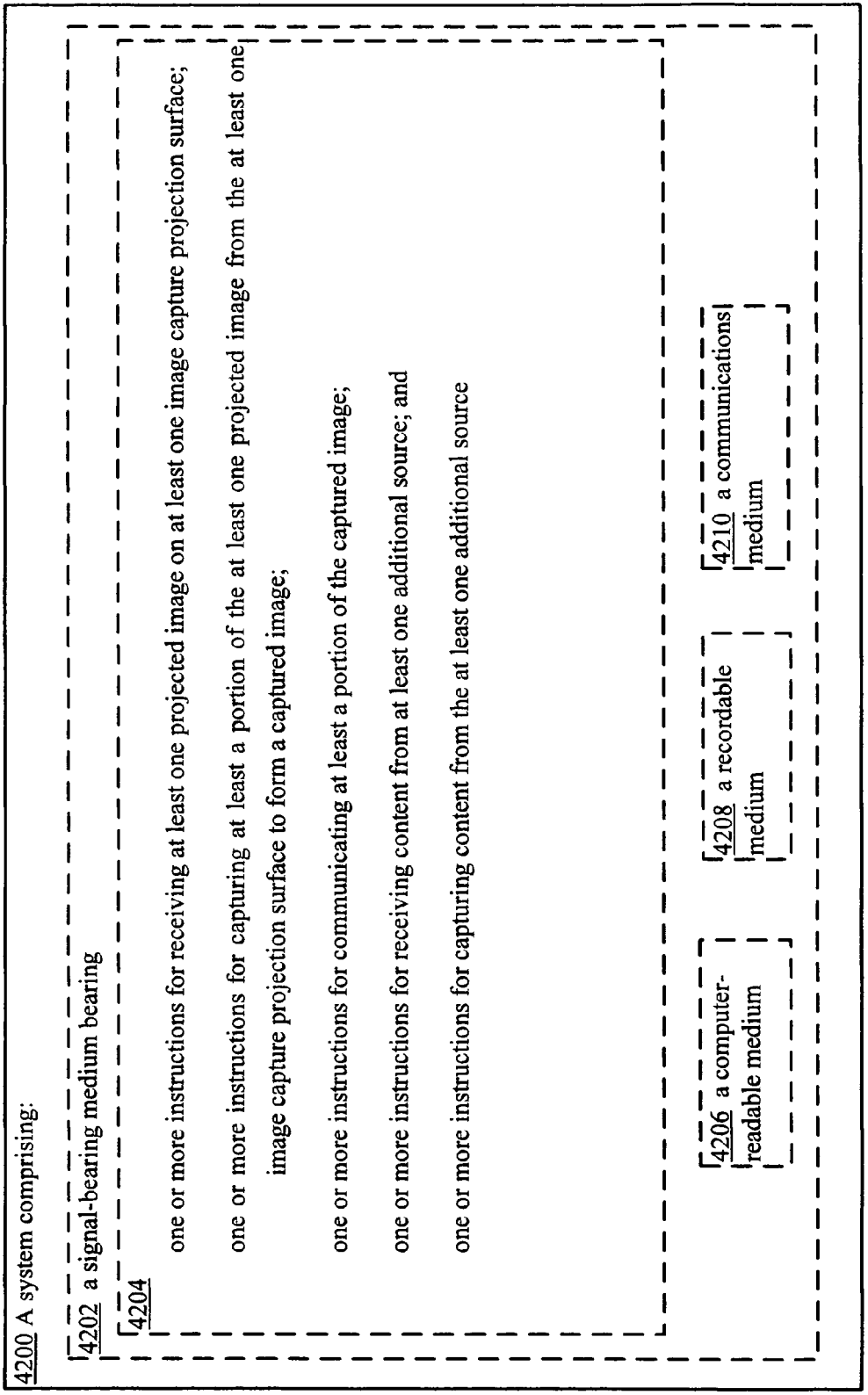

FIG. 42

4200 A system comprising:

4202 a signal-bearing medium bearing

4204 one or more instructions for receiving at least one projected image on at least one image capture projection surface;

one or more instructions for capturing at least a portion of the at least one projected image from the at least one image capture projection surface to form a captured image;

one or more instructions for communicating at least a portion of the captured image;

one or more instructions for receiving content from at least one additional source; and one or more instructions for capturing content from the at least one additional source 4206 a computer-readable medium 4208 a recordable medium 4210 a communications medium

FIG. 48

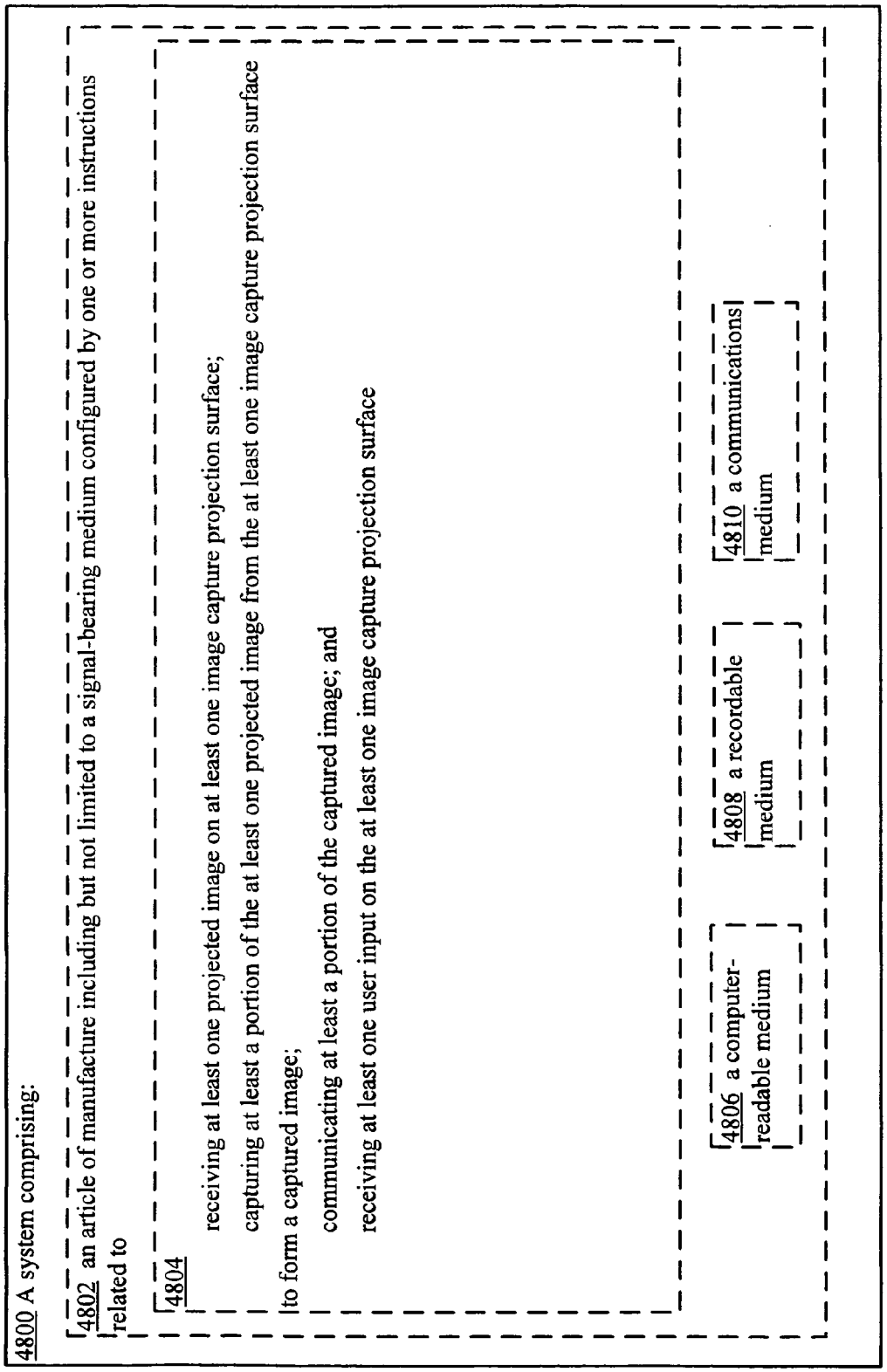

4800 A system comprising:

4802 an article of manufacture including but not limited to a signal-bearing medium configured by one or more instructions related to 4804
receiving at least one projected image on at least one image capture projection surface;
capturing at least a portion of the at least one projected image from the at least one image capture projection surface to form a captured image;
communicating at least a portion of the captured image; and
receiving at least one user input on the at least one image capture projection surface 4806 a computer-readable medium 4808 a recordable medium 4810 a communications medium

FIG. 55

5500 A system comprising:

5502 an article of manufacture including but not limited to a signal-bearing medium configured by one or more instructions related to 5504
    receiving at least one projected image on at least one image capture projection surface;
    capturing at least a portion of the at least one projected image from the at least one image capture projection surface to form a captured image;
    communicating at least a portion of the captured image;
    receiving audio content; and
    capturing at least a portion of the audio content to form captured audio content 5506 a computer-readable medium 5508 a recordable medium 5510 a communications medium

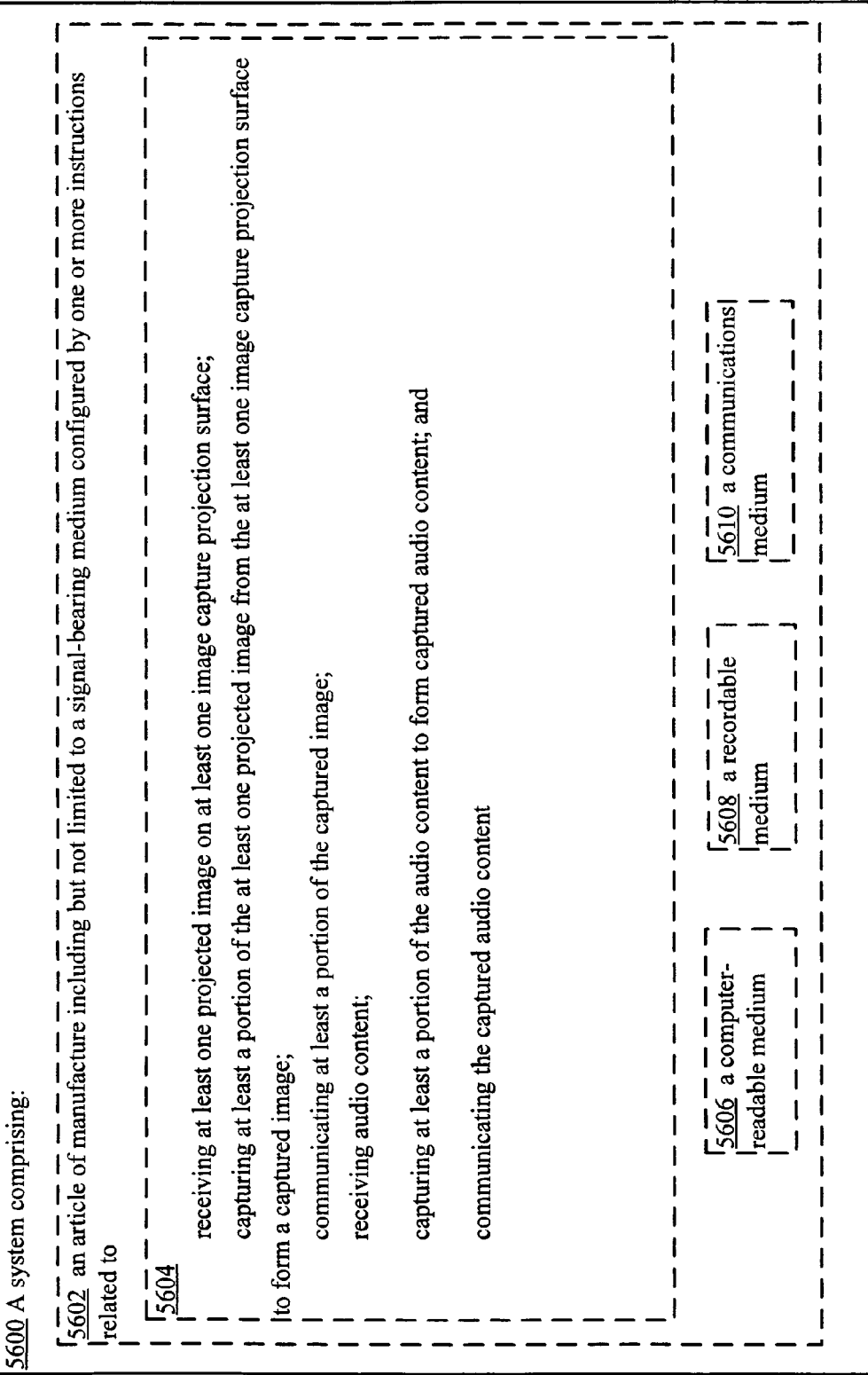

METHODS AND SYSTEMS RELATED TO AN IMAGE CAPTURE PROJECTION SURFACE

RELATED APPLICATIONS

For purposes of the USPTO extra-statutory requirements, the present application constitutes a continuation-in-part of U.S. patent application Ser. No. 12/214,422, entitled SYSTEMS AND DEVICES, naming Edward K. Y. Jung, Eric C. Leuthardt, Royce A. Levien, Robert W. Lord, Mark A. Malamud, John D. Rinaldo, Jr., and Lowell L. Wood, Jr. as inventors, filed 17 Jun. 2008, which is currently co-pending, or is an application of which a currently co-pending application is entitled to the benefit of the filing date.

For purposes of the USPTO extra-statutory requirements, the present application constitutes a continuation-in-part of U.S. patent application Ser. No. 12/217,118, entitled MOTION RESPONSIVE DEVICES AND SYSTEMS, naming Edward K. Y. Jung, Eric C. Leuthardt, Royce A. Levien, Robert W. Lord, Mark A. Malamud, John D. Rinaldo, Jr., and Lowell L. Wood, Jr. as inventors, filed 30 Jun. 2008, now U.S. Pat. No. 8,403,501.

For purposes of the USPTO extra-statutory requirements, the present application constitutes a continuation-in-part of U.S. patent application Ser. No. 12/217,116, entitled SYSTEMS AND METHODS FOR PROJECTING, naming Edward K. Y. Jung, Eric C. Leuthardt, Royce A. Levien, Robert W. Lord, Mark A. Malamud, John D. Rinaldo, Jr., and Lowell L. Wood, Jr. as inventors, filed 30 Jun. 2008, now U.S. Pat. No. 8,430,515.

For purposes of the USPTO extra-statutory requirements, the present application constitutes a continuation-in-part of U.S. patent application Ser. No. 12/217,115, entitled SYSTEMS AND METHODS FOR TRANSMITTING INFORMATION ASSOCIATED WITH PROJECTING, naming Edward K. Y. Jung, Eric C. Leuthardt, Royce A. Levien, Robert W. Lord, Mark A. Malamud, John D. Rinaldo, Jr., and Lowell L. Wood, Jr. as inventors, filed 30 Jun. 2008, now U.S. Pat. No. 8,262,236.

For purposes of the USPTO extra-statutory requirements, the present application constitutes a continuation-in-part of U.S. patent application Ser. No. 12/217,123, entitled SYSTEMS AND METHODS FOR RECEIVING INFORMATION ASSOCIATED WITH PROJECTING, naming Edward K. Y. Jung, Eric C. Leuthardt, Royce A. Levien, Robert W. Lord, Mark A. Malamud, John D. Rinaldo, Jr., and Lowell L. Wood, Jr. as inventors, filed 30 Jun. 2008, now U.S. Pat. No. 8,540,381.

For purposes of the USPTO extra-statutory requirements, the present application constitutes a continuation-in-part of U.S. patent application Ser. No. 12/217,135, entitled SYSTEMS AND METHODS FOR PROJECTING IN RESPONSE TO POSITION, naming Edward K. Y. Jung, Eric C. Leuthardt, Royce A. Levien, Robert W. Lord, Mark A. Malamud, John D. Rinaldo, Jr., and Lowell L. Wood, Jr. as inventors, filed 30 Jun. 2008, now U.S. Pat. No. 8,376,558.

For purposes of the USPTO extra-statutory requirements, the present application constitutes a continuation-in-part of U.S. patent application Ser. No. 12/217,117, entitled SYSTEMS AND METHODS FOR PROJECTING IN RESPONSE TO CONFORMATION, naming Edward K. Y. Jung, Eric C. Leuthardt, Royce A. Levien, Robert W. Lord, Mark A. Malamud, John D. Rinaldo, Jr., and Lowell L. Wood, Jr. as inventors, filed 30 Jun. 2008, now U.S. Pat. No. 8,608,321.

For purposes of the USPTO extra-statutory requirements, the present application constitutes a continuation-in-part of U.S. patent application Ser. No. 12/218,269, entitled SYSTEMS AND METHODS FOR TRANSMITTING IN RESPONSE TO POSITION, naming Edward K. Y. Jung, Eric C. Leuthardt, Royce A. Levien, Richard T. Lord, Robert W. Lord, Mark A. Malamud, John D. Rinaldo, Jr., and Lowell L. Wood, Jr. as inventors, filed 11 Jul. 2008, now U.S. Pat. No. 8,384,005.

For purposes of the USPTO extra-statutory requirements, the present application constitutes a continuation-in-part of U.S. patent application Ser. No. 12/218,266, entitled SYSTEMS AND METHODS FOR PROJECTING IN RESPONSE TO POSITION, naming Edward K. Y. Jung, Eric C. Leuthardt, Royce A. Levien, Richard T. Lord, Robert W. Lord, Mark A. Malamud, John D. Rinaldo, Jr., and Lowell L. Wood, Jr. as inventors, filed 11 Jul. 2008, which is currently co-pending, or is an application of which a currently co-pending application is entitled to the benefit of the filing date.

For purposes of the USPTO extra-statutory requirements, the present application constitutes a continuation-in-part of U.S. patent application Ser. No. 12/218,267, entitled SYSTEMS AND METHODS ASSOCIATED WITH PROJECTING IN RESPONSE TO CONFORMATION, naming Edward K. Y. Jung, Eric C. Leuthardt, Royce A. Levien, Richard T. Lord, Robert W. Lord, Mark A. Malamud, John D. Rinaldo, Jr., and Lowell L. Wood, Jr. as inventors, filed 11 Jul. 2008, which is currently co-pending, or is an application of which a currently co-pending application is entitled to the benefit of the filing date.

For purposes of the USPTO extra-statutory requirements, the present application constitutes a continuation-in-part of U.S. patent application Ser. No. 12/218,268, entitled SYSTEMS AND METHODS ASSOCIATED WITH PROJECTING IN RESPONSE TO CONFORMATION, naming Edward K. Y. Jung, Eric C. Leuthardt, Royce A. Levien, Richard T. Lord, Robert W. Lord, Mark A. Malamud, John D. Rinaldo, Jr., and Lowell L. Wood, Jr. as inventors, filed 11 Jul. 2008, which is currently co-pending, or is an application of which a currently co-pending application is entitled to the benefit of the filing date.

For purposes of the USPTO extra-statutory requirements, the present application constitutes a continuation-in-part of U.S. patent application Ser. No. 12/220,906, entitled METHODS AND SYSTEMS FOR RECEIVING AND TRANSMITTING SIGNALS ASSOCIATED WITH PROJECTION, naming Edward K. Y. Jung, Eric C. Leuthardt, Royce A. Levien, Richard T. Lord, Robert W. Lord, Mark A. Malamud, John D. Rinaldo, Jr., and Lowell L. Wood, Jr. as inventors, filed 28 Jul. 2008, which is currently co-pending, or is an application of which a currently co-pending application is entitled to the benefit of the filing date.

For purposes of the USPTO extra-statutory requirements, the present application constitutes a continuation-in-part of U.S. patent application Ser. No. 12/229,534, entitled PROJECTION IN RESPONSE TO POSITION, naming Edward K. Y. Jung, Eric C. Leuthardt, Royce A. Levien, Richard T. Lord, Robert W. Lord, Mark A. Malamud, John D. Rinaldo, Jr., and Lowell L. Wood, Jr. as inventors, filed 22 Aug. 2008, which is currently co-pending, or is an application of which a currently co-pending application is entitled to the benefit of the filing date.

For purposes of the USPTO extra-statutory requirements, the present application constitutes a continuation-in-part of U.S. patent application Ser. No. 12/229,518, entitled PROJECTION IN RESPONSE TO CONFORMATION, naming Edward K. Y. Jung, Eric C. Leuthardt, Royce A. Levien, Richard T. Lord, Robert W. Lord, Mark A. Malamud, John D. Rinaldo, Jr., and Lowell L. Wood, Jr. as inventors, filed 22

Aug. 2008, which is currently co-pending, or is an application of which a currently co-pending application is entitled to the benefit of the filing date.

For purposes of the USPTO extra-statutory requirements, the present application constitutes a continuation-in-part of U.S. patent application Ser. No. 12/229,505, entitled METHODS AND SYSTEMS FOR PROJECTING IN RESPONSE TO POSITION, naming Edward K. Y. Jung, Eric C. Leuthardt, Royce A. Levien, Richard T. Lord, Robert W. Lord, Mark A. Malamud, John D. Rinaldo, Jr., and Lowell L. Wood, Jr. as inventors, filed 22 Aug. 2008, now U.S. Pat. No. 8,602,564.

For purposes of the USPTO extra-statutory requirements, the present application constitutes a continuation-in-part of U.S. patent application Ser. No. 12/229,519, entitled METHODS AND SYSTEMS FOR PROJECTING IN RESPONSE TO POSITION, naming Edward K. Y. Jung, Eric C. Leuthardt, Royce A. Levien, Richard T. Lord, Robert W. Lord, Mark A. Malamud, John D. Rinaldo, Jr., and Lowell L. Wood, Jr. as inventors, filed 22 Aug. 2008, which is currently co-pending, or is an application of which a currently co-pending application is entitled to the benefit of the filing date.

For purposes of the USPTO extra-statutory requirements, the present application constitutes a continuation-in-part of U.S. patent application Ser. No. 12/229,536, entitled METHODS AND SYSTEMS FOR PROJECTING IN RESPONSE TO CONFORMATION, naming Edward K. Y. Jung, Eric C. Leuthardt, Royce A. Levien, Richard T. Lord, Robert W. Lord, Mark A. Malamud, John D. Rinaldo, Jr., and Lowell L. Wood, Jr. as inventors, filed 22 Aug. 2008, which is currently co-pending, or is an application of which a currently co-pending application is entitled to the benefit of the filing date.

For purposes of the USPTO extra-statutory requirements, the present application constitutes a continuation-in-part of U.S. patent application Ser. No. 12/229,508, entitled METHODS AND SYSTEMS FOR PROJECTING IN RESPONSE TO CONFORMATION, naming Edward K. Y. Jung, Eric C. Leuthardt, Royce A. Levien, Richard T. Lord, Robert W. Lord, Mark A. Malamud, John D. Rinaldo, Jr., and Lowell L. Wood, Jr. as inventors, filed 22 Aug. 2008, which is currently co-pending, or is an application of which a currently co-pending application is entitled to the benefit of the filing date.

For purposes of the USPTO extra-statutory requirements, the present application constitutes a continuation-in-part of U.S. patent application Ser. No. 12/286,731, entitled PROJECTION ASSOCIATED METHODS AND SYSTEMS, naming Edward K. Y. Jung, Eric C. Leuthardt, Royce A. Levien, Richard T. Lord, Robert W. Lord, Mark A. Malamud, John D. Rinaldo, Jr., and Lowell L. Wood, Jr. as inventors, filed 30 Sep. 2008, which is currently co-pending, or is an application of which a currently co-pending application is entitled to the benefit of the filing date.

For purposes of the USPTO extra-statutory requirements, the present application constitutes a continuation-in-part of U.S. patent application Ser. No. 12/286,750, entitled PROJECTION ASSOCIATED METHODS AND SYSTEMS, naming Edward K. Y. Jung, Eric C. Leuthardt, Royce A. Levien, Richard T. Lord, Robert W. Lord, Mark A. Malamud, John D. Rinaldo, Jr., and Lowell L. Wood, Jr. as inventors, filed 30 Sep. 2008, which is currently co-pending, or is an application of which a currently co-pending application is entitled to the benefit of the filing date.

For purposes of the USPTO extra-statutory requirements, the present application constitutes a continuation-in-part of U.S. patent application Ser. No. 12/290,240, entitled METHODS ASSOCIATED WITH RECEIVING AND TRANSMITTING INFORMATION RELATED TO PROJECTION, naming Edward K. Y. Jung, Eric C. Leuthardt, Royce A. Levien, Richard T. Lord, Robert W. Lord, Mark A. Malamud, John D. Rinaldo, Jr., and Lowell L. Wood, Jr. as inventors, filed 27 Oct. 2008, now U.S. Pat. No. 8,267,526.

For purposes of the USPTO extra-statutory requirements, the present application constitutes a continuation-in-part of U.S. patent application Ser. No. 12/290,241, entitled SYSTEMS ASSOCIATED WITH RECEIVING AND TRANSMITTING INFORMATION RELATED TO PROJECTION, naming Edward K. Y. Jung, Eric C. Leuthardt, Royce A. Levien, Richard T. Lord, Robert W. Lord, Mark A. Malamud, John D. Rinaldo, Jr., and Lowell L. Wood, Jr. as inventors, filed 27 Oct. 2008, now U.S. Pat. No. 8,308,304.

For purposes of the USPTO extra-statutory requirements, the present application constitutes a continuation-in-part of U.S. patent application Ser. No. 12/291,019, entitled METHODS ASSOCIATED WITH PROJECTION BILLING, naming Edward K. Y. Jung, Eric C. Leuthardt, Royce A. Levien, Richard T. Lord, Robert W. Lord, Mark A. Malamud, John D. Rinaldo, Jr., and Lowell L. Wood, Jr. as inventors, filed 30 Oct. 2008, which is currently co-pending, or is an application of which a currently co-pending application is entitled to the benefit of the filing date.

For purposes of the USPTO extra-statutory requirements, the present application constitutes a continuation-in-part of U.S. patent application Ser. No. 12/291,024, entitled SYSTEMS ASSOCIATED WITH PROJECTION BILLING, naming Edward K. Y. Jung, Eric C. Leuthardt, Royce A. Levien, Richard T. Lord, Robert W. Lord, Mark A. Malamud, John D. Rinaldo, Jr., and Lowell L. Wood, Jr. as inventors, filed 30 Oct. 2008, which is currently co-pending, or is an application of which a currently co-pending application is entitled to the benefit of the filing date.

For purposes of the USPTO extra-statutory requirements, the present application constitutes a continuation-in-part of U.S. patent application Ser. No. 12/291,023, entitled METHODS ASSOCIATED WITH PROJECTION SYSTEM BILLING, naming Edward K. Y. Jung, Eric C. Leuthardt, Royce A. Levien, Richard T. Lord, Robert W. Lord, Mark A. Malamud, John D. Rinaldo, Jr., and Lowell L. Wood, Jr. as inventors, filed 30 Oct. 2008, which is currently co-pending, or is an application of which a currently co-pending application is entitled to the benefit of the filing date.

For purposes of the USPTO extra-statutory requirements, the present application constitutes a continuation-in-part of U.S. patent application Ser. No. 12/291,025, entitled SYSTEMS ASSOCIATED WITH PROJECTION SYSTEM BILLING, naming Edward K. Y. Jung, Eric C. Leuthardt, Royce A. Levien, Richard T. Lord, Robert W. Lord, Mark A. Malamud, John D. Rinaldo, Jr., and Lowell L. Wood, Jr. as inventors, filed 30 Oct. 2008, which is currently co-pending, or is an application of which a currently co-pending application is entitled to the benefit of the filing date.

For purposes of the USPTO extra-statutory requirements, the present application constitutes a continuation-in-part of U.S. patent application Ser. No. 12/322,063, entitled METHODS AND SYSTEMS FOR USER PARAMETER RESPONSIVE PROJECTION, naming Edward K. Y. Jung, Eric C. Leuthardt, Royce A. Levien, Richard T. Lord, Robert W. Lord, Mark A. Malamud, John D. Rinaldo, Jr., and Lowell L. Wood, Jr. as inventors, filed 27 Jan. 2009, which is currently co-pending, or is an application of which a currently co-pending application is entitled to the benefit of the filing date.

For purposes of the USPTO extra-statutory requirements, the present application constitutes a continuation-in-part of U.S. patent application Ser. No. 12/322,875, entitled METH- ODS AND SYSTEMS FOR TRANSMITTING INSTRUCTIONS ASSOCIATED WITH USER PARAMETER RESPONSIVE PROJECTION, naming Edward K. Y. Jung, Eric C. Leuthardt, Royce A. Levien, Richard T. Lord, Robert W. Lord, Mark A. Malamud, John D. Rinaldo, Jr., and Lowell L. Wood, Jr. as inventors, filed 5 Feb. 2009, which is currently co-pending, or is an application of which a currently co-pending application is entitled to the benefit of the filing date.

For purposes of the USPTO extra-statutory requirements, the present application constitutes a continuation-in-part of U.S. patent application Ser. No. 12/322,876, entitled METHODS AND SYSTEMS FOR RECEIVING INSTRUCTIONS ASSOCIATED WITH USER PARAMETER RESPONSIVE PROJECTION, naming Edward K. Y. Jung, Eric C. Leuthardt, Royce A. Levien, Richard T. Lord, Robert W. Lord, Mark A. Malamud, John D. Rinaldo, Jr., and Lowell L. Wood, Jr. as inventors, filed 5 Feb. 2009, which is currently co-pending, or is an application of which a currently co-pending application is entitled to the benefit of the filing date.

For purposes of the USPTO extra-statutory requirements, the present application constitutes a continuation-in-part of U.S. patent application Ser. No. 12/380,595, entitled METHODS AND SYSTEMS FOR COORDINATED USE OF TWO OR MORE USER RESPONSIVE PROJECTORS, naming Edward K. Y. Jung, Eric C. Leuthardt, Royce A. Levien, Richard T. Lord, Robert W. Lord, Mark A. Malamud, John D. Rinaldo, Jr., and Lowell L. Wood, Jr. as inventors, filed 27 Feb. 2009, which is currently co-pending, or is an application of which a currently co-pending application is entitled to the benefit of the filing date.

For purposes of the USPTO extra-statutory requirements, the present application constitutes a continuation-in-part of U.S. patent application Ser. No. 12/380,571, entitled METHODS AND SYSTEMS FOR TRANSMITTING INFORMATION ASSOCIATED WITH THE coordinated use of two or more user responsive projectors, naming Edward K. Y. Jung, Eric C. Leuthardt, Royce A. Levien, Richard T. Lord, Robert W. Lord, Mark A. Malamud, John D. Rinaldo, Jr., and Lowell L. Wood, Jr. as inventors, filed 27 Feb. 2009, which is currently co-pending, or is an application of which a currently co-pending application is entitled to the benefit of the filing date.

For purposes of the USPTO extra-statutory requirements, the present application constitutes a continuation-in-part of U.S. patent application Ser. No. 12/380,582, entitled METHODS AND SYSTEMS FOR RECEIVING INFORMATION ASSOCIATED WITH THE COORDINATED USE OF TWO OR MORE USER RESPONSIVE PROJECTORS, naming Edward K. Y. Jung, Eric C. Leuthardt, Royce A. Levien, Richard T. Lord, Robert W. Lord, Mark A. Malamud, John D. Rinaldo, Jr., and Lowell L. Wood, Jr. as inventors, filed 27 Feb. 2009, which is currently co-pending, or is an application of which a currently co-pending application is entitled to the benefit of the filing date.

CROSS-REFERENCE TO RELATED APPLICATIONS

The present application is related to and claims the benefit of the earliest available effective filing date(s) from the following listed application(s) (the "Related Applications") (e.g., claims earliest available priority dates for other than provisional patent applications or claims benefits under 35 USC §119(e) for provisional patent applications, for any and all parent, grandparent, great-grandparent, etc. applications of the Related Application(s)).

The United States Patent Office (USPTO) has published a notice to the effect that the USPTO's computer programs require that patent applicants reference both a serial number and indicate whether an application is a continuation or continuation-in-part. Stephen G. Kunin, Benefit of Prior-Filed Application, USPTO Official Gazette Mar. 18, 2003, available at http://www.uspto.gov/web/offices/com/sol/og/2003/week11/patbene.htm. The present Applicant Entity (hereinafter "Applicant") has provided above a specific reference to the application(s) from which priority is being claimed as recited by statute. Applicant understands that the statute is unambiguous in its specific reference language and does not require either a serial number or any characterization, such as "continuation" or "continuation-in-part," for claiming priority to U.S. patent applications. Notwithstanding the foregoing, Applicant understands that the USPTO's computer programs have certain data entry requirements, and hence Applicant is designating the present application as a continuation-in-part of its parent applications as set forth above, but expressly points out that such designations are not to be construed in any way as any type of commentary and/or admission as to whether or not the present application contains any new matter in addition to the matter of its parent application(s).

All subject matter of the Related Applications and of any and all parent, grandparent, great-grandparent, etc. applications of the Related Applications is incorporated herein by reference to the extent such subject matter is not inconsistent herewith.

TECHNICAL FIELD

The present disclosure relates to systems and methods that are related to an image capture projection surface.

SUMMARY

In one aspect, a method includes but is not limited to receiving at least one projected image on at least one image capture projection surface; capturing at least a portion of the at least one projected image from the at least one image capture projection surface to form a captured image; and communicating at least a portion of the captured image. In addition to the foregoing, other aspects are described in the claims, drawings, and text forming a part of the present disclosure.

In one aspect, a system includes but is not limited to circuitry for receiving at least one projected image on at least one image capture projection surface; circuitry for capturing at least a portion of the at least one projected image from the at least one image capture projection surface to form a captured image; and circuitry for communicating at least a portion of the captured image. In addition to the foregoing, other aspects are described in the claims, drawings, and text forming a part of the present disclosure.

In one aspect, a system includes but is not limited to a signal-bearing medium bearing one or more instructions for receiving at least one projected image on at least one image capture projection surface; one or more instructions for capturing at least a portion of the at least one projected image from the at least one image capture projection surface to form a captured image; and one or more instructions for communicating at least a portion of the captured image. In addition to the foregoing, other aspects are described in the claims, drawings, and text forming a part of the present disclosure.

In one aspect, a system includes but is not limited to an article of manufacture including but not limited to a signal-bearing medium configured by one or more instructions related to: receiving at least one projected image on at least one image capture projection surface; capturing at least a portion of the at least one projected image from the at least one image capture projection surface to form a captured image; communicating at least a portion of the captured image. In addition to the foregoing, other system aspects are described in the claims, drawings, and text forming a part of the present disclosure.

In one aspect, a system includes but is not limited to means for receiving at least one projected image on at least one image capture projection surface; means for capturing at least a portion of the at least one projected image from the at least one image capture projection surface to form a captured image; and means for communicating at least a portion of the captured image. In addition to the foregoing, other system aspects are described in the claims, drawings, and text forming a part of the present disclosure.

In one or more various aspects, means include but are not limited to circuitry and/or programming for effecting the herein referenced functional aspects; the circuitry and/or programming can be virtually any combination of hardware, software, and/or firmware configured to effect the herein referenced functional aspects depending upon the design choices of the system designer. In addition to the foregoing, other system aspects means are described in the claims, drawings, and/or text forming a part of the present disclosure.

In one or more various aspects, related systems include but are not limited to circuitry and/or programming for effecting the herein-referenced method aspects; the circuitry and/or programming can be virtually any combination of hardware, software, and/or firmware configured to effect the herein referenced method aspects depending upon the design choices of the system designer. In addition to the foregoing, other system aspects are described in the claims, drawings, and/or text forming a part of the present application.

The foregoing is a summary and thus may contain simplifications, generalizations, inclusions, and/or omissions of detail; consequently, those skilled in the art will appreciate that the summary is illustrative only and is NOT intended to be in any way limiting. Other aspects, features, and advantages of the devices and/or processes and/or other subject matter described herein will become apparent in the teachings set forth herein.

BRIEF DESCRIPTION OF THE FIGURES

FIGS. 37-46 illustrate example computer systems for implementing embodiments.

FIGS. 47-56 illustrate example articles of manufacture for implementing embodiments.

DETAILED DESCRIPTION

Figure 1:
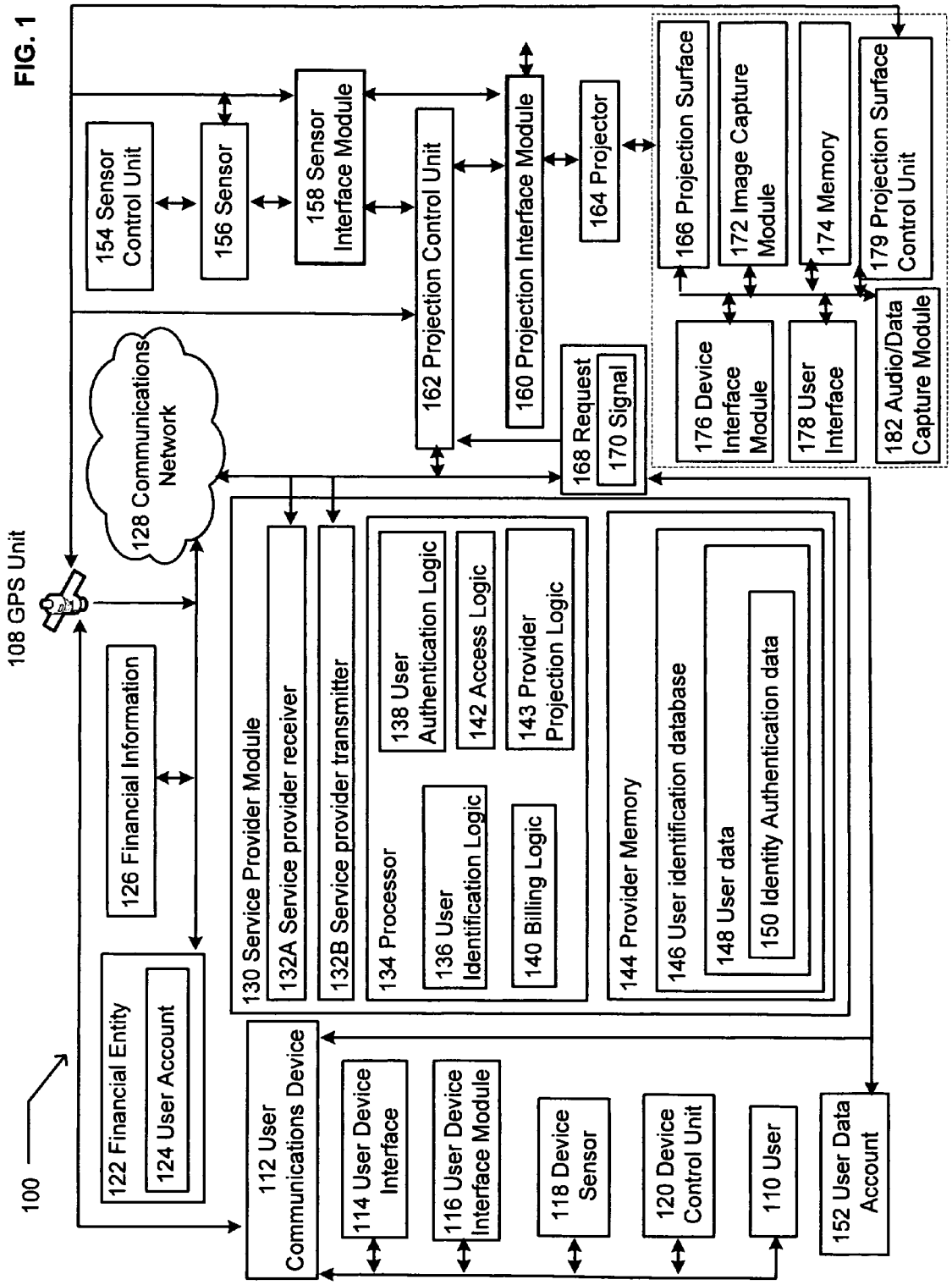
FIG. 1 illustrates an example system in which embodiments may be implemented.
Figure 2:
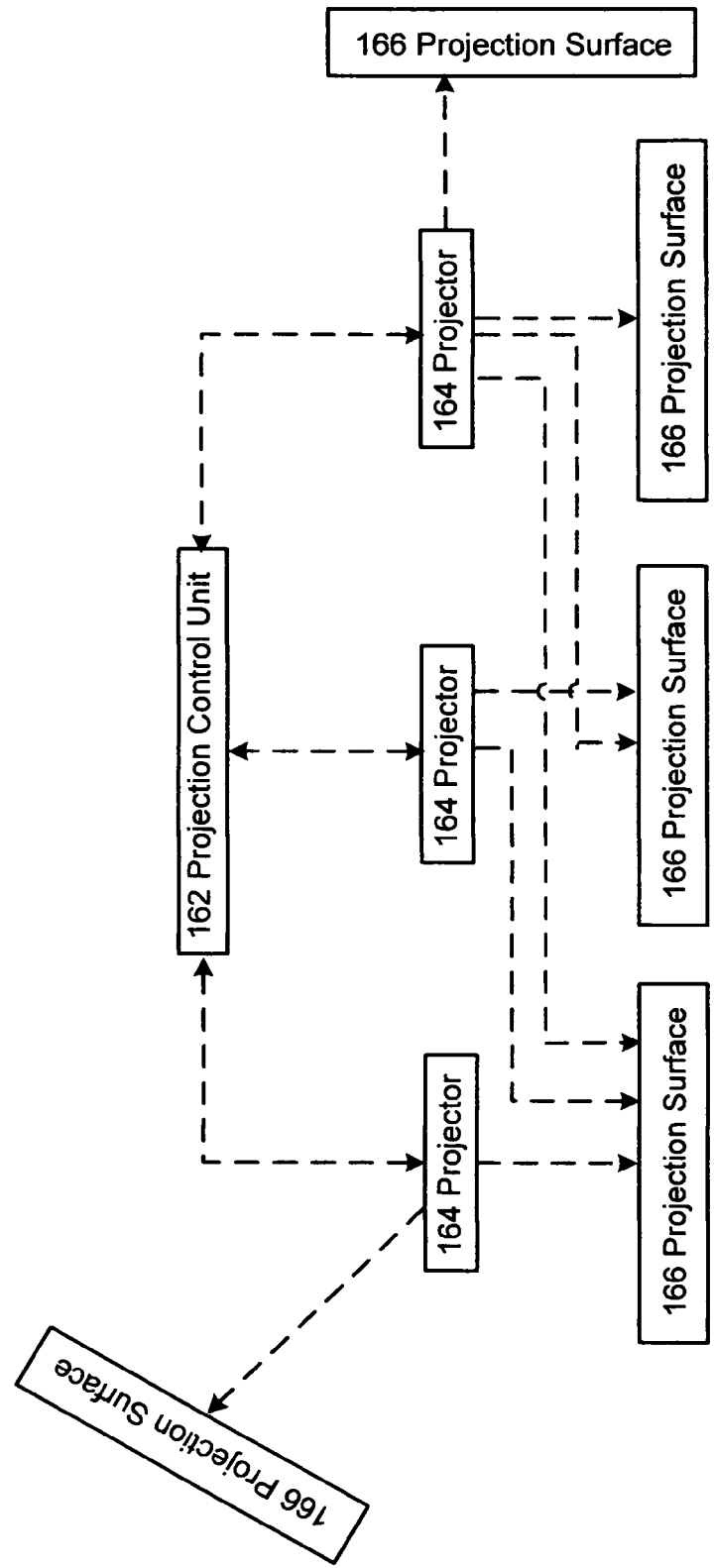
FIGS. 2-10 illustrate embodiments of components shown in FIG. 1.
Figure 3:
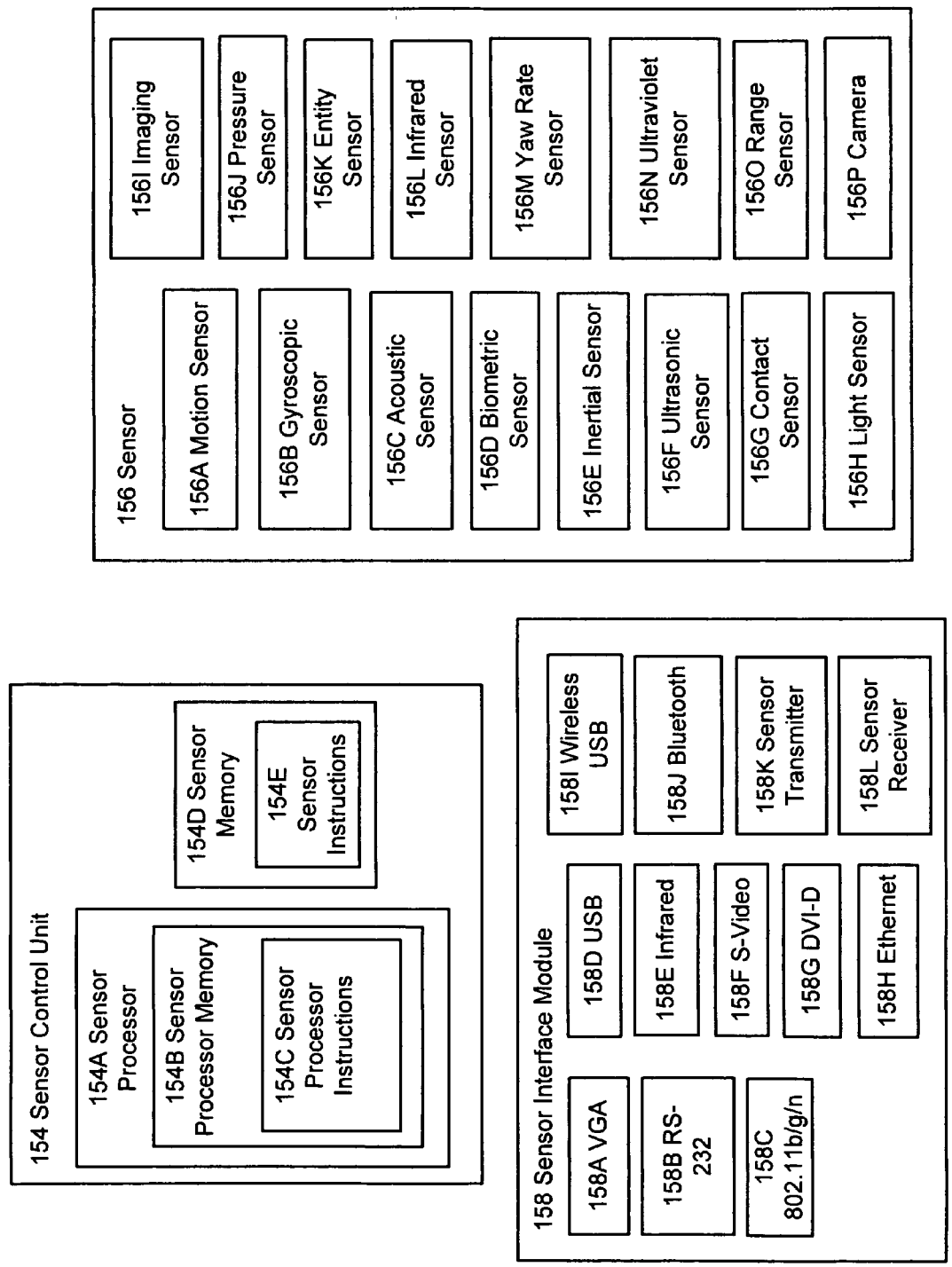
Figure 4:
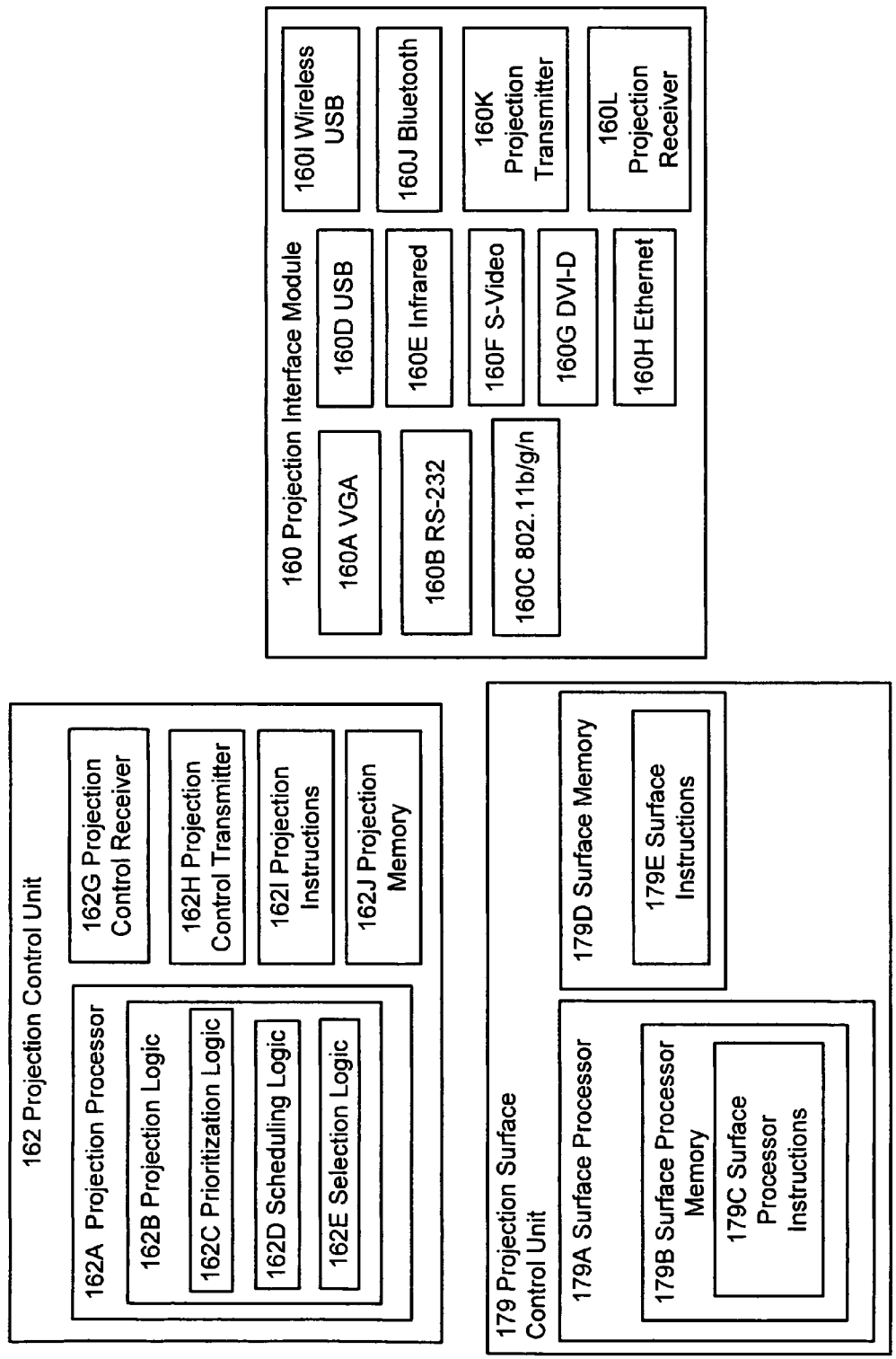
Figure 5:
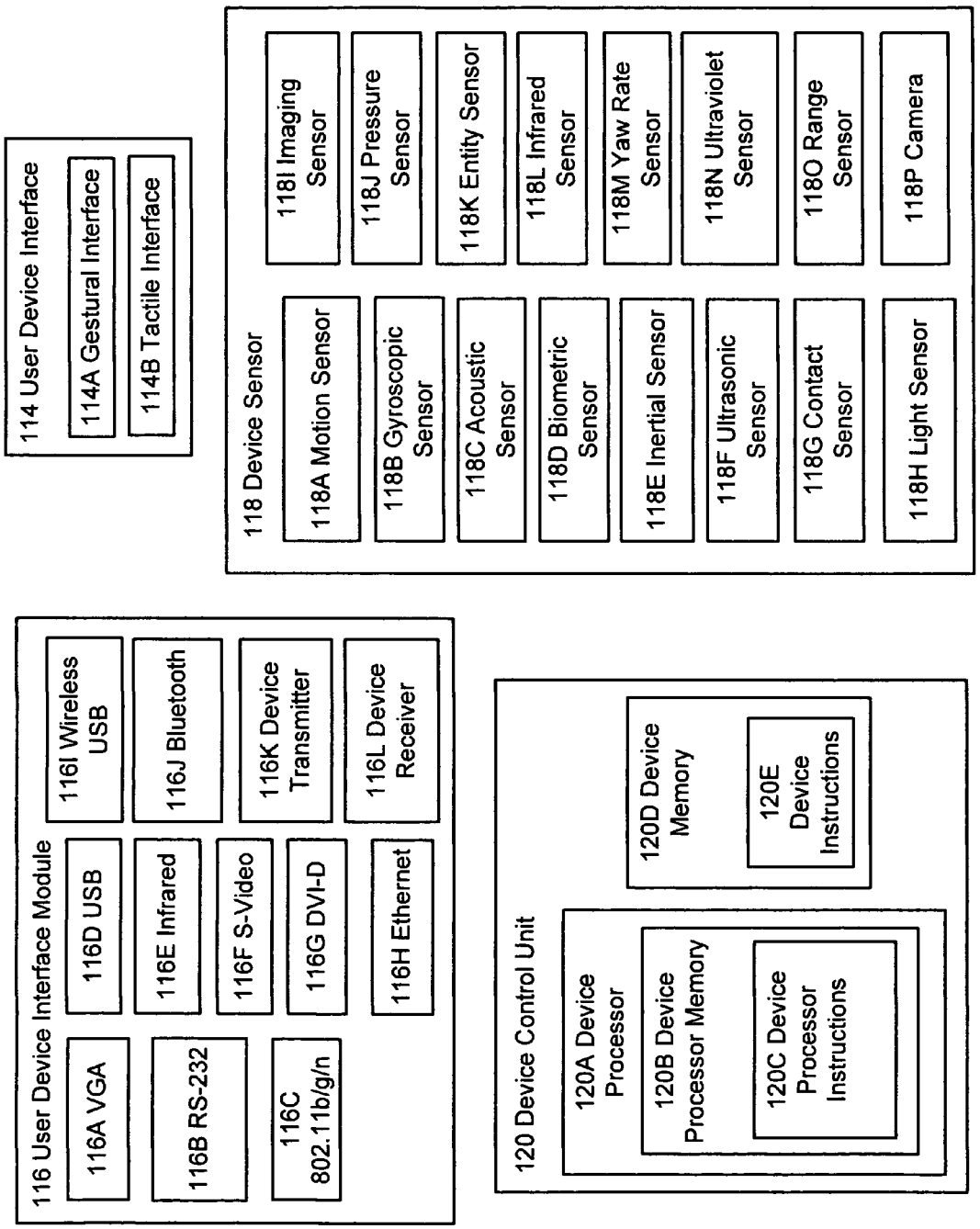
Figure 6:
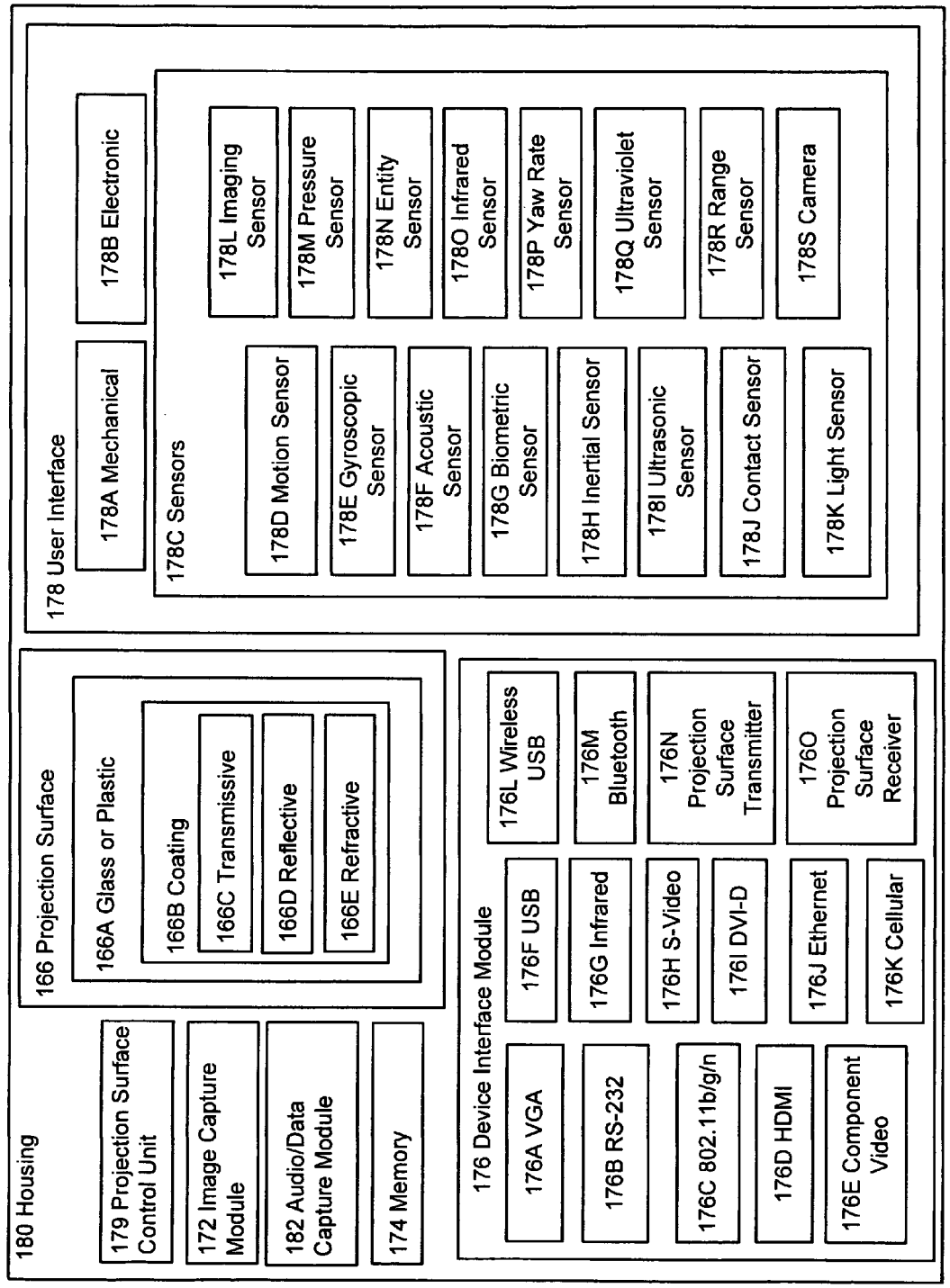
Figure 7:
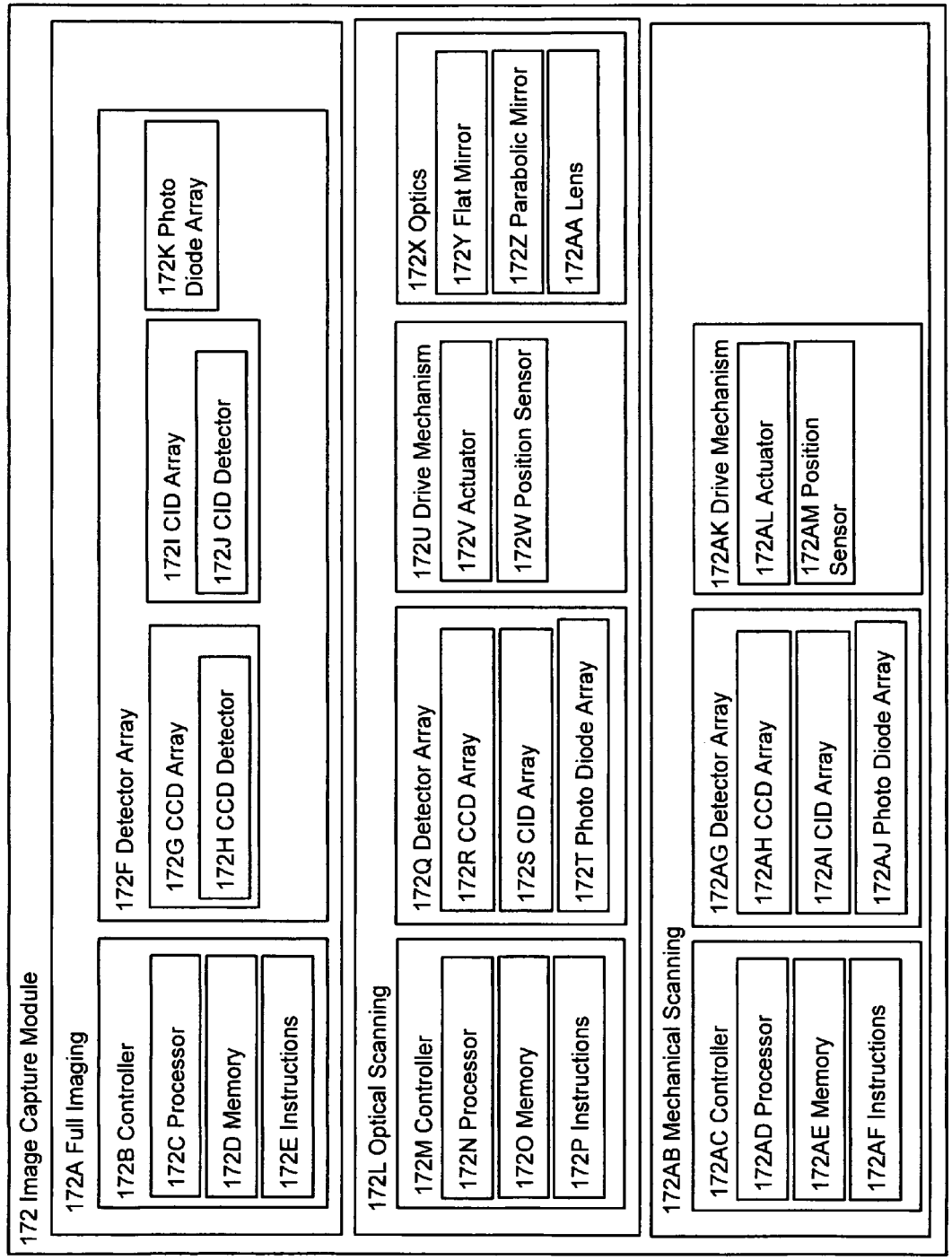
Figure 8:
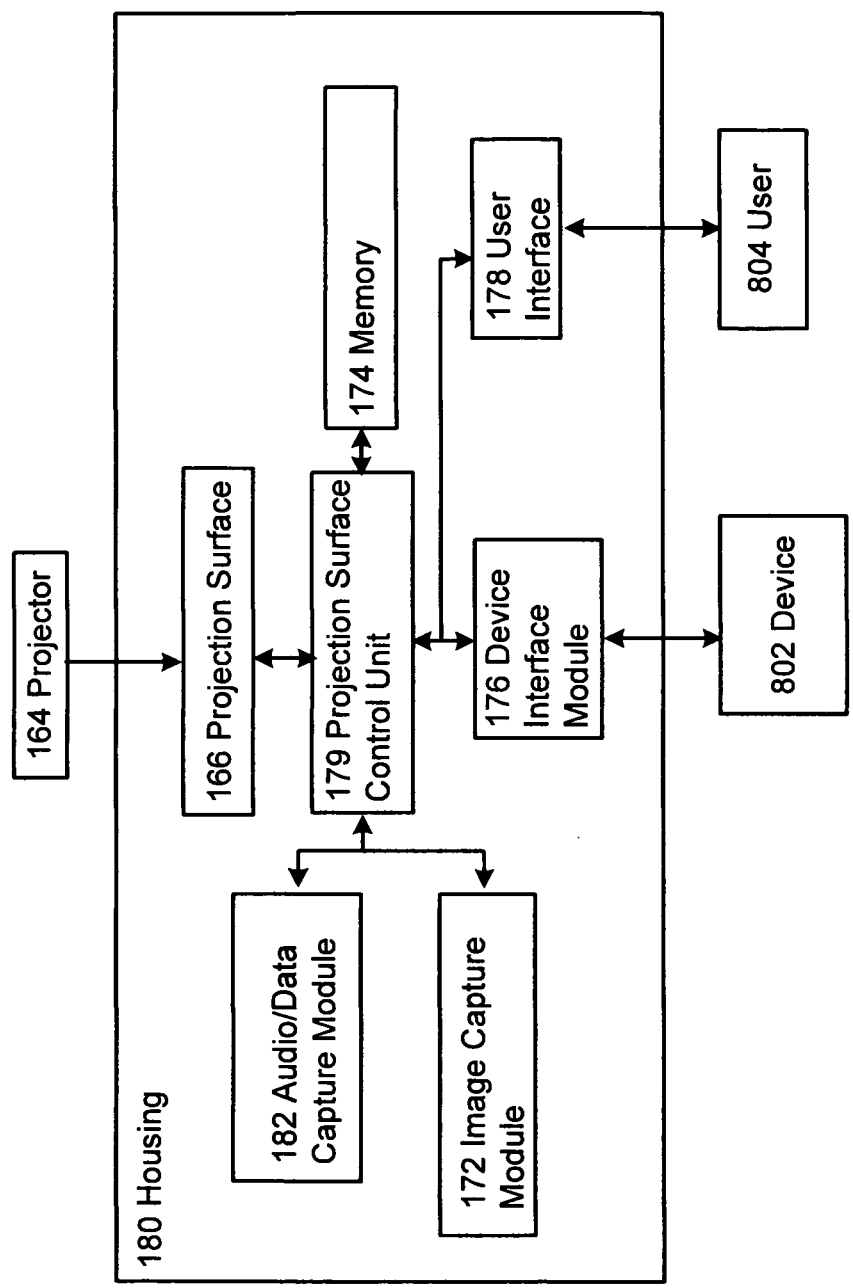
Figure 9:
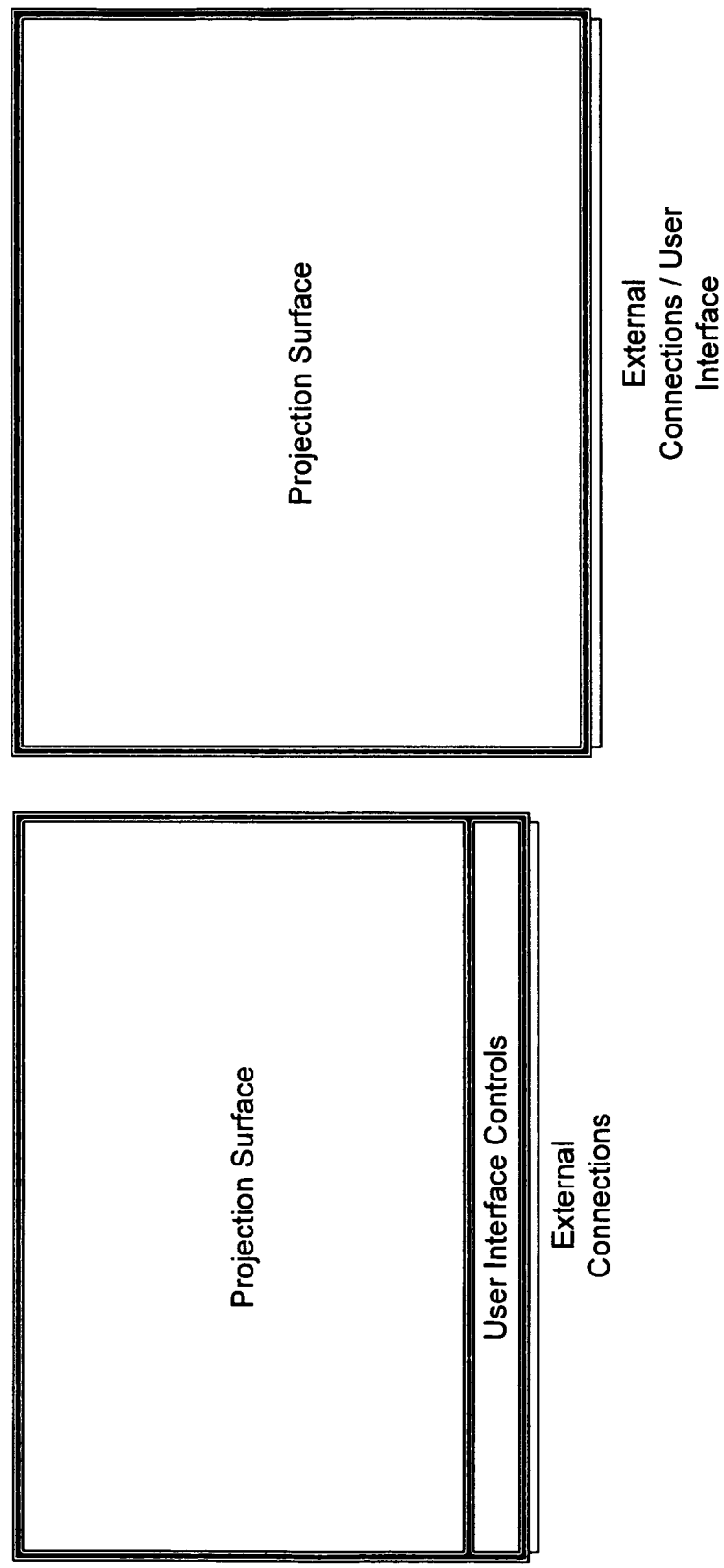
Figure 10:
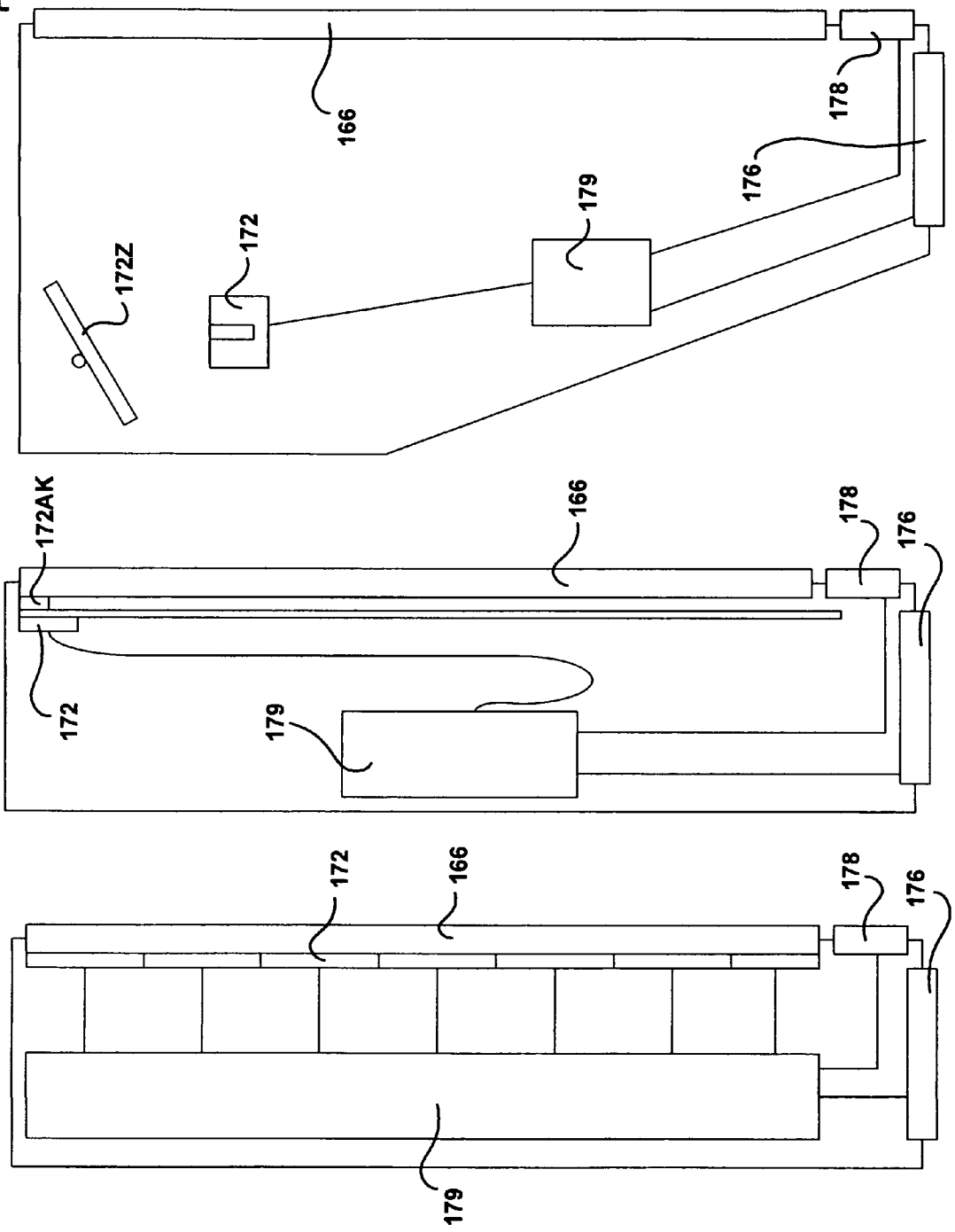

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here.

FIG. 1 illustrates an example system 100 in which embodiments may be implemented. In some embodiments, system 100 may include one or more user communications devices 112. In some embodiments, system 100 may include one or more user device interfaces 114. In some embodiments, system 100 may include one or more user device interface modules 116. In some embodiments, system 100 may include one or more device sensors 118. In some embodiments, system 100 may include one or more device control units 120. In some embodiments, system 100 may be configured to communicate with one or more users 110. In some embodiments, system 100 may include one or more sensor control units 154. In some embodiments, system 100 may include one or more sensors 156. In some embodiments, system 100 may include one or more sensor interface modules 158. In some embodiments, system 100 may include one or more projection control units 162. In some embodiments, system 100 may include one or more projectors 164. In some embodiments, system 100 may include one or more projectors 164 that are configured to project in coordination with one or more other projectors 164. In some embodiments, system 100 may include one or more projection interface modules 160. In some embodiments, system 100 may include one or more image capture projection surfaces 166. In some embodiments, system 100 may be configured to communicate with one or more communications networks 128. In some embodiments, system 100 may be configured to communicate with one or more service provider modules 130. In some embodiments, a service provider module 130 may include one or more service provider receivers 132A. In some embodiments, a service provider module 130 may include one or more service provider transmitters 132B. In some embodiments, a service provider module 130 may include one or more processors 134. In some embodiments, a service provider module 130 may include user identification logic 136. In some embodiments, a service provider module 130 may include billing logic 140. In some embodiments, a service provider module 130 may include user authentication logic 138. In some embodiments, a service provider module 130 may include access logic 142. In some embodiments, a service provider module 130 may include provider projection logic 143. In some embodiments, a service provider module 130 may include provider memory 144. In some embodiments, a service provider module 130 may include one or more user identification databases 146. In some embodiments, a service provider module 130 may include user data 148. In some embodiments, a service provider module 130 may include identity authentication data 150. In some embodiments, system 100 may be configured to communicate with one or more financial entities 122. In some embodiments, a financial entity 122 may include one or more user accounts 124. In some embodiments, system 100 may include financial information 126. In some embodiments, system 100 may include one or more user data accounts 152. In some embodiments, system 100 may include one or more image capture projection surfaces 166. In some embodiments, system 100 may include one or more image capture modules 172. In some embodiments, system 100 may include one or more memory 174. In some embodiments, system 100 may include one or more projection surface control units 179. In some embodiments, system 100 may include one or more device interface modules 176. In some embodiments, system 100 may include one or more user interfaces 178.

User Communications Device

In some embodiments, system 100 may include one or more user communications devices 112. A user communications device 112 may be configured in numerous ways. For example, in some embodiments, a user communications device 112 may be configured as a personal digital assistant (PDA). In some embodiments, a user communications device 112 may be configured as a cellular telephone. In some embodiments, a user communications device 112 may be configured as a computer (e.g., a laptop computer).

In some embodiments, a user communications device 112 may be operably associated with one or more user device interfaces 114. User device interfaces 114 may be configured in numerous ways. Examples of such configurations include, but are not limited to, touchscreens, keyboards, and the like. In some embodiments, a user device interface 114 may be configured as a gestural user device interface 114A. For example, in some embodiments, a user device interface 114 may be configured to respond to one or more physical actions. Examples of such physical actions include, but are not limited to, acceleration, negative acceleration, shock, squeeze, movement (e.g., substantially defined motions), and the like. In some embodiments, one or more user device interfaces 114 may be configured to be programmable to respond to one or more gestures. For example, in some embodiments, one or more user device interfaces 114 may be configured to respond to pressure produced by squeezing the user device interface 114. In some embodiments, one or more user device interfaces 114 may be configured to respond to one or more motions. Accordingly, one or more user device interfaces 114 may be configured to respond to numerous types of gestures. In some embodiments, one or more user device interfaces 114 may be configured to include one or more tactile interfaces 114B. In some embodiments, one or more user device interfaces 114 may be configured to utilize vibration to interact with a user 110. For example, in some embodiments, a user device interface 114 may be configured to vibrate if a user communications device 112 enters into proximity with one or more available projection control units 162. Accordingly, a user device interface 114 may be configured to utilize numerous tactile interfaces 114B.

In some embodiments, a user communications device 112 may be operably associated with one or more user device interface modules 116. In some embodiments, one or more user device interface modules 116 may be configured to operably communicate with one or more projectors 164. In some embodiments, one or more projection interface modules 160 may be configured to operably communicate with one or more projection control units 162. In some embodiments, one or more projection interface modules 160 may be configured to operably communicate with one or more projection interface modules 160. In some embodiments, one or more user device interface modules 116 may be configured to operably communicate with one or more service provider receivers 132A. In some embodiments, one or more user device interface modules 116 may be configured to operably communicate with one or more service provider transmitters 132B. In some embodiments, one or more user device interface modules 116 may be configured to operably communicate with one or more service provider modules 130. In some embodiments, one or more user device interface modules 116 may be configured to operably communicate with one or more sensors 156. In some embodiments, one or more user device interface modules 116 may be configured to operably communicate with one or more sensor interface modules 158. In some embodiments, one or more user device interface modules 116 may be configured to operably communicate with one or more sensor control units 154. In some embodiments, one or more user device interface modules 116 may be configured to operably communicate with one or more financial entities 122. In some embodiments, one or more user device interface modules 116 may be configured to operably communicate with one or more communications networks 128. In some embodiments, one or more user device interface modules 116 may be configured to operably communicate with one or more image capture projection surfaces 166. In some embodiments, one or more user device interface modules 116 may be configured to operably communicate with one or more device interface modules 176. In some embodiments, one or more user device interface modules 116 may be configured to operably communicate with one or more user interfaces 178. In some embodiments, one or more user device interface modules 116 may be configured to operably communicate with one or more image capture modules 172. In some embodiments, one or more user device interface modules 116 may be configured to operably communicate with one or more memory 174. In some embodiments, one or more user device interface modules 116 may be configured to operably communicate with one or more projection surface control units 179. A user device interface module 116 may communicate with other components of system 100 through use of numerous communication formats and combinations of communication formats. Examples of such formats include, but are not limited to, 116A VGA, 116D USB, 116I wireless USB, 116B RS-232, 116E infrared, 116J Bluetooth, 116C 802.11b/g/n, 116F S-video, 116H Ethernet, 116G DVI-D, and the like. In some embodiments, one or more user device interface modules 116 may be configured to receive information from one or more global positioning units 108.

In some embodiments, a user communications device 112 may be operably associated with one or more device sensors 118. A user communications device 112 may be operably associated with many types of device sensors 118 alone or in combination. Examples of device sensors 118 include, but are not limited to, 118P cameras, 118H light sensors, 118O range sensors, 118G contact sensors, 118K entity sensors, 118L infrared sensors, 118M yaw rate sensors, 118N ultraviolet sensors, 118E inertial sensors, 118F ultrasonic sensors, 118I imaging sensors, 118J pressure sensors, 118A motion sensors, 118B gyroscopic sensors, 118C acoustic sensors, 118D biometric sensors, and the like. In some embodiments, one or more device sensors 118 may be configured to detect motion. In some embodiments, one or more device sensors 118 may be configured to detect motion that is imparted to one or more user communications devices 112. In some embodiments, one or more device sensors 118 may be configured to detect one or more projectors 164. In some embodiments, one or more device sensors 118 may be configured to detect one or more projection interface modules 160. In some embodiments, one or more device sensors 118 may be configured to detect one or more projection control units 162. In some embodiments, one or more device sensors 118 may be configured to detect one or more users 110. In some embodiments, one or more device sensors 118 may be configured to detect one or more individuals. In some embodiments, one or more device sensors 118 may be configured to detect one or more additional user communications devices 112. In some embodiments, one or more device sensors 118 may be configured to detect one or more image capture projection surfaces 166.

In some embodiments, a user communications device 112 may be operably associated with one or more device control units 120. In some embodiments, a device control unit 120 may be operably associated with one or more device processors 120A. In some embodiments, a device control unit 120 may be configured to process one or more instructions. For example, in some embodiments, one or more device control units 120 may process information associated with prioritization of projection. In some embodiments, one or more device control units 120 may process information associated with scheduling projection. Accordingly, in some embodiments, one or more device control units 120 may act to control the transmission of information associated with projection. In some embodiments, one or more device control units 120 may process information associated with capturing a projected image. In some embodiments, one or more device control units 120 may process information associated with communicating a projected image. In some embodiments, a device control unit 120 may be operably associated with device processor memory 120B. Accordingly, in some embodiments, device processor memory 120B may include information associated with the operation of the device processor 120A. For example, in some embodiments, device processor memory 120B may include device processor instructions 120C. Device processor instructions 120C may include numerous types of instructions. For example, in some embodiments, device processor instructions 120C may instruct one or more device processors 120A to correlate one or more motions that are imparted to a device with one or more commands. In some embodiments, a device control unit 120 may be operably associated with device memory 120D.

Device memory 120D may include numerous types of information. Examples of such information include, but are not limited to, pictures, text, internet addresses, maps, instructions, and the like. In some embodiments, device memory 120D may include device instructions 120E. For example, in some embodiments, device instructions 120E may instruct a device to pair a certain communications protocol with another device (e.g., use of Bluetooth to communicate with a laptop computer).

Financial Entity

In some embodiments, system 100 may be configured to communicate with one or more financial entities 122. System 100 may be configured to communicate with numerous types of financial entities 122. Examples of such financial entities 122 include, but are not limited to, banks, credit unions, retail stores, credit card companies, issuers of prepaid service cards (e.g., prepaid telephone cards, prepaid internet cards, etc.). In some embodiments, a financial entity 122 may include a user account 124. Examples of such user accounts 124 include, but are not limited to, checking accounts, savings accounts, prepaid service accounts, credit card accounts, and the like.

Financial Information

In some embodiments, system 100 may include financial information 126. For example, in some embodiments, system 100 may include memory in which financial information 126 may be saved. In some embodiments, system 100 may include access to financial information 126. For example, in some embodiments, system 100 may include access codes that may be used to access financial information 126. In some embodiments, financial information 126 may include information about an individual (e.g., credit history, prepaid accounts, checking accounts, saving accounts, credit card accounts, and the like). In some embodiments, financial information 126 may include information about an institution (e.g., information about an institution that issues credit cards, prepaid service cards, automatic teller machine cards, and the like). Accordingly, in some embodiments, system 100 may be configured to allow a user 110 to access financial information 126 to pay for the use of system 100 or a component thereof. In some embodiments, financial information 126 may include financial transactions (e.g. funds transfers), financial reports (e.g. account statements), financial requests (e.g. credit checks), and the like. Numerous types of financial entities 122 may receive the transmitted financial information 126. The financial entity 122 may include banking systems, credit systems, online payment systems (e.g. PayPal®), bill processing systems, and the like. The financial entity 122 including a user account 124 may be maintained as a component of the service provider module 130 or as an independent service.

Service Provider Module

In some embodiments, system 100 may be configured to communicate with one or more service provider modules 130. The service provider module 130 may be an integrated or distributed server system associated with one or more communications networks 128. Numerous types of communications networks 128 may be used. Examples of communications networks 128 may include, but are not limited to, a voice over internet protocol (VoIP) network (e.g. networks maintained by Vonage®, Verizon®, Sprint®), a cellular network (e.g. networks maintained by Verizon®, Sprint®, AT&T®, T-Mobile® ), a text messaging network (e.g. an SMS system in GSM), an e-mail system (e.g. an IMAP, POP3, SMTP, and/or HTTP e-mail server), and the like.

The service provider module 130 may include one or more service provider receivers 132A. The service provider module 130 may include one or more service provider transmitters 132B. Numerous types of service provider receivers 132A and transmitters 132B may be used. Examples of service provider receivers 132A and transmitters 132B may include, but are not limited to, a cellular transceiver, a satellite transceiver, a network portal (e.g. a modem linked to an internet service provider), and the like.

The service provider module 130 may include a processor 134. Numerous types of processors 134 may be used (e.g. general purpose processors 134 such as those marketed by Intel® and AMD, application specific integrated circuits, and the like). For example, the processor 134 may include, but is not limited to, one or more logic blocks capable of performing one or more computational functions, such as user identification logic 136, user-authentication logic 138, billing logic 140, access logic 142, and the like.

The service provider module 130 may include provider memory 144. Numerous types of provider memory 144 may be used (e.g. RAM, ROM, flash memory, and the like). The provider memory 144 may include, but is not limited to, a user identification database 146 including user data 148 for one or more users 110. A user identification database 146 item for a user 110 may include one or more fields including identity authentication data 150.

The user data 148 may include data representing various identification characteristics of one or more users 110. The identification characteristics of the one or more users 110 may include, but are not limited to, user names, identification numbers, telephone numbers (e.g., area codes, international codes), images, voice prints, locations, ages, gender, physical trait, and the like.

Sensor Control Unit

System 100 may include one or more sensor control units 154. In some embodiments, one or more sensor control units 154 may be operably associated with one or more sensors 156. In some embodiments, one or more sensor control units 154 may be operably associated with one or more sensor interface modules 158. In some embodiments, one or more sensor control units 154 may be operably associated with one or more sensor processors 154A. In some embodiments, one or more sensor control units 154 may be operably associated with sensor processor memory 154B. In some embodiments, one or more sensor control units 154 may be operably associated with one or more sensor processor instructions 154C. In some embodiments, one or more sensor control units 154 may be operably associated with sensor memory 154D. In some embodiments, one or more sensor control units 154 may be operably associated with one or more sensor instructions 154E. In some embodiments, one or more sensor control units 154 may facilitate the transmission of one or more signals 170 that include information associated with one or more changes in sensor 156 response. For example, in some embodiments, one or more signals 170 that include information associated with a change in one or more features associated with one or more image capture projection surfaces 166 may be transmitted. The one or more signals 170 may be received by one or more projection control units 162 and used to facilitate projection by one or more projectors 164 in response to the one or more signals 170. In some embodiments, one or more sensor control units 154 may use prior sensor response, user input, or other stimulus, to activate or deactivate one or more sensors 156 or other subordinate features contained within one or more sensor control units 154.

Sensor

System 100 may include one or more sensors 156. In some embodiments, one or more sensors 156 may be operably associated with one or more sensor control units 154. In some embodiments, one or more sensors 156 may be operably associated with one or more sensor interface modules 158. System 100 may include many types of sensors 156 alone or in combination. Examples of sensors 156 include, but are not limited to, 156P cameras, 156H light sensors, 156O range sensors, 156G contact sensors, 156K entity sensors, 156L infrared sensors, 156M yaw rate sensors, 156N ultraviolet sensors, 156E inertial sensors, 156F ultrasonic sensors, 156I imaging sensors, 156J pressure sensors, 156A motion sensors, 156B gyroscopic sensors, 156C acoustic sensors, 156D biometric sensors, and the like. In some embodiments, one or more sensors 156 may be configured to detect motion. In some embodiments, one or more sensors 156 may be configured to detect motion that is imparted to one or more image capture projection surfaces 166. In some embodiments, one or more sensors 156 may be configured to detect the availability of one or more image capture projection surfaces 166.

Sensor Interface Module

System 100 may include one or more sensor interface modules 158. In some embodiments, one or more sensor interface modules 158 may be operably associated with one or more sensor control units 154. In some embodiments, one or more sensor interface modules 158 may be operably associated with one or more sensors 156. In some embodiments, one or more sensor interface modules 158 may be configured to communicate with one or more user device interfaces 114. In some embodiments, one or more sensor interface modules 158 may be configured to communicate with one or more projection interface modules 160. In some embodiments, one or more sensor interface modules 158 may be configured to communicate with one or more projection surface control units. A sensor interface module 158 may communicate with other components of system 100 through use of numerous communication formats and combinations of communication formats. Examples of such formats include, but are not limited to, 158A VGA, 158D USB, 158I wireless USB, 158B RS-232, 158E infrared, 158J Bluetooth, 158C 802.11b/g/n, 158F S-video, 158H Ethernet, 158G DVI-D, and the like. In some embodiments, a sensor interface module 158 may include one or more sensor transmitters 158K. In some embodiments, a sensor interface module 158 may include one or more sensor receivers 158L.

Projection Control Unit

System 100 may include one or more projection control units 162. In some embodiments, one or more projection control units 162 may be operably associated with one or more projectors 164. In some embodiments, one or more projection control units 162 may be operably associated with one or more projection interface modules 160. In some embodiments, one or more projection control units 162 may be operably associated with one or more projectors 164 and one or more projection interface modules 160. In some embodiments, a projection control unit 162 may be operably associated with one or more projection processors 162A. In some embodiments, a projection control unit 162 may be operably associated with projection memory 162J. In some embodiments, a projection control unit 162 may be operably associated with one or more projection instructions 162I. In some embodiments, a projection control unit 162 may be operably associated with one or more projection control transmitters 162H. In some embodiments, a projection control unit 162 may be operably associated with one or more projection control receivers 162G. In some embodiments, a projection control unit 162 may be operably associated with one or more projection processors 162A that include projection logic 162B. Examples of such projection logic 162B include, but are not limited to, prioritization logic 162C (e.g., logic for prioritizing projection in response to one or more requests from one or more specific individuals), scheduling logic 162D (e.g., logic for scheduling projection in response to the availability of one or more projectors 164, one or more image capture projection surfaces 166, or the combination of one or more projectors 164 and one or more image capture projection surfaces 166), selection logic 162E (e.g., logic for selecting content in response to one or more requests from one or more specific individuals), projection logic 162B (e.g., logic for selecting projection parameters in response to one or more features associated with one or more image capture projection surfaces 166), and the like. In some embodiments, a projection control unit 162 may be configured to modulate output projected by one or more projectors 164. In some embodiments, one or more projection control units 162 may be configured to select one or more wavelengths of light that will be projected by one or more projectors 164. For example, in some embodiments, one or more projection control units 162 may select one or more wavelengths of ultraviolet light that will be projected by one or more projectors 164. In some embodiments, one or more projection control units 162 may select one or more wavelengths of visible light that will be projected by one or more projectors 164. In some embodiments, one or more projection control units 162 may select one or more wavelengths of infrared light that will be projected by one or more projectors 164. Accordingly, in some embodiments, one or more projection control units 162 may select numerous wavelengths of light that will be projected by one or more projectors 164.

In some embodiments, one or more projection control units 162 may select content that is to be projected by one or more projectors 164. In some embodiments, one or more projection control units 162 may select content that is to be projected in response to one or more requests from one or more users 110. For example, in some embodiments, one or more projection control units 162 may select content that is appropriate for children in response to a request 168 from a child. In some embodiments, one or more projection control units 162 may modulate output that is projected by one or more projectors 164. In some embodiments, one or more projection control units 162 may modulate the intensity of light that is projected by one or more projectors 164. In some embodiments, one or more projection control units 162 may modulate the brightness of light that is projected by one or more projectors 164. In some embodiments, one or more projection control units 162 may modulate the contrast of light that is projected by one or more projectors 164. In some embodiments, one or more projection control units 162 may modulate the sharpness of light that is projected by one or more projectors 164.

In some embodiments, one or more projection control units 162 may modulate the direction of output that is projected by one or more projectors 164. In some embodiments, one or more projection control units 162 may direct output from one or more projectors 164 onto one or more moving projection surfaces 166. In some embodiments, one or more projection control units 162 may direct output from one or more projectors 164 onto one or more stationary projection surfaces 166. In some embodiments, one or more projection control units 162 may direct output from one or more projectors 164 onto one or more moving projection surfaces 166 and onto one or more stationary projection surfaces 166. In some embodiments, one or more projection control units 162 may direct output from one or more projectors 164 onto multiple projection surfaces 166. For example, in some embodiments, one or more projection control units 162 may direct output from one or more projectors 164 onto a first image capture projection surface 166 and direct output from one or more projectors 164 onto a second image capture projection surface 166.

In some embodiments, one or more projection control units 162 may direct output from two or more projectors 164 in a coordinated manner. For example, in some embodiments, one or more projection control units 162 may coordinate output from two or more projectors 164 onto the same image capture projection surface 166. In some embodiments, one or more projection control units 162 may coordinate output from two or more projectors 164 onto one or more image capture projection surfaces 166. In some embodiments, one or more projection control units 162 may coordinate output of content from two or more projectors 164. For example, in some embodiments, one or more projection control units 162 may coordinate projection of a first set of content from a first projector 164 and projection of a second set of content from a second projector 164. Accordingly, in some embodiments, one or more projection control units 162 may coordinate projection of content in accordance with the type of content that is projected. For example, in some embodiments, a high resolution projector may be used to project high resolution content and a low resolution projector may be used to project low resolution content in a coordinated manner. In some embodiments, one or more projection control units 162 may coordinate the projection of three-dimensional images (e.g., isometric projection, oblique projection, cavalier projection, one-point perspective projection). Accordingly, numerous methods may be used to coordinate projection from two or more projectors 164. For example, tiling may be used to coordinate projection from two or more projectors 164 (e.g., Christie Digital Systems USA, Inc., Cypress, Calif.).

In some embodiments, one or more projection control units 162 may dynamically modulate output from one or more projectors 164. For example, in some embodiments, one or more projectors 164 may be carried from room to room such that one or more projection control units 162 modulate output from the one or more projectors 164 in response to the available image capture projection surface 166. In some embodiments, one or more projection control units 162 may dynamically modulate output from two or more projectors 164.

In some embodiments, one or more projection control units 162 may be configured to respond to one or more substantially defined motions. In some embodiments, a user 110 may program one or more projection control units 162 to correlate one or more substantially defined motions with one or more projection commands. For example, in some embodiments, a user 110 may program one or more projection control units 162 to correlate clockwise motion of a user communications device 112 with a command to advance a projected slide presentation by one slide. Accordingly, in some embodiments, a projection control unit 162 may be configured to project in response to substantially defined motions that are programmed according to the preferences of an individual user 110.

In some embodiments, one or more projection control units 162 may direct output from two or more sources from one or more projectors 164. In some embodiments, one or more projection control units 162 may direct output from two or more sources on the same image capture projection surface 166. In some embodiments, one or more projection control units 162 may direct output from two or more sources on one or more image capture projection surfaces 166. For example, sources may include a user communications device 112, a network file location, a computer readable media, user input, or an internet file.

In some embodiments, one or more projection control units 162 may direct output from one or more projectors 164 in coordination with audio content (e.g. music, verbal communications, recording, or soundtrack). In some embodiments, sources of audio content include a user communications device 112, a network file location, a computer readable media, user input, an internet file, or from live or recorded verbal communications proximate to one or more image capture projection surfaces 166.

Projector

System 100 may include one or more projectors 164. In some embodiments, a projector may be a user responsive projector 164 that is configured to project for an individual user 110 in an individualized manner. In some embodiments, a user responsive projector 164 may be configured to be controllable by an individual user 110 and/or group of users 110. For example, in some embodiments, a user responsive projector 164 may be directed to project onto one or more image capture projection surfaces 166 that are selected by a user 110. Accordingly, in some embodiments, numerous functions of a user responsive projector 164 may be controlled by a user 110 in an individualized manner.

In some embodiments, a projector 164 may be operably associated with one or more projection control units 162. In some embodiments, a projector 164 may be operably associated with one or more projection interface modules 160. In some embodiments, a projector 164 may be operably associated with one or more projection processors 162A. In some embodiments, a projector 164 may be operably associated with projection memory 162J. In some embodiments, a projector 164 may be operably associated with one or more projection instructions 162I. In some embodiments, a projector 164 may be operably associated with projection logic 162B. In some embodiments, a projector 164 may be an image stabilized projector 164. In some embodiments, two or more projectors 164 may be configured for coordinated projection. For example, in some embodiments, two or more projectors 164 may be positioned to project onto the same image capture projection surface 166. In some embodiments, two or more projectors 164 may be configured for tiled projection of content.

System 100 may include numerous types of projectors 164. In some embodiments, a projector 164 may include inertia and yaw rate sensors that detect motion and provide for adjustment of projected content to compensate for the detected motion. In some embodiments, a projector 164 may include an optoelectronic inclination sensor and an optical position displacement sensor to provide for stabilized projection (e.g., U.S. Published Patent Application No.: 2003/0038927). In some embodiments, a projector 164 may include an optoelectronic inclination sensor, an optical position sensitive detector, and a piezoelectric accelerometer that provide for stabilized projection (e.g., U.S. Published Patent Application No.: 2003/0038928). Image stabilized projectors 164 have been described (e.g., U.S. Pat. No.: 7,284,866; U.S. Published Patent Application Nos.: 20050280628;

20060103811, and 2006/0187421). In some embodiments, one or more projectors 164 may be modified to become image stabilized projectors 164. Examples of such projectors 164 have been described (e.g., U.S. Pat. Nos.: 6,002,505; 6,764,185; 6,811,264; 7,036,936; 6,626,543; 7,134,078; 7,355,584; U.S. Published Patent Application No.: 2007/0109509).

Projectors 164 may be configured to project numerous wavelengths of light. In some embodiments, a projector 164 may be configured to project ultraviolet light. In some embodiments, a projector 164 may be configured to project visible light. In some embodiments, a projector 164 may be configured to project infrared light. In some embodiments, a projector 164 may be configured to project numerous combinations of light. For example, in some embodiments, a projector 164 may project one or more infrared calibration images and one or more visible images.

Numerous types of projectors 164 may be used within system 100. In some embodiments, analog projectors 164 may be used within system 100. In some embodiments, digital projectors 164 may be used within system 100. In some embodiments, combinations of projector 164 types may be used within system 100. In some embodiments, pico-projectors 164 may be used within system 100 (e.g., Texas Instruments, Dallas, Tex.; Microvision, Redmond, Wash.; Toshiba, New York, N.Y.; WowWee Group Limited, Carlsbad, Calif.). Numerous configurations of projectors 164 may be used within system 100. In some embodiments, projectors 164 may be mounted within a venue. For example, in some embodiments, one or more projectors 164 may be mounted within a venue on walls, ceilings, floors, dividers, furniture, etc. Accordingly, in some embodiments, a user 110 may enter into a venue and utilize one or more projectors 164 that are present at a venue. In some embodiments, system 100 may include projectors 164 that are portable. In some embodiments, a venue may include portable projectors 164 that are operable within system 100. For example, in some embodiments, a user 110 may enter a venue and obtain a projector 164 (e.g., rent a projector 164, borrow a projector 164) that may be operably connected for use within system 100. Accordingly, in some embodiments, a user 110 may take one or more projectors 164 to substantially any accessible location within a venue and utilize the one or more projectors 164 to project material onto substantially any image capture projection surface 166 that is available for projection. Accordingly, system 100 may be configured to utilize numerous types of projectors 164.

Projection Interface Module

System 100 may include one or more projection interface modules 160. In some embodiments, one or more projection interface modules 160 may be operably associated with one or more projection control units 162. In some embodiments, one or more projection interface modules 160 may be operably associated with one or more projectors 164. A projection interface module 160 may communicate with other components of system 100 through use of numerous communication formats and combinations of communication formats. Examples of such formats include, but are not limited to, 160A VGA, 160D USB, 160I wireless USB, 160B RS-232, 160E infrared, 160J Bluetooth, 160C 802.11b/g/n, 160F S-video, 160H Ethernet, 160G DVI-D, and the like. In some embodiments, a projection interface module 160 may include one or more projection transmitters 160K. In some embodiments, a projection interface module 160 may include one or more projection receivers 160L.

Projection Surface

System 100 may include one or more image capture projection surfaces 166. In some embodiments, one or more image capture projection surfaces 166 are operably associated with one or more image capture modules 172. In some embodiments, one or more image capture projection surfaces 166 are operably associated with one or more memory 174. In some embodiments, one or more image capture projection surfaces 166 are operably associated with one or more projection surface control units 179. In some embodiments, one or more image capture projection surfaces 166 are operably associated with one or more device interface modules 176. In some embodiments, one or more image capture projection surfaces 166 are operably associated with one or more user interfaces 178. In some embodiments, one or more image capture projection surfaces 166 are operably associated with one or more audio/data capture modules 182.

In some embodiments, one or more image capture projection surfaces 166 are configured to receive a projected image from one or more projectors 164. In some embodiments, one or more image capture projection surfaces 166 are configured to receive user input. In some embodiments, one or more image capture projection surfaces 166 are configured to receive content from at least one other source (e.g., a file location, an internet address, a device).

In some embodiments, one or more image capture projection surfaces 166 are configured as a portable tablet. In some embodiments, one or more image capture projection surfaces 166 are configured as a sheet of material or two or more sheets of material that may be separated from each other, and the like. In some embodiments, one or more image capture projection surfaces 166 are configured as a writing surface. In some embodiments, one or more image capture projection surfaces 166 are configured as a hanging or mountable device. In some embodiments, one or more image capture projection surfaces 166 are configured as a surface on a vehicle console.

One or more image capture projection surfaces 166 may be constructed from numerous types of materials and combinations of materials. In some embodiments, one or more image capture projection surfaces 166 may be constructed from glass or plastic 166A. Examples of other materials include, but are not limited to, cloth, metal, ceramics, paper, wood, leather, and the like. In some embodiments, one or more image capture projection surfaces 166 may exhibit electrochromic properties. In some embodiments, one or more image capture projection surfaces 166 may be coated with a coating 166B. In some embodiments, coating 166B may include a transmissive coating 166C. In some embodiments, coating 166B may include a reflective coating 166D. In some embodiments, coating 166B may include a refractive coating 166E. In some embodiments, an image capture projection surface 166 may be coated with paint. In some embodiments, an image capture projection surface 166 may include one or more materials that alter light. For example, in some embodiments, an image capture projection surface 166 may convert light (e.g., up-convert light, down-convert light).

In some embodiments, an image capture projection surface 166 may be operably associated with one or more surface sensors. In some embodiments, an image capture projection surface 166 may include one or more magnetic surface sensors. For example, in some embodiments, an image capture projection surface 166 may include magnetic surface sensors that are configured to detect magnetic ink that is applied to the image capture projection surface 166. In some embodiments, an image capture projection surface 166 may include one or more pressure surface sensors. For example, in some embodiments, an image capture projection surface 166 may include pressure surface sensors that are configured to detect pressure that is applied to the image capture projection surface 166 (e.g., contact of a stylus with the image capture projection surface 166, contact of a pen with the image capture projection surface 166, contact of a pencil with the image capture projection surface 166, etc.). In some embodiments, an image capture projection surface 166 may include one or more motion surface sensors. For example, in some embodiments, an image capture projection surface 166 may include motion surface sensors that are configured to detect movement associated with the image capture projection surface 166. In some embodiments, an image capture projection surface 166 may include one or more strain surface sensors. For example, in some embodiments, an image capture projection surface 166 may include strain surface sensors that are configured to detect changes in conformation associated with the image capture projection surface 166. In some embodiments, an image capture projection surface 166 may include one or more positional surface sensors (e.g., global positioning surface sensors). For example, in some embodiments, an image capture projection surface 166 may include positional surface sensors that are configured to detect changes in position associated with the image capture projection surface 166.

In some embodiments, an image capture projection surface 166 may be operably associated with one or more surface transmitters. Accordingly, in some embodiments, an image capture projection surface 166 may be configured to transmit one or more signals 170. Such signals 170 may include numerous types of information. Examples of such information may include, but are not limited to, information associated with: one or more positions of one or more image capture projection surfaces 166, one or more conformations of one or more image capture projection surfaces 166, one or more changes in the position of one or more image capture projection surfaces 166, one or more changes in the conformation of one or more image capture projection surfaces 166, one or more motions associated with one or more image capture projection surfaces 166, one or more changes in the motion of one or more image capture projection surfaces 166, and the like.

In some embodiments, an image capture projection surface 166 may be operably associated with one or more surface receivers. Accordingly, in some embodiments, an image capture projection surface 166 may be configured to receive one or more signals 170. For example, in some embodiments, one or more surface receivers may receive one or more signals 170 that are transmitted by one or more projection transmitters 160K. In some embodiments, one or more surface receivers may receive one or more signals 170 that are transmitted by one or more sensor transmitters 158K.

In some embodiments, an image capture projection surface 166 may be operably associated with one or more fiducials. For example, in some embodiments, one or more fluorescent marks may be placed on an image capture projection surface 166. In some embodiments, one or more phosphorescent marks may be placed on an image capture projection surface 166. In some embodiments, one or more magnetic materials may be placed on an image capture projection surface 166. In some embodiments, fiducials may be placed on an image capture projection surface 166 in numerous configurations. For example, in some embodiments, fiducials may be positioned in association with an image capture projection surface 166 such that they form a pattern. In some embodiments, an image capture projection surface 166 may include one or more calibration images.

Projection Surface Control Unit

In some embodiments, one or more projection surface control units 179 may be operably associated with one or more image capture projection surfaces 166. In some embodiments, one or more projection surface control units 179 may be operably associated with one or more image capture modules 172. In some embodiments, one or more projection surface control units 179 may be operably associated with one or more memory 174. In some embodiments, one or more projection surface control units 179 may be operably associated with one or more device interface modules 176. In some embodiments, one or more projection surface control units 179 may be operably associated with one or more user interfaces 178. In some embodiments, one or more projection surface control units 179 may be operably associated with one or more audio/data capture modules 182. In some embodiments, one or more projection surface control units 179 may be operably associated with one or more surface processors 179A. In some embodiments, one or more projection surface control units 179 may be operably associated with one or more surface processor memory 179B. In some embodiments, one or more projection surface control units 179 may be operably associated with one or more surface processor instructions 179C. In some embodiments, one or more projection surface control units 179 may be operably associated with one or more surface memory 179D. In some embodiments, one or more projection surface control units 179 may be operably associated with one or more surface instructions 179E.

In some embodiments, a projection surface control unit 179 is configured to operably communicate with one or more projectors 164. In some embodiments, a projection surface control unit 179 is configured to operably communicate with one or more sensors 156. In some embodiments, a projection surface control unit 179 is configured to operably communicate with one or more service provider modules 130. In some embodiments, a projection surface control unit 179 is configured to operably communicate with one or more financial entities 122. In some embodiments, a projection surface control unit 179 is configured to operably communicate with one or more user communications devices 112. In some embodiments, a projection surface control unit 179 is configured to operably communicate with one or more users 110.

In some embodiments, a projection surface control unit 179 may be configured to control one or more image capture modules 172. For example, a projection surface control unit 179 may be configured to control timing, position, destination, resolution, color, and brightness of image capture. In some embodiments, a projection surface control unit 179 may be configured to control communications via one or more user interfaces 178. For example, in some embodiments, a projection surface control unit 179 may be configured to provide a graphical user interface, accept user commands and requests, and provide output via one or more user interfaces 178. In some embodiments, a projection surface control unit 179 may be configured to control communications via one or more device interface modules 176. For example, in some embodiments, a projection surface control unit 179 may be configured to receive commands, transmit commands, receive data, and transmit data via one or more device interface modules 176. In some embodiments, a projection surface control unit 179 may be configured to control communication via one or more communications networks 128. In some embodiments, a projection surface control unit 179 may be configured to control one or more projection surfaces 166. For example, in some embodiments, a projection surface control unit 179 may be configured to control light transmission, refraction, reflection, brightness, contrast, resolution, or colors on one or more image capture projection surfaces 166. In some embodiments, a projection surface control unit 179 may be configured to control placement or power for one or more image capture projection surfaces 166. In some embodiments, a projection surface control unit 179 may be configured to control one or more memory 174. For example, a projection surface control unit 179 may be configured to facilitate storage and retrieval of data and commands from one or more memory 174. In some embodiments, a projection surface control unit 179 may be configured to control one or more audio/data capture modules 182. For example, a projection surface control unit 179 may be configured to control timing, volume, location, source, destination, or association of audio or data capture.

Image Capture Module

In some embodiments, one or more image capture modules 172 may be operably associated with one or more image capture projection surfaces 166. In some embodiments, one or more image capture modules 172 may be operably associated with one or more memory 174. In some embodiments, one or more image capture modules 172 may be operably associated with one or more projection surface control units 179. In some embodiments, one or more image capture modules 172 may be operably associated with one or more user interfaces 178. In some embodiments, one or more image capture modules 172 may be operably associated with one or more device interface modules 176. In some embodiments, one or more image capture modules 172 may be operably associated with one or more audio/data capture modules 182.

In some embodiments, one or more image capture modules 172 may be operably associated with full imaging 172A. In some embodiments, full imaging 172A may be operably associated with one or more controllers 172B and one or more detector arrays 172F (e.g., CCD array 172G, CID array 172I, or photodiode array 172K). In some embodiments, one or more controllers 172B may be operably associated with one or more processors 172C, one or more memory 172D, and one or more instructions 172E. In some embodiments, one or more image capture modules 172 may be operably associated with optical scanning 172L. In some embodiments, optical scanning 172L may be operably associated with one or more controllers 172M, one or more detector arrays 172Q (e.g., CCD Array 172R, CID Array 172S, or Photodiode Array 172T), one or more drive mechanisms 172U, and one or more optics 172X (e.g., flat mirror 172Y, parabolic mirror 172Z, or lens 172AA). In some embodiments, one or more controllers 172M may be operably associated with one or more processors 172N, one or more memory 172O, and one or more instructions 172P. In some embodiments, one or more drive mechanisms 172U may be operably associated within one or more actuators 172V and one or more position sensors 172W. In some embodiments, one or more image capture modules 172 may be operably associated with mechanical scanning 172AB. In some embodiments, mechanical scanning 172AB may be operably associated with one or more controllers 172AC, one or more detector arrays 172AG (e.g., CCD Array 172AH, CID Array 172AI, or Photodiode Array 172AJ), and one or more drive mechanisms 172AK. In some embodiments, one or more controllers 172AC may be operably associated with one or more processors 172AD, one or more memory 172AE, and one or more instructions 172AF. In some embodiments, one or more drive mechanisms 172AK may be operably associated within one or more actuators 172AL and one or more position sensors 172AM.

In some embodiments, an image capture module 172 may be configured to capture one or more images from one or more image capture projection surfaces 166. For example, in some embodiments, an image capture module 172 may be configured to capture an image, a series of images, a video, or user input from one or more image capture projection surfaces 166. In some embodiments, an image capture module 172 may be configured to capture one or more images from two or more image capture projection surfaces 166. For example, in some embodiments, an image capture module 172 may be configured to capture one image from one image capture projection surface 166 and a same or different image from another image capture projection surface 166. In some embodiments, an image capture module 172 may be configured to capture content from another source. For example, in some embodiments, an image capture module 172 may be configured to capture content from a network location, memory 174, a projector 164, the internet, or a user communications device 112.

Audio/Data Capture Module

In some embodiments, one or more audio/data capture modules 182 may be operably associated with one or more image capture projection surfaces 166. In some embodiments, one or more audio/data capture modules 182 may be operably associated with one or more image capture modules 172. In some embodiments, one or more audio/data capture modules 182 may be operably associated with one or more memory 174. In some embodiments, one or more audio/data capture modules 182 may be operably associated with one or more projection surface control units 179. In some embodiments, one or more audio/data capture modules 182 may be operably associated with one or more device interface modules 176. In some embodiments, one or more audio/data capture modules 182 may be operably associated with one or more user interfaces 178.

In some embodiments, an audio/data capture module 182 may be configured to capture sound or data associated with one or more images on one or more image capture projection surfaces 166. For example, in some embodiments, an audio/data capture module 182 may be configured to capture speech or noise proximate to one or more image capture projection surfaces 166. In some embodiments, an audio/data capture module 182 may be configured to capture electronic files associated with one or more images on one or more image capture projection surfaces 166. For example, in some embodiments, an audio/data capture module 182 may be configured to capture electronic files from a user communications device 112, a network location, the internet, memory 174, or a projector 164. In some embodiments, an audio/data capture module 182 may be configured to capture text or user input associated with one or more images on one or more image capture projection surfaces 166. In some embodiments, an audio/data capture module 182 may be configured to capture sound or data associated with two or more image capture projection surfaces 166.

Memory

In some embodiments, one or more memory 174 (e.g., RAM, ROM, flash memory and the like) may be operably associated with one or more image capture projection surfaces 166. In some embodiments, one or more memory 174 may be operably associated with one or more image capture modules 172. In some embodiments, one or more memory 174 may be operably associated with one or more projection surface control units 179. In some embodiments, one or more memory 174 may be operably associated with one or more device interface modules 176. In some embodiments, one or more memory 174 may be operably associated with one or more user interfaces 178. In some embodiments, one or more memory 174 may be operably associated with one or more audio/data capture modules 182.

In some embodiments, memory 174 may be configured to store images, video, audio, content from other sources, references, user inputs, or other data. In some embodiments, memory 174 may be configured to store program instructions for an image capture projection surface 166, an image capture module 172, a projection surface control unit 179, an audio/data capture module 182, a device interface module 176, or a user interface 178.

Device Interface Module

In some embodiments, one or more device interface modules 176 may be operably associated with one or more image capture projection surfaces 166. In some embodiments, one or more device interface modules 176 may be operably associated with one or more image capture modules 172. In some embodiments, one or more device interface modules 176 may be operably associated with one or more memory 174. In some embodiments, one or more device interface modules 176 may be operably associated with one or more projection surface control units 179. In some embodiments, one or more device interface modules 176 may be operably associated with one or more user interfaces 178. In some embodiments, one or more device interface modules 176 may be operably associated with one or more audio/data capture modules 182.

In some embodiments, one or more device interface modules 176 may be configured to operably communicate with one or more user communications devices 112. In some embodiments, one or more device interface modules 176 may be configured to operably communicate with one or more financial entities 122. In some embodiments, one or more device interface modules 176 may be configured to operably communicate with one or more service provider modules 130. In some embodiments, one or more device interface modules 176 may be configured to operably communicate with one or more projectors 164. In some embodiments, one or more device interface modules 176 may be configured to operably communicate with one or more sensors 156. One or more device interface modules 176 may communicate with other components of system 100 through use of numerous communication formats and combinations of communication formats. Examples of such formats include, but are not limited to, 176A VGA, 176B RS-232, 176C 802.11b/g/n, 176d HDMI, 176E Component Video, 176F USB, 176G Infrared, 176H S-Video, 176I DVI-D, 176J Ethernet, 176K Cellular, 176L Wireless USB, 176M Bluetooth, and the like.

In some embodiments, one or more device interface modules 176 may be configured to receive commands, selections, or input for controlling one or more image capture projection surfaces 166, one or more image capture modules 172, one or more memory 174, one or more projection surface control units 179, one or more device interface modules 176, or one or more audio/data capture modules 182. In some embodiments, one or more user interfaces 178 may be configured to transfer data, images, video, audio, or options for interacting with or receiving results from one or more image capture projection surfaces 166, one or more image capture modules 172, one or more memory 174, one or more projection surface control units 179, one or more device interface modules 176, or one or more audio/data capture modules 182.

User Interface

In some embodiments, one or more user interfaces 178 may be operably associated with one or more image capture projection surfaces 166. In some embodiments, one or more user interfaces 178 may be operably associated with one or more image capture modules 172. In some embodiments, one or more user interfaces 178 may be operably associated with one or more memory 174. In some embodiments, one or more user interfaces 178 may be operably associated with one or more projection surface control units 179. In some embodiments, one or more user interfaces 178 may be operably associated with one or more device interface modules 176. In some embodiments, one or more user interfaces 178 may be operably associated with one or more audio data/capture modules 182.

In some embodiments, one or more user interfaces 178 may be configured to operably communicate with one or more users 110. In some embodiments, one or more user interfaces 178 may be configured to operably communicate with one or more user communications devices 112. In some embodiments, one or more user interfaces 178 may be configured to operably communicate with one or more financial entities 122. In some embodiments, one or more user interfaces 178 may be configured to operably communicate with one or more service provider modules 130. In some embodiments, one or more user interfaces 178 may be configured to operably communicate with one or more sensors 156. In some embodiments, one or more user interfaces 178 may be configured to operably communicate with one or more projectors 164. In some embodiments, one or more user interfaces 178 may be configured to operably communicate via one or more communications networks 128.

In some embodiments, one or more user interfaces 178 may be configured as mechanical 178A (e.g., buttons, switches, keys, electromechanical etc.). In some embodiments, one or more user interfaces 178 may be configured as electronic 178B (touch screen, audible control, wireless communication, electronic communication, etc). In some embodiments, one or more user interfaces 178 may include one or more sensors 178C. For example, in some embodiments, one or more sensors 178C may include one or more motion sensors 178D, one or more gyroscopic sensors 178E, one or more acoustic sensors 178F, one or more biometric sensors 178G, one or more inertial sensors 178H, one or more ultrasonic sensors 178I, one or more contact sensors 178J, one or more light sensors 178K, one or more imaging sensors 178L, one or more pressure sensors 178M, one or more entity sensors 178N, one or more infrared sensors 178O, one or more yaw rate sensors 178P, one or more ultraviolet sensors 178Q, one or more range sensors 178R, or one or more cameras 178S.

In some embodiments, one or more user interfaces 178 may be configured to receive user commands, selections, or input for controlling one or more image capture projection surfaces 166, one or more image capture modules 172, one or more memory 174, one or more projection surface control units 179, one or more device interface modules 176, or one or more audio/data capture modules 182. In some embodiments, one or more user interfaces 178 may be configured to present graphical user interfaces, images, video, audio, or options for interacting with or receiving results from one or more image capture projection surfaces 166, one or more image capture modules 172, one or more memory 174, one or more projection surface control units 179, one or more device interface modules 176, or one or more audio/data capture modules 182.

Request

Numerous types of requests 168 may be used in association with system 100. In some embodiments, a request 168 may include unprocessed input. In some embodiments, a request 168 may include unprocessed output. In some embodiments, a request 168 may include processed input. In some embodiments, a request 168 may include processed output. For example, in some embodiments, a user communications device 112 may receive unprocessed input from one or more users 110 and then process the input to produce a request 168 that includes the processed output. In some embodiments, a user communications device 112 may receive unprocessed input from one or more users 110 and then produce a request 168 that includes the unprocessed input that was received from the one or more users 110. In some embodiments, a user communications device 112 may receive processed input (e.g., from a user device interface 114, a user device interface module 116, a device sensor 118, a device control unit 120, and substantially any combination thereof) and then produce a request 168 that includes processed output. In some embodiments, a request 168 may include instructions. For example, in some embodiments, a request 168 may include projection instructions 162I. In some embodiments, a request 168 may include instructions to access one or more financial entities 122. In some embodiments, a request 168 may include instructions to communicate with one or more service provider modules 130. In some embodiments, a request 168 may include instructions to capture or communicate an image from one or more image capture projection surfaces 166. Accordingly, a request 168 may be configured in numerous ways and include numerous types of information.

Signal

Numerous types of signals 170 may be used in association with system 100. Examples of such signals 170 include, but are not limited to, analog signals 170, digital signals 170, acoustic signals 170, optical signals 170, radio signals 170, wireless signals 170, hardwired signals 170, infrared signals 170, ultrasonic signals 170, Bluetooth signals 170, 802.11 signals 170, and the like. In some embodiments, one or more signals 170 may not be encrypted. In some embodiments, one or more signals 170 may be encrypted. In some embodiments, one or more signals 170 may be authenticated. In some embodiments, one or more signals 170 may be sent through use of a secure mode of transmission. In some embodiments, one or more signals 170 may be coded for receipt by a specific recipient. In some embodiments, such code may include anonymous code that is specific for the recipient. Accordingly, information included within one or more signals 170 may be protected against being accessed by others who are not the intended recipient. In some embodiments, one or more signals 170 may include information as one or more content packets.

In some embodiments, one or more signals 170 may include processed information. In some embodiments, one or more signals 170 may include information that has been processed by one or more sensor processors 154A. For example, in some embodiments, a sensor processor 154A may receive input from one or more sensors 156 that is processed. In some embodiments, this processed information may then be included within a signal 170 that is transmitted. In some embodiments, one or more signals 170 may include processed information that contains information that has been retrieved from sensor processor memory 154B. In some embodiments, one or more signals 170 may include processed information that contains information that has been processed through use of sensor processor instructions 154C. Accordingly, in some embodiments, one or more signals 170 may include numerous types of information that is processed. Examples of such processing may include, but are not limited to, sub-setting, generating projection commands, selecting content, selecting content for projection, selecting content that is not for projection, summarizing sensor data, transforming sensor data, supplementing sensor data, supplementing sensor data with data from external sources, generating image capture commands, generating image communication commands, and the like.

In some embodiments, one or more signals 170 may include information that has not been processed. In some embodiments, a sensor transmitter 158K may act as a conduit to transmit one or more signals 170 that include raw data. For example, in some embodiments, one or more sensor transmitters 158K may receive information from one or more sensors 156 and transmit one or more signals 170 that include the unprocessed information. Accordingly, in some embodiments, one or more signals 170 may include unprocessed information.

User

System 100 may be operated by one or more users 110. In some embodiments, a user 110 may be human. In some embodiments, a user 110 may be a non-human user 110. For example, in some embodiments, a user 110 may be a computer, a robot, and the like. In some embodiments, a user 110 may be proximate to system 100. In some embodiments, a user 110 may be remote from system 100. In some embodiments, a user 110 may be an individual.

Figure 11:
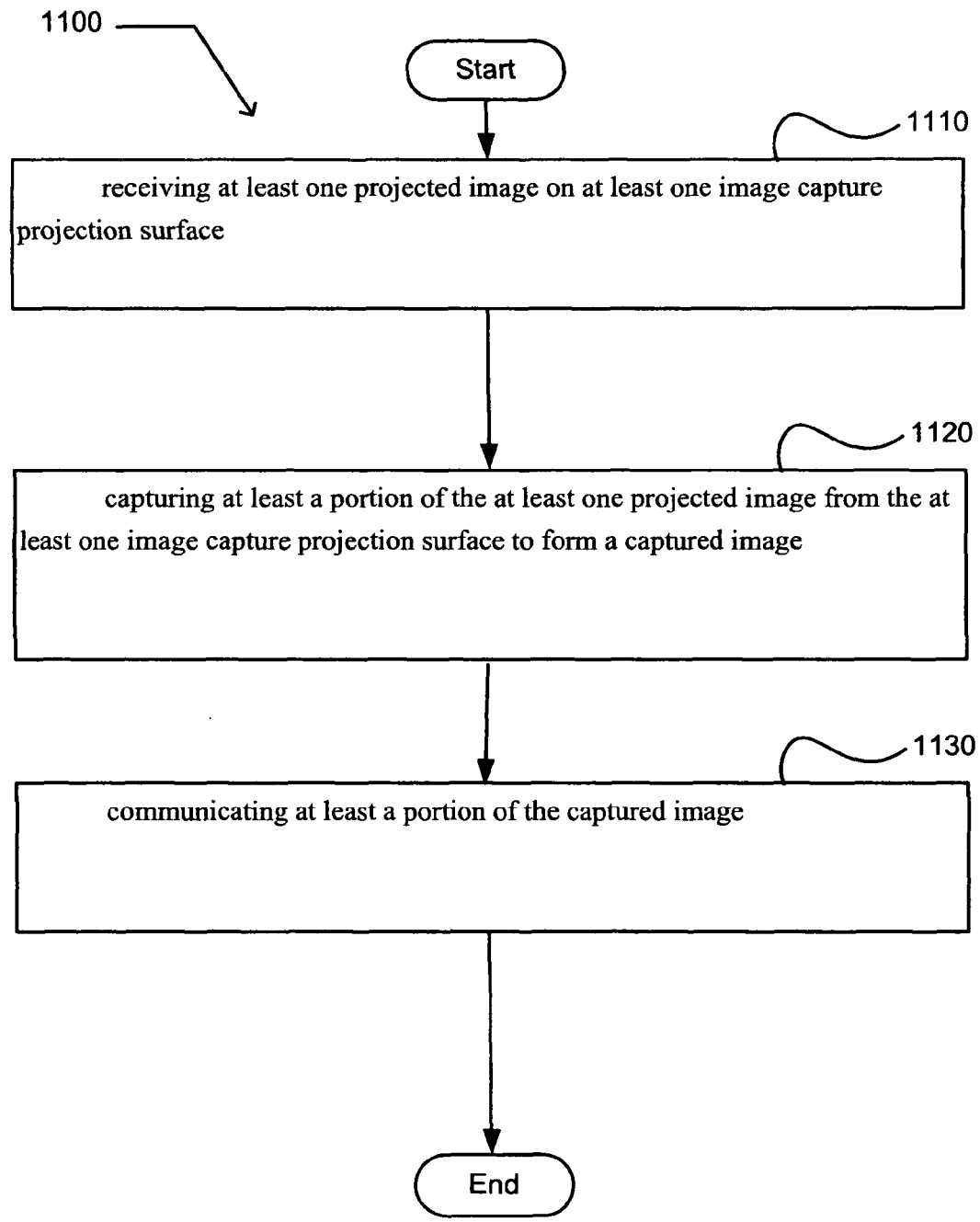
FIG. 11 illustrates an operational flow representing example operations related to receiving at least one projected image on at least one image capture projection surface; capturing at least a portion of the at least one projected image from the at least one image capture projection surface to form a captured image; and communicating at least a portion of the captured image.

In FIG. 11 and in following figures that include various examples of operations used during performance of various methods, discussion and explanation may be provided with respect to any one or combination of the above-described examples of FIGS. 1-10, and/or with respect to other examples and contexts. However, it should be understood that the operations may be executed in a number of other environments and contexts, and/or modified versions of FIGS. 1-10. Also, although the various operations are presented in the sequence(s) illustrated, it should be understood that the various operations may be performed in other orders than those which are illustrated, or may be performed concurrently.

After a start operation, the operational flow 1100 includes a receiving operation 1110 involving receiving at least one projected image on at least one image capture projection surface. In some embodiments, one or more image capture projection surfaces 166 may receive at least one projected image on at least one image capture projection surface. In some embodiments, one or more image capture projection surfaces 166 may receive at least one projected image projected from one or more projectors 164. In some embodiments, two or more image capture projection surfaces 166 may receive at least one projected image. In some embodiments, one or more image capture projection surfaces 166 may receive at least one projected image acquired from electronic or wireless communication such as via one or more communications networks 128 or one or more user communications devices 112. In some embodiments, one or more image capture projection surfaces 166 may receive at least one projected image in accordance with one or more user instructions from one or more users 110 or financial transactions. In some embodiments, one or more image capture projection surfaces 166 may receive at least one projected image in accordance with one or more user attributes of one or more users 110. In some embodiments, one or more image capture projection surfaces 166 may receive at least one projected image in accordance with one or more user attributes of one or more users 110 obtained from a history, a setting, a proximity determination, a sensor, a security parameter, a membership parameter, an account parameter, a status parameter, a group parameter, an ownership parameter, a role parameter, a capability parameter, a rights parameter, a service parameter, an activity parameter, a privilege parameter, a familial characteristic, a physical characteristic, an individualized parameter, or a contextualized parameter. In some embodiments, one or more image capture projection surfaces 166 may receive at least one projected image where the one or more image capture projection surfaces 166 are associated with a structure or device. In some embodiments, one or more image capture projection surfaces 166 may receive at least one projected image where the one or more image capture projection surfaces 166 are associated with a structure or device such as a tablet, a handheld device, a vehicle, a table, a wall, a desk, or a writing surface. In some embodiments, one or more image capture projection surfaces 166 may receive at least one projected image that relates to user-specified content from one or more users 110. In some embodiments, one or more image capture projection surfaces 166 may receive at least one projected image that relates to user-specified content such as legal content, educational content, healthcare content, business content, or personal content. In some embodiments, one or more image capture projection surfaces 166 may receive at least one projected image as a video. In some embodiments, one or more image capture projection surfaces 166 may receive at least one projected image in association with audio content. For example, in some embodiments, an image capture projection surface 166 may be a writing surface at a grocery checkout stand and a projected image may be a grocery receipt for signature. Alternatively, in some embodiments, an image capture projection surface 166 may be a wall mounted surface at a coffee shop and a projected image may be a business presentation. Also, in some embodiments, an image capture projection surface 166 may be a surface on a vehicle console and a projected image may be a menu for controlling vehicle component operations such as music, visual entertainment, climate control, seat placement, or security. Additionally, in some embodiments, an image capture projection surface 166 may be an instructional board for educational endeavors and a projected image may be educational subject matter.

After a start operation, the operational flow 1100 includes a capture operation 1120 involving capturing at least a portion of the at least one projected image from the at least one image capture projection surface to form a captured image. In some embodiments, one or more image capture modules 172 may capture at least a portion of the at least one projected image from the at least one image capture projection surface to form a captured image. In some embodiments, one or more image capture modules 172 may capture at least a portion of one or more projected images from one or more image capture projection surfaces 166. In some embodiments, one or more projection surface control units 179 may control one or more image capture modules 172 to capture at least a portion of one or more projected images from one or more image capture projection surfaces 166. In some embodiments, one or more projection surface control units 179 may receive control instructions from one or more surface memory 179D, from one or more memory 174, from one or more device interface modules 176, from one or more user interfaces 178, from one or more projectors 164, from one or more sensors 156, from one or more service provider modules 130, from one or more financial entities 122, from one or more user communications devices 112, or through one or more communications networks 128. In some embodiments, one or more image capture modules 172 may capture at least a portion of one or more projected images from two or more image capture projection surfaces 166. In some embodiments, one or more image capture modules 172 may capture at least a portion of one or more projected images in accordance with one or more user attributes of one or more users 110. In some embodiments, one or more image capture modules 172 may capture at least a portion of one or more projected images in accordance with one or more user attributes of one or more users 110 obtained from a history, a setting, a proximity determination, a sensor, a security parameter, a membership parameter, an account parameter, a status parameter, a group parameter, an ownership parameter, a role parameter, a capability parameter, a rights parameter, a service parameter, an activity parameter, a privilege parameter, a familial characteristic, a physical characteristic, an individualized parameter, or a contextualized parameter. In some embodiments, one or more image capture modules 172 may capture at least a portion of one or more projected images in accordance with one or more user instructions from one or more users 110. In some embodiments, one or more image capture modules 172 may capture at least a portion of one or more projected images in accordance with one or more physical instruction or one or more electronic instruction from one or more users 110. In some embodiments, one or more image capture modules 172 may capture at least a portion of one or more projected images in accordance with one or more financial transactions. In some embodiments, one or more image capture modules 172 may capture at least a portion of one or more projected images using full imaging 172A, optical scanning 172L, or mechanical scanning 172AB. In some embodiments, one or more image capture modules 172 may capture at least a portion of one or more projected images as video. In some embodiments, one or more image capture modules 172 may capture at least a portion of one or more projected images in association with audio content captured using one or more audio/data capture modules 182. In some embodiments, one or more image capture modules 172 may capture at least a portion of one or more projected images in accordance with one or more user-specified accounts such as from one or more user data accounts 152, one or more service provider modules 130, or one or more financial entities 122. In some embodiments, one or more image capture modules 172 may capture at least a portion of one or more projected images in association with user input or content from another source. For example, in some embodiments, an image capture module 172 may capture a projected grocery receipt from a writing surface at a grocery checkout stand. The image capture module 172 may further capture a signature provided through user input on a writing surface having a projected grocery receipt. Alternatively, in some embodiments, an image capture module 172 may capture a projected business presentation slide or series of slides from a wall mounted surface at a coffee shop. In some embodiments, the image capture module 172 may further capture writing provided from user input on a wall mounted surface having a projected business presentation. In some embodiments, the audio/data capture module 182 may further capture electronic data or files associated with a projected business presentation slide from one or more user communications devices 112, one or more memory 174, one or more service provider modules 130, one or more sensors 156, or through one or more electronic communications networks 128. Also, in some embodiments, an image capture module 172 may capture user input on a menu from a surface on a vehicle console. Additionally, in some embodiments, an image capture module 172 may capture educational subject matter from an instructional board. In some embodiments, the image capture module 172 may further capture writing provided from user input on an educational board having educational subject matter.

After a start operation, the operational flow 1100 includes a communication operation 1130 involving communicating at least a portion of the captured image. In some embodiments, one or more image capture modules 172 may communicate at least a portion of the captured image. In some embodiments, one or more projection surface control units 179 may communicate at least a portion of one or more captured images. In some embodiments, one or more captured images may be communicated using one or more device interface modules 176. In some embodiments, one or more captured images may be communicated using one or more user interfaces 178. In some embodiments, one or more captured images may be communicated using one or more communications networks 128. In some embodiments, one or more captured images may be communicated to one or more user communications devices 112. In some embodiments, one or more captured images may be communicated to one or more service provider modules 130. In some embodiments, one or more captured images may be communicated to one or more financial entities 122. In some embodiments, one or more captured images may be communicated to one or more sensors 156. In some embodiments, one or more captured images may be communicated to one or more projectors 164. In some embodiments, one or more captured images may be communicated in accordance with one or more user instructions, user attributes, or financial transactions. In some embodiments, one or more captured images may be communicated in accordance with one or more physical instructions or electronic instructions. In some embodiments, one or more captured images may be communicated using electronic communication. In some embodiments, one or more captured images may be communicated using wireless communication. In some embodiments, one or more captured images may be communicated to one or more provider memory 144, hardware devices, software applications, user devices, printers, monitor displays, or projectors 164. In some embodiments, one or more captured images may be communicated to two or more provider memory 144, hardware devices, software applications, user devices, printers, monitor displays, or projectors 164. In some embodiments, one or more captured images may be communicated in association with audio content. For example, in some embodiments, a captured grocery receipt and signature may be communicated to one or more email accounts, store accounts, printers, user devices, or the like of one or more users 110. Alternatively, in some embodiments, a captured business presentation slide, series of slides, writing, and/or associated data or files may be communicated to one or more user communications devices 112, email accounts, file locations, printers, projectors 164, or the like. Also, in some embodiments, captured user input on a menu from a surface on a vehicle console may be communicated to one or more corresponding systems for control. Additionally, in some embodiments, captured educational subject matter and writing may be communicated to one or more desk displays, email accounts, file locations, projectors 164, printers, or internet websites.

Figure 12:
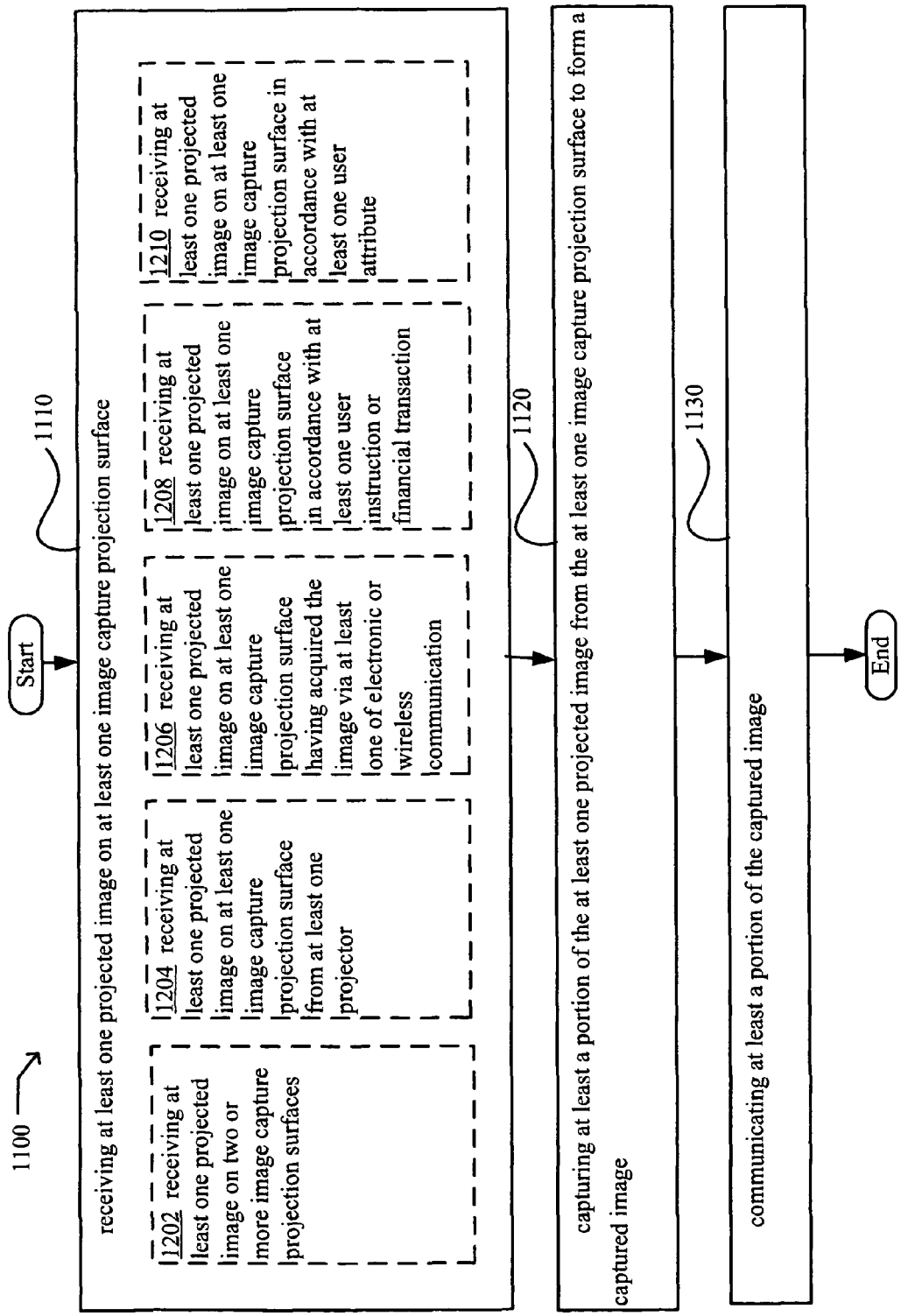
FIGS. 12-18 illustrate alternative embodiments of the example operation flow of FIG. 11.

FIG. 12 illustrates alternative embodiments of the example operational flow 1100 of FIG. 11. FIG. 12 illustrates example embodiments where the receiving operation 1110 may include at least one additional operation. Additional operations may include an operation 1202, operation 1204, operation 1206, operation 1208, and/or an operation 1210.

At operation 1202, the receiving operation 1110 may include receiving at least one projected image on two or more image capture projection surfaces. In some embodiments, two or more image capture projection surfaces 166 may receive at least one projected image on two or more image capture projection surfaces 166. In some embodiments, two or more image capture projection surfaces 166 may receive one or more projected images from one or more projectors 164. In some embodiments, two or more image capture projection surfaces 166 may receive different projected images from one projector 164. In some embodiments, two or more image capture projection surfaces 166 may receive similar projected images from one projector 164. In some embodiments, two or more image capture projection surfaces 166 may receive different projected images from different projectors 164. In some embodiments, two or more image capture projection surfaces 166 may receive similar projected images from different projectors 164. In some embodiments, two or more image capture projection surfaces 166 are proximately disposed. In some embodiments, two or more projection surfaces 166 are remotely disposed. For example, in some embodiments, one image capture projection surface 166 may be disposed on one office wall and another image capture projection surface 166 may be disposed on a different remote office wall and each of the projection surfaces 166 may receive similar presentation projected images. Alternatively, in some embodiments, one image capture projection surface 166 may be disposed on an instructional board and another image capture projection surface 166 may be disposed on nearby desk and each of the projection surfaces 166 may receive different instructional images. Also, in some embodiments, one image capture projection surface 166 may be disposed on one café wall and may receive informational slide show images and a different image capture projection surface 166 may be disposed on an adjacent wall and may receive video images.

At operation 1204, the receiving operation 1110 may include receiving at least one projected image on at least one image capture projection surface from at least one projector. In some embodiments, one or more image capture projection surfaces 166 may receive at least one projected image on at least one image capture projection surface from at least one projector. In some embodiments, one or more image capture projection surfaces 166 may receive one or more projected images from one or more projectors 164. In some embodiments, one or more projected images may include images, slide shows, videos, movies, text, drawings, pictures, application files, data, and the like. In some embodiments, one or more image capture projection surfaces 166 may receive one or more projected images via light projection or data communication. In some embodiments, one or more image capture projection surfaces 166 may reflect one or more projected images. In some embodiments, one or more image capture projection surfaces 166 may display (e.g., LCD, Plasma, etc.) one or more projected images. In some embodiments, one or more projectors 164 may be mounted on, within, or proximate to a wall, ceiling, vehicle, writing surface, computer, or user device. In some embodiments, one or more image capture projection surfaces 166 may be associated with, embodied within, or proximate to a tablet, user device, computer, hanging device, writing surface, wall, ceiling, floor, vehicle console, portable device, business checkout stand, doctors office, exam room desk, hospital chair, table, conference room table, phone, or the like. For example, in some embodiments, a hospital exam room may have a projector 164 mounted on a ceiling and an image capture projection surface 166 mounted on a wall for receiving health record or diagnostic monitoring images related to a particular patient. Also, in some embodiments, a retail store may have a projector 164 mounted on a ceiling and an image capture projection surface 166 on a kiosk for receiving store map or merchandise images. Alternatively, in some embodiments, a car may have a projector 164 mounted on central console and an image capture projection surface 166 on a central console for receive menu, video, navigation, or vehicle system control images.

At operation 1206, the receiving operation 1110 may include receiving at least one projected image on at least one image capture projection surface having acquired the image via at least one of electronic or wireless communication. In some embodiments, one or more image capture projection surfaces 166 may receive at least one projected image on at least one image capture projection surface 166 having acquired the image via at least one of electronic or wireless communication. In some embodiments, one or more image capture projection surfaces 166 may receive one or more projected images from one or more projectors 164. In some embodiments, one or more projectors 164 may receive one or more images via electronic or wireless communication with one or more projection interface modules 160. In some embodiments, one or more projectors 164 may receive one or more images via electronic or wireless communication with one or more user communications devices 112. In some embodiments, one or more projectors 164 may receive one or more images via electronic or wireless communication with one or more service provider modules 130. In some embodiments, one or more projectors 164 may receive one or more images via electronic or wireless communication with one or more communications networks 128. In some embodiments, one or more projectors 164 may receive one or more images via electronic or wireless communication with one or more image capture projection surfaces 166. For example, in some embodiments, a projector 164 may receive an image via wireless communication with a laptop computer or personal digital assistant having a desired image for projection. In some embodiments, in some embodiments, a projector 164 may receive an image via network communication with an internet or other server having a desired image for projection. In some embodiments, a projector may receive an image via electronic communication with another image capture projection surface 166 having captured a desired image for projection.

At operation 1208, the receiving operation 1110 may include receiving at least one projected image on at least one image capture projection surface
in accordance with at least one user instruction or financial transaction. In some embodiments, one or more image capture projection surfaces 166 may receive at least one projected image on at least one image capture projection surface in accordance with at least one user instruction or financial transaction. In some embodiments, one or more image capture projection surfaces 166 may receive one or more projected images from one or more projectors 164. In some embodiments, one or more image capture projection surfaces 166 may receive one or more projected images from one or more projectors 164 in accordance with one or more user instructions. In some embodiments, user instructions may be obtained from user history or preferences. In some embodiments, user instructions may be received through one or more sensors 156 (e.g., motion sensor 156A, gyroscopic sensor 156B, acoustic sensor 156C, biometric sensor 156D, inertial sensor 156E, ultrasonic sensor 156F, contact sensor 156G, light sensor 156H, imaging sensor 156I, pressure sensor 156J, entity sensor 156K, infrared sensor 156L, yaw rate sensor 156M, ultraviolet sensor 156N, range sensor 156O, and camera 156P). In some embodiments, user instructions may be received through one or more projectors 164. In some embodiments, user instructions may be received through one or more image capture projection surfaces 166. In some embodiments, user instructions may be received through one or more user communications devices 112. In some embodiments, user instructions may be received through one or more communications networks 128. In some embodiments, user instructions may be received from one or more users 110. For example, in some embodiments, user instruction may include verbal instruction, motion instruction, data instruction, or based upon user identity, position, movement, history, or preferences. In some embodiments, a user instruction may include interaction with a user interface, motion, sound, or the like. For example, in some embodiments, a physical user instruction may include pushing a button. In some embodiments, a physical user instruction may include speaking a command. In some embodiments, a physical user instruction may include gesturing towards one or more image capture projection surfaces 166. In some embodiments, a user instruction may include an instruction relating to image placement, timing, quality, color, amount, position, duration, sound, or the like. In some embodiments, one or more image capture projection surfaces 166 may receive one or more projected images from one or more projectors 164 in accordance with one or more financial transactions. In some embodiments, financial transactions may result from one or more projected images such as fees for projection, fees for projected content, or fees for projected placement. For example, in some embodiments, a tablet surface may receive a movie for viewing from a projector as a result of payment. In some embodiments, a fee is received from one or more financial entities 122. In some embodiments, one or more image capture projection surfaces 166 may receive one or more projected images from one or more projectors 164 as a result of a financial transaction. For example, in some embodiments, a checkout writing surface may receive a receipt image for signature from a projector in the course of a consumer purchase from a merchant.

At operation 1210, the receiving operation 1110 may include receiving at least one projected image on at least one image capture projection surface in accordance with at least one user attribute. In some embodiments, one or more image capture projection surfaces 166 may receive at least one projected image on at least one image capture projection surface in accordance with at least one user attribute. In some embodiments, one or more image capture projection surfaces 166 may receive one or more projected images from one or more projectors 164. In some embodiments, one or more image capture projection surfaces 166 may receive one or more projected images from one or more projectors 164 in accordance with one or more user attributes. In some embodiments, user attributes may be received from history or settings. In some embodiments, user attributes may be received from one or more users 110. In some embodiments, user attributes may be-received from one or more user data accounts 152. In some embodiments, user attributes may be received through one or more sensors 156 (e.g., motion sensor 156A, gyroscopic sensor 156B, acoustic sensor 156C, biometric sensor 156D, inertial sensor 156E, ultrasonic sensor 156F, contact sensor 156G, light sensor 156H, imaging sensor 156I, pressure sensor 156J, entity sensor 156K, infrared sensor 156L, yaw rate sensor 156M, ultraviolet sensor 156N, range sensor 156O, and camera 156P). In some embodiments, user attributes may be received from one or more user communications devices 112. In some embodiments, user attributes may be received from one or more financial entities 122. In some embodiments, user attributes may be received from one or more service provider modules 130. In some embodiments, user attributes may be received from one or more projectors 164. In some embodiments, user attributes may be received from one or more image capture projection surfaces 166. In some embodiments, user attributes may be received through one or more communications networks 128. In some-embodiments, user attributes may be determined from content of a projected image, user input on one or more image capture projection surfaces 166, or content from one or more other sources on one or more projection-surfaces.

Figure 13:
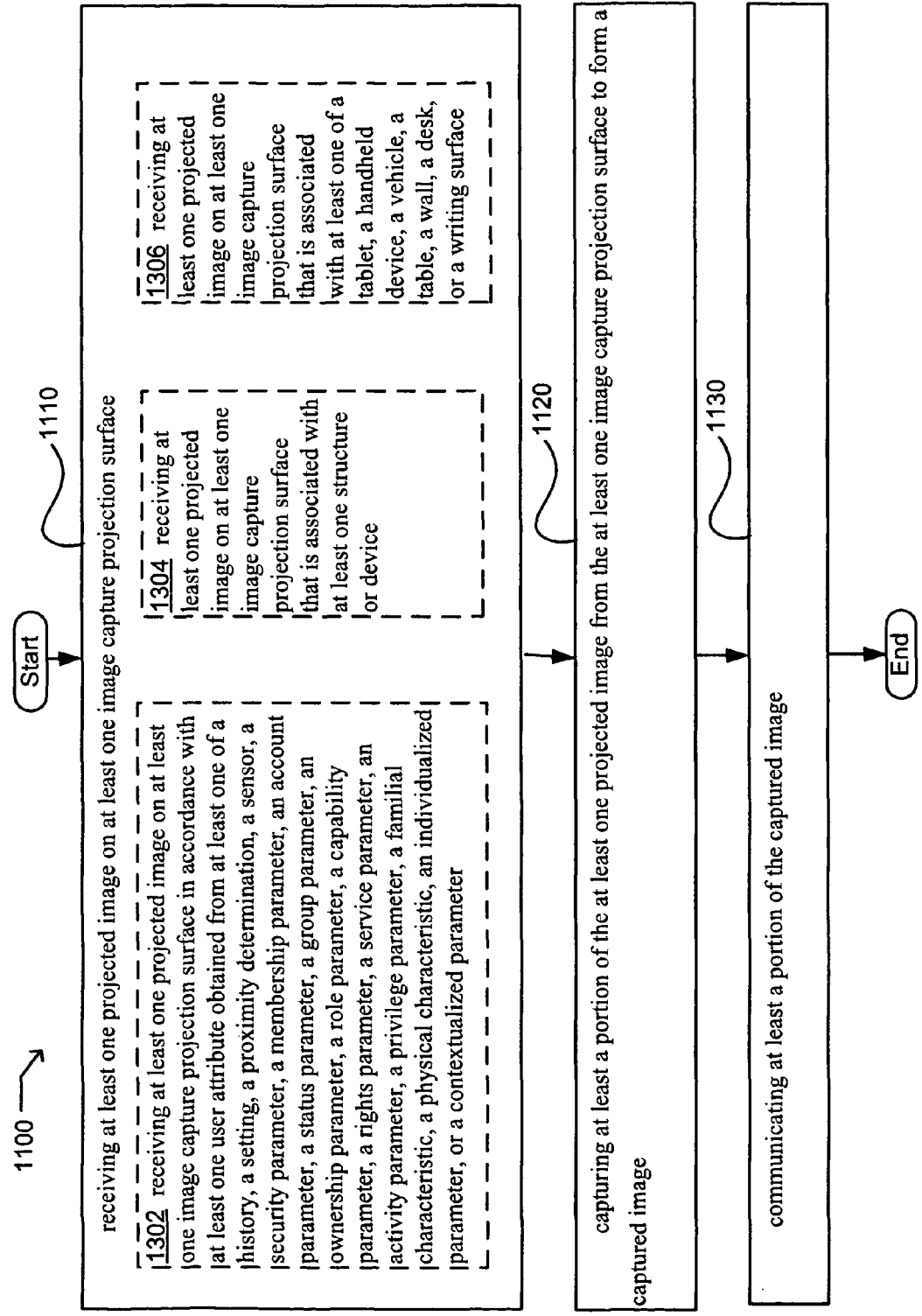

FIG. 13 illustrates alternative embodiments of the example operational flow 1100 of FIG. 11. FIG. 13 illustrates example embodiments where the receiving operation 1110 may include at least one additional operation. Additional operations may include an operation 1302, operation 1304, and/or an operation 1306.

At operation 1302, the receiving operation 1110 may include receiving at least one projected image on at least one image capture projection surface in accordance with at least one user attribute obtained from at least one of a history, a setting, a proximity determination, a sensor, a security parameter, a membership parameter, an account parameter, a status parameter, a group parameter, an ownership parameter, a role parameter, a capability parameter, a rights parameter, a service parameter, an activity parameter, a privilege parameter, a familial characteristic, a physical characteristic, an individualized parameter, or a contextualized parameter. In some embodiments, one or more image capture projection surfaces 166 may receive at least one projected image on at least one image capture projection surface in accordance with at least one user attribute obtained from at least one of a history, a setting, a proximity determination, a sensor, a security parameter, a membership parameter, an account parameter, a status parameter, a group parameter, an ownership parameter, a role parameter, a capability parameter, a rights parameter, a service parameter, an activity parameter, a privilege parameter, a familial characteristic, a physical characteristic, an individualized parameter, or a contextualized parameter. In some embodiments, one or more image capture projection surfaces 166 may receive one or more projected images from one or more projectors 164. In some embodiments, one or more image capture projection surfaces 166 may receive one or more projected images from one or more projectors 164 in accordance with one or more user attributes. In some embodiments, user attributes may be received from history or settings. In some embodiments, user attributes may be received from one or more users 110. In some embodiments, user attributes may be received from one or more user data accounts 152. In some embodiments, user attributes may be received through one or more sensors 156 (e.g., motion sensor 156A, gyroscopic sensor 156B, acoustic sensor 156C, biometric sensor 156D, inertial sensor 156E, ultrasonic sensor 156F, contact sensor 156G, light sensor 156H, imaging sensor 156I, pressure sensor 156J, entity sensor 156K, infrared sensor 156L, yaw rate sensor 156M, ultraviolet sensor 156N, range sensor 156O, and camera 156P). In some embodiments, user attributes may be received from one or more user communications devices 112. In some embodiments, user attributes may be received from one or more financial entities 122. In some embodiments, user attributes may be received from one or more service provider modules 130. In some embodiments, user attributes may be received from one or more projectors 164. In some embodiments, user attributes may be received from one or more image capture projection surfaces 166. In some embodiments, user attributes may be received through one or more communications networks 128. In some embodiments, user attributes may be contextually determined from content of a projected image, user input on one or more image capture projection surfaces 166, or content from one or more other sources on one or more projection surfaces. For example, in some embodiments, one or more image capture projection surfaces 166 may receive one or more projected images from one or more projectors 164 based on previously used projection surfaces 166, previously used projectors 164, or previously received images. In some embodiments, one or more image capture projection surfaces 166 may receive one or more projected images from one or more projectors 164 based on proximity of a user or device with one or more projectors 164 or projection surfaces 166. In some embodiments, one or more image capture projection surfaces 166 may receive one or more projected images from one or more projectors 164 based on movement of a user or device (e.g., tracking a user by receiving projected images on nearby projection surfaces) or motion of a user or device (e.g., interpreting gestural motions associated with a projector 164 or an image capture projection surface 166). In some embodiments, one or more image capture projection surfaces 166 may receive one or more projected images from one or more projectors 164 based on a login and password, biometric data, a security card, or the like. In some embodiments, one or more image capture projection surfaces 166 may receive one or more projected images from one or more projectors 164 based on membership in a service plan as indicated by one or more service provider modules 130. In some embodiments, one or more image capture projection surfaces 166 may receive one or more projected images from one or more projectors 164 based on membership in a group, partnership, organization, or company. In some embodiments, one or more image capture projection surfaces 166 may receive one or more projected images from one or more projectors 164 based on a defined role such as a company, leadership, or job position. In some embodiments, one or more image capture projection surfaces 166 may receive one or more projected images from one or more projectors 164 based on height, weight, age, or sex of one or more users. In some embodiments, one or more image capture projection surfaces 166 may receive one or more projected images from one or more projectors 164 based on person density, foot traffic volume, sales volume, conversation or sound volume, proximate sound type, time of day, weather conditions, language spoken by proximate persons, educational level of proximate persons as determined by language used, interests of proximate persons as determined by language used, age of persons as determined by height or language used, nearby objects, nearby images, other projected images, or the like receiving at least one projected image on at least one image capture projection surface having acquired the image via at least one of electronic or wireless communication At operation 1304, the receiving operation 1110 may include receiving at least one projected image on at least one image capture projection surface that is associated with at least one structure or device. In some embodiments, one or more image capture projection surfaces 166 may receive at least one projected image on at least one image capture projection surface that is associated with at least one structure or device. In some embodiments, one or more image capture projection surfaces 166 may receive one or more projected images from one or more projectors 164. In some embodiments, one or more image capture projection surfaces 166 may be associated with a structure or device. In some embodiments, one or more image capture projection surfaces 166 may be embedded within a structure or device. In some embodiments, one or more image capture projection surfaces 166 may be coupled to a structure or device. In some embodiments, one or more image capture projection surfaces 166 may be removably couplable to a structure or device. In some embodiments, one or more image capture projection surfaces 166 may be movable between one or more structures or devices. For example, in some embodiments, one or more image capture projection surfaces 166 may be embodied as a tablet, handheld, television, computer, or other device. In some embodiments, one or more image capture projection surfaces 166 may be embodied within a writing surface, vehicle, table, desk, kiosk, handheld device checkout stand, counter, billboard, advertisement, or the like. In some embodiments, one or more image capture projection surfaces 166 may be removably couplable to a wall, ceiling, floor, desk, writing surface, or the like.

At operation 1306, the receiving operation 1110 may include receiving at least one projected image on at least one image capture projection surface that is associated with at least one of a tablet, a handheld device, a vehicle, a table, a wall, a desk, or a writing surface. In some embodiments, one or more image capture projection surfaces 166 may receive at least one projected image on at least one image capture projection surface that is associated with at least one of a tablet, a handheld device, a vehicle, a table, a wall, a desk, or a writing surface. In some embodiments, one or more image capture projection surfaces 166 may receive one or more projected images from one or more projectors 164. In some embodiments, one or more image capture projection surfaces 166 may be associated with a structure or device. In some embodiments, one or more image capture projection surfaces 166 may be embedded within a structure or device. In some embodiments, one or more image capture projection surfaces 166 may be coupled to a structure or device. In some embodiments, one or more image capture projection surfaces 166 may be removably couplable to a structure or device. In some embodiments, one or more image capture projection surfaces 166 may be movable between one or more structures or devices. For example, in some embodiments, one or more image capture projection surfaces 166 may be embodied as a tablet, handheld, television, computer, or other device. In some embodiments, one or more image capture projection surfaces 166 may be embodied within a writing surface, vehicle, table, desk, kiosk, handheld device checkout stand, counter, billboard, advertisement, or the like. In some embodiments, one or more image capture projection surfaces 166 may be removably couplable to a wall, ceiling, floor, desk, writing surface, or the like.

Figure 14:
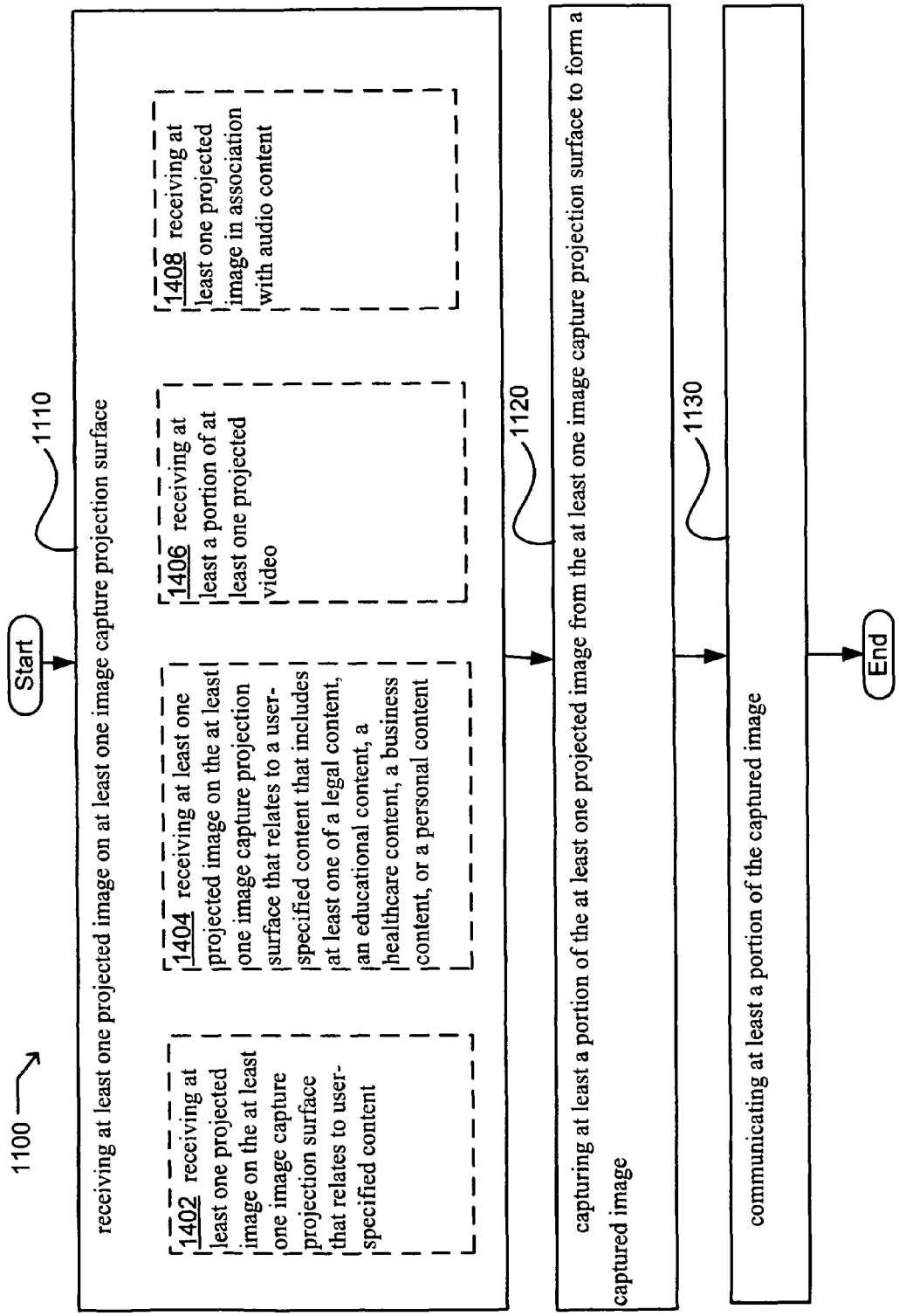

FIG. 14 illustrates alternative embodiments of the example operational flow 1100 of FIG. 11. FIG. 14 illustrates example embodiments where the receiving operation 1110 may include at least one additional operation. Additional operations may include an operation 1402, operation 1404, operation 1406 and/or an operation 1408.

At operation 1402, the receiving operation 1110 may include receiving at least one projected image on the at least one image capture projection surface that relates to user-specified content. In some embodiments, one or more image capture projection surfaces 166 may receive at least one projected image on the at least one image capture projection surface that relates to user-specified content. In some embodiments, one or more image capture projection surfaces 166 may receive one or more projected images from one or more projectors 164. In some embodiments, one or more image capture projection surfaces 166 may receive one or more projected images from one or more projectors 164 that relate to user-specified content. In some embodiments, a user-specification may be received from one or more users 110. In some embodiments, a user-specification may be received from one or more user communications devices 112. In some embodiments, a user-specification may be received from one or more sensors 156. In some embodiments, a user-specification may be received from one or more user data accounts 152. In some embodiments, a user-specification may be received from one or more projectors 164. In some embodiments, a user-specification may be received from one or more image capture projection surfaces 166. In some embodiments, a user-specification may be received from one or more service provider modules 130. In some embodiments, a user-specification may be received from one or more communications networks 128. For example, in some embodiments, user-specified content may relate to a file, an internet address, a network location, a subject, a date, a person, a document, a movie, a song, an artist, an author, an application, or the like.

At operation 1404, the receiving operation 1110 may include receiving at least one projected image on the at least one image capture projection surface that relates to a user-specified content that includes at least one of a legal content, an educational content, a healthcare content, a business content, or a personal content. In some embodiments, one or more image capture projection surfaces 166 may receive at least one projected image on the at least one image capture projection surface that relates to a user-specified content that includes at least one of a legal content, an educational content, a healthcare content, a business content, or a personal content. In some embodiments, one or more image capture projection surfaces 166 may receive one or more projected images from one or more projectors 164. In some embodiments, one or more image capture projection surfaces 166 may receive one or more projected images from one or more projectors 164 that relate to user-specified content that includes one or more of legal content, educational content, healthcare content, business content, or personal content. For example, in some embodiments, legal content may include a contract, a will, a deed, a statute, a regulation, a rule, a case, litigation material, or the like. In some embodiments, educational content may include textbook material, instructor material, instructor notes, student notes, shared student notes, assignments, quizzes, exams, standardized tests, graded materials, supplemental resources, and the like. In some embodiments, healthcare content may include personal health records, diagnostic information, lab results, test results, medical provider instruction, prescription details, medication instruction, medical provider advice, medical reference material, home healthcare direction, medical care locations, provider contact information, and the like. In some embodiments, business content may include sales material, marketing material, operational material, product material, service material, client material, company resources, employee material, supplier material, contact information, reference material, presentations, and the like. In some embodiments, personal content may include financial information, scheduling information, mail, email, reading material, news content, television content, movie content, video content, pictures, and the like.

At operation 1406, the receiving operation 1110 may include receiving at least a portion of at least one projected video. In some embodiments, one or more image capture projection surfaces 166 may receive at least a portion of at least one projected video. In some embodiments, one or more image capture projection surfaces 166 may receive one or more projected images from one or more projectors 164. In some embodiments, one or more image capture projection surfaces 166 may receive one or more projected videos from one or more projectors 164. In some embodiments, one or more videos may be received from one or more user communications devices 112. In some embodiments, one or more videos may be received from one or more communications networks 128. In some embodiments, one or more videos may be received from one or more sensors 156. In some embodiments, one or more videos may be received from one or more service provider modules 130. In some embodiments, one or more videos may be received from one or more other projection surfaces 166. In some embodiments, one or more videos may be received from one or more projectors 164. For example, in some embodiments, one or more videos may be a movie. In some embodiments, one or more videos may be a home video. In some embodiments, one or more videos may be a series of images received on another image capture projection surface 166 (e.g., at a prior time or from another location). In some embodiments, one or more videos may be an instructional video. In some embodiments, one or more videos may be a television show. In some embodiments, one or more videos may be a camera feed.

At operation 1408, the receiving operation 1110 may include receiving at least one projected image in association with audio content. In some embodiments, one or more image capture projection surfaces 166 may receive at least one projected image in association with audio content. In some embodiments, one or more image capture projection surfaces 166 may receive one or more projected images from one or more projectors 164. In some embodiments, one or more image capture projection surfaces 166 may receive one or more projected images from one or more projectors 164 in association with audio content. In some embodiments, audio content may be audibly broadcast by one or more projectors 164. In some embodiments, audio content may be electronically or wirelessly received by one or more image capture projection surfaces 166 for audible broadcast. In some embodiments, audio content may be electronically or wirelessly received by one or more audio broadcast devices for audible broadcast. In some embodiments, audio content may be received from one or more user communications devices 112. In some embodiments, audio content may be received from one or more service provider modules 130. In some embodiments, audio content may be received through one or more communications networks. In some embodiments, audio content may be received by one or more sensors 156. In some embodiments, audio content may be received by one or more projectors 164. In some embodiments, audio content may be received by one or more image capture projection surfaces 166. For example, in some embodiments, an image capture projection surface 166 may receive a presentation image in association with accompanying presentation speech. In some embodiments, an image capture projection surface 166 may receive a menu image in association with instructional speech. In some embodiments, an image capture projection surface 166 may receive a video in association with a soundtrack. In some embodiments, an image capture projection surface 166 may receive educational material in association with instructor comments.

Figure 15:
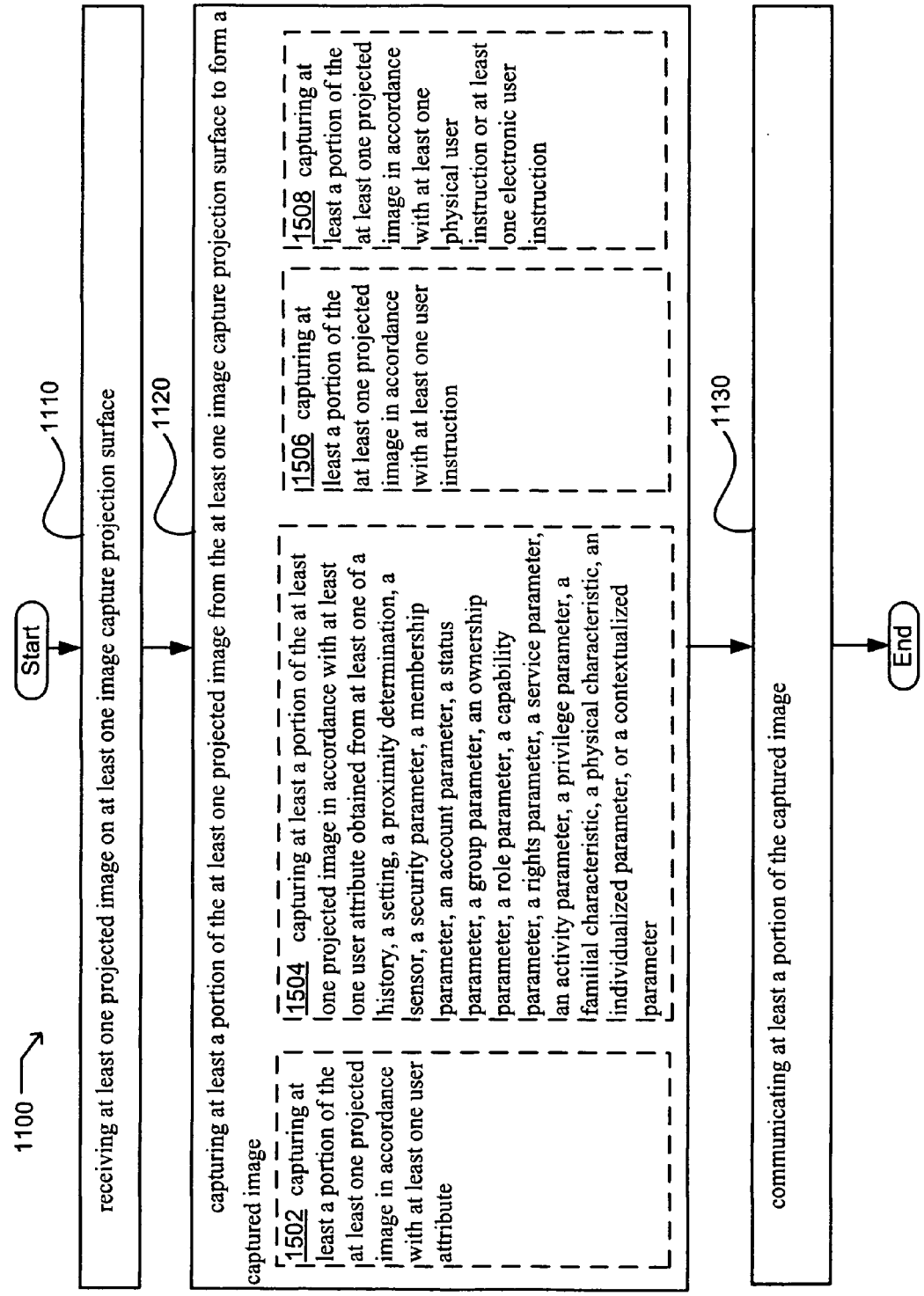

FIG. 15 illustrates alternative embodiments of the example operational flow 1100 of FIG. 11. FIG. 15 illustrates example embodiments where the capturing operation 1120 may include at least one additional operation. Additional operations may include an operation 1502, operation 1504, operation 1506, and/or an operation 1508.

At operation 1502, the capturing operation 1120 may include capturing at least a portion of the at least one projected image in accordance with at least one user attribute. In some embodiments, one or more image capture modules 172 may capture at least a portion of the at least one projected image in accordance with at least one user attribute. In some embodiments, one or more image capture modules 172 may capture one or more projected images from one or more image capture projection surfaces 166. In some embodiments, one or more image capture modules 172 may capture one or more projected images from one or more image capture projection surfaces 166 in accordance with one or more user attributes. In some embodiments, user attributes may be received from history or settings. In some embodiments, user attributes may be received from one or more users 110. In some embodiments, user attributes may be received from one or more user data accounts 152. In some embodiments, user attributes may be received through one or more sensors 156 (e.g., motion sensor 156A, gyroscopic sensor 156B, acoustic sensor 156C, biometric sensor 156D, inertial sensor 156E, ultrasonic sensor 156F, contact sensor 156G, light sensor 156H, imaging sensor 156I, pressure sensor 156J, entity sensor 156K, infrared sensor 156L, yaw rate sensor 156M, ultraviolet sensor 156N, range sensor 156O, and camera 156P). In some embodiments, user attributes may be received from one or more user communications devices 112. In some embodiments, user attributes may be received from one or more financial entities 122. In some embodiments, user attributes may be received from one or more service provider modules 130. In some embodiments, user attributes may be received from one or more projectors 164. In some embodiments, user attributes may be received from one or more image capture projection surfaces 166. In some embodiments, user attributes may be received through one or more communications networks 128. In some embodiments, user attributes may be determined from content of a projected image, user input on one or more image capture projection surfaces 166, or content from one or more other sources on one or more projection surfaces.

At operation 1504, the capturing operation 1120 may include capturing at least a portion of the at least one projected image in accordance with at least one user attribute obtained from at least one of a history, a setting, a proximity determination, a sensor, a security parameter, a membership parameter, an account parameter, a status parameter, a group parameter, an ownership parameter, a role parameter, a capability parameter, a rights parameter, a service parameter, an activity parameter, a privilege parameter, a familial characteristic, a physical characteristic, an individualized parameter, or a contextualized parameter. In some embodiments, one or more image capture modules 172 may capture at least a portion of the at least one projected image in accordance with at least one user attribute obtained from at least one of a history, a setting, a proximity determination, a sensor, a security parameter, a membership parameter, an account parameter, a status parameter, a group parameter, an ownership parameter, a role parameter, a capability parameter, a rights parameter, a service parameter, an activity parameter, a privilege parameter, a familial characteristic, a physical characteristic, an individualized parameter, or a contextualized parameter. In some embodiments, one or more image capture modules 172 may capture one or more projected images from one or more image capture projection surfaces 166. In some embodiments, one or more image capture modules 172 may capture one or more projected images from one or more image capture projection surfaces 166 in accordance with one or more user attributes. In some embodiments, user attributes may be received from history or settings. In some embodiments, user attributes may be received from one or more users 110. In some embodiments, user attributes may be received from one or more user data accounts 152. In some embodiments, user attributes may be received through one or more sensors 156 (e.g., motion sensor 156A, gyroscopic sensor 156B, acoustic sensor 156C, biometric sensor 156D, inertial sensor 156E, ultrasonic sensor 156F, contact sensor 156G, light sensor 156H, imaging sensor 156I, pressure sensor 156J, entity sensor 156K, infrared sensor 156L, yaw rate sensor 156M, ultraviolet sensor 156N, range sensor 156O, and camera 156P). In some embodiments, user attributes may be received from one or more user communications devices 112. In some embodiments, user attributes may be received from one or more financial entities 122. In some embodiments, user attributes may be received from one or more service provider modules 130. In some embodiments, user attributes may be received from one or more projectors 164. In some embodiments, user attributes may be received from one or more image capture projection surfaces 166. In some embodiments, user attributes may be received through one or more communications networks 128. In some embodiments, user attributes may be contextually determined from content of a projected image, user input on one or more image capture projection surfaces 166, or content from one or more other sources on one or more projection surfaces. For example, in some embodiments, one or more image capture modules 172 may capture one or more projected images from one or more image capture projection surfaces 166 based on previously used projection surfaces 166, previously used projectors 164, previously received images, previously captured images, or previous capture history. In some embodiments, one or more image capture modules 172 may capture one or more projected images from one or more image capture projection surfaces 166 based on proximity of a user or device with one or more projectors 164 or projection surfaces 166. In some embodiments, one or more image capture modules 172 may capture one or more projected images from one or more image capture projection surfaces 166 based on movement of a user or device (e.g., tracking a user and capturing projected images from nearby projection surfaces) or motion of a user or device (e.g., interpreting gestural motions associated with a projector 164 or an image capture projection surface 166). In some embodiments, one or more image capture modules 172 may capture one or more projected images from one or more image capture projection surfaces 166 based on a login and password, biometric data, a security card, or the like. In some embodiments, one or more image capture modules 172 may capture one or more projected images from one or more image capture projection surfaces 166 based on membership in a service plan as indicated by one or more service provider modules 130. In some embodiments, one or more image capture modules 172 may capture one or more projected images from one or more image capture projection surfaces 166 based on membership in a group, partnership, organization, or company. In some embodiments, one or more image capture modules 172 may capture one or more projected images from one or more image capture projection surfaces 166 based on a defined role such as a company, leadership, or job position. In some embodiments, one or more image capture modules 172 may capture one or more projected images from one or more image capture projection surfaces 166 based on height, weight, age, or sex of one or more users. In some embodiments, one or more image capture modules 172 may capture one or more projected images from one or more image capture projection surfaces 166 based on presence of a person or object, person density, foot traffic volume, sales volume, conversation or sound volume, proximate sound type, time of day, weather conditions, language spoken by proximate persons, educational level of proximate persons as determined by language used, interests of proximate persons as determined by language used, age of persons as determined by height or language used, nearby objects, nearby images, other projected images, or the like receiving at least one projected image on at least one image capture projection surface having acquired the image via at least one of electronic or wireless communication At operation 1506, the capturing operation 1120 may include capturing at least a portion of the at least one projected image in accordance with at least one user instruction. In some embodiments, one or more image capture modules 172 may capture at least a portion of the at least one projected image in accordance with at least one user instruction. In some embodiments, one or more image capture modules 172 may capture one or more projected images from one or more image capture projection surfaces 166. In some embodiments, one or more image capture modules 172 may capture one or more projected images from one or more image capture projection surfaces 166 in accordance with one or more user instructions. In some embodiments, user instructions may be obtained from user history or preferences. In some embodiments, user instructions may be received through one or more sensors 156 (e.g., motion sensor 156A, gyroscopic sensor 156B, acoustic sensor 156C, biometric sensor 156D, inertial sensor 156E, ultrasonic sensor 156F, contact sensor 156G, light sensor 156H, imaging sensor 156I, pressure sensor 156J, entity sensor 156K, infrared sensor 156L, yaw rate sensor 156M, ultraviolet sensor 156N, range sensor 156O, and camera 156P). In some embodiments, user instructions may be received through one or more projectors 164. In some embodiments, user instructions may be received through one or more image capture projection surfaces 166. In some embodiments, user instructions may be received through one or more user communications devices 112. In some embodiments, user instructions may be received through one or more communications networks 128. In some embodiments, user instructions may be received from one or more users 110. For example, in some embodiments, user instruction may include verbal instruction, motion instruction, data instruction, or based upon user identity, position, movement, history, or preferences.

At operation 1508, the capturing operation 1120 may include capturing at least a portion of the at least one projected image in accordance with at least one physical user instruction or at least one electronic user instruction. In some embodiments, one or more image capture modules 172 may capture at least a portion of the at least one projected image in accordance with at least one physical user instruction or at least one electronic user instruction. In some embodiments, one or more image capture modules 172 may capture one or more projected images from one or more image capture projection surfaces 166. In some embodiments, one or more image capture modules 172 may capture one or more projected images from one or more image capture projection surfaces 166 in accordance with one or more physical user instructions. In some embodiments, a physical user instruction may be converted to digital, electronic, or wireless instructions. In some embodiments, a physical user instruction may be received from one or more users 110. In some embodiments, a physical user instruction may be received from one or more user communications devices 112. In some embodiments, a physical user instruction may be received from one or more communications networks 128. In some embodiments, a physical user instruction may be received from one or more sensors 156. In some embodiments, a physical user instruction may be received from one or more projectors 164. In some embodiments, a physical user instruction may be received from one or more projection surfaces. In some embodiments, a physical user instruction may include interaction with a user interface, motion, sound, or the like. For example, in some embodiments, a physical user instruction may include pushing a button. In some embodiments, a physical user instruction may include speaking a command. In some embodiments, a physical user instruction may include outlining an image with a finger or device on one or more image capture projection surfaces 166. In some embodiments, one or more image capture modules 172 may capture one or more projected images from one or more image capture projection surfaces 166 in accordance with one or more electronic user instructions. In some embodiments, one or more electronic user instructions may result from one or more physical user instructions. In some embodiments, one or more electronic user instructions may be received from one or more users 110. In some embodiments, one or more electronic user instructions may be received from one or more user communications devices 112. In some embodiments, one or more electronic user instructions may be received from one or more financial entities 122. In some embodiments, one or more electronic user instructions may be received from one or more service provider modules 130. In some embodiments, one or more electronic user instructions may be received from one or more communications networks 128. In some embodiments, one or more electronic user instructions may be received from one or more sensors 156. In some embodiments, one or more electronic user instructions may be received from one or more projectors 164. In some embodiments, one or more electronic user instructions may be received from one or more image capture projection surfaces 166. In some embodiments, a physical or an electronic user instruction may include an instruction relating to capture timing, quality, color, amount, position, duration, sound, or the like.

Figure 16:
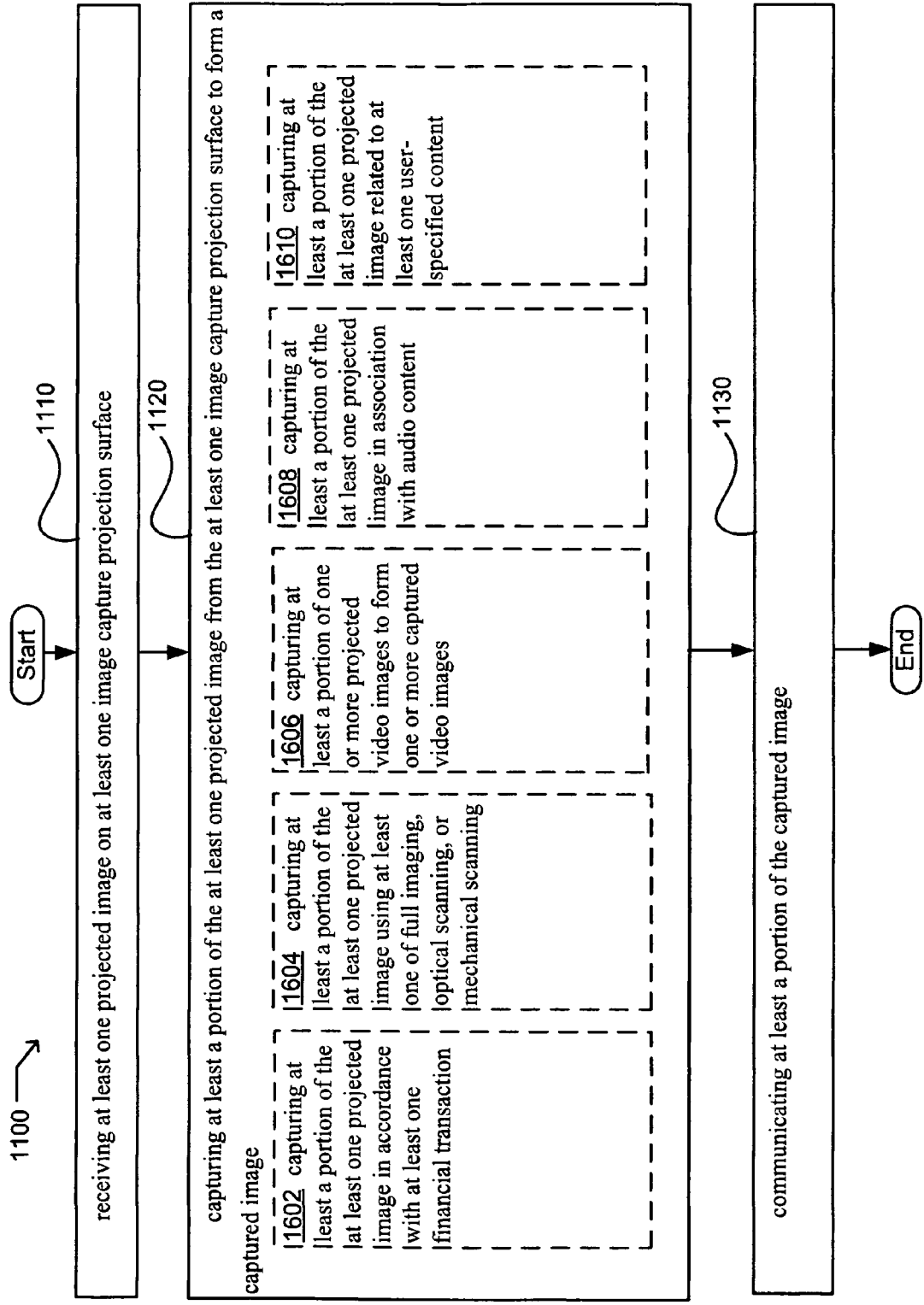

FIG. 16 illustrates alternative embodiments of the example operational flow 1100 of FIG. 11. FIG. 16 illustrates example embodiments where the capturing operation 1120 may include at least one additional operation. Additional operations may include an operation 1602, operation 1604, operation 1606, operation 1608, and/or an operation 1610.

At operation 1602, the capturing operation 1120 may include capturing at least a portion of the at least one projected image in accordance with at least one financial transaction. In some embodiments, one or more image capture modules 172 may capture at least a portion of the at least one projected image in accordance with at least one financial transaction. In some embodiments, one or more image capture modules 172 may capture one or more projected images from one or more image capture projection surfaces 166. In some embodiments, one or more image capture modules 172 may capture one or more projected images from one or more image capture projection surfaces 166 in accordance with one or more financial transactions. In some embodiments, financial transactions may result from one or more captured images such as fees for capture, fees for captured content, or fees for captured volume. For example, a fee may be imposed for capturing a movie, a single image, a series of images, audio, additional content, user input, or the like. In some embodiments, a fee is received from one or more financial entities 122. In some embodiments, one or more image capture modules 172 may capture one or more projected images from one or more image capture projection surfaces 166 as a result of a financial transaction. For example, in some embodiments, an image capture module may capture an image of a receipt and signature from a checkout writing surface in the course of a consumer purchase from a merchant.

At operation 1604, the capturing operation 1120 may include capturing at least a portion of the at least one projected image using at least one of full imaging, optical scanning, or mechanical scanning. In some embodiments, one or more image capture modules 172 may capture at least a portion of the at least one projected image using at least one of full imaging, optical scanning, or mechanical scanning. In some embodiments, one or more image capture modules 172 may capture one or more projected images from one or more image capture projection surfaces 166. In some embodiments, one or more image capture modules 172 may capture one or more projected images from one or more image capture projection surfaces 166 using full imaging 172A. In some embodiments, full imaging 172A may include one or more controllers 172B and one or more detector arrays 172F (e.g., CCD array 172G, CID array 172I, or photodiode array 172K). In some embodiments, one or more controllers 172B may include one or more processors 172C, one or more memory 172D, and one or more instructions 172E. In some embodiments, one or more image capture modules 172 may capture one or more projected images from one or more image capture projection surfaces 166 using optical scanning 172L. In some embodiments, optical scanning 172L may include one or more controllers 172M, one or more detector arrays 172Q (e.g., CCD Array 172R, CID Array 172S, or Photodiode Array 172T), one or more drive mechanisms 172U, and one or more optics 172X (e.g., flat mirror 172Y, parabolic mirror 172Z, or lens 172AA). In some embodiments, one or more controllers 172M may include one or more processors 172N, one or more memory 172O, and one or more instructions 172P. In some embodiments, one or more drive mechanisms 172U may include one or more actuators 172V and one or more position sensors 172W. In some embodiments, one or more image capture modules 172 may capture one or more projected images from one or more image capture projection surfaces 166 using mechanical scanning 172AB. In some embodiments, mechanical scanning 172AB may include one or more controllers 172AC, one or more detector arrays 172AG (e.g., CCD Array 172AH, CID Array 172AI, or Photodiode Array 172AJ), and one or more drive mechanisms 172AK. In some embodiments, one or more controllers 172AC may include one or more processors 172AD, one or more memory 172AE, and one or more instructions 172AF. In some embodiments, one or more drive mechanisms 172AK may include one or more actuators 172AL and one or more position sensors 172AM.

At operation 1606, the capturing operation 1120 may include capturing at least a portion of one or more projected video images to form one or more captured video images. In some embodiments, one or more image capture modules 172 may capture at least a portion of one or more projected video images to form one or more captured video images. In some embodiments, one or more image capture modules 172 may capture one or more projected images from one or more image capture projection surfaces 166. In some embodiments, one or more image capture modules 172 may capture one or more projected video images from one or more image capture projection surfaces 166 to form one or more captured video images. In some embodiments, one or more image capture modules 172 may capture one or more images from one or more image capture projection surfaces 166 to form one or more captured video images. In some embodiments, one or more image capture modules 172 may capture one or more images from one or more image capture projection surfaces 166 along with content from another source to form one or more captured video images. In some embodiments, one or more image capture modules 172 may capture one or more images from two or more image capture projection surfaces 166 to form one or more captured video images. In some embodiments, one or more image capture modules 172 may capture one or more projected images from one or more image capture projection surfaces 166 along with audio to form one or more captured video images. For example, one or more video images may be a movie. In some embodiments, one or more video images may be a home video. In some embodiments, one or more video images may be a series of images received on one or more image capture projection-surfaces 166. In some embodiments, one or more videos may be an instructional video. In some embodiments, one or more videos may be a television show. In some embodiments, one or more videos may be a camera feed.

At operation 1608, the capturing operation 1120 may include capturing at least a portion of the at least one projected image in association with audio content. In some embodiments, one or more image capture modules 172 may capture at least a portion of the at least one projected image in association with audio content. In some embodiments, one or more image capture modules 172 may capture one or more projected images from one or more image capture projection surfaces 166. In some embodiments, one or more image capture modules 172 may capture one or more projected images from one or more image capture projection surfaces 166 in association with audio content captured from one or more audio/data capture modules 182. In some embodiments, audio content may be captured using a microphone. In some embodiments, audio content may be captured from analog or digital data. In some embodiments, audio content may be captured wirelessly or electronically. In some embodiments, audio content may be received from one or more users 110. In some embodiments, audio content may be received from one or more user communications devices 112. In some embodiments, audio content may be received from one or more service provider modules 130. In some embodiments, audio content may be received from one or more communications networks 128. In some embodiments, audio content may be received from one or more sensors 156. In some embodiments, audio content may be received from one or more projectors 164. In some embodiments, audio content may be received from one or more image capture projection surfaces 166. For example, in some embodiments, an image capture module 172 may capture a presentation image in association with accompanying presentation speech. In some embodiments, an image capture module 172 may capture a document in association with instructions related to the document. In some embodiments, an image capture module 172 may capture a test answer in association with an explanation for understanding the answer. In some embodiments, an image capture module 172 may capture an agreement in association with an acknowledgement of the agreement. In some embodiments, an image capture module 172 may capture a slide show in association with participant dialog related to the slide show. In some embodiments, an image capture module 172 may capture a movie in association with a soundtrack.

At operation 1610, the capturing operation 1120 may include capturing at least a portion of the at least one projected image related to at least one user-specified content. In some embodiments, one or more image capture modules 172 may capture at least a portion of the at least one projected image related to at least one user-specified content. In some embodiments, one or more image capture modules 172 may capture one or more projected images from one or more image capture projection surfaces 166. In some embodiments, one or more image capture modules 172 may capture one or more projected images related to user-specified content from one or more image capture projection surfaces 166. In some embodiments, a user-specification may be received from one or more users 110. In some embodiments, a user-specification may be received from one or more user communications devices 112. In some embodiments, a user-specification may be received from one or more sensors 156. In some embodiments, a user-specification may be received from one or more user data accounts 152. In some embodiments, a user-specification may be received from one or more projectors 164. In some embodiments, a user-specification may be received from one or more image capture projection surfaces 166. In some embodiments, a user-specification may be received from one or more service provider modules 130. In some embodiments, a user-specification may be received from one or more communications networks 128. For example, in some embodiments, user-specified content may relate to a file, an internet address, a network location, a subject, a date, a person, a document, a movie, a song, an artist, an author, an application, or the like.

Figure 17:
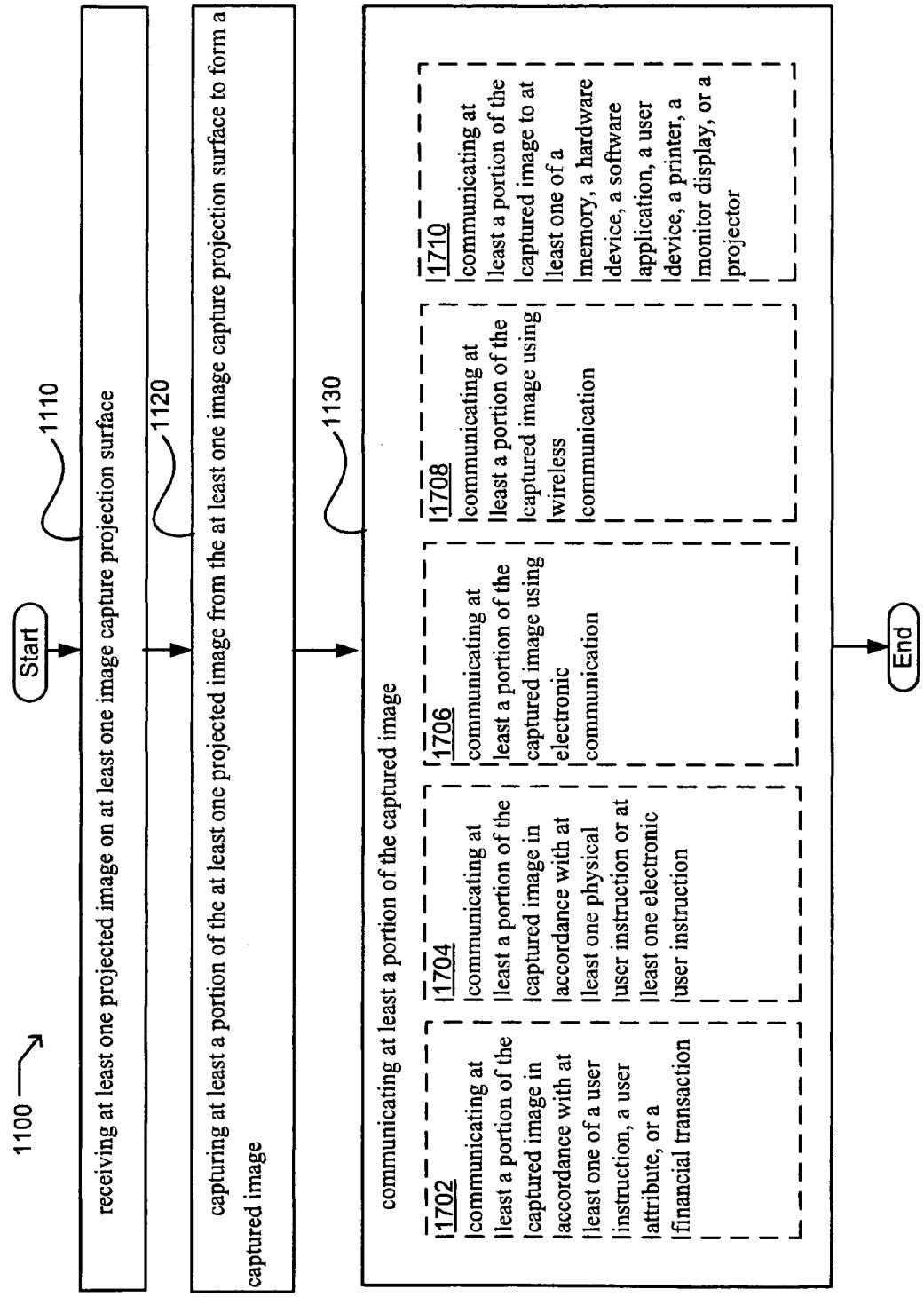

FIG. 17 illustrates alternative embodiments of the example operational flow 1100 of FIG. 11. FIG. 17 illustrates example embodiments where the communicating operation 1130 may include at least one additional operation. Additional operations may include an operation 1702, operation 1704, operation 1706, operation 1708, and/or an operation 1710.

At operation 1702, the communicating operation 1130 may include communicating at least a portion of the captured image in accordance with at least one of a user instruction, a user attribute, or a financial transaction. In some embodiments, one or more image capture modules 172 may communicate at least a portion of the captured image in accordance with at least one of a user instruction, a user attribute, or a financial transaction. In some embodiments, one or more projection surface control units 179 may control communication of one or more captured images from one or more image capture modules 172. In some embodiments, one or more projection surface control units 179 may control communication of one or more captured images from one or more memory 174. In some embodiments, one or more projection surface control units 179 may control communication of one or more captured images in accordance with at least one of a user instruction, a user attribute, or a financial transaction. In some embodiments, user instructions may be obtained from user history or preferences. In some embodiments, user instructions may be received through one or more sensors 156 (e.g., motion sensor 156A, gyroscopic sensor 156B, acoustic sensor 156C, biometric sensor 156D, inertial sensor 156E, ultrasonic sensor 156F, contact sensor 156G, light sensor 156H, imaging sensor 156I, pressure sensor 156J, entity sensor 156K, infrared sensor 156L, yaw rate sensor 156M, ultraviolet sensor 156N, range sensor 156O, and camera 156P). In some embodiments, user instructions may be received through one or more projectors 164. In some embodiments, user instructions may be received through one or more image capture projection surfaces 166. In some embodiments, user instructions may be received through one or more user communications devices 112. In some embodiments, user instructions may be received through one or more communications networks 128. In some embodiments, user instructions may be received from one or more users 110. For example, in some embodiments, user instruction may include verbal instruction, motion instruction, data instruction, or based upon user identity, position, movement, history, or preferences. In some embodiments, user attributes may be received from one or more users 110. In some embodiments, user attributes may be received from one or more user data accounts 152. In some embodiments, user attributes may be received through one or more sensors 156 (e.g., motion sensor 156A, gyroscopic sensor 156B, acoustic sensor 156C, biometric sensor 156D, inertial sensor 156E, ultrasonic sensor 156F, contact sensor 156G, light sensor 156H, imaging sensor 156I, pressure sensor 156J, entity sensor 156K, infrared sensor 156L, yaw rate sensor 156M, ultraviolet sensor 156N, range sensor 156O, and camera 156P). In some embodiments, user attributes may be received from one or more user communications devices 112. In some embodiments, user attributes may be received from one or more financial entities 122. In some embodiments, user attributes may be received from one or more service provider modules 130. In some embodiments, user attributes may be received from one or more projectors 164. In some embodiments, user attributes may be received from one or more image capture projection surfaces 166. In some embodiments, user attributes may be received through one or more communications networks 128. In some embodiments, user attributes may be determined from content of a captured image, user input on one or more image capture projection surfaces 166, or content from one or more other sources on one or more projection surfaces. In some embodiments, financial transactions may result from one or more communicated captured images such as fees for communication, fees for communicated content, fees for communicated volume, fees for communication destination, or fees for communication means. For example, a fee may be imposed for communicating a movie, a single image, a series of images, audio, additional content, user input, or the like. In some embodiments, a fee may be imposed for communicating to a printer, a user device, an email, a memory, a file location, a network location, or a projector. In some embodiments, a fee may be imposed for communicating wirelessly, electronically, or for a compressed or expanded format. In some embodiments, a fee is received from one or more financial entities 122. In some embodiments, one or more projection surface control units 179 may communicate one or more captured images from one or more image capture modules 172 as a result of a financial transaction. For example, in some embodiments, a projection surface control unit may communicate a captured image of a receipt and signature from a checkout writing surface in the course of a consumer purchase from a merchant.

At operation 1704, the communicating operation 1130 may include communicating at least a portion of the captured image in accordance with at least one physical user instruction or at least one electronic user instruction. In some embodiments, one or more image capture modules 172 may communicate at least a portion of the captured image in accordance with at least one physical user instruction or at least one electronic user instruction. In some embodiments, one or more projection surface control units 179 may control communication of one or more captured images from one or more image capture modules 172. In some embodiments, one or more projection surface control units 179 may control communication of one or more captured images from one or more memory 174. In some embodiments, one or more projection surface control units 179 may control communication of one or more captured images in accordance with one or more physical user instructions. In some embodiments, a physical user instruction may be converted to digital, electronic, or wireless instructions. In some embodiments, a physical user instruction may be received from one or more users 110. In some embodiments, a physical user instruction may be received from one or more user communications devices 112. In some embodiments, a physical user instruction may be received from one or more communications networks 128. In some embodiments, a physical user instruction may be received from one or more sensors 156. In some embodiments, a physical user instruction may be received from one or more projectors 164. In some embodiments, a physical user instruction may be received from one or more projection surfaces. In some embodiments, a physical user instruction may include interaction with a user interface, motion, sound, or the like. For example, in some embodiments, a physical user instruction may include pushing a button. In some embodiments, a physical user instruction may include speaking a command. In some embodiments, a physical user instruction may include gesturing. In some embodiments, one or more projection surface control units 179 may control communication of one or more captured images in accordance with one or more electronic user instructions. In some embodiments, one or more electronic user instructions may result from one or more physical user instructions. In some embodiments, one or more electronic user instructions may be received from one or more users 110. In some embodiments, one or more electronic user instructions may be received from one or more user communications devices 112. In some embodiments, one or more electronic user instructions may be received from one or more financial entities 122. In some embodiments, one or more electronic user instructions may be received from one or more service provider modules 130. In some embodiments, one or more electronic user instructions may be received from one or more communications networks 128. In some embodiments, one or more electronic user instructions may be received from one or more sensors 156. In some embodiments, one or more electronic user instructions may be received from one or more projectors 164. In some embodiments, one or more electronic user instructions may be received from one or more image capture projection surfaces 166. In some embodiments, a physical or an electronic user instruction may include an instruction relating to communication timing, quality, compression, source, destination, communication method, or the like.

At operation 1706, the communicating operation 1130 may include communicating at least a portion of the captured image using electronic communication. In some embodiments, one or more image capture modules 172 may communicate at least a portion of the captured image using electronic communication. In some embodiments, one or more projection surface control units 179 may control communication of one or more captured images from one or more image capture modules 172. In some embodiments, one or more projection surface control units 179 may control communication of one or more captured images from one or more memory 174. In some embodiments, one or more projection surface control units 179 may control electronic communication of one or more captured images. In some embodiments, one or more projection surface control units 179 may communicate one or more captured images using one or more device interface modules 176. In some embodiments, one or more projection surface control units 179 may communicate one or more captured images using one or more user interface modules 178. In some embodiments, one or more projection surface control units 179 may communicate one or more captured images using one or more communications networks 128. In some embodiments, one or more projection surface control units 179 may communicate one or more captured images using one or more service provider modules 130. In some embodiments, one or more projection surface control units 179 may communicate one or more captured images using one or more user communications devices 112.

At operation 1708, the communicating operation 1130 may include communicating at least a portion of the captured image using wireless communication. In some embodiments, one or more image capture modules 172 may communicate at least a portion of the captured image using wireless communication. In some embodiments, one or more projection surface control units 179 may control communication of one or more captured images from one or more image capture modules 172. In some embodiments, one or more projection surface control units 179 may control communication of one or more captured images from one or more memory 174. In some embodiments, one or more projection surface control units 179 may control wireless communication of one or more captured images. In some embodiments, one or more projection surface control units 179 may communicate one or more captured images using one or more device interface modules 176. In some embodiments, one or more projection surface control units 179 may communicate one or more captured images using one or more user interface modules 178. In some embodiments, one or more projection surface control units 179 may communicate one or more captured images using one or more communications networks 128. In some embodiments, one or more projection surface control units 179 may communicate one or more captured images using one or more service provider modules 130. In some embodiments, one or more projection surface control units 179 may communicate one or more captured images using one or more user communications devices 112.

At operation 1710, the communicating operation 1130 may include communicating at least a portion of the captured image to at least one of a memory, a hardware device, a software application, a user device, a printer, a monitor display, or a projector. In some embodiments, one or more image capture modules 172 may communicate at least a portion of the captured image to at least one of a memory, a hardware device, a software application, a user device, a printer, a monitor display, or a projector. In some embodiments, one or more projection surface control units 179 may control communication of one or more captured images from one or more image capture modules 172. In some embodiments, one or more projection surface control units 179 may control communication of one or more captured images from one or more memory 174. In some embodiments, one or more projection surface control units 179 may control communication of one or more captured images to a memory, a hardware device, a software application, a user device, a printer, a monitor display, or a projector. In some embodiments, one or more projection surface control units 179 may control communication of one or more captured images to one or more user communications devices 112. In some embodiments, one or more projection surface control units 179 may control communication of one or more captured images to one or more users 110. In some embodiments, one or more projection surface control units 179 may control communication of one or more captured images to one or more service provider modules 130. In some embodiments, one or more projection surface control units 179 may control communication of one or more captured images to one or more communications networks 128. In some embodiments, one or more projection surface control units 179 may control communication of one or more captured images to one or more projectors 164. In some embodiments, one or more projection surface control units 179 may control communication of one or more captured images through one or more device interface modules 176. In some embodiments, one or more projection surface control units 179 may control communication of one or more captured images to one or more memory 174. In some embodiments, one or more projection surface control units 179 may control communication of one or more captured images through one or more user interfaces 178. For example, in some embodiments, one or more captured images may be communicated to a printer for reproduction. In some embodiments, one or more captured images may be communicated to a personal digital assistant, laptop computer, mobile phone, internet appliance, portable storage device, or the like. In some embodiments, one or more captured images may be communicated to an email client, a document, an imaging software application, a website, or the like. In some embodiments, one or more captured images may be communicated to a projector for projection and/or possibly capture and communication. In some embodiments, one or more captured images may be communicated to a television, computer monitor, personal digital assistant display, electronic photography frame, or the like.

Figure 18:
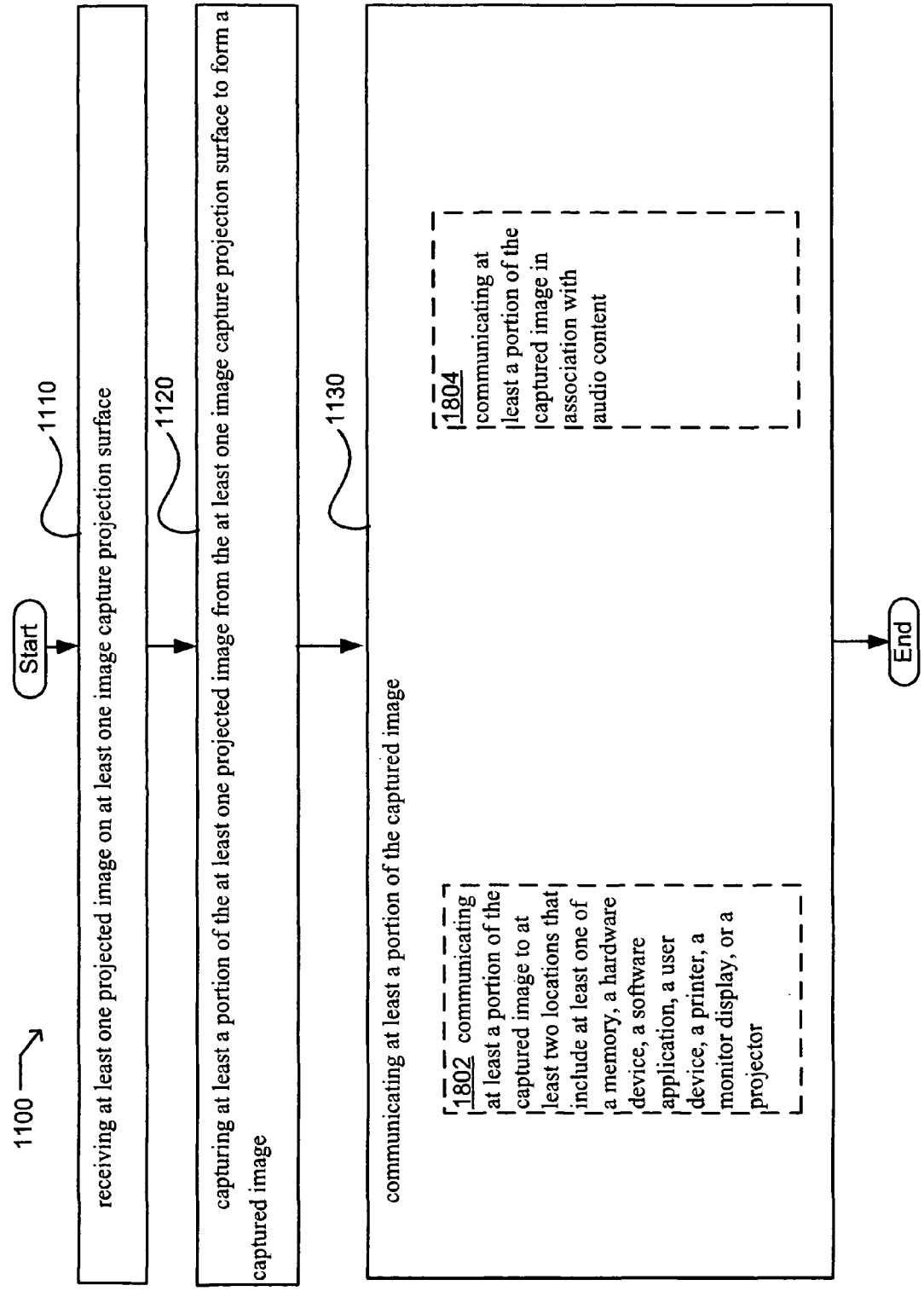

FIG. 18 illustrates alternative embodiments of the example operational flow 1100 of FIG. 11. FIG. 18 illustrates example embodiments where the communicating operation 1130 may include at least one additional operation. Additional operations may include an operation 1802, and/or an operation 1804.

At operation 1802, the communicating operation 1130 may include communicating at least a portion of the captured image to at least two locations that include at least one of a memory, a hardware device, a software application, a user device, a printer, a monitor display, or a projector. In some embodiments, one or more image capture modules 172 may communicate at least a portion of the captured image to at least two locations that include at least one of a memory, a hardware device, a software application, a user device, a printer, a monitor display, or a projector. In some embodiments, one or more projection surface control units 179 may control communication of one or more captured images from one or more image capture modules 172. In some embodiments, one or more projection surface control units 179 may control communication of one or more captured images from one or more memory 174. In some embodiments, one or more projection surface control units 179 may control communication of one or more captured images to at least two locations that include at least one of a memory, a hardware device, a software application, a user device, a printer, a monitor display, or a projector. In some embodiments, at least two locations may be on one device. In some embodiments, at least two locations may be on two or more devices. In some embodiments, at least two locations may be proximately disposed. In some embodiments, at least two locations may be remotely disposed. In some embodiments, at least two locations may be similar. In some embodiments, at least two locations may be different. For example, in some embodiments, one or more captured images may be communicated to a printer and an email account. For example, in some embodiments, one or more captured images may be communicated to a display screen and memory. For example, in some embodiments, one or more captured images may be communicated to a projector and a display screen.

At operation 1804, the communicating operation 1130 may include communicating at least a portion of the captured image in association with audio content. In some embodiments, one or more image capture modules 172 may communicate at least a portion of the captured image in association with audio content. In some embodiments, one or more projection surface control units 179 may control communication of one or more captured images from one or more image capture modules 172. In some embodiments, one or more projection surface control units 179 may control communication of one or more captured images from one or more memory 174. In some embodiments, one or more projection surface control units 179 may control communication of one or more captured images in association with audio content from one or more audio/data capture modules 182. In some embodiments, one or more projection surface control units 179 may control communication of one or more captured images in association with audio content from one or more memory 174. In some embodiments, one or more projection surface control units 179 may control communication of one or more captured images in association with audio content from one or more user communications devices 112. In some embodiments, one or more projection surface control units 179 may control communication of one or more captured images in association with audio content from one or more service provider modules 130. In some embodiments, one or more projection surface control units 179 may control communication of one or more captured images in association with audio content from one or more sensors 156. In some embodiments, one or more projection surface control units 179 may control communication of one or more captured images in association with audio content from one or more projectors 164. In some embodiments, one or more projection surface control units 179 may control communication of one or more captured images in association with audio content from one or more image capture projection surfaces 166. In some embodiments, one or more projection surface control units 179 may control communication of one or more captured images in association with audio content from one or more microphones. In some embodiments, one or more projection surface control units 179 may control communication of one or more captured images in association with audio content from one or more users 110. In some embodiments, one or more projection surface control units 179 may control communication of one or more captured images in association with audio content from one or more communications networks 128. For example, in some embodiments, a projection surface control unit 179 may communicate a presentation image in association with accompanying presentation speech. In some embodiments, a projection surface control unit 179 may communicate a document in association with instructions related to the document. In some embodiments, a projection surface control unit 179 may communicate a test answer in association with an explanation for understanding the answer. In some embodiments, a projection surface control unit 179 may communicate an agreement in association with an acknowledgement of the agreement. In some embodiments, a projection surface control unit 179 may communicate a slide show in association with participant dialog related to the slide show. In some embodiments, a projection surface control unit 179 may communicate a movie in association with a soundtrack.

Figure 19:
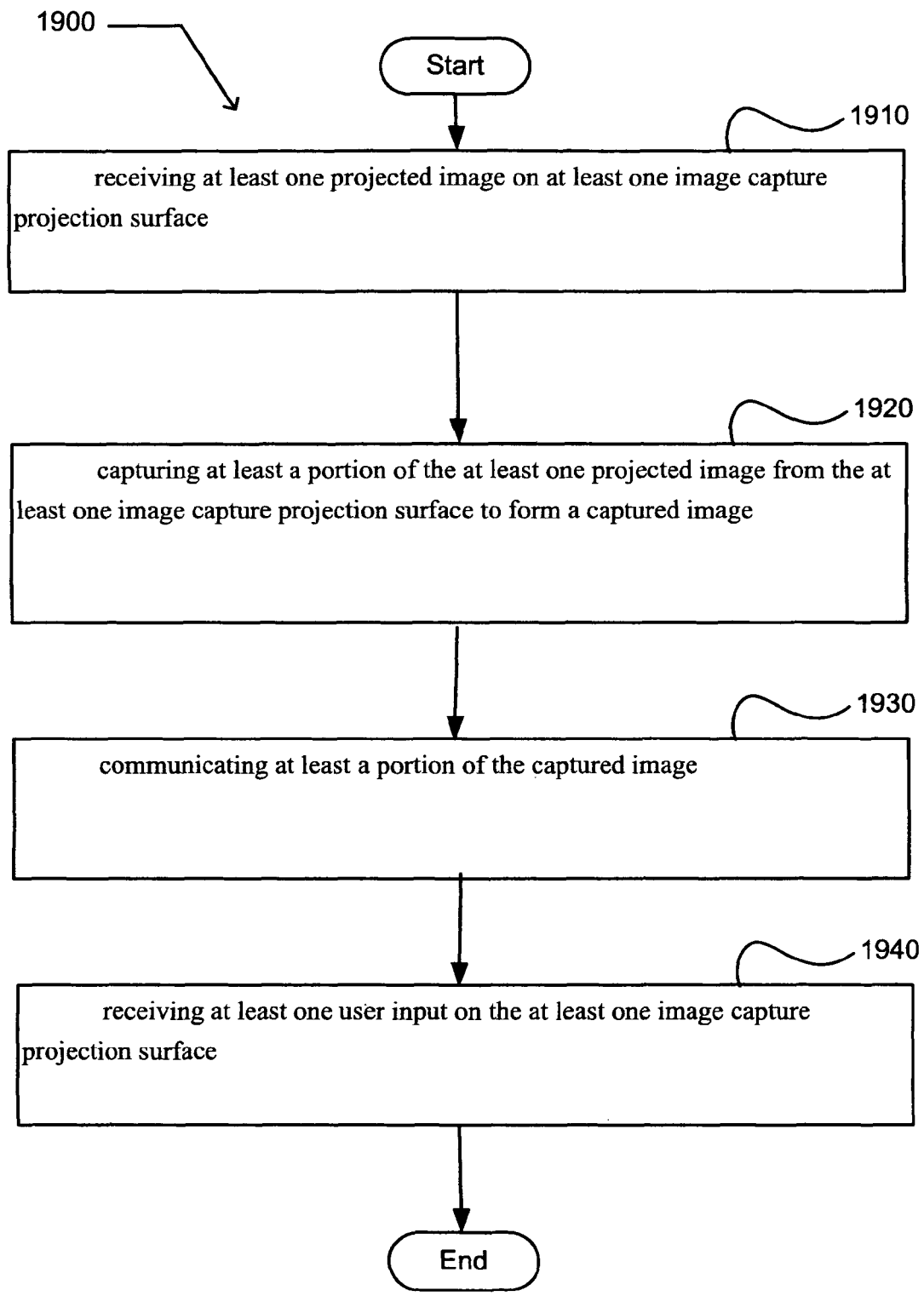
FIG. 19 illustrates an operational flow representing example operations related to receiving at least one projected image on at least one image capture projection surface; capturing at least a portion of the at least one projected image from the at least one image capture projection surface to form a captured image; communicating at least a portion of the captured image; and receiving at least one user input on the at least one image capture projection surface.

In FIG. 19 and in following figures that include various examples of operations used during performance of various methods, discussion and explanation may be provided with respect to any one or combination of the above-described examples of FIGS. 1-10, and/or with respect to other examples and contexts. In some embodiments, operations 1110, 1120 and 1130 of FIG. 11 may correspond to operations 1910, 1920 and 1930 of FIG. 19. However, it should be understood that the operations may be executed in a number of other environments and contexts, and/or modified versions of FIGS. 1-10. Also, although the various operations are presented in the sequence(s) illustrated, it should be understood that the various operations may be performed in other orders than those which are illustrated, or may be performed concurrently.

After a start operation, the operational flow 1900 includes a receiving operation 1910 involving receiving at least one projected image on at least one image capture projection surface. In some embodiments, one or more image capture projection surfaces 166 may receive at least one projected image on at least one image capture projection surface. In some embodiments, one or more image capture projection surfaces 166 may receive at least one projected image projected from one or more projectors 164. In some embodiments, two or more image capture projection surfaces 166 may receive at least one projected image. In some embodiments, one or more image capture projection surfaces 166 may receive at least one projected image acquired from electronic or wireless communication such as via one or more communications networks 128 or one or more user communications devices 112. In some embodiments, one or more image capture projection surfaces 166 may receive at least one projected image in accordance with one or more user instructions from one or more users 110 or financial transactions. In some embodiments, one or more image capture projection surfaces 166 may receive at least one projected image in accordance with one or more user attributes of one or more users 110. In some embodiments, one or more image capture projection surfaces 166 may receive at least one projected image in accordance with one or more user attributes of one or more users 110 obtained from a history, a setting, a proximity determination, a sensor, a security parameter, a membership parameter, an account parameter, a status parameter, a group parameter, an ownership parameter, a role parameter, a capability parameter, a rights parameter, a service parameter, an activity parameter, a privilege parameter, a familial characteristic, a physical characteristic, an individualized parameter, or a contextualized parameter. In some embodiments, one or more image capture projection surfaces 166 may receive at least one projected image where the one or more image capture projection surfaces 166 are associated with a structure or device. In some embodiments, one or more image capture projection surfaces 166 may receive at least one projected image where the one or more image capture projection surfaces 166 are associated with a structure or device such as a tablet, a handheld device, a vehicle, a table, a wall, a desk, or a writing surface. In some embodiments, one or more image capture projection surfaces 166 may receive at least one projected image that relates to user-specified content from one or more users 110. In some embodiments, one or more image capture projection surfaces 166 may receive at least one projected image that relates to user-specified content such as legal content, educational content, healthcare content, business content, or personal content. In some embodiments, one or more image capture projection surfaces 166 may receive at least one projected image as a video. In some embodiments, one or more image capture projection surfaces 166 may receive at least one projected image in association with audio content. For example, in some embodiments, an image capture projection surface 166 may be a writing surface at a grocery checkout stand and a projected image may be a grocery receipt for signature. Alternatively, in some embodiments, an image capture projection surface 166 may be a wall mounted surface at a coffee shop and a projected image may be a business presentation. Also, in some embodiments, an image capture projection surface 166 may be a surface on a vehicle console and a projected image may be a menu for controlling vehicle component operations such as music, visual entertainment, climate control, seat placement, or security. Additionally, in some embodiments, an image capture projection surface 166 may be an instructional board for educational endeavors and a projected image may be educational subject matter.

After a start operation, the operational flow 1900 includes a capture operation 1920 involving capturing at least a portion of the at least one projected image from the at least one image capture projection surface to form a captured image. In some embodiments, one or more image capture modules 172 may capture at least a portion of the at least one projected image from the at least one image capture projection surface to form a captured image. In some embodiments, one or more image capture modules 172 may capture at least a portion of one or more projected images from one or more image capture projection surfaces 166. In some embodiments, one or more projection surface control units 179 may control one or more image capture modules 172 to capture at least a portion of one or more projected images from one or more image capture projection surfaces 166. In some embodiments, one or more projection surface control units 179 may receive control instructions from one or more surface memory 179D, from one or more memory 174, from one or more device interface modules 176, from one or more user interfaces 178, from one or more projectors 164, from one or more sensors 156, from one or more service provider modules 130, from one or more financial entities 122, from one or more user communications devices 112, or through one or more communications networks 128. In some embodiments, one or more image capture modules 172 may capture at least a portion of one or more projected images from two or more image capture projection surfaces 166. In some embodiments, one or more image capture modules 172 may capture at least a portion of one or more projected images in accordance with one or more user attributes of one or more users 110. In some embodiments, one or more image capture modules 172 may capture at least a portion of one or more projected images in accordance with one or more user attributes of one or more users 110 obtained from a history, a setting, a proximity determination, a sensor, a security parameter, a membership parameter, an account parameter, a status parameter, a group parameter, an ownership parameter, a role parameter, a capability parameter, a rights parameter, a service parameter, an activity parameter, a privilege parameter, a familial characteristic, a physical characteristic, an individualized parameter, or a contextualized parameter. In some embodiments, one or more image capture modules 172 may capture at least a portion of one or more projected images in accordance with one or more user instructions from one or more users 110. In some embodiments, one or more image capture modules 172 may capture at least a portion of one or more projected images in accordance with one or more physical instruction or one or more electronic instruction from one or more users 110. In some embodiments, one or more image capture modules 172 may capture at least a portion of one or more projected images in accordance with one or more financial transactions. In some embodiments, one or more image capture modules 172 may capture at least a portion of one or more projected images using full imaging 172A, optical scanning 172L, or mechanical scanning 172AB. In some embodiments, one or more image capture modules 172 may capture at least a portion of one or more projected images as video. In some embodiments, one or more image capture modules 172 may capture at least a portion of one or more projected images in association with audio content captured using one or more audio/data capture modules 182. In some embodiments, one or more image capture modules 172 may capture at least a portion of one or more projected images in accordance with one or more user-specified accounts such as from one or more user data accounts 152, one or more service provider modules 130, or one or more financial entities 122. In some embodiments, one or more image capture modules 172 may capture at least a portion of one or more projected images in association with user input or content from another source. For example, in some embodiments, an image capture module 172 may capture a projected grocery receipt from a writing surface at a grocery checkout stand. The image capture module 172 may further capture a signature provided through user input on a writing surface having a projected grocery receipt. Alternatively, in some embodiments, an image capture module 172 may capture a projected business presentation slide or series of slides from a wall mounted surface at a coffee shop. In some embodiments, the image capture module 172 may further capture writing provided from user input on a wall mounted surface having a projected business presentation. In some embodiments, the audio/data capture module 182 may further capture electronic data or files associated with a projected business presentation slide from one or more user communications devices 112, one or more memory 174, one or more service provider modules 130, one or more sensors 156, or through one or more electronic communications networks 128. Also, in some embodiments, an image capture module 172 may capture user input on a menu from a surface on a vehicle console. Additionally, in some embodiments, an image capture module 172 may capture educational subject matter from an instructional board. In some embodiments, the image capture module 172 may further capture writing provided from user input on an educational board having educational subject matter.

After a start operation, the operational flow 1900 includes a communication operation 1930 involving communicating at least a portion of the captured image. In some embodiments, one or more image capture modules 172 may communicate at least a portion of the captured image. In some embodiments, one or more projection surface control units 179 may communicate at least a portion of one or more captured images. In some embodiments, one or more captured images may be communicated using one or more device interface modules 176. In some embodiments, one or more captured images may be communicated using one or more user interfaces 178. In some embodiments, one or more captured images may be communicated using one or more communications networks 128. In some embodiments, one or more captured images may be communicated to one or more user communications devices 112. In some embodiments, one or more captured images may be communicated to one or more service provider modules 130. In some embodiments, one or more captured images may be communicated to one or more financial entities 122. In some embodiments, one or more captured images may be communicated to one or more sensors 156. In some embodiments, one or more captured images may be communicated to one or more projectors 164. In some embodiments, one or more captured images may be communicated in accordance with one or more user instructions, user attributes, or financial transactions. In some embodiments, one or more captured images may be communicated in accordance with one or more physical instructions or electronic instructions. In some embodiments, one or more captured images may be communicated using electronic communication. In some embodiments, one or more captured images may be communicated using wireless communication. In some embodiments, one or more captured images may be communicated to one or more memory, hardware devices, software applications, user devices, printers, monitor displays, or projectors 164. In some embodiments, one or more captured images may be communicated to two or more memory, hardware devices, software applications, user devices, printers, monitor displays, or projectors. In some embodiments, one or more captured images may be communicated in association with audio content. For example, in some embodiments, a captured grocery receipt and signature may be communicated to one or more email accounts, store accounts, printers, user devices, or the like of one or more users 110. Alternatively, in some embodiments, a captured business presentation slide, series of slides, writing, and/or associated data or files may be communicated to one or more user communications devices 112, email accounts, file locations, printers, projectors, or the like. Also, in some embodiments, captured user input on a menu from a surface on a vehicle console may be communicated to one or more corresponding systems for control. Additionally, in some embodiments, captured educational subject matter and writing may be communicated to one or more desk displays, email accounts, file locations, projectors 164, printers, or internet websites.

After a start operation, the operational flow 1900 includes a receiving operation 1940 involving receiving at least one user input on the at least one image capture projection surface. In some embodiments, one or more image capture projection surfaces 166 may receive at least one user input on the at least one image capture projection surface. In some embodiments, one or more image capture projection surfaces 166 may receive one or more user input. In some embodiments, one or more image capture projection surfaces 166 may receive one or more user input from one or more users 110. In some embodiments, one or more image capture projection surfaces 166 may receive one or more user input from one or more user communications devices 112. In some embodiments, one or more image capture projection surfaces 166 may receive one or more user input from one or more service provider modules 130. In some embodiments, one or more image capture projection surfaces 166 may receive one or more user input from one or more communications networks 128. In some embodiments, one or more image capture projection surfaces 166 may receive one or more user input from one or more sensors 156. In some embodiments, one or more image capture projection surfaces 166 may receive one or more user input from one or more projectors 164. In some embodiments, one or more image capture projection surfaces 166 may receive one or more user input from one or more audio/data capture modules 182. In some embodiments, two or more image capture projection surfaces 166 may receive one or more user input. In some embodiments, one or more image capture projection surfaces 166 may receive one or more user input acquired from electronic or wireless communication such as via one or more communications networks 128 or one or more user communications devices 112. In some embodiments, one or more image capture projection surfaces 166 may receive one or more user input in accordance with one or more user instructions from one or more users 110 or financial transactions. In some embodiments, one or more image capture projection surfaces 166 may receive one or more user input in accordance with one or more user attributes of one or more users 110. In some embodiments, one or more image capture projection surfaces 166 may receive one or more user input in accordance with one or more user attributes of one or more users 110 obtained from a history, a setting, a proximity determination, a sensor, a security parameter, a membership parameter, an account parameter, a status parameter, a group parameter, an ownership parameter, a role parameter, a capability parameter, a rights parameter, a service parameter, an activity parameter, a privilege parameter, a familial characteristic, a physical characteristic, an individualized parameter, or a contextualized parameter. In some embodiments, one or more image capture projection surfaces 166 may receive one or more user input where the one or more image capture projection surfaces 166 are associated with a structure or device. In some embodiments, one or more image capture projection surfaces 166 may receive one or more user input where the one or more image capture projection surfaces 166 are associated with a structure or device such as a tablet, a handheld device, a vehicle, a table, a wall, a desk, or a writing surface. In some embodiments, one or more image capture projection surfaces 166 may receive one or more user input that relates to user-specified content from one or more users 110. In some embodiments, one or more image capture projection surfaces 166 may receive one or more user input that relates to user-specified content such as legal content, educational content, healthcare content, business content, or personal content. In some embodiments, one or more image capture projection surfaces 166 may receive one or more user input as a video. In some embodiments, one or more image capture projection surfaces 166 may receive one or more user input in association with audio content. For example, in some embodiments, an image capture projection surface 166 may be a writing surface at a grocery checkout stand and a user input may be a signature on a receipt. Alternatively, in some embodiments, an image capture projection surface 166 may be a wall mounted surface at a coffee shop and a user input may be notes on a business presentation. Also, in some embodiments, an image capture projection surface 166 may be a surface on a vehicle console and a user input may be a menu item selection. Additionally, in some embodiments, an image capture projection surface 166 may be an instructional board for educational endeavors and a user input may be lecture notes. Also, in some embodiments, an image capture projection surface 166 may be a desktop device operably coupled to a computer and a user input may be a signature or writing on fields of the document.

Figure 20:
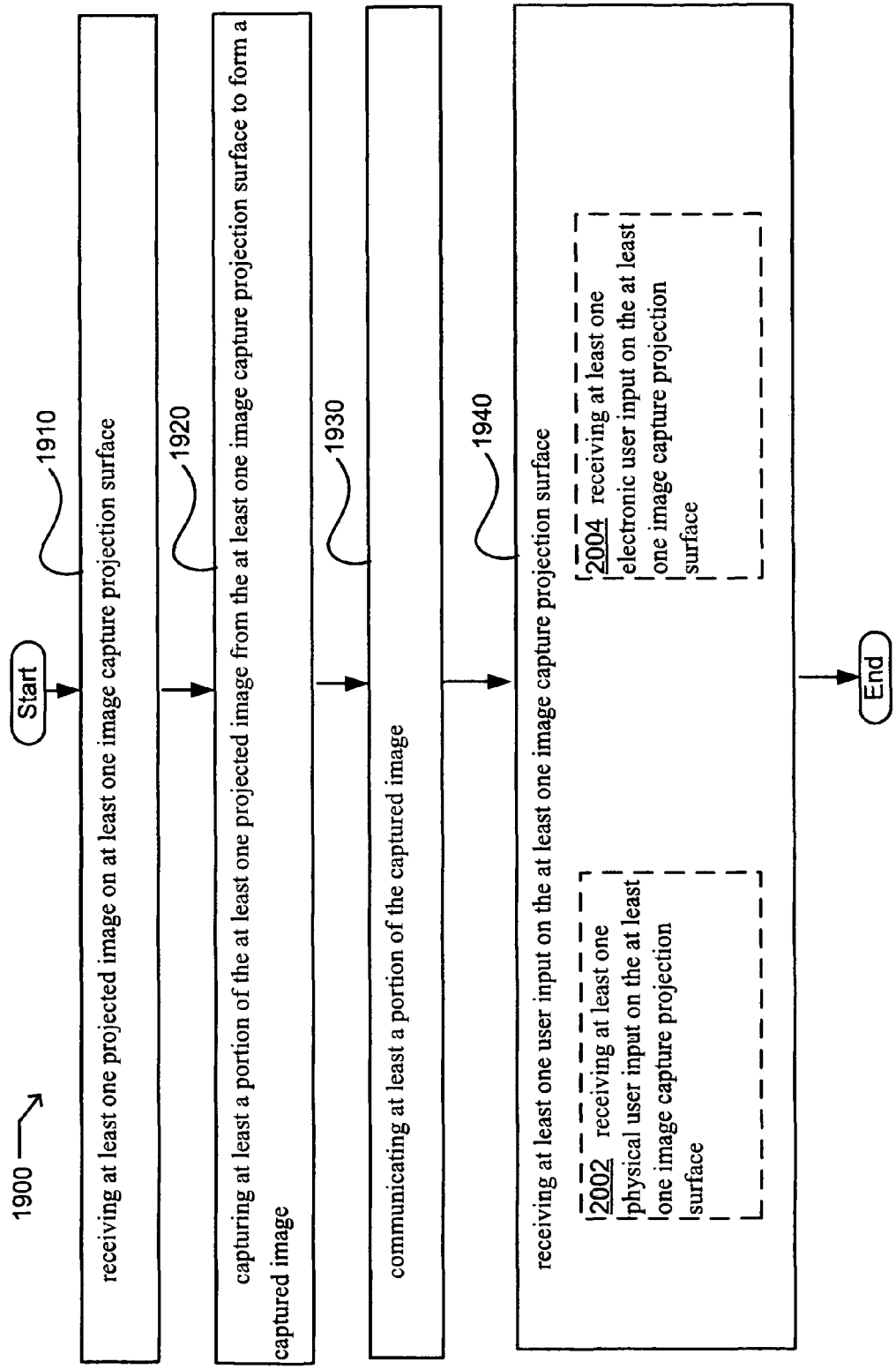
FIG. 20 illustrates alternative embodiments of the example operation flow of FIG. 19.

FIG. 20 illustrates alternative embodiments of the example operational flow 1900 of FIG. 19. FIG. 20 illustrates example embodiments where the receiving operation 1940 may include at least one additional operation. Additional operations may include an operation 2002, and/or an operation 2004.

At operation 2002, the receiving operation 1940 may include receiving at least one physical user input on the at least one image capture projection surface. In some embodiments, one or more image capture projection surfaces 166 may receive at least one physical user input on the at least one image capture projection surface. In some embodiments, one or more image capture projection surfaces 166 may receive one or more physical user inputs. In some embodiments, one or more image capture projection surfaces 166 may receive one or more physical user inputs from one or more users 110. In some embodiments, one or more image capture projection surfaces 166 may receive one or more physical user inputs through one or more user communications devices 112. In some embodiments, one or more image capture projection surfaces 166 may receive one or more physical user inputs through one or more service provider modules 130. In some embodiments, one or more image capture projection surfaces 166 may receive one or more physical user inputs through one or more financial entities 122. In some embodiments, one or more image capture projection surfaces 166 may receive one or more physical user inputs through one or more communications networks 128. In some embodiments, one or more image capture projection surfaces 166 may receive one or more physical user inputs through one or more sensors 156. In some embodiments, one or more image capture projection surfaces 166 may receive one or more physical user inputs through one or more projectors 164. In some embodiments, one or more image capture projection surfaces 166 may receive one or more physical user inputs through one or more device interface modules 176. In some embodiments, one or more image capture projection surfaces 166 may receive one or more physical user inputs through one or more user interfaces 178. In some embodiments, one or more image capture projection surfaces 166 may receive one or more physical user inputs through one or more audio/data capture modules 182. In some embodiments, one or more image capture projection surfaces 166 may receive one or more physical user inputs from one or more memory 174. In some embodiments, one or more image capture projection surfaces 166 may receive one or more physical user inputs from one or more image capture modules 172. For example, in some embodiments, one or more physical user inputs may be user or device induced pressure, dragging, sliding, arranging, or other manipulation of one or more image capture projection surfaces 166. In some embodiments, one or more physical user inputs may be sound. In some embodiments, one or more physical user inputs may be one or more interactions with a menu. In some embodiments, one or more physical user inputs may be writing. In some embodiments, one or more physical user inputs may be one or more interactions with a user interface.

At operation 2004, the receiving operation 1940 may include receiving at least one electronic user input on the at least one image capture projection surface. In some embodiments, one or more image capture projection surfaces 166 may receive at least one electronic user input on the at least one image capture projection surface. In some embodiments, one or more image capture projection surfaces 166 may receive one or more electronic user inputs. In some embodiments, one or more image capture projection surfaces 166 may receive one or more electronic user inputs wirelessly. In some embodiments, one or more image capture projection surfaces 166 may receive one or more electronic user inputs from one or more users 110. In some embodiments, one or more image capture projection surfaces 166 may receive one or more electronic user inputs through one or more user communications devices 112. In some embodiments, one or more image capture projection surfaces 166 may receive one or more electronic user inputs through one or more service provider modules 130. In some embodiments, one or more image capture projection surfaces 166 may receive one or more electronic user inputs through one or more financial entities 122. In some embodiments, one or more image capture projection surfaces 166 may receive one or more electronic user inputs through one or more communications networks 128. In some embodiments, one or more image capture projection surfaces 166 may receive one or more electronic user inputs through one or more sensors 156. In some embodiments, one or more image capture projection surfaces 166 may receive one or more electronic user inputs through one or more projectors 164. In some embodiments, one or more image capture projection surfaces 166 may receive one or more electronic user inputs through one or more device interface modules 176. In some embodiments, one or more image capture projection surfaces 166 may receive one or more electronic user inputs through one or more user interfaces 178. In some embodiments, one or more image capture projection surfaces 166 may receive one or more electronic user inputs through one or more audio/data capture modules 182. In some embodiments, one or more image capture projection surfaces 166 may receive one or more electronic user inputs from one or more memory 174. In some embodiments, one or more image capture projection surfaces 166 may receive one or more electronic user inputs from one or more image capture modules 172. For example, in some embodiments, one or more electronic user inputs may be a file. In some embodiments, one or more electronic user inputs may be an image. In some embodiments, one or more electronic user inputs may be a video. In some embodiments, one or more electronic user inputs may be an audio file. In some embodiments, one or more electronic user inputs may be a link. In some embodiments, one or more electronic user inputs may be text.

Figure 21:
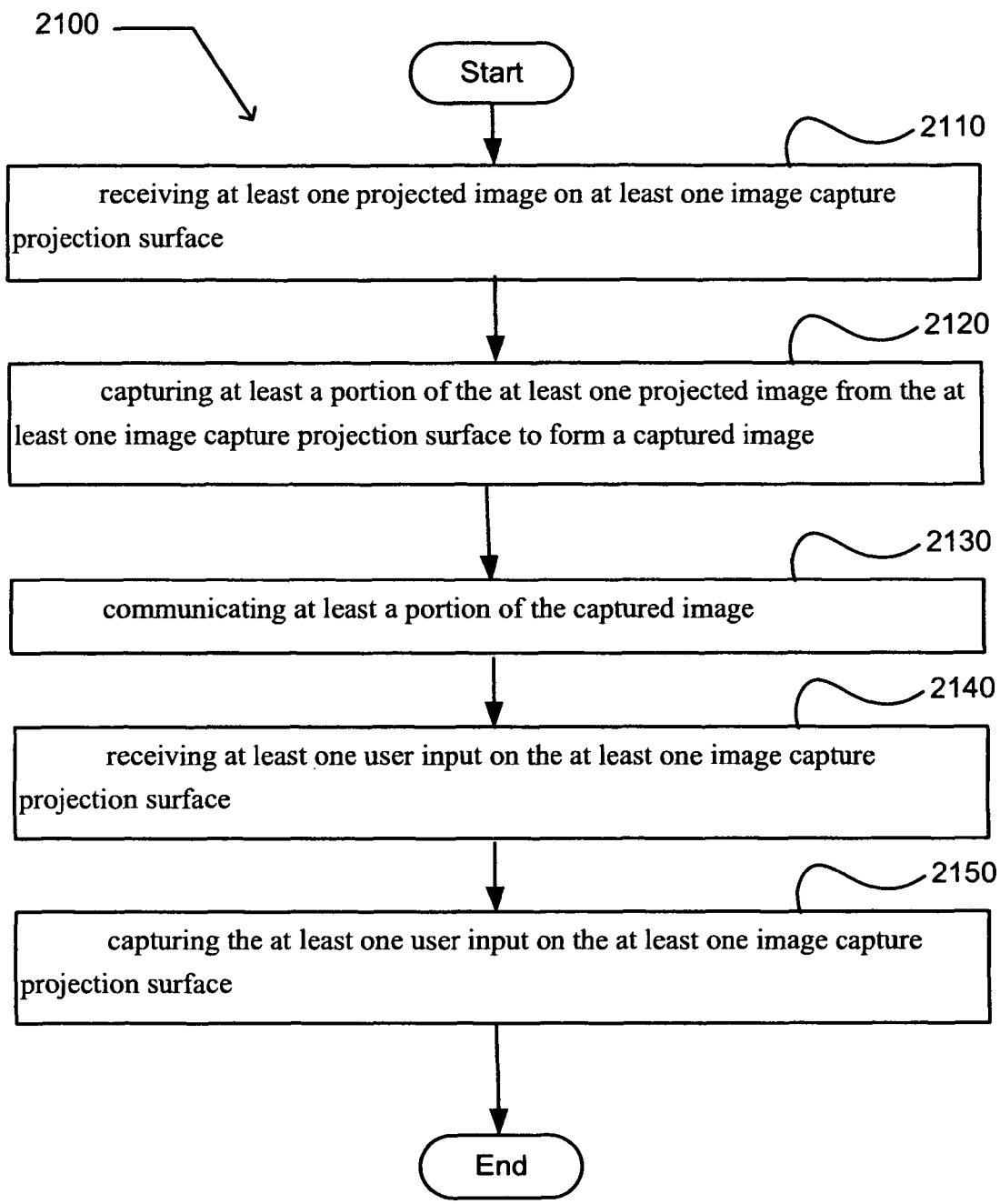
FIG. 21 illustrates an operational flow representing example operations related to receiving at least one projected image on at least one image capture projection surface; capturing at least a portion of the at least one projected image from the at least one image capture projection surface to form a captured image; communicating at least a portion of the captured image; receiving at least one user input on the at least one image capture projection surface; and capturing the at least one user input on the at least one image capture projection surface.

In FIG. 21 and in following figures that include various examples of operations used during performance of various methods, discussion and explanation may be provided with respect to any one or combination of the above-described examples of FIGS. 1-10, and/or with respect to other examples and contexts. In some embodiments, operations 1910, 1920, 1930 and 1940 of FIG. 19 may correspond to operations 2110, 2120, 2130 and 2140 of FIG. 21. However, it should be understood that the operations may be executed in a number of other environments and contexts, and/or modified versions of FIGS. 1-10. Also, although the various operations are presented in the sequence(s) illustrated, it should be understood that the various operations may be performed in other orders than those which are illustrated, or may be performed concurrently.

After a start operation, the operational flow 2100 includes a receiving operation 2110 involving receiving at least one projected image on at least one image capture projection surface. In some embodiments, one or more image capture projection surfaces 166 may receive at least one projected image on at least one image capture projection surface. In some embodiments, one or more image capture projection surfaces 166 may receive at least one projected image projected from one or more projectors 164. In some embodiments, two or more image capture projection surfaces 166 may receive at least one projected image. In some embodiments, one or more image capture projection surfaces 166 may receive at least one projected image acquired from electronic or wireless communication such as via one or more communications networks 128 or one or more user communications devices 112. In some embodiments, one or more image capture projection surfaces 166 may receive at least one projected image in accordance with one or more user instructions from one or more users 110 or financial transactions. In some embodiments, one or more image capture projection surfaces 166 may receive at least one projected image in accordance with one or more user attributes of one or more users 110. In some embodiments, one or more image capture projection surfaces 166 may receive at least one projected image in accordance with one or more user attributes of one or more users 110 obtained from a history, a setting, a proximity determination, a sensor, a security parameter, a membership parameter, an account parameter, a status parameter, a group parameter, an ownership parameter, a role parameter, a capability parameter, a rights parameter, a service parameter, an activity parameter, a privilege parameter, a familial characteristic, a physical characteristic, an individualized parameter, or a contextualized parameter. In some embodiments, one or more image capture projection surfaces 166 may receive at least one projected image where the one or more image capture projection surfaces 166 are associated with a structure or device. In some embodiments, one or more image capture projection surfaces 166 may receive at least one projected image where the one or more image capture projection surfaces 166 are associated with a structure or device such as a tablet, a handheld device, a vehicle, a table, a wall, a desk, or a writing surface. In some embodiments, one or more image capture projection surfaces 166 may receive at least one projected image that relates to user-specified content from one or more users 110. In some embodiments, one or more image capture projection surfaces 166 may receive at least one projected image that relates to user-specified content such as legal content, educational content, healthcare content, business content, or personal content. In some embodiments, one or more image capture projection surfaces 166 may receive at least one projected image as a video. In some embodiments, one or more image capture projection surfaces 166 may receive at least one projected image in association with audio content. For example, in some embodiments, an image capture projection surface 166 may be a writing surface at a grocery checkout stand and a projected image may be a grocery receipt for signature. Alternatively, in some embodiments, an image capture projection surface 166 may be a wall mounted surface at a coffee shop and a projected image may be a business presentation. Also, in some embodiments, an image capture projection surface 166 may be a surface on a vehicle console and a projected image may be a menu for controlling vehicle component operations such as music, visual entertainment, climate control, seat placement, or security. Additionally, in some embodiments, an image capture projection surface 166 may be an instructional board for educational endeavors and a projected image may be educational subject matter.

After a start operation, the operational flow 2100 includes a capture operation 2120 involving capturing at least a portion of the at least one projected image from the at least one image capture projection surface to form a captured image. In some embodiments, one or more image capture modules 172 may capture at least a portion of the at least one projected image from the at least one image capture projection surface to form a captured image. In some embodiments, one or more image capture modules 172 may capture at least a portion of one or more projected images from one or more image capture projection surfaces 166. In some embodiments, one or more projection surface control units 179 may control one or more image capture modules 172 to capture at least a portion of one or more projected images from one or more image capture projection surfaces 166. In some embodiments, one or more projection surface control units 179 may receive control instructions from one or more surface memory 179D, from one or more memory 174, from one or more device interface modules 176, from one or more user interfaces 178, from one or more projectors 164, from one or more sensors 156, from one or more service provider modules 130, from one or more financial entities 122, from one or more user communications devices 112, or through one or more communications networks 128. In some embodiments, one or more image capture modules 172 may capture at least a portion of one or more projected images from two or more image capture projection surfaces 166. In some embodiments, one or more image capture modules 172 may capture at least a portion of one or more projected images in accordance with one or more user attributes of one or more users 110. In some embodiments, one or more image capture modules 172 may capture at least a portion of one or more projected images in accordance with one or more user attributes of one or more users 110 obtained from a history, a setting, a proximity determination, a sensor, a security parameter, a membership parameter, an account parameter, a status parameter, a group parameter, an ownership parameter, a role parameter, a capability parameter, a rights parameter, a service parameter, an activity parameter, a privilege parameter, a familial characteristic, a physical characteristic, an individualized parameter, or a contextualized parameter. In some embodiments, one or more image capture modules 172 may capture at least a portion of one or more projected images in accordance with one or more user instructions from one or more users 110. In some embodiments, one or more image capture modules 172 may capture at least a portion of one or more projected images in accordance with one or more physical instruction or one or more electronic instruction from one or more users 110. In some embodiments, one or more image capture modules 172 may capture at least a portion of one or more projected images in accordance with one or more financial transactions. In some embodiments, one or more image capture modules 172 may capture at least a portion of one or more projected images using full imaging 172A, optical scanning 172L, or mechanical scanning 172AB. In some embodiments, one or more image capture modules 172 may capture at least a portion of one or more projected images as video. In some embodiments, one or more image capture modules 172 may capture at least a portion of one or more projected images in association with audio content captured using one or more audio/data capture modules 182. In some embodiments, one or more image capture modules 172 may capture at least a portion of one or more projected images in accordance with one or more user-specified accounts such as from one or more user data accounts 152, one or more service provider modules 130, or one or more financial entities 122. In some embodiments, one or more image capture modules 172 may capture at least a portion of one or more projected images in association with user input or content from another source. For example, in some embodiments, an image capture module 172 may capture a projected grocery receipt from a writing surface at a grocery checkout stand. The image capture module 172 may further capture a signature provided through user input on a writing surface having a projected grocery receipt. Alternatively, in some embodiments, an image capture module 172 may capture a projected business presentation slide or series of slides from a wall mounted surface at a coffee shop. In some embodiments, the image capture module 172 may further capture writing provided from user input on a wall mounted surface having a projected business presentation. In some embodiments, the audio/data capture module 182 may further capture electronic data or files associated with a projected business presentation slide from one or more user communications devices 112, one or more memory 174, one or more service provider modules 130, one or more sensors 156, or through one or more electronic communications networks 128. Also, in some embodiments, an image capture module 172 may capture user input on a menu from a surface on a vehicle console. Additionally, in some embodiments, an image capture module 172 may capture educational subject matter from an instructional board. In some embodiments, the image capture module 172 may further capture writing provided from user input on an educational board having educational subject matter.

After a start operation, the operational flow 2100 includes a communication operation 2130 involving communicating at least a portion of the captured image. In some embodiments, one or more image capture modules 172 may communicate at least a portion of the captured image. In some embodiments, one or more projection surface control units 179 may communicate at least a portion of one or more captured images. In some embodiments, one or more captured images may be communicated using one or more device interface modules 176. In some embodiments, one or more captured images may be communicated using one or more user interfaces 178. In some embodiments, one or more captured images may be communicated using one or more communications networks 128. In some embodiments, one or more captured images may be communicated to one or more user communications devices 112. In some embodiments, one or more captured images may be communicated to one or more service provider modules 130. In some embodiments, one or more captured images may be communicated to one or more financial entities 122. In some embodiments, one or more captured images may be communicated to one or more sensors 156. In some embodiments, one or more captured images may be communicated to one or more projectors 164. In some embodiments, one or more captured images may be communicated in accordance with one or more user instructions, user attributes, or financial transactions. In some embodiments, one or more captured images may be communicated in accordance with one or more physical instructions or electronic instructions. In some embodiments, one or more captured images may be communicated using electronic communication. In some embodiments, one or more captured images may be communicated using wireless communication. In some embodiments, one or more captured images may be communicated to one or more memory, hardware devices, software applications, user devices, printers, monitor displays, or projectors 164. In some embodiments, one or more captured images may be communicated to two or more memory, hardware devices, software applications, user devices, printers, monitor displays, or projectors. In some embodiments, one or more captured images may be communicated in association with audio content. For example, in some embodiments, a captured grocery receipt and signature may be communicated to one or more email accounts, store accounts, printers, user devices, or the like of one or more users 110. Alternatively, in some embodiments, a captured business presentation slide, series of slides, writing, and/or associated data or files may be communicated to one or more user communications devices 112, email accounts, file locations, printers, projectors, or the like. Also, in some embodiments, captured user input on a menu from a surface on a vehicle console may be communicated to one or more corresponding systems for control. Additionally, in some embodiments, captured educational subject matter and writing may be communicated to one or more desk displays, email accounts, file locations, projectors 164, printers, or internet websites.

After a start operation, the operational flow 2100 includes a receiving operation 2140 involving receiving at least one user input on the at least one image capture projection surface. In some embodiments, one or more image capture projection surfaces 166 may receive at least one user input on the at least one image capture projection surface. In some embodiments, one or more image capture projection surfaces 166 may receive one or more user input. In some embodiments, one or more image capture projection surfaces 166 may receive one or more user input from one or more users 110. In some embodiments, one or more image capture projection surfaces 166 may receive one or more user input from one or more user communications devices 112. In some embodiments, one or more image capture projection surfaces 166 may receive one or more user input from one or more service provider modules 130. In some embodiments, one or more image capture projection surfaces 166 may receive one or more user input from one or more communications networks 128. In some embodiments, one or more image capture projection surfaces 166 may receive one or more user input from one or more sensors 156. In some embodiments, one or more image capture projection surfaces 166 may receive one or more user input from one or more projectors 164. In some embodiments, one or more image capture projection surfaces 166 may receive one or more user input from one or more audio/data capture modules 182. In some embodiments, two or more image capture projection surfaces 166 may receive one or more user input. In some embodiments, one or more image capture projection surfaces 166 may receive one or more user input acquired from electronic or wireless communication such as via one or more communications networks 128 or one or more user communications devices 112. In some embodiments, one or more image capture projection surfaces 166 may receive one or more user input in accordance with one or more user instructions from one or more users 110 or financial transactions. In some embodiments, one or more image capture projection surfaces 166 may receive one or more user input in accordance with one or more user attributes of one or more users 110. In some embodiments, one or more image capture projection surfaces 166 may receive one or more user input in accordance with one or more user attributes of one or more users 110 obtained from a history, a setting, a proximity determination, a sensor, a security parameter, a membership parameter, an account parameter, a status parameter, a group parameter, an ownership parameter, a role parameter, a capability parameter, a rights parameter, a service parameter, an activity parameter, a privilege parameter, a familial characteristic, a physical characteristic, an individualized parameter, or a contextualized parameter. In some embodiments, one or more image capture projection surfaces 166 may receive one or more user input where the one or more image capture projection surfaces 166 are associated with a structure or device. In some embodiments, one or more image capture projection surfaces 166 may receive one or more user input where the one or more image capture projection surfaces 166 are associated with a structure or device such as a tablet, a handheld device, a vehicle, a table, a wall, a desk, or a writing surface. In some embodiments, one or more image capture projection surfaces 166 may receive one or more user input that relates to user-specified content from one or more users 110. In some embodiments, one or more image capture projection surfaces 166 may receive one or more user input that relates to user-specified content such as legal content, educational content, healthcare content, business content, or personal content. In some embodiments, one or more image capture projection surfaces 166 may receive one or more user input as a video. In some embodiments, one or more image capture projection surfaces 166 may receive one or more user input in association with audio content. For example, in some embodiments, an image capture projection surface 166 may be a writing surface at a grocery checkout stand and a user input may be a signature on a receipt. Alternatively, in some embodiments, an image capture projection surface 166 may be a wall mounted surface at a coffee shop and a user input may be notes on a business presentation. Also, in some embodiments, an image capture projection surface 166 may be a surface on a vehicle console and a user input may be a menu item selection. Additionally, in some embodiments, an image capture projection surface 166 may be an instructional board for educational endeavors and a user input may be lecture notes. Also, in some embodiments, an image capture projection surface 166 may be a desktop device operably coupled to a computer and a user input may be a signature or writing on fields of the document.

After a start operation, the operational flow 2100 includes a capturing operation 2150 involving capturing the at least one user input on the at least one image capture projection surface. In some embodiments, one or more image capture modules 172 may capture the at least one user input on the at least one image capture projection surface. In some embodiments, one or more image capture modules 172 may capture one or more user input from one or more image capture projection surfaces 166. In some embodiments, one or more audio/data capture modules 182 may capture one or more user input from one or more image capture projection surfaces 166. In some embodiments, one or more projection surface control units 179 may control one or more image capture modules 172 to capture one or more user input from one or more image capture projection surfaces 166. In some embodiments, one or more projection surface control units 179 may control one or more audio/data capture modules 182 to capture one or more user input from one or more image capture projection surfaces 166. In some embodiments, one or more projection surface control units 179 may receive control instructions from one or more surface memory 179D, from one or more memory 174, from one or more device interface modules 176, from one or more user interfaces 178, from one or more projectors 164, from one or more sensors 156, from one or more service provider modules 130, from one or more financial entities 122, from one or more user communications devices 112, or through one or more communications networks 128. In some embodiments, one or more image capture modules 172 or audio/data capture modules 182 may capture one or more user input from two or more image capture projection surfaces 166. In some embodiments, one or more image capture modules 172 or one or more audio/data capture modules 182 may capture one or more user input from one or more user communications devices 112, users 110, service provider modules 130, communications networks 128, sensors 156, or projectors 164. In some embodiments, one or more image capture modules 172 or audio/data capture modules 182 may capture one or more user input in accordance with one or more user attributes of one or more users 110. In some embodiments, one or more image capture modules 172 or audio/data capture modules 182 may capture one or more user input in accordance with one or more user attributes of one or more users 110 obtained from a history, a setting, a proximity determination, a sensor, a security parameter, a membership parameter, an account parameter, a status parameter, a group parameter, an ownership parameter, a role parameter, a capability parameter, a rights parameter, a service parameter, an activity parameter, a privilege parameter, a familial characteristic, a physical characteristic, an individualized parameter, or a contextualized parameter. In some embodiments, one or more image capture modules 172 or audio/data capture modules 182 may capture one or more user input in accordance with one or more user instructions from one or more users 110. In some embodiments, one or more image capture modules 172 or audio/data capture modules 182 may capture one or more user input in accordance with one or more physical instruction or one or more electronic instruction from one or more users 110. In some embodiments, one or more image capture modules 172 or audio/data capture modules 182 may capture one or more user input in accordance with one or more financial transactions. In some embodiments, one or more image capture modules 172 or audio/data capture modules 182 may capture one or more user input using full imaging 172A, optical scanning 172L, or mechanical scanning 172AB. In some embodiments, one or more image capture modules 172 or audio/data capture modules 182 may capture one or more user input as video. In some embodiments, one or more image capture modules 172 or audio/data capture modules 182 may capture one or more user input in association with audio content captured using one or more audio/data capture modules 182. In some embodiments, one or more image capture modules 172 or audio/data capture modules 182 may capture one or more user input in accordance with one or more user-specified accounts such as from one or more user data accounts 152, one or more service provider modules 130, or one or more financial entities 122. In some embodiments, one or more image capture modules 172 or audio/data capture modules 182 may capture one or more user input in association with user input or content from another source. For example, in some embodiments, a signature on a projected receipt may be captured. In some embodiments, notes on a projected business presentation may be captured. In some embodiments, selections on a projected menu may be captured. In some embodiments, lecture notes on a projected instructional board may be captured. In some embodiments, writing on a projected document may be captured.

Figure 22:
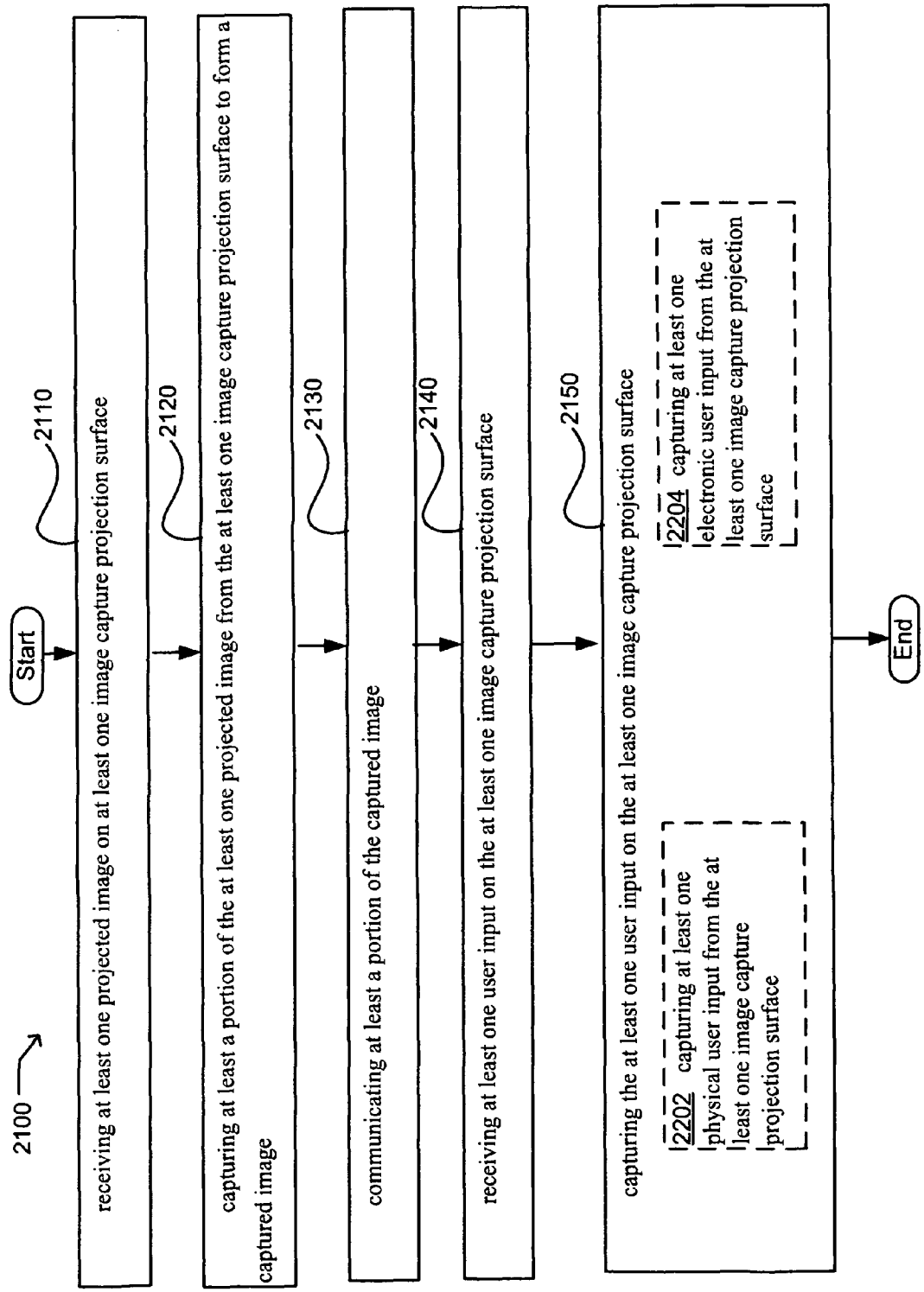
FIG. 22 illustrates alternative embodiments of the example operation flow of FIG. 21.

FIG. 22 illustrates alternative embodiments of the example operational flow 2100 of FIG. 21. FIG. 22 illustrates example embodiments where the capturing operation 2150 may include at least one additional operation. Additional operations may include an operation 2202, and/or an operation 2204.

At operation 2202, the capturing operation 2150 may include capturing at least one physical user input from the at least one image capture projection surface. In some embodiments, one or more image capture modules 172 may capture at least one physical user input from the at least one image capture projection surface. In some embodiments, one or more image capture modules 172 may capture one or more physical user input from one or more image capture projection surfaces 166. In some embodiments, one or more audio/data capture modules 182 may capture one or more physical user input from one or more image capture projection surfaces 166. In some embodiments, one or more physical user inputs may be digitally captured. For example, in some embodiments, user or device induced pressure, dragging, sliding, arranging, or other manipulation may be captured. In some embodiments, sound may be captured. In some embodiments, interactions with a menu may be captured. In some embodiments, writing may be captured. In some embodiments, interactions with a user interface may be captured.

At operation 2204, the capturing operation 2150 may include capturing at least one electronic user input from the at least one image capture projection surface. In some embodiments, one or more image capture modules 172 may capture at least one electronic user input from the at least one image capture projection surface. In some embodiments, one or more image capture modules 172 may capture one or more electronic user input from one or more image capture projection surfaces 166. In some embodiments, one or more audio/data capture modules 182 may capture one or more electronic user input from one or more image capture projection surfaces 166. For example, in some embodiments, a file may be captured. In some embodiments, an image may be captured. In some embodiments, a video may be captured. In some embodiments, an audio file may be captured. In some embodiments, a link or contents of that link may be captured. In some embodiments, text may be captured.

Figure 23:
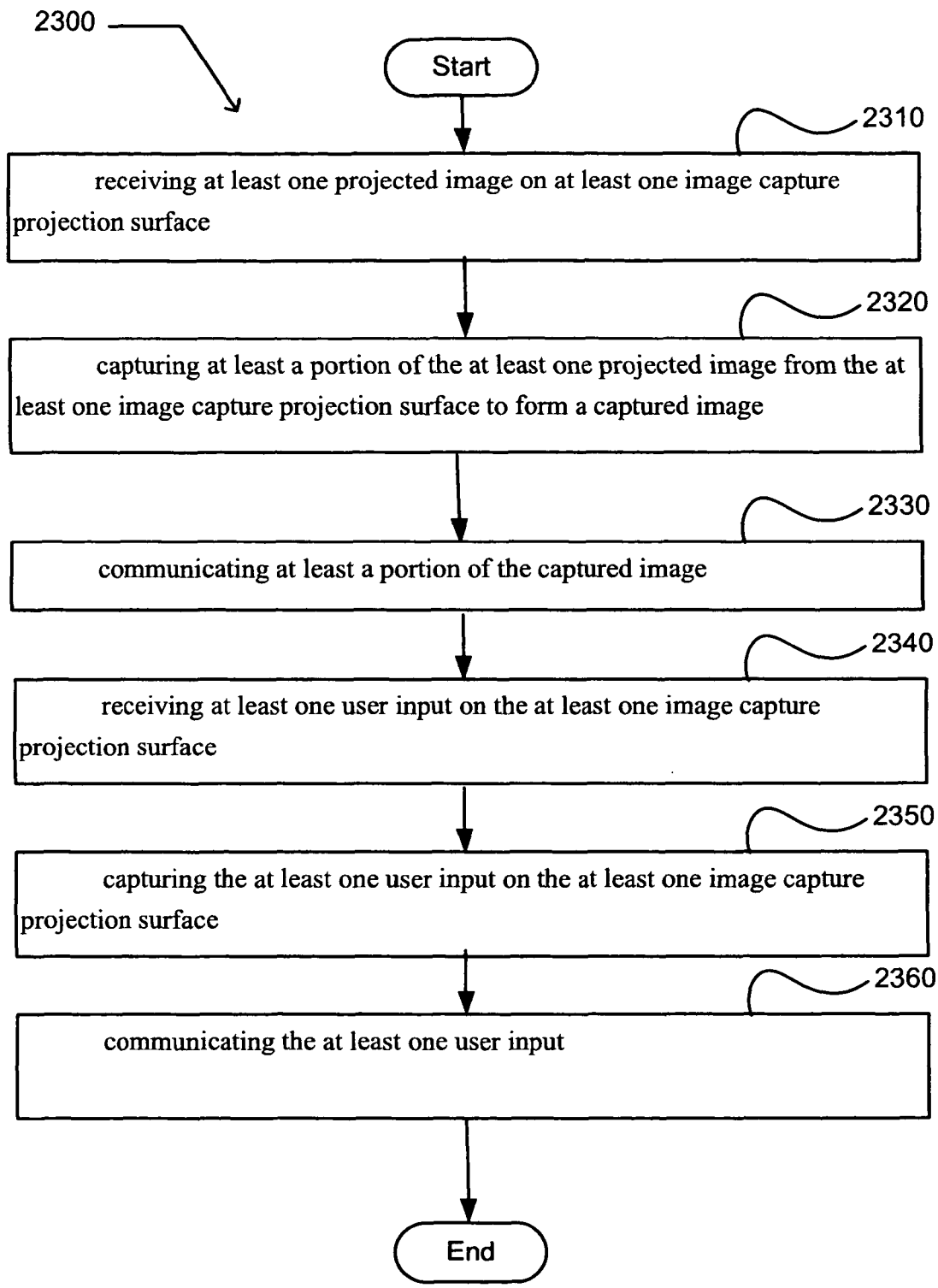
FIG. 23 illustrates an operational flow representing example operations related to receiving at least one projected image on at least one image capture projection surface; capturing at least a portion of the at least one projected image from the at least one image capture projection surface to form a captured image; communicating at least a portion of the captured image; receiving at least one user input on the at least one image capture projection surface; capturing the at least one user input on the at least one image capture projection surface; and communicating the at least one user input.

In FIG. 23 and in following figures that include various examples of operations used during performance of various methods, discussion and explanation may be provided with respect to any one or combination of the above-described examples of FIGS. 1-10, and/or with respect to other examples and contexts. In some embodiments, operations 2110, 2120, 2130, 2140 and 2150 of FIG. 21 may correspond to operations 2310, 2320, 2330, 2340 and 2350 of FIG. 23. However, it should be understood that the operations may be executed in a number of other environments and contexts, and/or modified versions of FIGS. 1-10. Also, although the various operations are presented in the sequence(s) illustrated, it should be understood that the various operations may be performed in other orders than those which are illustrated, or may be performed concurrently.

After a start operation, the operational flow 2300 includes a receiving operation 2310 involving receiving at least one projected image on at least one image capture projection surface. In some embodiments, one or more image capture projection surfaces 166 may receive at least one projected image on at least one image capture projection surface. In some embodiments, one or more image capture projection surfaces 166 may receive at least one projected image projected from one or more projectors 164. In some embodiments, two or more image capture projection surfaces 166 may receive at least one projected image. In some embodiments, one or more image capture projection surfaces 166 may receive at least one projected image acquired from electronic or wireless communication such as via one or more communications networks 128 or one or more user communications devices 112. In some embodiments, one or more image capture projection surfaces 166 may receive at least one projected image in accordance with one or more user instructions from one or more users 110 or financial transactions. In some embodiments, one or more image capture projection surfaces 166 may receive at least one projected image in accordance with one or more user attributes of one or more users 110. In some embodiments, one or more image capture projection surfaces 166 may receive at least one projected image in accordance with one or more user attributes of one or more users 110 obtained from a history, a setting, a proximity determination, a sensor, a security parameter, a membership parameter, an account parameter, a status parameter, a group parameter, an ownership parameter, a role parameter, a capability parameter, a rights parameter, a service parameter, an activity parameter, a privilege parameter, a familial characteristic, a physical characteristic, an individualized parameter, or a contextualized parameter. In some embodiments, one or more image capture projection surfaces 166 may receive at least one projected image where the one or more image capture projection surfaces 166 are associated with a structure or device. In some embodiments, one or more image capture projection surfaces 166 may receive at least one projected image where the one or more image capture projection surfaces 166 are associated with a structure or device such as a tablet, a handheld device, a vehicle, a table, a wall, a desk, or a writing surface. In some embodiments, one or more image capture projection surfaces 166 may receive at least one projected image that relates to user-specified content from one or more users 110. In some embodiments, one or more image capture projection surfaces 166 may receive at least one projected image that relates to user-specified content such as legal content, educational content, healthcare content, business content, or personal content. In some embodiments, one or more image capture projection surfaces 166 may receive at least one projected image as a video. In some embodiments, one or more image capture projection surfaces 166 may receive at least one projected image in association with audio content. For example, in some embodiments, an image capture projection surface 166 may be a writing surface at a grocery checkout stand and a projected image may be a grocery receipt for signature. Alternatively, in some embodiments, an image capture projection surface 166 may be a wall mounted surface at a coffee shop and a projected image may be a business presentation. Also, in some embodiments, an image capture projection surface 166 may be a surface on a vehicle console and a projected image may be a menu for controlling vehicle component operations such as music, visual entertainment, climate control, seat placement, or security. Additionally, in some embodiments, an image capture projection surface 166 may be an instructional board for educational endeavors and a projected image may be educational subject matter.

After a start operation, the operational flow 2300 includes a capture operation 2320 involving capturing at least a portion of the at least one projected image from the at least one image capture projection surface to form a captured image. In some embodiments, one or more image capture modules 172 may capture at least a portion of the at least one projected image from the at least one image capture projection surface to form a captured image. In some embodiments, one or more image capture modules 172 may capture at least a portion of one or more projected images from one or more image capture projection surfaces 166. In some embodiments, one or more projection surface control units 179 may control one or more image capture modules 172 to capture at least a portion of one or more projected images from one or more image capture projection surfaces 166. In some embodiments, one or more projection surface control units 179 may receive control instructions from one or more surface memory 179D, from one or more memory 174, from one or more device interface modules 176, from one or more user interfaces 178, from one or more projectors 164, from one or more sensors 156, from one or more service provider modules 130, from one or more financial entities 122, from one or more user communications devices 112, or through one or more communications networks 128. In some embodiments, one or more image capture modules 172 may capture at least a portion of one or more projected images from two or more image capture projection surfaces 166. In some embodiments, one or more image capture modules 172 may capture at least a portion of one or more projected images in accordance with one or more user attributes of one or more users 110. In some embodiments, one or more image capture modules 172 may capture at least a portion of one or more projected images in accordance with one or more user attributes of one or more users 110 obtained from a history, a setting, a proximity determination, a sensor, a security parameter, a membership parameter, an account parameter, a status parameter, a group parameter, an ownership parameter, a role parameter, a capability parameter, a rights parameter, a service parameter, an activity parameter, a privilege parameter, a familial characteristic, a physical characteristic, an individualized parameter, or a contextualized parameter. In some embodiments, one or more image capture modules 172 may capture at least a portion of one or more projected images in accordance with one or more user instructions from one or more users 110. In some embodiments, one or more image capture modules 172 may capture at least a portion of one or more projected images in accordance with one or more physical instruction or one or more electronic instruction from one or more users 110. In some embodiments, one or more image capture modules 172 may capture at least a portion of one or more projected images in accordance with one or more financial transactions. In some embodiments, one or more image capture modules 172 may capture at least a portion of one or more projected images using full imaging 172A, optical scanning 172L, or mechanical scanning 172AB. In some embodiments, one or more image capture modules 172 may capture at least a portion of one or more projected images as video. In some embodiments, one or more image capture modules 172 may capture at least a portion of one or more projected images in association with audio content captured using one or more audio/data capture modules 182. In some embodiments, one or more image capture modules 172 may capture at least a portion of one or more projected images in accordance with one or more user-specified accounts such as from one or more user data accounts 152, one or more service provider modules 130, or one or more financial entities 122. In some embodiments, one or more image capture modules 172 may capture at least a portion of one or more projected images in association with user input or content from another source. For example, in some embodiments, an image capture module 172 may capture a projected grocery receipt from a writing surface at a grocery checkout stand. The image capture module 172 may further capture a signature provided through user input on a writing surface having a projected grocery receipt. Alternatively, in some embodiments, an image capture module 172 may capture a projected business presentation slide or series of slides from a wall mounted surface at a coffee shop. In some embodiments, the image capture module 172 may further capture writing provided from user input on a wall mounted surface having a projected business presentation. In some embodiments, the audio/data capture module 182 may further capture electronic data or files associated with a projected business presentation slide from one or more user communications devices 112, one or more memory 174, one or more service provider modules 130, one or more sensors 156, or through one or more electronic communications networks 128. Also, in some embodiments, an image capture module 172 may capture user input on a menu from a surface on a vehicle console. Additionally, in some embodiments, an image capture module 172 may capture educational subject matter from an instructional board. In some embodiments, the image capture module 172 may further capture writing provided from user input on an educational board having educational subject matter.

After a start operation, the operational flow 2300 includes a communication operation 2330 involving communicating at least a portion of the captured image. In some embodiments, one or more image capture modules 172 may communicate at least a portion of the captured image. In some embodiments, one or more projection surface control units 179 may communicate at least a portion of one or more captured images. In some embodiments, one or more captured images may be communicated using one or more device interface modules 176. In some embodiments, one or more captured images may be communicated using one or more user interfaces 178. In some embodiments, one or more captured images may be communicated using one or more communications networks 128. In some embodiments, one or more captured images may be communicated to one or more user communications devices 112. In some embodiments, one or more captured images may be communicated to one or more service provider modules 130. In some embodiments, one or more captured images may be communicated to one or more financial entities 122. In some embodiments, one or more captured images may be communicated to one or more sensors 156. In some embodiments, one or more captured images may be communicated to one or more projectors 164. In some embodiments, one or more captured images may be communicated in accordance with one or more user instructions, user attributes, or financial transactions. In some embodiments, one or more captured images may be communicated in accordance with one or more physical instructions or electronic instructions. In some embodiments, one or more captured images may be communicated using electronic communication. In some embodiments, one or more captured images may be communicated using wireless communication. In some embodiments, one or more captured images may be communicated to one or more memory, hardware devices, software applications, user devices, printers, monitor displays, or projectors 164. In some embodiments, one or more captured images may be communicated to two or more memory, hardware devices, software applications, user devices, printers, monitor displays, or projectors. In some embodiments, one or more captured images may be communicated in association with audio content. For example, in some embodiments, a captured grocery receipt and signature may be communicated to one or more email accounts, store accounts, printers, user devices, or the like of one or more users 110. Alternatively, in some embodiments, a captured business presentation slide, series of slides, writing, and/or associated data or files may be communicated to one or more user communications devices 112, email accounts, file locations, printers, projectors, or the like. Also, in some embodiments, captured user input on a menu from a surface on a vehicle console may be communicated to one or more corresponding systems for control. Additionally, in some embodiments, captured educational subject matter and writing may be communicated to one or more desk displays, email accounts, file locations, projectors 164, printers, or internet websites.

After a start operation, the operational flow 2300 includes a receiving operation 2340 involving receiving at least one user input on the at least one image capture projection surface. In some embodiments, one or more image capture projection surfaces 166 may receive at least one user input on the at least one image capture projection surface. In some embodiments, one or more image capture projection surfaces 166 may receive one or more user input. In some embodiments, one or more image capture projection surfaces 166 may receive one or more user input from one or more users 110. In some embodiments, one or more image capture projection surfaces 166 may receive one or more user input from one or more user communications devices 112. In some embodiments, one or more image capture projection surfaces 166 may receive one or more user input from one or more service provider modules 130. In some embodiments, one or more image capture projection surfaces 166 may receive one or more user input from one or more communications networks 128. In some embodiments, one or more image capture projection surfaces 166 may receive one or more user input from one or more sensors 156. In some embodiments, one or more image capture projection surfaces 166 may receive one or more user input from one or more projectors 164. In some embodiments, one or more image capture projection surfaces 166 may receive one or more user input from one or more audio/data capture modules 182. In some embodiments, two or more image capture projection surfaces 166 may receive one or more user input. In some embodiments, one or more image capture projection surfaces 166 may receive one or more user input acquired from electronic or wireless communication such as via one or more communications networks 128 or one or more user communications devices 112. In some embodiments, one or more image capture projection surfaces 166 may receive one or more user input in accordance with one or more user instructions from one or more users 110 or financial transactions. In some embodiments, one or more image capture projection surfaces 166 may receive one or more user input in accordance with one or more user attributes of one or more users 110. In some embodiments, one or more image capture projection surfaces 166 may receive one or more user input in accordance with one or more user attributes of one or more users 110 obtained from a history, a setting, a proximity determination, a sensor, a security parameter, a membership parameter, an account parameter, a status parameter, a group parameter, an ownership parameter, a role parameter, a capability parameter, a rights parameter, a service parameter, an activity parameter, a privilege parameter, a familial characteristic, a physical characteristic, an individualized parameter, or a contextualized parameter. In some embodiments, one or more image capture projection surfaces 166 may receive one or more user input where the one or more image capture projection surfaces 166 are associated with a structure or device. In some embodiments, one or more image capture projection surfaces 166 may receive one or more user input where the one or more image capture projection surfaces 166 are associated with a structure or device such as a tablet, a handheld device, a vehicle, a table, a wall, a desk, or a writing surface. In some embodiments, one or more image capture projection surfaces 166 may receive one or more user input that relates to user-specified content from one or more users 110. In some embodiments, one or more image capture projection surfaces 166 may receive one or more user input that relates to user-specified content such as legal content, educational content, healthcare content, business content, or personal content. In some embodiments, one or more image capture projection surfaces 166 may receive one or more user input as a video. In some embodiments, one or more image capture projection surfaces 166 may receive one or more user input in association with audio content. For example, in some embodiments, an image capture projection surface 166 may be a writing surface at a grocery checkout stand and a user input may be a signature on a receipt. Alternatively, in some embodiments, an image capture projection surface 166 may be a wall mounted surface at a coffee shop and a user input may be notes on a business presentation. Also, in some embodiments, an image capture projection surface 166 may be a surface on a vehicle console and a user input may be a menu item selection. Additionally, in some embodiments, an image capture projection surface 166 may be an instructional board for educational endeavors and a user input may be lecture notes. Also, in some embodiments, an image capture projection surface 166 may be a desktop device operably coupled to a computer and a user input may be a signature or writing on fields of the document.

After a start operation, the operational flow 2300 includes a capturing operation 2350 involving capturing the at least one user input on the at least one image capture projection surface. In some embodiments, one or more image capture modules 172 may capture the at least one user input on the at least one image capture projection surface. In some embodiments, one or more image capture modules 172 may capture one or more user input from one or more image capture projection surfaces 166. In some embodiments, one or more audio/data capture modules 182 may capture one or more user input from one or more image capture projection surfaces 166. In some embodiments, one or more projection surface control units 179 may control one or more image capture modules 172 to capture one or more user input from one or more image capture projection surfaces 166. In some embodiments, one or more projection surface control units 179 may control one or more audio/data capture modules 182 to capture one or more user input from one or more image capture projection surfaces 166. In some embodiments, one or more projection surface control units 179 may receive control instructions from one or more surface memory 179D, from one or more memory 174, from one or more device interface modules 176, from one or more user interfaces 178, from one or more projectors 164, from one or more sensors 156, from one or more service provider modules 130, from one or more financial entities 122, from one or more user communications devices 112, or through one or more communications networks 128. In some embodiments, one or more image capture modules 172 or audio/data capture modules 182 may capture one or more user input from two or more image capture projection surfaces 166. In some embodiments, one or more image capture modules 172 or one or more audio/data capture modules 182 may capture one or more user input from one or more user communications devices 112, users 110, service provider modules 130, communications networks 128, sensors 156, or projectors 164. In some embodiments, one or more image capture modules 172 or audio/data capture modules 182 may capture one or more user input in accordance with one or more user attributes of one or more users 110. In some embodiments, one or more image capture modules 172 or audio/data capture modules 182 may capture one or more user input in accordance with one or more user attributes of one or more users 110 obtained from a history, a setting, a proximity determination, a sensor, a security parameter, a membership parameter, an account parameter, a status parameter, a group parameter, an ownership parameter, a role parameter, a capability parameter, a rights parameter, a service parameter, an activity parameter, a privilege parameter, a familial characteristic, a physical characteristic, an individualized parameter, or a contextualized parameter. In some embodiments, one or more image capture modules 172 or audio/data capture modules 182 may capture one or more user input in accordance with one or more user instructions from one or more users 110. In some embodiments, one or more image capture modules 172 or audio/data capture modules 182 may capture one or more user input in accordance with one or more physical instruction or one or more electronic instruction from one or more users 110. In some embodiments, one or more image capture modules 172 or audio/data capture modules 182 may capture one or more user input in accordance with one or more financial transactions. In some embodiments, one or more image capture modules 172 or audio/data capture modules 182 may capture one or more user input using full imaging 172A, optical scanning 172L, or mechanical scanning 172AB. In some embodiments, one or more image capture modules 172 or audio/data capture modules 182 may capture one or more user input as video. In some embodiments, one or more image capture modules 172 or audio/data capture modules 182 may capture one or more user input in association with audio content captured using one or more audio/data capture modules 182. In some embodiments, one or more image capture modules 172 or audio/data capture modules 182 may capture one or more user input in accordance with one or more user-specified accounts such as from one or more user data accounts 152, one or more service provider modules 130, or one or more financial entities 122. In some embodiments, one or more image capture modules 172 or audio/data capture modules 182 may capture one or more user input in association with user input or content from another source. For example, in some embodiments, a signature on a projected receipt may be captured. In some embodiments, notes on a projected business presentation may be captured. In some embodiments, selections on a projected menu may be captured. In some embodiments, lecture notes on a projected instructional board may be captured. In some embodiments, writing on a projected document may be captured.

After a start operation, the operational flow 2300 includes a communicating operation 2360 involving communicating the at least one user input. In some embodiments, one or more image capture modules 172 may communicate the at least one user input. In some embodiments, one or more image capture modules 172 or audio/data capture modules 182 may communicate one or more user inputs. In some embodiments, one or more projection surface control units 179 may communicate one or more user inputs. In some embodiments, one or more user inputs may be communicated using one or more device interface modules 176. In some embodiments, one or more user inputs may be communicated using one or more user interfaces 178. In some embodiments, one or more user inputs may be communicated using one or more communications networks 128. In some embodiments, one or more user inputs may be communicated to one or more user communications devices 112. In some embodiments, one or more user inputs may be communicated to one or more service provider modules 130. In some embodiments, one or more user inputs may be communicated to one or more financial entities 122. In some embodiments, one or more user inputs may be communicated to one or more sensors 156. In some embodiments, one or more user inputs may be communicated to one or more projectors 164. In some embodiments, one or more user inputs may be communicated in accordance with one or more user instructions, user attributes, or financial transactions. In some embodiments, one or more user inputs may be communicated in accordance with one or more physical instructions or electronic instructions. In some embodiments, one or more user inputs may be communicated using electronic communication. In some embodiments, one or more user inputs may be communicated using wireless communication. In some embodiments, one or more user inputs may be communicated to one or more memory, hardware devices, software applications, user devices, printers, monitor displays, or projectors 164. In some embodiments, one or more user inputs may be communicated to two or more memory, hardware devices, software applications, user devices, printers, monitor displays, or projectors. In some embodiments, one or more user inputs may be communicated in association with audio content. For example, in some embodiments, a signature on a grocery receipt may be communicated to one or more email accounts, store accounts, printers, user devices, or the like of one or more users 110. Also, in some embodiments, user input on a menu from a surface on a vehicle console may be communicated to one or more corresponding systems for control. Additionally, in some embodiments, writing on a document may be communicated to one or more desk displays, email accounts, file locations, projectors 164, printers, or internet websites. In some embodiments, one or more user inputs may be communicated to one or more projection control units 162 to affect further projection. For example, selection of a projected menu item may result in projection of details associated with that selected menu item. Alternatively, signature on a contract may result in projection of a menu having options for printing, emailing, or storing the contract.

Figure 24:
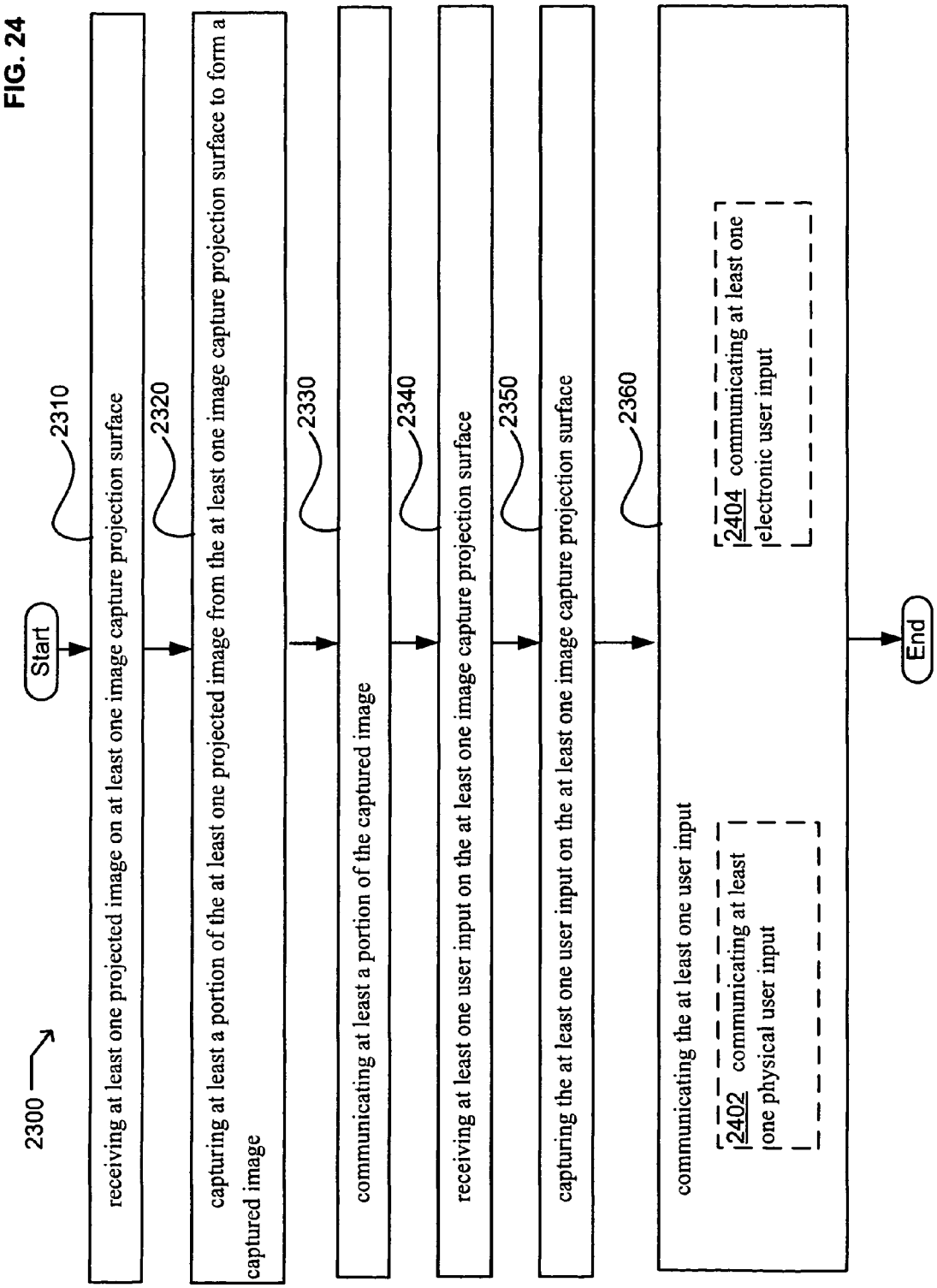
FIG. 24 illustrates alternative embodiments of the example operation flow of FIG. 23.

FIG. 24 illustrates alternative embodiments of the example operational flow 2300 of FIG. 23. FIG. 24 illustrates example embodiments where the communicating operation 2360 may include at least one additional operation. Additional operations may include an operation 2402, and/or an operation 2404.

At operation 2402, the communicating operation 2360 may include communicating at least one physical user input. In some embodiments, one or more image capture modules 172 may communicate at least one physical user input. In some embodiments, one or more image capture modules 172 or audio/data capture modules 182 may communicate one or more physical user input. In some embodiments, one or more projection surface control units 179 may communicate one or more physical user inputs. In some embodiments, one or more physical user input may be communicated to one or more memory 174. In some embodiments, one or more physical user input may be communicated using one or more device interface modules 176. In some embodiments, one or more physical user input may be communicated using one or more user interfaces 178. In some embodiments, one or more physical user input may be communicated to one or more projectors 164. In some embodiments, one or more physical user input may be communicated to one or more user communications devices 112. In some embodiments, one or more physical user input may be communicated to one or more service provider modules 130. In some embodiments, one or more physical user input may be communicated to one or more sensors 156. In some embodiments, one or more physical user input may be communicated to one or more communications networks 128. In some embodiments, one or more physical user input may be communicated to one or more financial entities 122. For example, in some embodiments, user or device induced pressure, dragging, sliding, arranging, or other manipulation may be communicated. In some embodiments, sound may be communicated. In some embodiments, interactions with a menu may be communicated. In some embodiments, writing may be communicated. In some embodiments, interactions with a user interface may be communicated.

At operation 2404, the communicating operation 2360 may include communicating at least one electronic user input. In some embodiments, one or more audio/data capture modules 182 may communicate at least one electronic user input. In some embodiments, one or more image capture modules 172 or audio/data capture modules 182 may communicate one or more electronic user input. In some embodiments, one or more projection surface control units 179 may communicate one or more electronic user inputs. In some embodiments, one or more electronic user inputs may be communicated to one or more memory 174. In some embodiments, one or more electronic user inputs may be communicated using one or more device interface modules 176. In some embodiments, one or more electronic user inputs may be communicated using one or more user interfaces 178. In some embodiments, one or more electronic user inputs may be communicated to one or more projectors 164. In some embodiments, one or more electronic user inputs may be communicated to one or more user communications devices 112. In some embodiments, one or more electronic user inputs may be communicated to one or more service provider modules 130. In some embodiments, one or more electronic user inputs may be communicated to one or more sensors 156. In some embodiments, one or more electronic user inputs may be communicated to one or more communications networks 128. In some embodiments, one or more electronic user inputs may be communicated to one or more financial entities 122. For example, in some embodiments, a file may be communicated. In some embodiments, an image may be communicated. In some embodiments, a video may be communicated. In some embodiments, an audio file may be communicated. In some embodiments, a link or contents of that link may be communicated. In some embodiments, text may be communicated.

Figure 25:
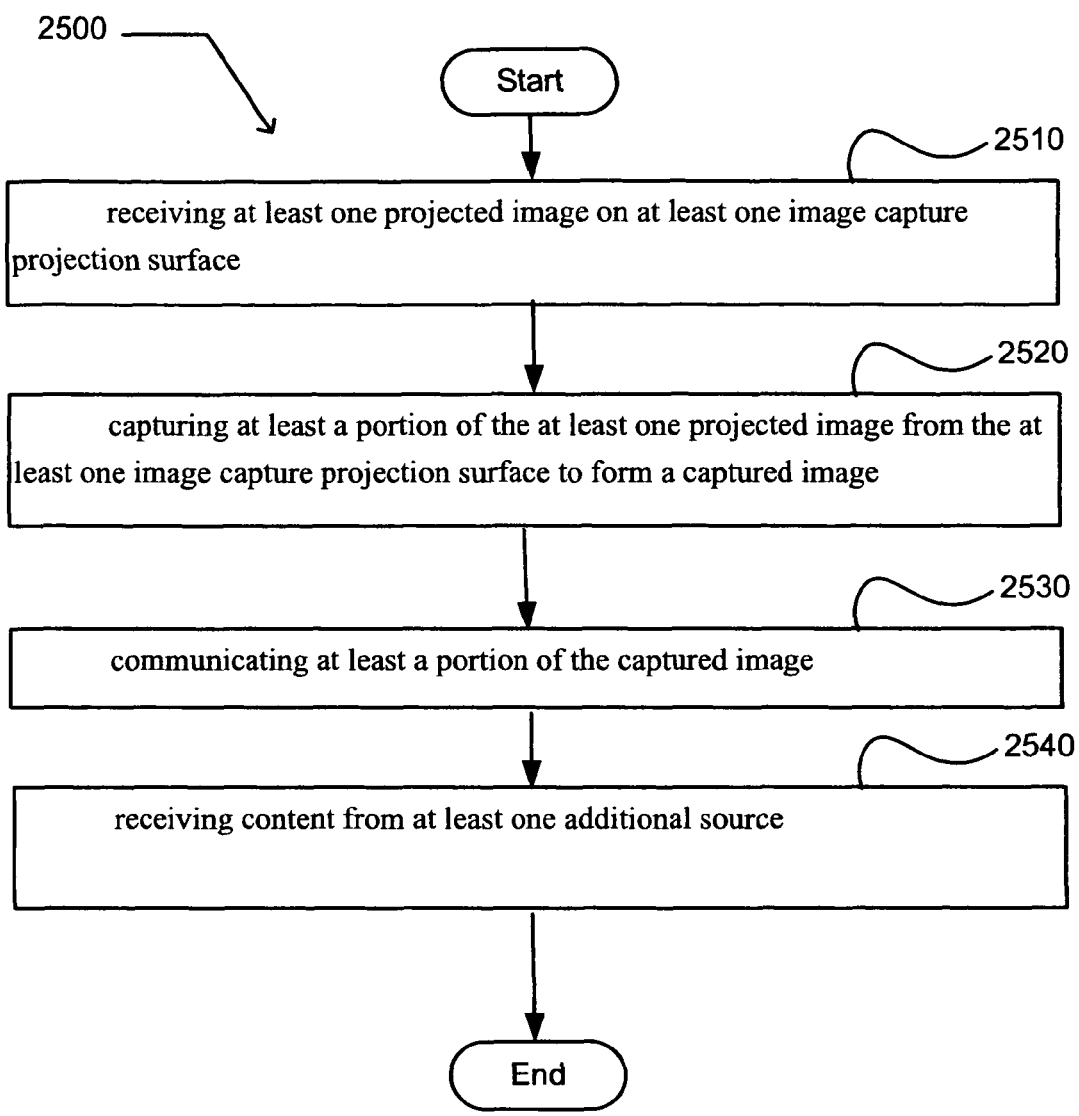
FIG. 25 illustrates an operational flow representing example operations related to receiving at least one projected image on at least one image capture projection surface; capturing at least a portion of the at least one projected image from the at least one image capture projection surface to form a captured image; communicating at least a portion of the captured image; and receiving content from at least one additional source.

In FIG. 25 and in following figures that include various examples of operations used during performance of various methods, discussion and explanation may be provided with respect to any one or combination of the above-described examples of FIGS. 1-10, and/or with respect to other examples and contexts. In some embodiments, operations 1110, 1120 and 1130 of FIG. 11 may correspond to operations 2510, 2520 and 2530 of FIG. 25. However, it should be understood that the operations may be executed in a number of other environments and contexts, and/or modified versions of FIGS. 1-10. Also, although the various operations are presented in the sequence(s) illustrated, it should be understood that the various operations may be performed in other orders than those which are illustrated, or may be performed concurrently.

After a start operation, the operational flow 2500 includes a receiving operation 2510 involving receiving at least one projected image on at least one image capture projection surface. In some embodiments, one or more image capture projection surfaces 166 may receive at least one projected image on at least one image capture projection surface. In some embodiments, one or more image capture projection surfaces 166 may receive at least one projected image projected from one or more projectors 164. In some embodiments, two or more image capture projection surfaces 166 may receive at least one projected image. In some embodiments, one or more image capture projection surfaces 166 may receive at least one projected image acquired from electronic or wireless communication such as via one or more communications networks 128 or one or more user communications devices 112. In some embodiments, one or more image capture projection surfaces 166 may receive at least one projected image in accordance with one or more user instructions from one or more users 110 or financial transactions. In some embodiments, one or more image capture projection surfaces 166 may receive at least one projected image in accordance with one or more user attributes of one or more users 110. In some embodiments, one or more image capture projection surfaces 166 may receive at least one projected image in accordance with one or more user attributes of one or more users 110 obtained from a history, a setting, a proximity determination, a sensor, a security parameter, a membership parameter, an account parameter, a status parameter, a group parameter, an ownership parameter, a role parameter, a capability parameter, a rights parameter, a service parameter, an activity parameter, a privilege parameter, a familial characteristic, a physical characteristic, an individualized parameter, or a contextualized parameter. In some embodiments, one or more image capture projection surfaces 166 may receive at least one projected image where the one or more image capture projection surfaces 166 are associated with a structure or device. In some embodiments, one or more image capture projection surfaces 166 may receive at least one projected image where the one or more image capture projection surfaces 166 are associated with a structure or device such as a tablet, a handheld device, a vehicle, a table, a wall, a desk, or a writing surface. In some embodiments, one or more image capture projection surfaces 166 may receive at least one projected image that relates to user-specified content from one or more users 110. In some embodiments, one or more image capture projection surfaces 166 may receive at least one projected image that relates to user-specified content such as legal content, educational content, healthcare content, business content, or personal content. In some embodiments, one or more image capture projection surfaces 166 may receive at least one projected image as a video. In some embodiments, one or more image capture projection surfaces 166 may receive at least one projected image in association with audio content. For example, in some embodiments, an image capture projection surface 166 may be a writing surface at a grocery checkout stand and a projected image may be a grocery receipt for signature. Alternatively, in some embodiments, an image capture projection surface 166 may be a wall mounted surface at a coffee shop and a projected image may be a business presentation. Also, in some embodiments, an image capture projection surface 166 may be a surface on a vehicle console and a projected image may be a menu for controlling vehicle component operations such as music, visual entertainment, climate control, seat placement, or security. Additionally, in some embodiments, an image capture projection surface 166 may be an instructional board for educational endeavors and a projected image may be educational subject matter.

After a start operation, the operational flow 2500 includes a capture operation 2520 involving capturing at least a portion of the at least one projected image from the at least one image capture projection surface to form a captured image. In some embodiments, one or more image capture modules 172 may capture at least a portion of the at least one projected image from the at least one image capture projection surface to form a captured image. In some embodiments, one or more image capture modules 172 may capture at least a portion of one or more projected images from one or more image capture projection surfaces 166. In some embodiments, one or more projection surface control units 179 may control one or more image capture modules 172 to capture at least a portion of one or more projected images from one or more image capture projection surfaces 166. In some embodiments, one or more projection surface control units 179 may receive control instructions from one or more surface memory 179D, from one or more memory 174, from one or more device interface modules 176, from one or more user interfaces 178, from one or more projectors 164, from one or more sensors 156, from one or more service provider modules 130, from one or more financial entities 122, from one or more user communications devices 112, or through one or more communications networks 128. In some embodiments, one or more image capture modules 172 may capture at least a portion of one or more projected images from two or more image capture projection surfaces 166. In some embodiments, one or more image capture modules 172 may capture at least a portion of one or more projected images in accordance with one or more user attributes of one or more users 110. In some embodiments, one or more image capture modules 172 may capture at least a portion of one or more projected images in accordance with one or more user attributes of one or more users 110 obtained from a history, a setting, a proximity determination, a sensor, a security parameter, a membership parameter, an account parameter, a status parameter, a group parameter, an ownership parameter, a role parameter, a capability parameter, a rights parameter, a service parameter, an activity parameter, a privilege parameter, a familial characteristic, a physical characteristic, an individualized parameter, or a contextualized parameter. In some embodiments, one or more image capture modules 172 may capture at least a portion of one or more projected images in accordance with one or more user instructions from one or more users 110. In some embodiments, one or more image capture modules 172 may capture at least a portion of one or more projected images in accordance with one or more physical instruction or one or more electronic instruction from one or more users 110. In some embodiments, one or more image capture modules 172 may capture at least a portion of one or more projected images in accordance with one or more financial transactions. In some embodiments, one or more image capture modules 172 may capture at least a portion of one or more projected images using full imaging 172A, optical scanning 172L, or mechanical scanning 172AB. In some embodiments, one or more image capture modules 172 may capture at least a portion of one or more projected images as video. In some embodiments, one or more image capture modules 172 may capture at least a portion of one or more projected images in association with audio content captured using one or more audio/data capture modules 182. In some embodiments, one or more image capture modules 172 may capture at least a portion of one or more projected images in accordance with one or more user-specified accounts such as from one or more user data accounts 152, one or more service provider modules 130, or one or more financial entities 122. In some embodiments, one or more image capture modules 172 may capture at least a portion of one or more projected images in association with user input or content from another source. For example, in some embodiments, an image capture module 172 may capture a projected grocery receipt from a writing surface at a grocery checkout stand. The image capture module 172 may further capture a signature provided through user input on a writing surface having a projected grocery receipt. Alternatively, in some embodiments, an image capture module 172 may capture a projected business presentation slide or series of slides from a wall mounted surface at a coffee shop. In some embodiments, the image capture module 172 may further capture writing provided from user input on a wall mounted surface having a projected business presentation. In some embodiments, the audio/data capture module 182 may further capture electronic data or files associated with a projected business presentation slide from one or more user communications devices 112, one or more memory 174, one or more service provider modules 130, one or more sensors 156, or through one or more electronic communications networks 128. Also, in some embodiments, an image capture module 172 may capture user input on a menu from a surface on a vehicle console. Additionally, in some embodiments, an image capture module 172 may capture educational subject matter from an instructional board. In some embodiments, the image capture module 172 may further capture writing provided from user input on an educational board having educational subject matter.

After a start operation, the operational flow 2500 includes a communication operation 2530 involving communicating at least a portion of the captured image. In some embodiments, one or more image capture modules 172 may communicate at least a portion of the captured image. In some embodiments, one or more projection surface control units 179 may communicate at least a portion of one or more captured images. In some embodiments, one or more captured images may be communicated using one or more device interface modules 176. In some embodiments, one or more captured images may be communicated using one or more user interfaces 178. In some embodiments, one or more captured images may be communicated using one or more communications networks 128. In some embodiments, one or more captured images may be communicated to one or more user communications devices 112. In some embodiments, one or more captured images may be communicated to one or more service provider modules 130. In some embodiments, one or more captured images may be communicated to one or more financial entities 122. In some embodiments, one or more captured images may be communicated to one or more sensors 156. In some embodiments, one or more captured images may be communicated to one or more projectors 164. In some embodiments, one or more captured images may be communicated in accordance with one or more user instructions, user attributes, or financial transactions. In some embodiments, one or more captured images may be communicated in accordance with one or more physical instructions or electronic instructions. In some embodiments, one or more captured images may be communicated using electronic communication. In some embodiments, one or more captured images may be communicated using wireless communication. In some embodiments, one or more captured images may be communicated to one or more memory, hardware devices, software applications, user devices, printers, monitor displays, or projectors 164. In some embodiments, one or more captured images may be communicated to two or more memory, hardware devices, software applications, user devices, printers, monitor displays, or projectors. In some embodiments, one or more captured images may be communicated in association with audio content. For example, in some embodiments, a captured grocery receipt and signature may be communicated to one or more email accounts, store accounts, printers, user devices, or the like of one or more users 110. Alternatively, in some embodiments, a captured business presentation slide, series of slides, writing, and/or associated data or files may be communicated to one or more user communications devices 112, email accounts, file locations, printers, projectors, or the like. Also, in some embodiments, captured user input on a menu from a surface on a vehicle console may be communicated to one or more corresponding systems for control. Additionally, in some embodiments, captured educational subject matter and writing may be communicated to one or more desk displays, email accounts, file locations, projectors 164, printers, or internet websites.

After a start operation, the operational flow 2500 includes a receiving operation 2540 involving receiving content from at least one additional source. In some embodiments, one or more image capture projection surfaces 166 may receive content from at least one additional source. In some embodiments, one or more image capture projection surfaces 166 may receive one or more content from one or more sources. In some embodiments, one or more image capture modules 172 may receive one or more content from one or more sources. In some embodiments, one or more memory 174 may receive one or more content from one or more sources. In some embodiments, one or more projection surface control units 179 may receive one or more content from one or more sources. In some embodiments, one or more device interface modules 176 may receive one or more content from one or more sources. In some embodiments, one or more user interfaces 178 may receive one or more content from one or more sources. In some embodiments, one or more audio/data capture modules 182 may receive one or more content from one or more sources. In some embodiments, one or more projectors 164 may receive one or more content from one or more sources. In some embodiments, one or more sensors 156 may receive one or more content from one or more sources. In some embodiments, one or more communications networks 128 may receive one or more content from one or more sources. In some embodiments, one or more service provider modules 130 may receive one or more content from one or more sources. In some embodiments, one or more user communications devices 112 may receive one or more content from one or more sources. In some embodiments, one or more users 110 may receive one or more content from one or more sources. In some embodiments, one or more content may be received from one or more users 110. In some embodiments, one or more content may be received from one or more user communications devices 112. In some embodiments, one or more content may be received from one or more service provider modules 130. In some embodiments, one or more content may be received from one or more financial entities 122. In some embodiments, one or more content may be received from one or more communications networks 128. In some embodiments, one or more content may be received from one or more sensors 156. In some embodiments, one or more content may be received from one or more projectors 164. In some embodiments, one or more content may be received from one or more user data accounts 152. In some embodiments, one or more content may be received from one or more image capture projection surfaces 166. In some embodiments, one or more content may be received from one or more device interface modules 176. In some embodiments, one or more content may be received from one or more user interfaces 178. In some embodiments, one or more content may be received from one or more audio/data capture modules 182. In some embodiments, one or more content may be received from one or more projection surface control units 179. In some embodiments, one or more content may be received from one or more memory 174. In some embodiments, one or more content may be received from one or more image capture modules 172. In some embodiments, two or more locations may receive one or more content from one or more sources. In some embodiments, one or more content from one or more sources may be received from electronic or wireless communication such as via one or more communications networks 128 or one or more user communications devices 112. In some embodiments, one or more content from one or more sources may be received in accordance with one or more user instructions from one or more users 110 or financial transactions. In some embodiments, one or more content from one or more sources may be received in accordance with one or more user attributes of one or more users 110. In some embodiments, one or more content from one or more sources may be received in accordance with one or more user attributes of one or more users 110 obtained from a history, a setting, a proximity determination, a sensor, a security parameter, a membership parameter, an account parameter, a status parameter, a group parameter, an ownership parameter, a role parameter, a capability parameter, a rights parameter, a service parameter, an activity parameter, a privilege parameter, a familial characteristic, a physical characteristic, an individualized parameter, or a contextualized parameter. In some embodiments, one or more content from one or more sources may be received that relates to user-specified content from one or more users 110. In some embodiments, one or more content from one or more sources may be received that relates to user-specified content such as legal content, educational content, healthcare content, business content, or personal content. In some embodiments, one or more content from one or more sources may be received as a video. In some embodiments, one or more content from one or more sources may be received in association with audio content. For example, in some embodiments, one or more content may be user account information from one or more user data accounts 152 that relates to a receipt and signature captured at a grocery checkout stand. In some embodiments, one or more content may be a data file from one or more user communications devices 112 referenced by notes and a business presentation captured on a wall mounted surface at a coffee shop. In some embodiments, one or more content may be program instructions from one or more memory 174 for implementing a menu selection captured on a vehicle console. In some embodiments, one or more content may be a course assignment or suggest reading from one or more service provider modules 130 that relates to lecture notes captured from an instructional board. In some embodiments, one or more content may be a file attachment from one or more communications networks 128 that relates to a document captured on a desktop device.

Figure 26:
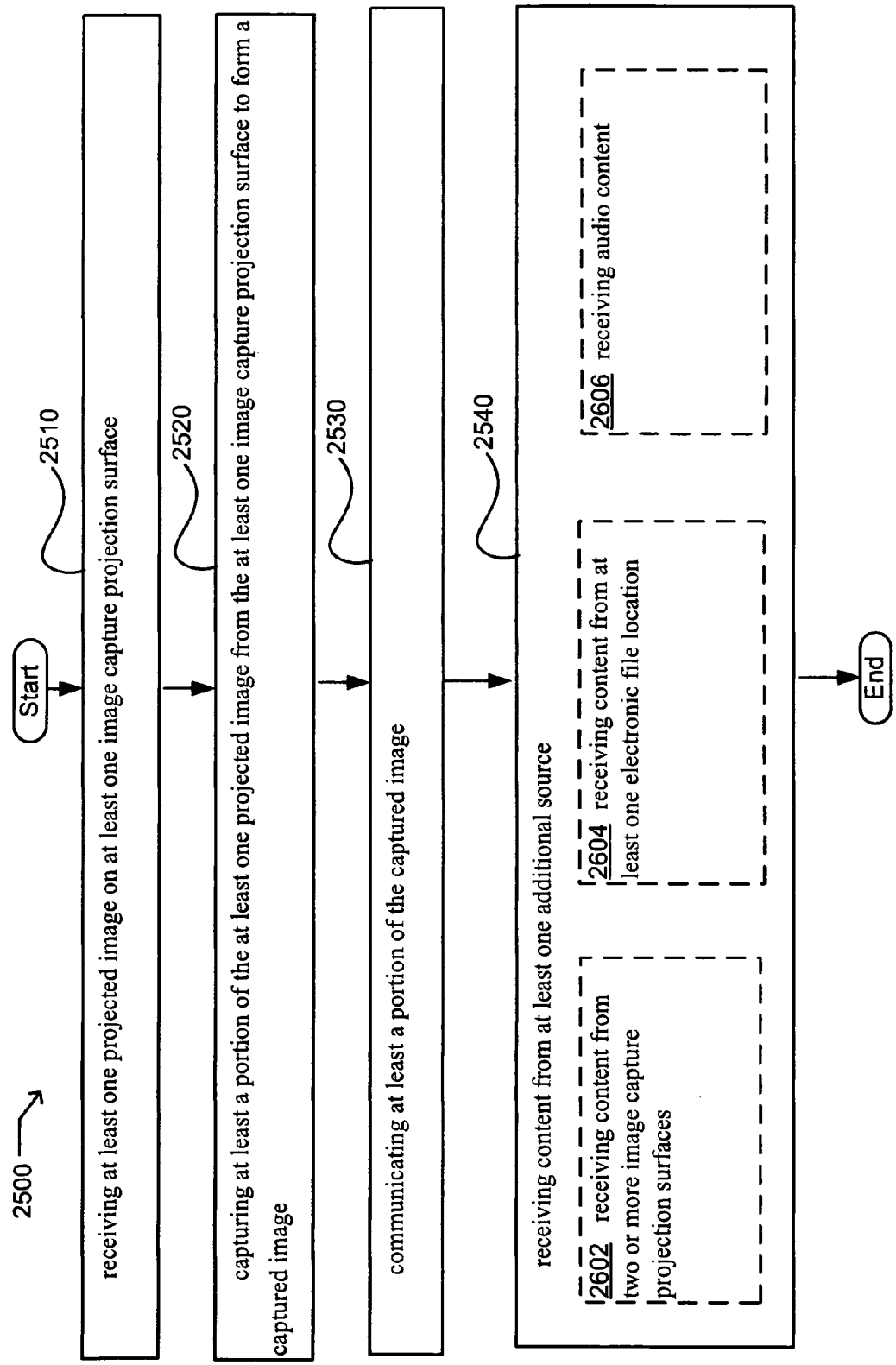
FIG. 26 illustrates alternative embodiments of the example operation flow of FIG. 25.

FIG. 26 illustrates alternative embodiments of the example operational flow 2500 of FIG. 25. FIG. 26 illustrates example embodiments where the receiving operation 2540 may include at least one additional operation. Additional operations may include an operation 2602, an operation 2604, and/or an operation 2606.

At operation 2602, the receiving operation 2540 may include receiving content from two or more image capture projection surfaces. In some embodiments, one or more image capture modules 172 may receive content from two or more image capture projection surfaces. In some embodiments, one or more image capture modules 172 or one or more audio/data capture modules 182 may receive content from two or more image capture projection surfaces 166. In some embodiments, one or more image capture modules 172 or one or more audio/data capture modules 182 may receive content from two or more image capture projection surfaces 166 using one or more communications networks 128. For example, in some embodiments, content may include one or more captured images from two or more image capture projection surfaces 166. In some embodiments, content may include one or more audio from two or more image capture projection surfaces 166. In some embodiments, content may include one or more videos from two or more image capture projection surfaces 166. In some embodiments, content may include one or more user input from two or more image capture projection surfaces 166. In some embodiments, content may be similar from two or more image capture projection surfaces 166. In some embodiments, content may be different from two or more image capture projection surfaces 166.

At operation 2604, the receiving operation 2540 may include receiving content from at least one electronic file location. In some embodiments, one or more audio/data capture modules 182 may receive content from at least one electronic file location. In some embodiments, one or more image capture modules 172 or one or more audio/data capture modules 182 may receive content from one or more memory 174. In some embodiments, one or more image capture modules 172 or one or more audio/data capture modules 182 may receive content using one or more device interface modules 176. In some embodiments, one or more image capture modules 172 or one or more audio/data capture modules 182 may receive content using one or more user interfaces 178. In some embodiments, one or more image capture modules 172 or one or more audio/data capture modules 182 may receive content from one or more user communications devices 112. In some embodiments, one or more image capture modules 172 or one or more audio/data capture modules 182 may receive content from one or more users 110. In some embodiments, one or more image capture modules 172 or one or more audio/data capture modules 182 may receive content from one or more service provider modules 130. In some embodiments, one or more image capture modules 172 or one or more audio/data capture modules 182 may receive content from one or more sensors 156. In some embodiments, one or more image capture modules 172 or one or more audio/data capture modules 182 may receive content from one or more projectors 164. In some embodiments, one or more image capture modules 172 or one or more audio/data capture modules 182 may receive content from one or more communications networks 128. For example, in some embodiments, one or more electronic files may be located on a portable device. In some embodiments, one or more electronic files may be located in local memory. In some embodiments, one or more electronic files may be located on the internet.

At operation 2606, the receiving operation 2540 may include receiving audio content. In some embodiments, one or more audio/data capture modules 182 may receive audio content. In some embodiments, one or more image capture modules 172 or one or more audio/data capture modules 182 may receive audio content from one or more memory 174. In some embodiments, one or more image capture modules 172 or one or more audio/data capture modules 182 may receive audio content from one or more device interface modules 176. In some embodiments, one or more image capture modules 172 or one or more audio/data capture modules 182 may receive audio content from one or more user interfaces 178. In some embodiments, one or more image capture modules 172 or one or more audio/data capture modules 182 may receive audio content from one or more projectors 164. In some embodiments, one or more image capture modules 172 or one or more audio/data capture modules 182 may receive audio content from one or more sensors 156. In some embodiments, one or more image capture modules 172 or one or more audio/data capture modules 182 may receive audio content from one or more communications networks 128. In some embodiments, one or more image capture modules 172 or one or more audio/data capture modules 182 may receive audio content from one or more service provider modules 130. In some embodiments, one or more image capture modules 172 or one or more audio/data capture modules 182 may receive audio content from one or more user communications devices 112. In some embodiments, one or more image capture modules 172 or one or more audio/data capture modules 182 may receive audio content from one or more users 110. For example, in some embodiments, audio content may be ambient sound proximate to one or more projectors 164. In some embodiments, audio content may be speech. In some embodiments, audio content may be music. In some embodiments, audio content may be a soundtrack. In some embodiments, audio content may be a sound effect.

Figure 27:
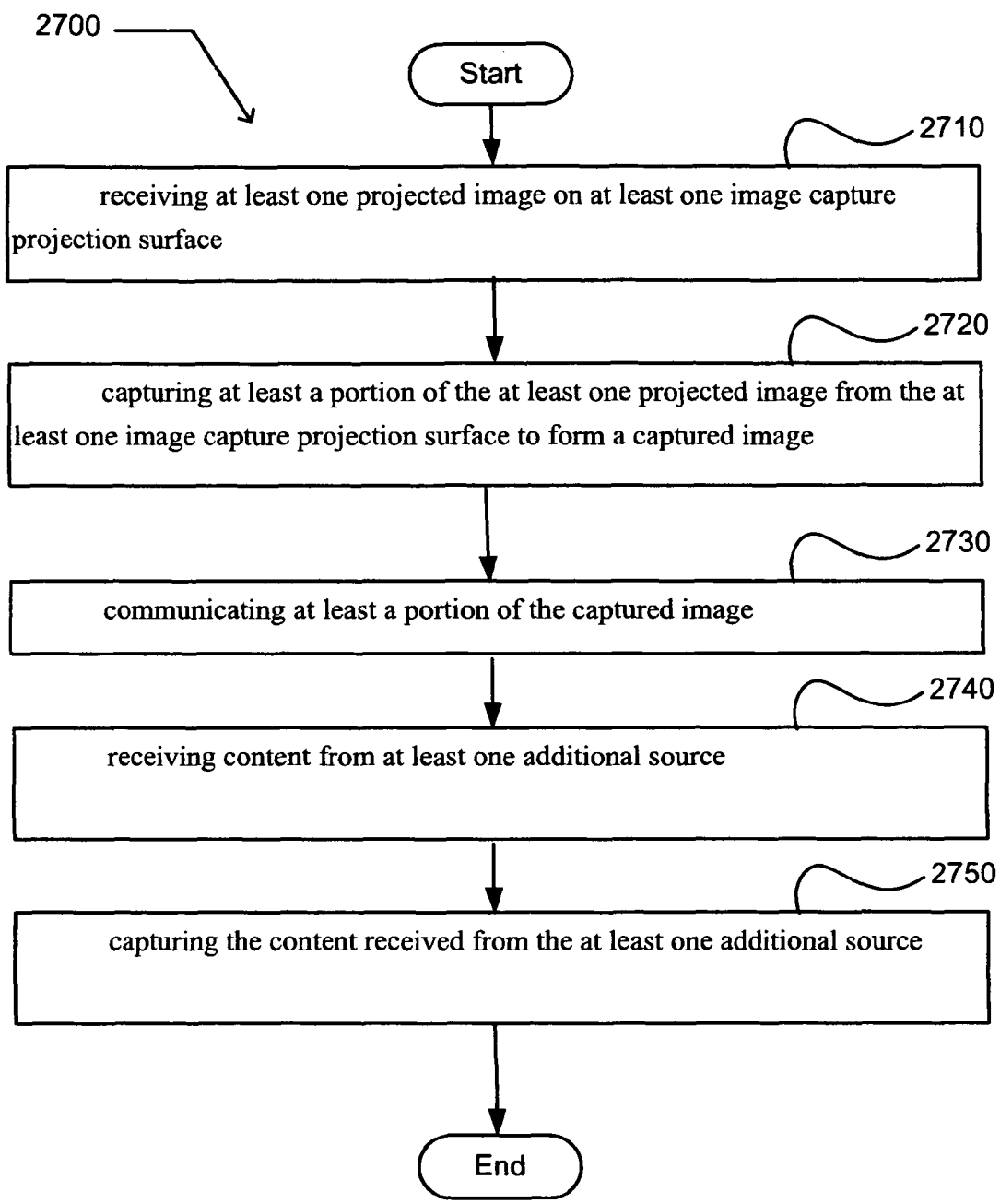
FIG. 27 illustrates an operational flow representing example operations related to receiving at least one projected image on at least one image capture projection surface; capturing at least a portion of the at least one projected image from the at least one image capture projection surface to form a captured image; communicating at least a portion of the captured image; receiving content from at least one additional source; and capturing the content received from the at least one additional source.

In FIG. 27 and in following figures that include various examples of operations used during performance of various methods, discussion and explanation may be provided with respect to any one or combination of the above-described examples of FIGS. 1-10, and/or with respect to other examples and contexts. In some embodiments, operations 2510, 2520, 2530 and 2540 of FIG. 25 may correspond to operations 2710, 2720, 2730 and 2740 of FIG. 27. However, it should be understood that the operations may be executed in a number of other environments and contexts, and/or modified versions of FIGS. 1-10. Also, although the various operations are presented in the sequence(s) illustrated, it should be understood that the various operations may be performed in other orders than those which are illustrated, or may be performed concurrently.

After a start operation, the operational flow 2700 includes a receiving operation 2710 involving receiving at least one projected image on at least one image capture projection surface. In some embodiments, one or more image capture projection surfaces 166 may receive at least one projected image on at least one image capture projection surface. In some embodiments, one or more image capture projection surfaces 166 may receive at least one projected image projected from one or more projectors 164. In some embodiments, two or more image capture projection surfaces 166 may receive at least one projected image. In some embodiments, one or more image capture projection surfaces 166 may receive at least one projected image acquired from electronic or wireless communication such as via one or more communications networks 128 or one or more user communications devices 112. In some embodiments, one or more image capture projection surfaces 166 may receive at least one projected image in accordance with one or more user instructions from one or more users 110 or financial transactions. In some embodiments, one or more image capture projection surfaces 166 may receive at least one projected image in accordance with one or more user attributes of one or more users 110. In some embodiments, one or more image capture projection surfaces 166 may receive at least one projected image in accordance with one or more user attributes of one or more users 110 obtained from a history, a setting, a proximity determination, a sensor, a security parameter, a membership parameter, an account parameter, a status parameter, a group parameter, an ownership parameter, a role parameter, a capability parameter, a rights parameter, a service parameter, an activity parameter, a privilege parameter, a familial characteristic, a physical characteristic, an individualized parameter, or a contextualized parameter. In some embodiments, one or more image capture projection surfaces 166 may receive at least one projected image where the one or more image capture projection surfaces 166 are associated with a structure or device. In some embodiments, one or more image capture projection surfaces 166 may receive at least one projected image where the one or more image capture projection surfaces 166 are associated with a structure or device such as a tablet, a handheld device, a vehicle, a table, a wall, a desk, or a writing surface. In some embodiments, one or more image capture projection surfaces 166 may receive at least one projected image that relates to user-specified content from one or more users 110. In some embodiments, one or more image capture projection surfaces 166 may receive at least one projected image that relates to user-specified content such as legal content, educational content, healthcare content, business content, or personal content. In some embodiments, one or more image capture projection surfaces 166 may receive at least one projected image as a video. In some embodiments, one or more image capture projection surfaces 166 may receive at least one projected image in association with audio content. For example, in some embodiments, an image capture projection surface 166 may be a writing surface at a grocery checkout stand and a projected image may be a grocery receipt for signature. Alternatively, in some embodiments, an image capture projection surface 166 may be a wall mounted surface at a coffee shop and a projected image may be a business presentation. Also, in some embodiments, an image capture projection surface 166 may be a surface on a vehicle console and a projected image may be a menu for controlling vehicle component operations such as music, visual entertainment, climate control, seat placement, or security. Additionally, in some embodiments, an image capture projection surface 166 may be an instructional board for educational endeavors and a projected image may be educational subject matter.

After a start operation, the operational flow 2700 includes a capture operation 2720 involving capturing at least a portion of the at least one projected image from the at least one image capture projection surface to form a captured image. In some embodiments, one or more image capture modules 172 may capture at least a portion of the at least one projected image from the at least one image capture projection surface to form a captured image. In some embodiments, one or more image capture modules 172 may capture at least a portion of one or more projected images from one or more image capture projection surfaces 166. In some embodiments, one or more projection surface control units 179 may control one or more image capture modules 172 to capture at least a portion of one or more projected images from one or more image capture projection surfaces 166. In some embodiments, one or more projection surface control units 179 may receive control instructions from one or more surface memory 179D, from one or more memory 174, from one or more device interface modules 176, from one or more user interfaces 178, from one or more projectors 164, from one or more sensors 156, from one or more service provider modules 130, from one or more financial entities 122, from one or more user communications devices 112, or through one or more communications networks 128. In some embodiments, one or more image capture modules 172 may capture at least a portion of one or more projected images from two or more image capture projection surfaces 166. In some embodiments, one or more image capture modules 172 may capture at least a portion of one or more projected images in accordance with one or more user attributes of one or more users 110. In some embodiments, one or more image capture modules 172 may capture at least a portion of one or more projected images in accordance with one or more user attributes of one or more users 110 obtained from a history, a setting, a proximity determination, a sensor, a security parameter, a membership parameter, an account parameter, a status parameter, a group parameter, an ownership parameter, a role parameter, a capability parameter, a rights parameter, a service parameter, an activity parameter, a privilege parameter, a familial characteristic, a physical characteristic, an individualized parameter, or a contextualized parameter. In some embodiments, one or more image capture modules 172 may capture at least a portion of one or more projected images in accordance with one or more user instructions from one or more users 110. In some embodiments, one or more image capture modules 172 may capture at least a portion of one or more projected images in accordance with one or more physical instruction or one or more electronic instruction from one or more users 110. In some embodiments, one or more image capture modules 172 may capture at least a portion of one or more projected images in accordance with one or more financial transactions. In some embodiments, one or more image capture modules 172 may capture at least a portion of one or more projected images using full imaging 172A, optical scanning 172L, or mechanical scanning 172AB. In some embodiments, one or more image capture modules 172 may capture at least a portion of one or more projected images as video. In some embodiments, one or more image capture modules 172 may capture at least a portion of one or more projected images in association with audio content captured using one or more audio/data capture modules 182. In some embodiments, one or more image capture modules 172 may capture at least a portion of one or more projected images in accordance with one or more user-specified accounts such as from one or more user data accounts 152, one or more service provider modules 130, or one or more financial entities 122. In some embodiments, one or more image capture modules 172 may capture at least a portion of one or more projected images in association with user input or content from another source. For example, in some embodiments, an image capture module 172 may capture a projected grocery receipt from a writing surface at a grocery checkout stand. The image capture module 172 may further capture a signature provided through user input on a writing surface having a projected grocery receipt. Alternatively, in some embodiments, an image capture module 172 may capture a projected business presentation slide or series of slides from a wall mounted surface at a coffee shop. In some embodiments, the image capture module 172 may further capture writing provided from user input on a wall mounted surface having a projected business presentation. In some embodiments, the audio/data capture module 182 may further capture electronic data or files associated with a projected business presentation slide from one or more user communications devices 112, one or more memory 174, one or more service provider modules 130, one or more sensors 156, or through one or more electronic communications networks 128. Also, in some embodiments, an image capture module 172 may capture user input on a menu from a surface on a vehicle console. Additionally, in some embodiments, an image capture module 172 may capture educational subject matter from an instructional board. In some embodiments, the image capture module 172 may further capture writing provided from user input on an educational board having educational subject matter.

After a start operation, the operational flow 2700 includes a communication operation 2730 involving communicating at least a portion of the captured image. In some embodiments, one or more image capture modules 172 may communicate at least a portion of the captured image. In some embodiments, one or more projection surface control units 179 may communicate at least a portion of one or more captured images. In some embodiments, one or more captured images may be communicated using one or more device interface modules 176. In some embodiments, one or more captured images may be communicated using one or more user interfaces 178. In some embodiments, one or more captured images may be communicated using one or more communications networks 128. In some embodiments, one or more captured images may be communicated to one or more user communications devices 112. In some embodiments, one or more captured images may be communicated to one or more service provider modules 130. In some embodiments, one or more captured images may be communicated to one or more financial entities 122. In some embodiments, one or more captured images may be communicated to one or more sensors 156. In some embodiments, one or more captured images may be communicated to one or more projectors 164. In some embodiments, one or more captured images may be communicated in accordance with one or more user instructions, user attributes, or financial transactions. In some embodiments, one or more captured images may be communicated in accordance with one or more physical instructions or electronic instructions. In some embodiments, one or more captured images may be communicated using electronic communication. In some embodiments, one or more captured images may be communicated using wireless communication. In some embodiments, one or more captured images may be communicated to one or more memory, hardware devices, software applications, user devices, printers, monitor displays, or projectors 164. In some embodiments, one or more captured images may be communicated to two or more memory, hardware devices, software applications, user devices, printers, monitor displays, or projectors. In some embodiments, one or more captured images may be communicated in association with audio content. For example, in some embodiments, a captured grocery receipt and signature may be communicated to one or more email accounts, store accounts, printers, user devices, or the like of one or more users 110. Alternatively, in some embodiments, a captured business presentation slide, series of slides, writing, and/or associated data or files may be communicated to one or more user communications devices 112, email accounts, file locations, printers, projectors, or the like. Also, in some embodiments, captured user input on a menu from a surface on a vehicle console may be communicated to one or more corresponding systems for control. Additionally, in some embodiments, captured educational subject matter and writing may be communicated to one or more desk displays, email accounts, file locations, projectors 164, printers, or internet websites.

After a start operation, the operational flow 2700 includes a receiving operation 2740 involving receiving content from at least one additional source. In some embodiments, one or more image capture projection surfaces 166 may receive content from at least one additional source. In some embodiments, one or more image capture projection surfaces 166 may receive one or more content from one or more sources. In some embodiments, one or more image capture modules 172 may receive one or more content from one or more sources. In some embodiments, one or more memory 174 may receive one or more content from one or more sources. In some embodiments, one or more projection surface control units 179 may receive one or more content from one or more sources. In some embodiments, one or more device interface modules 176 may receive one or more content from one or more sources. In some embodiments, one or more user interfaces 178 may receive one or more content from one or more sources. In some embodiments, one or more audio/data capture modules 182 may receive one or more content from one or more sources. In some embodiments, one or more projectors 164 may receive one or more content from one or more sources. In some embodiments, one or more sensors 156 may receive one or more content from one or more sources. In some embodiments, one or more communications networks 128 may receive one or more content from one or more sources. In some embodiments, one or more service provider modules 130 may receive one or more content from one or more sources. In some embodiments, one or more user communications devices 112 may receive one or more content from one or more sources. In some embodiments, one or more users 110 may receive one or more content from one or more sources. In some embodiments, one or more content may be received from one or more users 110. In some embodiments, one or more content may be received from one or more user communications devices 112. In some embodiments, one or more content may be received from one or more service provider modules 130. In some embodiments, one or more content may be received from one or more financial entities 122. In some embodiments, one or more content may be received from one or more communications networks 128. In some embodiments, one or more content may be received from one or more sensors 156. In some embodiments, one or more content may be received from one or more projectors 164. In some embodiments, one or more content may be received from one or more user data accounts 152. In some embodiments, one or more content may be received from one or more image capture projection surfaces 166. In some embodiments, one or more content may be received from one or more device interface modules 176. In some embodiments, one or more content may be received from one or more user interfaces 178. In some embodiments, one or more content may be received from one or more audio/data capture modules 182. In some embodiments, one or more content may be received from one or more projection surface control units 179. In some embodiments, one or more content may be received from one or more memory 174. In some embodiments, one or more content may be received from one or more image capture modules 172. In some embodiments, two or more locations may receive one or more content from one or more sources. In some embodiments, one or more content from one or more sources may be received from electronic or wireless communication such as via one or more communications networks 128 or one or more user communications devices 112. In some embodiments, one or more content from one or more sources may be received in accordance with one or more user instructions from one or more users 110 or financial transactions. In some embodiments, one or more content from one or more sources may be received in accordance with one or more user attributes of one or more users 110. In some embodiments, one or more content from one or more sources may be received in accordance with one or more user attributes of one or more users 110 obtained from a history, a setting, a proximity determination, a sensor, a security parameter, a membership parameter, an account parameter, a status parameter, a group parameter, an ownership parameter, a role parameter, a capability parameter, a rights parameter, a service parameter, an activity parameter, a privilege parameter, a familial characteristic, a physical characteristic, an individualized parameter, or a contextualized parameter. In some embodiments, one or more content from one or more sources may be received that relates to user-specified content from one or more users 110. In some embodiments, one or more content from one or more sources may be received that relates to user-specified content such as legal content, educational content, healthcare content, business content, or personal content. In some embodiments, one or more content from one or more sources may be received as a video. In some embodiments, one or more content from one or more sources may be received in association with audio content. For example, in some embodiments, one or more content may be user account information from one or more user data accounts 152 that relates to a receipt and signature captured at a grocery checkout stand. In some embodiments, one or more content may be a data file from one or more user communications devices 112 referenced by notes and a business presentation captured on a wall mounted surface at a coffee shop. In some embodiments, one or more content may be program instructions from one or more memory 174 for implementing a menu selection captured on a vehicle console. In some embodiments, one or more content may be a course assignment or suggest reading from one or more service provider modules 130 that relates to lecture notes captured from an instructional board. In some embodiments, one or more content may be a file attachment from one or more communications networks 128 that relates to a document captured on a desktop device.

After a start operation, the operational flow 2700 includes a capturing operation 2750 involving capturing the content received from the at least one additional source. In some embodiments, one or more image capture modules 172 may capture the content received from the at least one additional source. In some embodiments, one or more image capture modules 172 may capture one or more content. In some embodiments, one or more audio/data capture modules 182 may capture one or more content. In some embodiments, one or more projection surface control units 179 may control one or more image capture modules 172 to capture one or more content. In some embodiments, one or more projection surface control units 179 may control one or more audio/data capture modules 182 to capture one or more content. In some embodiments, one or more projection surface control units 179 may receive control instructions from one or more surface memory 179D, from one or more memory 174, from one or more device interface modules 176, from one or more user interfaces 178, from one or more projectors 164, from one or more sensors 156, from one or more service provider modules 130, from one or more financial entities 122, from one or more user communications devices 112, or through one or more communications networks 128. In some embodiments, one or more image capture modules 172 or audio/data capture modules 182 may capture one or more content from two or more image capture projection surfaces 166. In some embodiments, one or more image capture modules 172 or one or more audio/data capture modules 182 may capture one or more content from one or more user communications devices 112, users 110, service provider modules 130, communications networks 128, sensors 156, or projectors 164. In some embodiments, one or more image capture modules 172 or audio/data capture modules 182 may capture one or more content in accordance with one or more user attributes of one or more users 110. In some embodiments, one or more image capture modules 172 or audio/data capture modules 182 may capture one or more content in accordance with one or more user attributes of one or more users 110 obtained from a history, a setting, a proximity determination, a sensor, a security parameter, a membership parameter, an account parameter, a status parameter, a group parameter, an ownership parameter, a role parameter, a capability parameter, a rights parameter, a service parameter, an activity parameter, a privilege parameter, a familial characteristic, a physical characteristic, an individualized parameter, or a contextualized parameter. In some embodiments, one or more image capture modules 172 or audio/data capture modules 182 may capture one or more content in accordance with one or more user instructions from one or more users 110. In some embodiments, one or more image capture modules 172 or audio/data capture modules 182 may capture one or more content in accordance with one or more physical instruction or one or more electronic instruction from one or more users 110. In some embodiments, one or more image capture modules 172 or audio/data capture modules 182 may capture one or more content in accordance with one or more financial transactions. In some embodiments, one or more image capture modules 172 or audio/data capture modules 182 may capture one or more content using full imaging 172A, optical scanning 172L, or mechanical scanning 172AB. In some embodiments, one or more image capture modules 172 or audio/data capture modules 182 may capture one or more content as video. In some embodiments, one or more image capture modules 172 or audio/data capture modules 182 may capture one or more content in association with audio content captured using one or more audio/data capture modules 182. In some embodiments, one or more image capture modules 172 or audio/data capture modules 182 may capture one or more content in accordance with one or more user-specified accounts such as from one or more user data accounts 152, one or more service provider modules 130, or one or more financial entities 122. In some embodiments, one or more image capture modules 172 or audio/data capture modules 182 may capture one or more content in association with user input or content from another source. For example, in some embodiments, one or more content may be user account information from one or more user data accounts 152 that relates to a receipt and signature captured at a grocery checkout stand. In some embodiments, one or more content may be a data file from one or more user communications devices 112 referenced by notes and a business presentation captured on a wall mounted surface at a coffee shop. In some embodiments, one or more content may be program instructions from one or more memory 174 for implementing a menu selection captured on a vehicle console. In some embodiments, one or more content may be a course assignment or suggest reading from one or more service provider modules 130 that relates to lecture notes captured from an instructional board. In some embodiments, one or more content may be a file attachment from one or more communications networks 128 that relates to a document captured on a desktop device.

Figure 28:
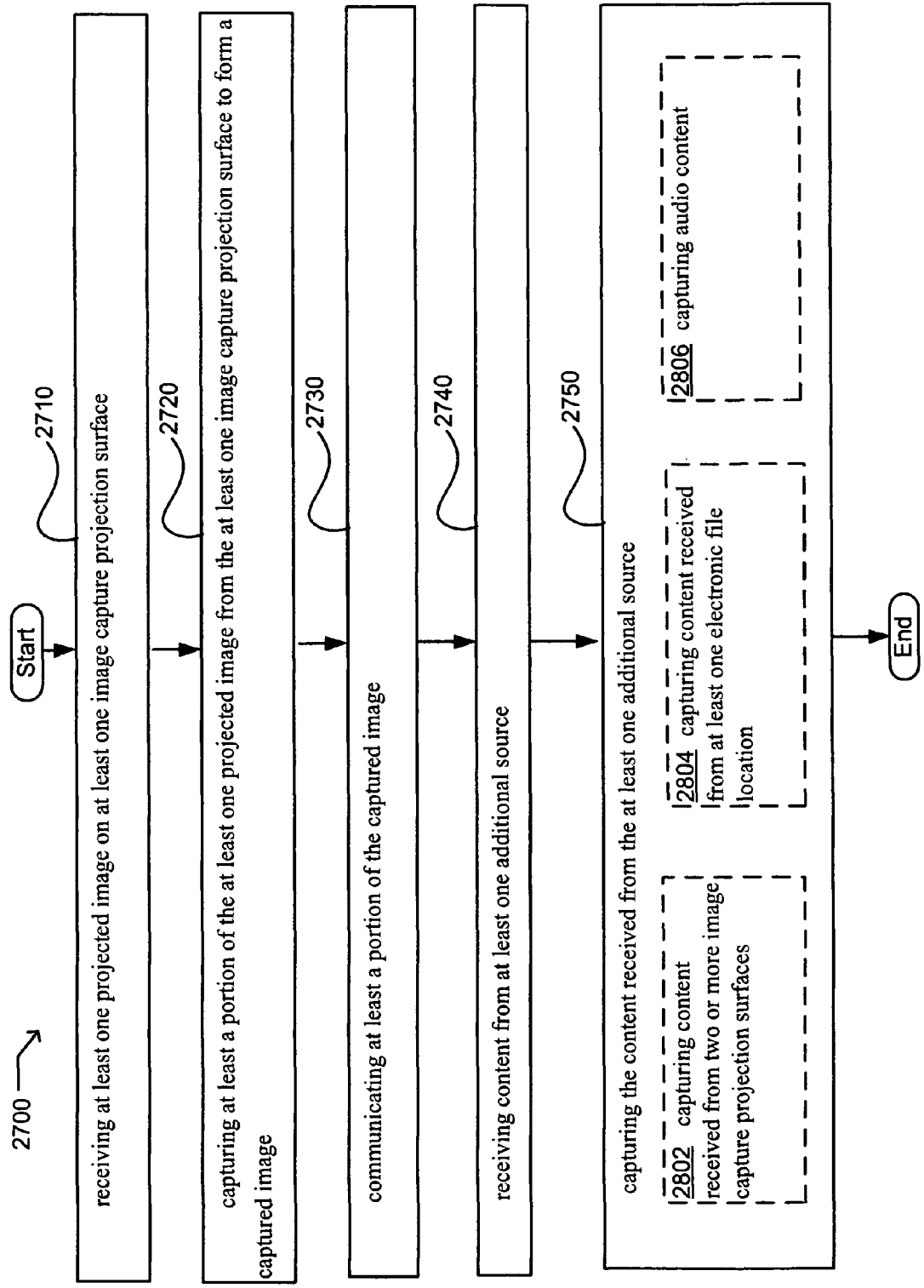
FIG. 28 illustrates alternative embodiments of the example operation flow of FIG. 27.

FIG. 28 illustrates alternative embodiments of the example operational flow 2700 of FIG. 27. FIG. 28 illustrates example embodiments where the capturing operation 2750 may include at least one additional operation. Additional operations may include an operation 2802, an operation 2804, and/or an operation 2806.

At operation 2802, the capturing operation 2750 may include capturing content received from two or more image capture projection surfaces. In some embodiments, one or more image capture modules 172 may capture content received from two or more image capture projection surfaces. In some embodiments, one or more image capture modules 172 or one or more audio/data capture modules 182 may capture content from two or more image capture projection surfaces 166. For example, in some embodiments, content may include one or more captured images from two or more image capture projection surfaces 166. In some embodiments, content may include one or more audio from two or more image capture projection surfaces 166. In some embodiments, content may include one or more videos from two or more image capture projection surfaces 166. In some embodiments, content may include one or more user input from two or more image capture projection surfaces 166. In some embodiments, content may be similar from two or more image capture projection surfaces 166. In some embodiments, content may be different from two or more image capture projection surfaces 166.

At operation 2804, the capturing operation 2750 may include capturing content received from at least one electronic file location. In some embodiments, one or more audio/data capture modules 182 may capture content received from at least one electronic file location. In some embodiments, one or more image capture modules 172 or one or more audio/data capture modules 182 may capture content from one or more memory 174. In some embodiments, one or more image capture modules 172 or one or more audio/data capture modules 182 may capture content using one or more device interface modules 176. In some embodiments, one or more image capture modules 172 or one or more audio/data capture modules 182 may capture content using one or more user interfaces 178. In some embodiments, one or more image capture modules 172 or one or more audio/data capture modules 182 may capture content from one or more user communications devices 112. In some embodiments, one or more image capture modules 172 or one or more audio/data capture modules 182 may capture content from one or more users 110. In some embodiments, one or more image capture modules 172 or one or more audio/data capture modules 182 may capture content from one or more service provider modules 130. In some embodiments, one or more image capture modules 172 or one or more audio/data capture modules 182 may capture content from one or more sensors 156. In some embodiments, one or more image capture modules 172 or one or more audio/data capture modules 182 may capture content from one or more projectors 164. In some embodiments, one or more image capture modules 172 or one or more audio/data capture modules 182 may capture content from one or more communications networks 128. For example, in some embodiments, one or more electronic files may be located on a portable device. In some embodiments, one or more electronic files may be located in local memory. In some embodiments, one or more electronic files may be located on the internet.

At operation 2806, the capturing operation 2750 may include capturing audio content. In some embodiments, one or more audio/data capture modules 182 may capture audio content. In some embodiments, one or more image capture modules 172 or one or more audio/data capture modules 182 may capture audio content from one or more memory 174. In some embodiments, one or more image capture modules 172 or one or more audio/data capture modules 182 may capture audio content from one or more device interface modules 176. In some embodiments, one or more image capture modules 172 or one or more audio/data capture modules 182 may capture audio content from one or more user interfaces 178. In some embodiments, one or more image capture modules 172 or one or more audio/data capture modules 182 may capture audio content from one or more projectors 164. In some embodiments, one or more image capture modules 172 or one or more audio/data capture modules 182 may capture audio content from one or more sensors 156. In some embodiments, one or more image capture modules 172 or one or more audio/data capture modules 182 may capture audio content from one or more communications networks 128. In some embodiments, one or more image capture modules 172 or one or more audio/data capture modules 182 may capture audio content from one or more service provider modules 130. In some embodiments, one or more image capture modules 172 or one or more audio/data capture modules 182 may capture audio content from one or more user communications devices 112. In some embodiments, one or more image capture modules 172 or one or more audio/data capture modules 182 may capture audio content from one or more users 110. For example, in some embodiments, audio content may be ambient sound proximate to one or more projectors 164. In some embodiments, audio content may be speech. In some embodiments, audio content may be music. In some embodiments, audio content may be a soundtrack. In some embodiments, audio content may be a sound effect.

Figure 29:
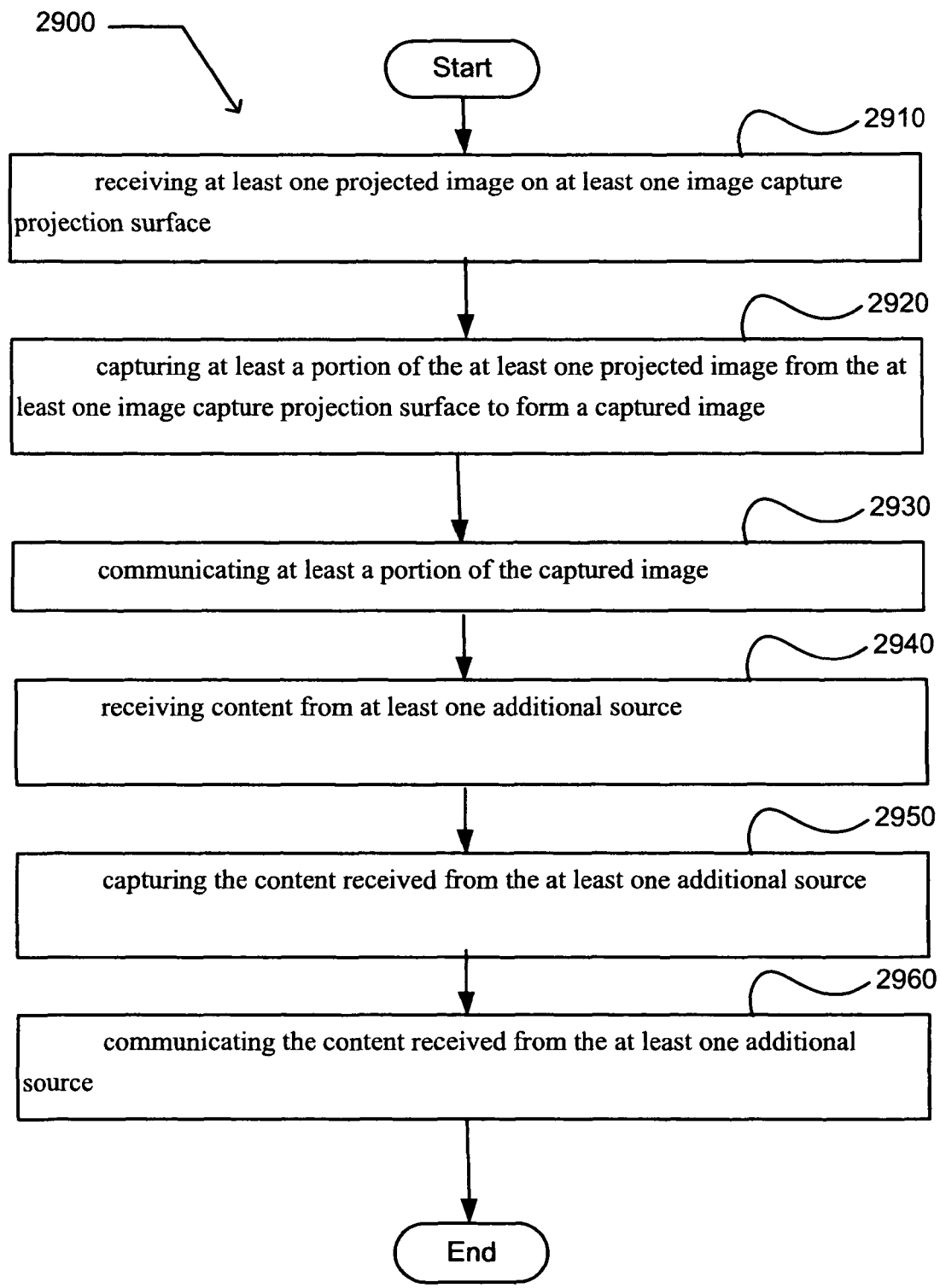
FIG. 29 illustrates an operational flow representing example operations related to receiving at least one projected image on at least one image capture projection surface; capturing at least a portion of the at least one projected image from the at least one image capture projection surface to form a captured image; communicating at least a portion of the captured image; receiving content from at least one additional source; capturing the content received from the at least one additional source; and communicating the content received from the at least one additional source.

In FIG. 29 and in following figures that include various examples of operations used during performance of various methods, discussion and explanation may be provided with respect to any one or combination of the above-described examples of FIGS. 1-10, and/or with respect to other examples and contexts. In some embodiments, operations 2710, 2720, 2730, 2740 and 2750 of FIG. 27 may correspond to operations 2910, 2920, 2930, 2940 and 2950 of FIG. 29. However, it should be understood that the operations may be executed in a number of other environments and contexts, and/or modified versions of FIGS. 1-10. Also, although the various operations are presented in the sequence(s) illustrated, it should be understood that the various operations may be performed in other orders than those which are illustrated, or may be performed concurrently.

After a start operation, the operational flow 2900 includes a receiving operation 2910 involving receiving at least one projected image on at least one image capture projection surface. In some embodiments, one or more image capture projection surfaces 166 may receive at least one projected image on at least one image capture projection surface. In some embodiments, one or more image capture projection surfaces 166 may receive at least one projected image projected from one or more projectors 164. In some embodiments, two or more image capture projection surfaces 166 may receive at least one projected image. In some embodiments, one or more image capture projection surfaces 166 may receive at least one projected image acquired from electronic or wireless communication such as via one or more communications networks 128 or one or more user communications devices 112. In some embodiments, one or more image capture projection surfaces 166 may receive at least one projected image in accordance with one or more user instructions from one or more users 110 or financial transactions. In some embodiments, one or more image capture projection surfaces 166 may receive at least one projected image in accordance with one or more user attributes of one or more users 110. In some embodiments, one or more image capture projection surfaces 166 may receive at least one projected image in accordance with one or more user attributes of one or more users 110 obtained from a history, a setting, a proximity determination, a sensor, a security parameter, a membership parameter, an account parameter, a status parameter, a group parameter, an ownership parameter, a role parameter, a capability parameter, a rights parameter, a service parameter, an activity parameter, a privilege parameter, a familial characteristic, a physical characteristic, an individualized parameter, or a contextualized parameter. In some embodiments, one or more image capture projection surfaces 166 may receive at least one projected image where the one or more image capture projection surfaces 166 are associated with a structure or device. In some embodiments, one or more image capture projection surfaces 166 may receive at least one projected image where the one or more image capture projection surfaces 166 are associated with a structure or device such as a tablet, a handheld device, a vehicle, a table, a wall, a desk, or a writing surface. In some embodiments, one or more image capture projection surfaces 166 may receive at least one projected image that relates to user-specified content from one or more users 110. In some embodiments, one or more image capture projection surfaces 166 may receive at least one projected image that relates to user-specified content such as legal content, educational content, healthcare content, business content, or personal content. In some embodiments, one or more image capture projection surfaces 166 may receive at least one projected image as a video. In some embodiments, one or more image capture projection surfaces 166 may receive at least one projected image in association with audio content. For example, in some embodiments, an image capture projection surface 166 may be a writing surface at a grocery checkout stand and a projected image may be a grocery receipt for signature. Alternatively, in some embodiments, an image capture projection surface 166 may be a wall mounted surface at a coffee shop and a projected image may be a business presentation. Also, in some embodiments, an image capture projection surface 166 may be a surface on a vehicle console and a projected image may be a menu for controlling vehicle component operations such as music, visual entertainment, climate control, seat placement, or security. Additionally, in some embodiments, an image capture projection surface 166 may be an instructional board for educational endeavors and a projected image may be educational subject matter.

After a start operation, the operational flow 2900 includes a capture operation 2920 involving capturing at least a portion of the at least one projected image from the at least one image capture projection surface to form a captured image. In some embodiments, one or more image capture modules 172 may capture at least a portion of the at least one projected image from the at least one image capture projection surface to form a captured image. In some embodiments, one or more image capture modules 172 may capture at least a portion of one or more projected images from one or more image capture projection surfaces 166. In some embodiments, one or more projection surface control units 179 may control one or more image capture modules 172 to capture at least a portion of one or more projected images from one or more image capture projection surfaces 166. In some embodiments, one or more projection surface control units 179 may receive control instructions from one or more surface memory 179D, from one or more memory 174, from one or more device interface modules 176, from one or more user interfaces 178, from one or more projectors 164, from one or more sensors 156, from one or more service provider modules 130, from one or more financial entities 122, from one or more user communications devices 112, or through one or more communications networks 128. In some embodiments, one or more image capture modules 172 may capture at least a portion of one or more projected images from two or more image capture projection surfaces 166. In some embodiments, one or more image capture modules 172 may capture at least a portion of one or more projected images in accordance with one or more user attributes of one or more users 110. In some embodiments, one or more image capture modules 172 may capture at least a portion of one or more projected images in accordance with one or more user attributes of one or more users 110 obtained from a history, a setting, a proximity determination, a sensor, a security parameter, a membership parameter, an account parameter, a status parameter, a group parameter, an ownership parameter, a role parameter, a capability parameter, a rights parameter, a service parameter, an activity parameter, a privilege parameter, a familial characteristic, a physical characteristic, an individualized parameter, or a contextualized parameter. In some embodiments, one or more image capture modules 172 may capture at least a portion of one or more projected images in accordance with one or more user instructions from one or more users 110. In some embodiments, one or more image capture modules 172 may capture at least a portion of one or more projected images in accordance with one or more physical instruction or one or more electronic instruction from one or more users 110. In some embodiments, one or more image capture modules 172 may capture at least a portion of one or more projected images in accordance with one or more financial transactions. In some embodiments, one or more image capture modules 172 may capture at least a portion of one or more projected images using full imaging 172A, optical scanning 172L, or mechanical scanning 172AB. In some embodiments, one or more image capture modules 172 may capture at least a portion of one or more projected images as video. In some embodiments, one or more image capture modules 172 may capture at least a portion of one or more projected images in association with audio content captured using one or more audio/data capture modules 182. In some embodiments, one or more image capture modules 172 may capture at least a portion of one or more projected images in accordance with one or more user-specified accounts such as from one or more user data accounts 152, one or more service provider modules 130, or one or more financial entities 122. In some embodiments, one or more image capture modules 172 may capture at least a portion of one or more projected images in association with user input or content from another source. For example, in some embodiments, an image capture module 172 may capture a projected grocery receipt from a writing surface at a grocery checkout stand. The image capture module 172 may further capture a signature provided through user input on a writing surface having a projected grocery receipt. Alternatively, in some embodiments, an image capture module 172 may capture a projected business presentation slide or series of slides from a wall mounted surface at a coffee shop. In some embodiments, the image capture module 172 may further capture writing provided from user input on a wall mounted surface having a projected business presentation. In some embodiments, the audio/data capture module 182 may further capture electronic data or files associated with a projected business presentation slide from one or more user communications devices 112, one or more memory 174, one or more service provider modules 130, one or more sensors 156, or through one or more electronic communications networks 128. Also, in some embodiments, an image capture module 172 may capture user input on a menu from a surface on a vehicle console. Additionally, in some embodiments, an image capture module 172 may capture educational subject matter from an instructional board. In some embodiments, the image capture module 172 may further capture writing provided from user input on an educational board having educational subject matter.

After a start operation, the operational flow 2900 includes a communication operation 2930 involving communicating at least a portion of the captured image. In some embodiments, one or more image capture modules 172 may communicate at least a portion of the captured image. In some embodiments, one or more projection surface control units 179 may communicate at least a portion of one or more captured images. In some embodiments, one or more captured images may be communicated using one or more device interface modules 176. In some embodiments, one or more captured images may be communicated using one or more user interfaces 178. In some embodiments, one or more captured images may be communicated using one or more communications networks 128. In some embodiments, one or more captured images may be communicated to one or more user communications devices 112. In some embodiments, one or more captured images may be communicated to one or more service provider modules 130. In some embodiments, one or more captured images may be communicated to one or more financial entities 122. In some embodiments, one or more captured images may be communicated to one or more sensors 156. In some embodiments, one or more captured images may be communicated to one or more projectors 164. In some embodiments, one or more captured images may be communicated in accordance with one or more user instructions, user attributes, or financial transactions. In some embodiments, one or more captured images may be communicated in accordance with one or more physical instructions or electronic instructions. In some embodiments, one or more captured images may be communicated using electronic communication. In some embodiments, one or more captured images may be communicated using wireless communication. In some embodiments, one or more captured images may be communicated to one or more memory, hardware devices, software applications, user devices, printers, monitor displays, or projectors 164. In some embodiments, one or more captured images may be communicated to two or more memory, hardware devices, software applications, user devices, printers, monitor displays, or projectors. In some embodiments, one or more captured images may be communicated in association with audio content. For example, in some embodiments, a captured grocery receipt and signature may be communicated to one or more email accounts, store accounts, printers, user devices, or the like of one or more users 110. Alternatively, in some embodiments, a captured business presentation slide, series of slides, writing, and/or associated data or files may be communicated to one or more user communications devices 112, email accounts, file locations, printers, projectors, or the like. Also, in some embodiments, captured user input on a menu from a surface on a vehicle console may be communicated to one or more corresponding systems for control. Additionally, in some embodiments, captured educational subject matter and writing may be communicated to one or more desk displays, email accounts, file locations, projectors 164, printers, or internet websites.

After a start operation, the operational flow 2900 includes a receiving operation 2940 involving receiving content from at least one additional source. In some embodiments, one or more image capture projection surfaces 166 may receive content from at least one additional source. In some embodiments, one or more image capture projection surfaces 166 may receive one or more content from one or more sources. In some embodiments, one or more image capture modules 172 may receive one or more content from one or more sources. In some embodiments, one or more memory 174 may receive one or more content from one or more sources. In some embodiments, one or more projection surface control units 179 may receive one or more content from one or more sources. In some embodiments, one or more device interface modules 176 may receive one or more content from one or more sources. In some embodiments, one or more user interfaces 178 may receive one or more content from one or more sources. In some embodiments, one or more audio/data capture modules 182 may receive one or more content from one or more sources. In some embodiments, one or more projectors 164 may receive one or more content from one or more sources. In some embodiments, one or more sensors 156 may receive one or more content from one or more sources. In some embodiments, one or more communications networks 128 may receive one or more content from one or more sources. In some embodiments, one or more service provider modules 130 may receive one or more content from one or more sources. In some embodiments, one or more user communications devices 112 may receive one or more content from one or more sources. In some embodiments, one or more users 110 may receive one or more content from one or more sources. In some embodiments, one or more content may be received from one or more users 110. In some embodiments, one or more content may be received from one or more user communications devices 112. In some embodiments, one or more content may be received from one or more service provider modules 130. In some embodiments, one or more content may be received from one or more financial entities 122. In some embodiments, one or more content may be received from one or more communications networks 128. In some embodiments, one or more content may be received from one or more sensors 156. In some embodiments, one or more content may be received from one or more projectors 164. In some embodiments, one or more content may be received from one or more user data accounts 152. In some embodiments, one or more content may be received from one or more image capture projection surfaces 166. In some embodiments, one or more content may be received from one or more device interface modules 176. In some embodiments, one or more content may be received from one or more user interfaces 178. In some embodiments, one or more content may be received from one or more audio/data capture modules 182. In some embodiments, one or more content may be received from one or more projection surface control units 179. In some embodiments, one or more content may be received from one or more memory 174. In some embodiments, one or more content may be received from one or more image capture modules 172. In some embodiments, two or more locations may receive one or more content from one or more sources. In some embodiments, one or more content from one or more sources may be received from electronic or wireless communication such as via one or more communications networks 128 or one or more user communications devices 112. In some embodiments, one or more content from one or more sources may be received in accordance with one or more user instructions from one or more users 110 or financial transactions. In some embodiments, one or more content from one or more sources may be received in accordance with one or more user attributes of one or more users 110. In some embodiments, one or more content from one or more sources may be received in accordance with one or more user attributes of one or more users 110 obtained from a history, a setting, a proximity determination, a sensor, a security parameter, a membership parameter, an account parameter, a status parameter, a group parameter, an ownership parameter, a role parameter, a capability parameter, a rights parameter, a service parameter, an activity parameter, a privilege parameter, a familial characteristic, a physical characteristic, an individualized parameter, or a contextualized parameter. In some embodiments, one or more content from one or more sources may be received that relates to user-specified content from one or more users 110. In some embodiments, one or more content from one or more sources may be received that relates to user-specified content such as legal content, educational content, healthcare content, business content, or personal content. In some embodiments, one or more content from one or more sources may be received as a video. In some embodiments, one or more content from one or more sources may be received in association with audio content. For example, in some embodiments, one or more content may be user account information from one or more user data accounts 152 that relates to a receipt and signature captured at a grocery checkout stand. In some embodiments, one or more content may be a data file from one or more user communications devices 112 referenced by notes and a business presentation captured on a wall mounted surface at a coffee shop. In some embodiments, one or more content may be program instructions from one or more memory 174 for implementing a menu selection captured on a vehicle console. In some embodiments, one or more content may be a course assignment or suggest reading from one or more service provider modules 130 that relates to lecture notes captured from an instructional board. In some embodiments, one or more content may be a file attachment from one or more communications networks 128 that relates to a document captured on a desktop device.

After a start operation, the operational flow 2900 includes a capturing operation 2950 involving capturing the content received from the at least one additional source. In some embodiments, one or more image capture modules 172 may capture the content received from the at least one additional source. In some embodiments, one or more image capture modules 172 may capture one or more content. In some embodiments, one or more audio/data capture modules 182 may capture one or more content. In some embodiments, one or more projection surface control units 179 may control one or more image capture modules 172 to capture one or more content. In some embodiments, one or more projection surface control units 179 may control one or more audio/data capture modules 182 to capture one or more content. In some embodiments, one or more projection surface control units 179 may receive control instructions from one or more surface memory 179D, from one or more memory 174, from one or more device interface modules 176, from one or more user interfaces 178, from one or more projectors 164, from one or more sensors 156, from one or more service provider modules 130, from one or more financial entities 122, from one or more user communications devices 112, or through one or more communications networks 128. In some embodiments, one or more image capture modules 172 or audio/data capture modules 182 may capture one or more content from two or more image capture projection surfaces 166. In some embodiments, one or more image capture modules 172 or one or more audio/data capture modules 182 may capture one or more content from one or more user communications devices 112, users 110, service provider modules 130, communications networks 128, sensors 156, or projectors 164. In some embodiments, one or more image capture modules 172 or audio/data capture modules 182 may capture one or more content in accordance with one or more user attributes of one or more users 110. In some embodiments, one or more image capture modules 172 or audio/data capture modules 182 may capture one or more content in accordance with one or more user attributes of one or more users 110 obtained from a history, a setting, a proximity determination, a sensor, a security parameter, a membership parameter, an account parameter, a status parameter, a group parameter, an ownership parameter, a role parameter, a capability parameter, a rights parameter, a service parameter, an activity parameter, a privilege parameter, a familial characteristic, a physical characteristic, an individualized parameter, or a contextualized parameter. In some embodiments, one or more image capture modules 172 or audio/data capture modules 182 may capture one or more content in accordance with one or more user instructions from one or more users 110. In some embodiments, one or more image capture modules 172 or audio/data capture modules 182 may capture one or more content in accordance with one or more physical instruction or one or more electronic instruction from one or more users 110. In some embodiments, one or more image capture modules 172 or audio/data capture modules 182 may capture one or more content in accordance with one or more financial transactions. In some embodiments, one or more image capture modules 172 or audio/data capture modules 182 may capture one or more content using full imaging 172A, optical scanning 172L, or mechanical scanning 172AB. In some embodiments, one or more image capture modules 172 or audio/data capture modules 182 may capture one or more content as video. In some embodiments, one or more image capture modules 172 or audio/data capture modules 182 may capture one or more content in association with audio content captured using one or more audio/data capture modules 182. In some embodiments, one or more image capture modules 172 or audio/data capture modules 182 may capture one or more content in accordance with one or more user-specified accounts such as from one or more user data accounts 152, one or more service provider modules 130, or one or more financial entities 122. In some embodiments, one or more image capture modules 172 or audio/data capture modules 182 may capture one or more content in association with user input or content from another source. For example, in some embodiments, one or more content may be user account information from one or more user data accounts 152 that relates to a receipt and signature captured at a grocery checkout stand. In some embodiments, one or more content may be a data file from one or more user communications devices 112 referenced by notes and a business presentation captured on a wall mounted surface at a coffee shop. In some embodiments, one or more content may be program instructions from one or more memory 174 for implementing a menu selection captured on a vehicle console. In some embodiments, one or more content may be a course assignment or suggest reading from one or more service provider modules 130 that relates to lecture notes captured from an instructional board. In some embodiments, one or more content may be a file attachment from one or more communications networks 128 that relates to a document captured on a desktop device.

After a start operation, the operational flow 2900 includes a communicating operation 2960 involving communicating the content received from the at least one additional source. In some embodiments, one or more image capture modules 172 may communicate the content received from the at least one additional source. In some embodiments, one or more image capture modules 172 or audio/data capture modules 182 may communicate one or more content. In some embodiments, one or more projection surface control units 179 may communicate one or more content. In some embodiments, one or more content may be communicated using one or more device interface modules 176. In some embodiments, one or more content may be communicated using one or more user interfaces 178. In some embodiments, one or more content may be communicated using one or more communications networks 128. In some embodiments, one or more content may be communicated to one or more user communications devices 112. In some embodiments, one or more content may be communicated to one or more service provider modules 130. In some embodiments, one or more content may be communicated to one or more financial entities 122. In some embodiments, one or more content may be communicated to one or more sensors 156. In some embodiments, one or more content may be communicated to one or more projectors 164. In some embodiments, one or more content may be communicated in accordance with one or more user instructions, user attributes, or financial transactions. In some embodiments, one or more content may be communicated in accordance with one or more physical instructions or electronic instructions. In some embodiments, one or more content may be communicated using electronic communication. In some embodiments, one or more content may be communicated using wireless communication. In some embodiments, one or more content may be communicated to one or more memory, hardware devices, software applications, user devices, printers, monitor displays, or projectors 164. In some embodiments, one or more content may be communicated to two or more memory, hardware devices, software applications, user devices, printers, monitor displays, or projectors. In some embodiments, one or more content may be communicated in association with audio content. For example, in some embodiments, user account information that relates to a signature and a grocery receipt may be communicated to one or more email accounts, store accounts, printers, user devices, or the like of one or more users 110. Also, in some embodiments, program instructions for implementing a menu selection may be communicated to one or more corresponding systems for control. Additionally, a file attachment that relates to a document may be communicated to one or more desk displays, email accounts, file locations, projectors 164, printers, or internet websites.

Figure 30:
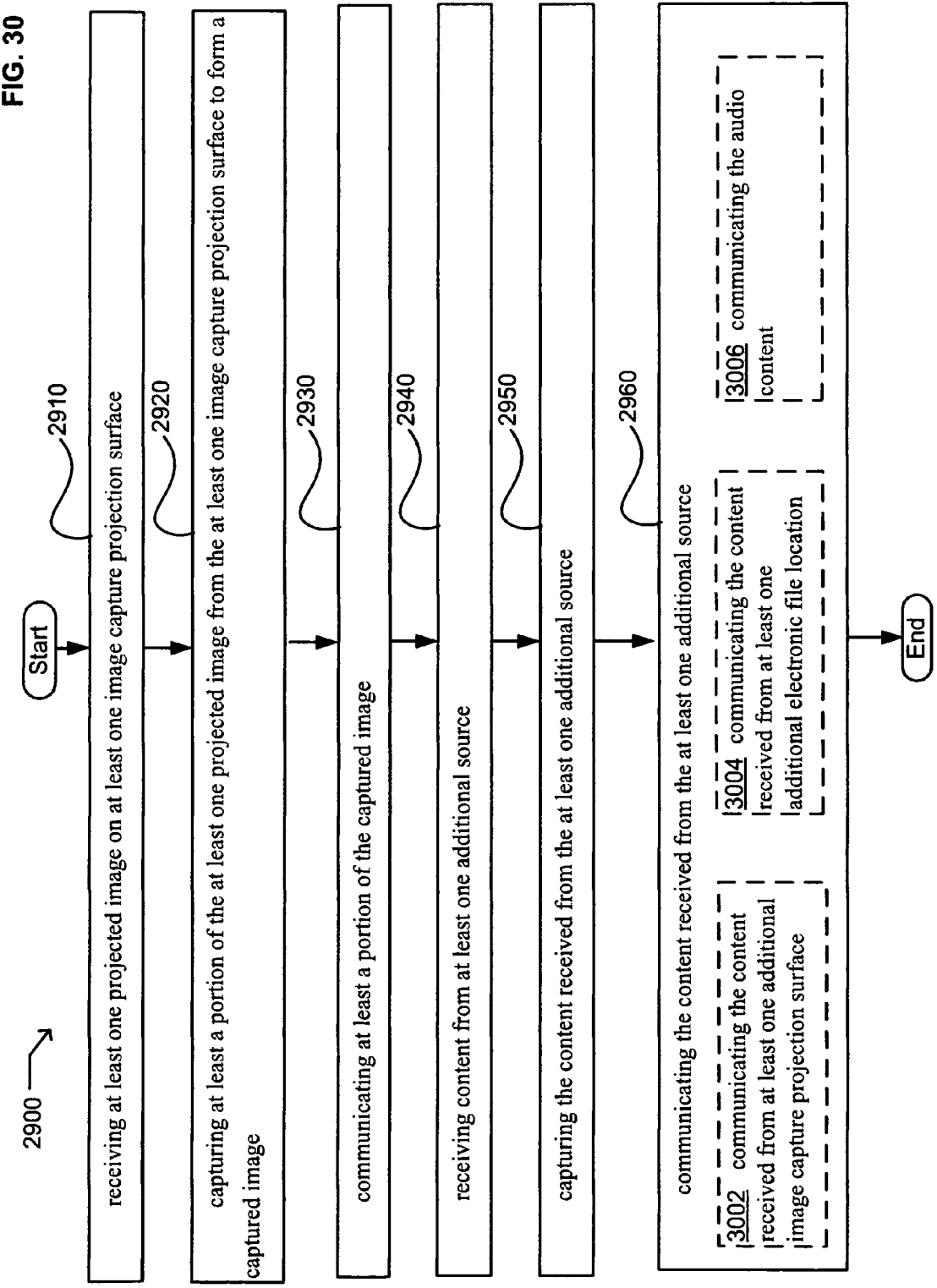
FIG. 30 illustrates alternative embodiments of the example operation flow of FIG. 29.

FIG. 30 illustrates alternative embodiments of the example operational flow 2900 of FIG. 29. FIG. 30 illustrates example embodiments where the communicating operation 2960 may include at least one additional operation. Additional operations may include an operation 3002, an operation 3004, and/or an operation 3006.

At operation 3002, the communicating operation 2960 may include communicating the content received from at least one additional image capture projection surface. In some embodiments, one or more image capture modules 172 may communicate the content received from at least one additional image capture projection surface. In some embodiments, one or more image capture modules 172 or audio/data capture modules 182 may communicate one or more content received from one or more additional projection surfaces 166. In some embodiments, one or more projection surface control units 179 may communicate one or more content received from one or more additional projection surfaces 166. In some embodiments, one or more content may be communicated to one or more memory 174. In some embodiments, one or more content may be communicated using one or more device interface modules 176. In some embodiments, one or more content may be communicated using one or more user interfaces 178. In some embodiments, one or more content may be communicated to one or more projectors 164. In some embodiments, one or more content may be communicated to one or more user communications devices 112. In some embodiments, one or more content may be communicated to one or more service provider modules 130. In some embodiments, one or more content may be communicated to one or more sensors 156. In some embodiments, one or more content may be communicated to one or more communications networks 128. In some embodiments, one or more content may be communicated to one or more financial entities 122. For example, in some embodiments, an image, a video, audio, user input, or other content may be communicated.

At operation 3004, the communicating operation 2960 may include communicating the content received from at least one additional electronic file location. In some embodiments, one or more audio/data capture modules 182 may communicate the content received from at least one additional electronic file location. In some embodiments, one or more image capture modules 172 or audio/data capture modules 182 may communicate one or more content received from one or more electronic file locations. In some embodiments, one or more projection surface control units 179 may communicate one or more content received from one or more electronic file locations. In some embodiments, one or more content received from one or more electronic file locations may be communicated to one or more memory 174. In some embodiments, one or more content received from one or more electronic file locations may be communicated using one or more device interface modules 176. In some embodiments, one or more content received from one or more electronic file locations may be communicated using one or more user interfaces 178. In some embodiments, one or more content received from one or more electronic file locations may be communicated to one or more projectors 164. In some embodiments, one or more content received from one or more electronic file locations may be communicated to one or more user communications devices 112. In some embodiments, one or more content received from one or more electronic file locations may be communicated to one or more service provider modules 130. In some embodiments, one or more content received from one or more electronic file locations may be communicated to one or more sensors 156. In some embodiments, one or more content received from one or more electronic file locations may be communicated to one or more communications networks 128. In some embodiments, one or more content received from one or more electronic file locations may be communicated to one or more financial entities 122. For example, in some embodiments, an image, a video, audio, user input, application file, program instructions, email, document, link, data, or other content may be communicated.

At operation 3006, the communicating operation 2960 may include communicating audio content. In some embodiments, one or more audio/data capture modules 182 may communicate the audio content. In some embodiments, one or more image capture modules 172 or audio/data capture modules 182 may communicate one or more audio content. In some embodiments, one or more projection surface control units 179 may communicate one or more audio content. In some embodiments, one or more content audio content may be communicated to one or more memory 174. In some embodiments, one or more audio content may be communicated using one or more device interface modules 176. In some embodiments, one or more audio content may be communicated using one or more user interfaces 178. In some embodiments, one or more audio content may be communicated to one or more projectors 164. In some embodiments, one or more audio content may be communicated to one or more user communications devices 112. In some embodiments, one or more audio content may be communicated to one or more service provider modules 130. In some embodiments, one or more audio content may be communicated to one or more sensors 156. In some embodiments, one or more audio content may be communicated to one or more communications networks 128. In some embodiments, one or more audio content may be communicated to one or more financial entities 122. For example, in some embodiments, speech, music, a soundtrack, a sound effect, or ambient noise may be communicated.

Figure 31:
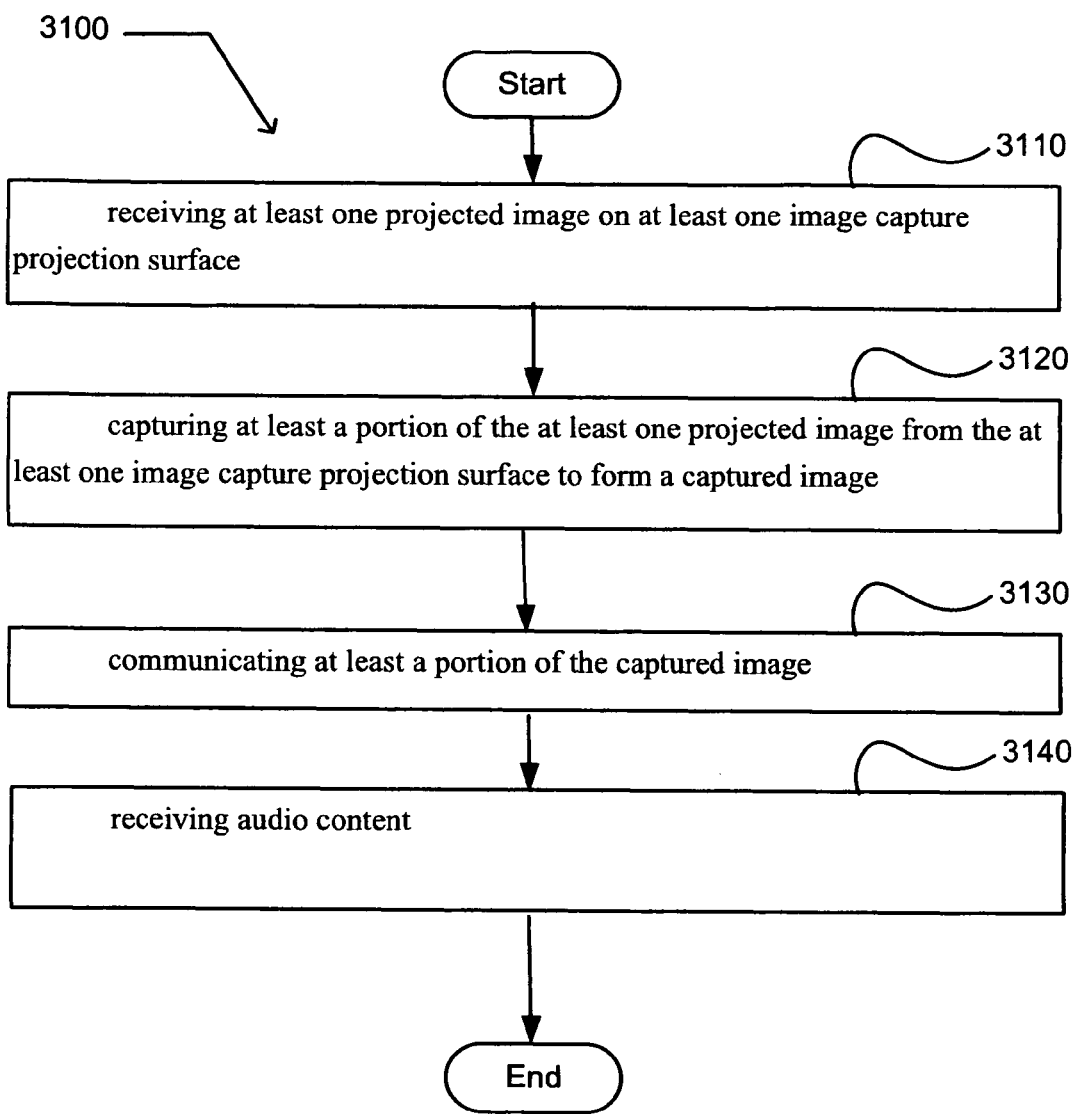
FIG. 31 illustrates an operational flow representing example operations related to receiving at least one projected image on at least one image capture projection surface; capturing at least a portion of the at least one projected image from the at least one image capture projection surface to form a captured image; communicating at least a portion of the captured image; and receiving audio content.

In FIG. 31 and in following figures that include various examples of operations used during performance of various methods, discussion and explanation may be provided with respect to any one or combination of the above-described examples of FIGS. 1-10, and/or with respect to other examples and contexts. In some embodiments, operations 1110, 1120 and 1130 of FIG. 11 may correspond to operations 3110, 3120 and 3130 of FIG. 31. However, it should be understood that the operations may be executed in a number of other environments and contexts, and/or modified versions of FIGS. 1-10. Also, although the various operations are presented in the sequence(s) illustrated, it should be understood that the various operations may be performed in other orders than those which are illustrated, or may be performed concurrently.

After a start operation, the operational flow 3100 includes a receiving operation 3110 involving receiving at least one projected image on at least one image capture projection surface. In some embodiments, one or more image capture projection surfaces 166 may receive at least one projected image on at least one image capture projection surface. In some embodiments, one or more image capture projection surfaces 166 may receive at least one projected image projected from one or more projectors 164. In some embodiments, two or more image capture projection surfaces 166 may receive at least one projected image. In some embodiments, one or more image capture projection surfaces 166 may receive at least one projected image acquired from electronic or wireless communication such as via one or more communications networks 128 or one or more user communications devices 112. In some embodiments, one or more image capture projection surfaces 166 may receive at least one projected image in accordance with one or more user instructions from one or more users 110 or financial transactions. In some embodiments, one or more image capture projection surfaces 166 may receive at least one projected image in accordance with one or more user attributes of one or more users 110. In some embodiments, one or more image capture projection surfaces 166 may receive at least one projected image in accordance with one or more user attributes of one or more users 110 obtained from a history, a setting, a proximity determination, a sensor, a security parameter, a membership parameter, an account parameter, a status parameter, a group parameter, an ownership parameter, a role parameter, a capability parameter, a rights parameter, a service parameter, an activity parameter, a privilege parameter, a familial characteristic, a physical characteristic, an individualized parameter, or a contextualized parameter. In some embodiments, one or more image capture projection surfaces 166 may receive at least one projected image where the one or more image capture projection surfaces 166 are associated with a structure or device. In some embodiments, one or more image capture projection surfaces 166 may receive at least one projected image where the one or more image capture projection surfaces 166 are associated with a structure or device such as a tablet, a handheld device, a vehicle, a table, a wall, a desk, or a writing surface. In some embodiments, one or more image capture projection surfaces 166 may receive at least one projected image that relates to user-specified content from one or more users 110. In some embodiments, one or more image capture projection surfaces 166 may receive at least one projected image that relates to user-specified content such as legal content, educational content, healthcare content, business content, or personal content. In some embodiments, one or more image capture projection surfaces 166 may receive at least one projected image as a video. In some embodiments, one or more image capture projection surfaces 166 may receive at least one projected image in association with audio content. For example, in some embodiments, an image capture projection surface 166 may be a writing surface at a grocery checkout stand and a projected image may be a grocery receipt for signature. Alternatively, in some embodiments, an image capture projection surface 166 may be a wall mounted surface at a coffee shop and a projected image may be a business presentation. Also, in some embodiments, an image capture projection surface 166 may be a surface on a vehicle console and a projected image may be a menu for controlling vehicle component operations such as music, visual entertainment, climate control, seat placement, or security. Additionally, in some embodiments, an image capture projection surface 166 may be an instructional board for educational endeavors and a projected image may be educational subject matter.

After a start operation, the operational flow 3100 includes a capture operation 3120 involving capturing at least a portion of the at least one projected image from the at least one image capture projection surface to form a captured image. In some embodiments, one or more image capture modules 172 may capture at least a portion of the at least one projected image from the at least one image capture projection surface to form a captured image. In some embodiments, one or more image capture modules 172 may capture at least a portion of one or more projected images from one or more image capture projection surfaces 166. In some embodiments, one or more projection surface control units 179 may control one or more image capture modules 172 to capture at least a portion of one or more projected images from one or more image capture projection surfaces 166. In some embodiments, one or more projection surface control units 179 may receive control instructions from one or more surface memory 179D, from one or more memory 174, from one or more device interface modules 176, from one or more user interfaces 178, from one or more projectors 164, from one or more sensors 156, from one or more service provider modules 130, from one or more financial entities 122, from one or more user communications devices 112, or through one or more communications networks 128. In some embodiments, one or more image capture modules 172 may capture at least a portion of one or more projected images from two or more image capture projection surfaces 166. In some embodiments, one or more image capture modules 172 may capture at least a portion of one or more projected images in accordance with one or more user attributes of one or more users 110. In some embodiments, one or more image capture modules 172 may capture at least a portion of one or more projected images in accordance with one or more user attributes of one or more users 110 obtained from a history, a setting, a proximity determination, a sensor, a security parameter, a membership parameter, an account parameter, a status parameter, a group parameter, an ownership parameter, a role parameter, a capability parameter, a rights parameter, a service parameter, an activity parameter, a privilege parameter, a familial characteristic, a physical characteristic, an individualized parameter, or a contextualized parameter. In some embodiments, one or more image capture modules 172 may capture at least a portion of one or more projected images in accordance with one or more user instructions from one or more users 110. In some embodiments, one or more image capture modules 172 may capture at least a portion of one or more projected images in accordance with one or more physical instruction or one or more electronic instruction from one or more users 110. In some embodiments, one or more image capture modules 172 may capture at least a portion of one or more projected images in accordance with one or more financial transactions. In some embodiments, one or more image capture modules 172 may capture at least a portion of one or more projected images using full imaging 172A, optical scanning 172L, or mechanical scanning 172AB. In some embodiments, one or more image capture modules 172 may capture at least a portion of one or more projected images as video. In some embodiments, one or more image capture modules 172 may capture at least a portion of one or more projected images in association with audio content captured using one or more audio/data capture modules 182. In some embodiments, one or more image capture modules 172 may capture at least a portion of one or more projected images in accordance with one or more user-specified accounts such as from one or more user data accounts 152, one or more service provider modules 130, or one or more financial entities 122. In some embodiments, one or more image capture modules 172 may capture at least a portion of one or more projected images in association with user input or content from another source. For example, in some embodiments, an image capture module 172 may capture a projected grocery receipt from a writing surface at a grocery checkout stand. The image capture module 172 may further capture a signature provided through user input on a writing surface having a projected grocery receipt. Alternatively, in some embodiments, an image capture module 172 may capture a projected business presentation slide or series of slides from a wall mounted surface at a coffee shop. In some embodiments, the image capture module 172 may further capture writing provided from user input on a wall mounted surface having a projected business presentation. In some embodiments, the audio/data capture module 182 may further capture electronic data or files associated with a projected business presentation slide from one or more user communications devices 112, one or more memory 174, one or more service provider modules 130, one or more sensors 156, or through one or more electronic communications networks 128. Also, in some embodiments, an image capture module 172 may capture user input on a menu from a surface on a vehicle console. Additionally, in some embodiments, an image capture module 172 may capture educational subject matter from an instructional board. In some embodiments, the image capture module 172 may further capture writing provided from user input on an educational board having educational subject matter.

After a start operation, the operational flow 3100 includes a communication operation 3130 involving communicating at least a portion of the captured image. In some embodiments, one or more image capture modules 172 may communicate at least a portion of the captured image. In some embodiments, one or more projection surface control units 179 may communicate at least a portion of one or more captured images. In some embodiments, one or more captured images may be communicated using one or more device interface modules 176. In some embodiments, one or more captured images may be communicated using one or more user interfaces 178. In some embodiments, one or more captured images may be communicated using one or more communications networks 128. In some embodiments, one or more captured images may be communicated to one or more user communications devices 112. In some embodiments, one or more captured images may be communicated to one or more service provider modules 130. In some embodiments, one or more captured images may be communicated to one or more financial entities 122. In some embodiments, one or more captured images may be communicated to one or more sensors 156. In some embodiments, one or more captured images may be communicated to one or more projectors 164. In some embodiments, one or more captured images may be communicated in accordance with one or more user instructions, user attributes, or financial transactions. In some embodiments, one or more captured images may be communicated in accordance with one or more physical instructions or electronic instructions. In some embodiments, one or more captured images may be communicated using electronic communication. In some embodiments, one or more captured images may be communicated using wireless communication. In some embodiments, one or more captured images may be communicated to one or more memory, hardware devices, software applications, user devices, printers, monitor displays, or projectors 164. In some embodiments, one or more captured images may be communicated to two or more memory, hardware devices, software applications, user devices, printers, monitor displays, or projectors. In some embodiments, one or more captured images may be communicated in association with audio content. For example, in some embodiments, a captured grocery receipt and signature may be communicated to one or more email accounts, store accounts, printers, user devices, or the like of one or more users 110. Alternatively, in some embodiments, a captured business presentation slide, series of slides, writing, and/or associated data or files may be communicated to one or more user communications devices 112, email accounts, file locations, printers, projectors, or the like. Also, in some embodiments, captured user input on a menu from a surface on a vehicle console may be communicated to one or more corresponding systems for control. Additionally, in some embodiments, captured educational subject matter and writing may be communicated to one or more desk displays, email accounts, file locations, projectors 164, printers, or internet websites.

After a start operation, the operational flow 3100 includes a receiving operation 3140 involving receiving audio content. In some embodiments, one or more audio/data capture modules 182 may receive audio content. In some embodiments, one or more image capture modules 172 or audio/data capture modules 182 may receive audio content. In some embodiments, one or more projection surface control units 179 may receive audio content. In some embodiments, one or more device interface modules 176 may receive audio content. In some embodiments, one or more user interfaces 178 may receive audio content. In some embodiments, one or more image capture projection surfaces 166 may receive audio content. In some embodiments, one or more projectors 164 may receive audio content. In some embodiments, one or more sensors 156 may receive audio content. In some embodiments, one or more service provider modules 130 may receive audio content. In some embodiments, one or more user communications devices 112 may receive audio content. In some embodiments, audio content may be received from one or more users 152. In some embodiments, audio content may be received from one or more user communications devices 112. In some embodiments, audio content may be received from one or more service provider modules 130. In some embodiments, audio content may be received from one or more communications networks 128. In some embodiments, audio content may be received from one or more sensors 156. In some embodiments, audio content may be received from one or more projectors 164. In some embodiments, audio content may be received from one or more image capture projection surfaces 166. In some embodiments, audio content may be received from one or more memory 174. In some embodiments, audio content may be received from one or more device interface modules 176. In some embodiments, audio content may be received from one or more user interfaces 178. In some embodiments, audio content may be received from one or more image capture modules 172. In some embodiments, audio content may be received from one or more audio/data capture modules 182. In some embodiments, two or more locations may receive audio content. In some embodiments, audio content may be received from electronic or wireless communication such as via one or more communications networks 128 or one or more user communications devices 112. In some embodiments, audio content may be received in accordance with one or more user instructions from one or more users 110 or financial transactions. In some embodiments, audio content may be received in accordance with one or more user attributes of one or more users 110. In some embodiments, audio content may be received in accordance with one or more user attributes of one or more users 110 obtained from a history, a setting, a proximity determination, a sensor, a security parameter, a membership parameter, an account parameter, a status parameter, a group parameter, an ownership parameter, a role parameter, a capability parameter, a rights parameter, a service parameter, an activity parameter, a privilege parameter, a familial characteristic, a physical characteristic, an individualized parameter, or a contextualized parameter. In some embodiments, audio content may be received that relates to user-specified content from one or more users 110. In some embodiments, audio content may be received that relates to user-specified content such as legal content, educational content, healthcare content, business content, or personal content. In some embodiments, audio content may be received in association with a video. In some embodiments, audio content may be received in association with additional audio content. For example, in some embodiments, audio content may be verbal instructions for taking a medication prescribed on a captured prescription. In some embodiments, audio content may be participant questions and speaker answers associated with a captured business presentation. In some embodiments, audio content may be supplemental instructor comments associated with captured classroom board notes. In some embodiments, audio content may be a soundtrack to a captured video. In some embodiments, audio content may be a verbal acceptance of a captured agreement. In some embodiments, audio content may be an explanation of an answer on a captured test answer. In some embodiments, audio content may be a question relating to a captured bill or statement.

Figure 32:
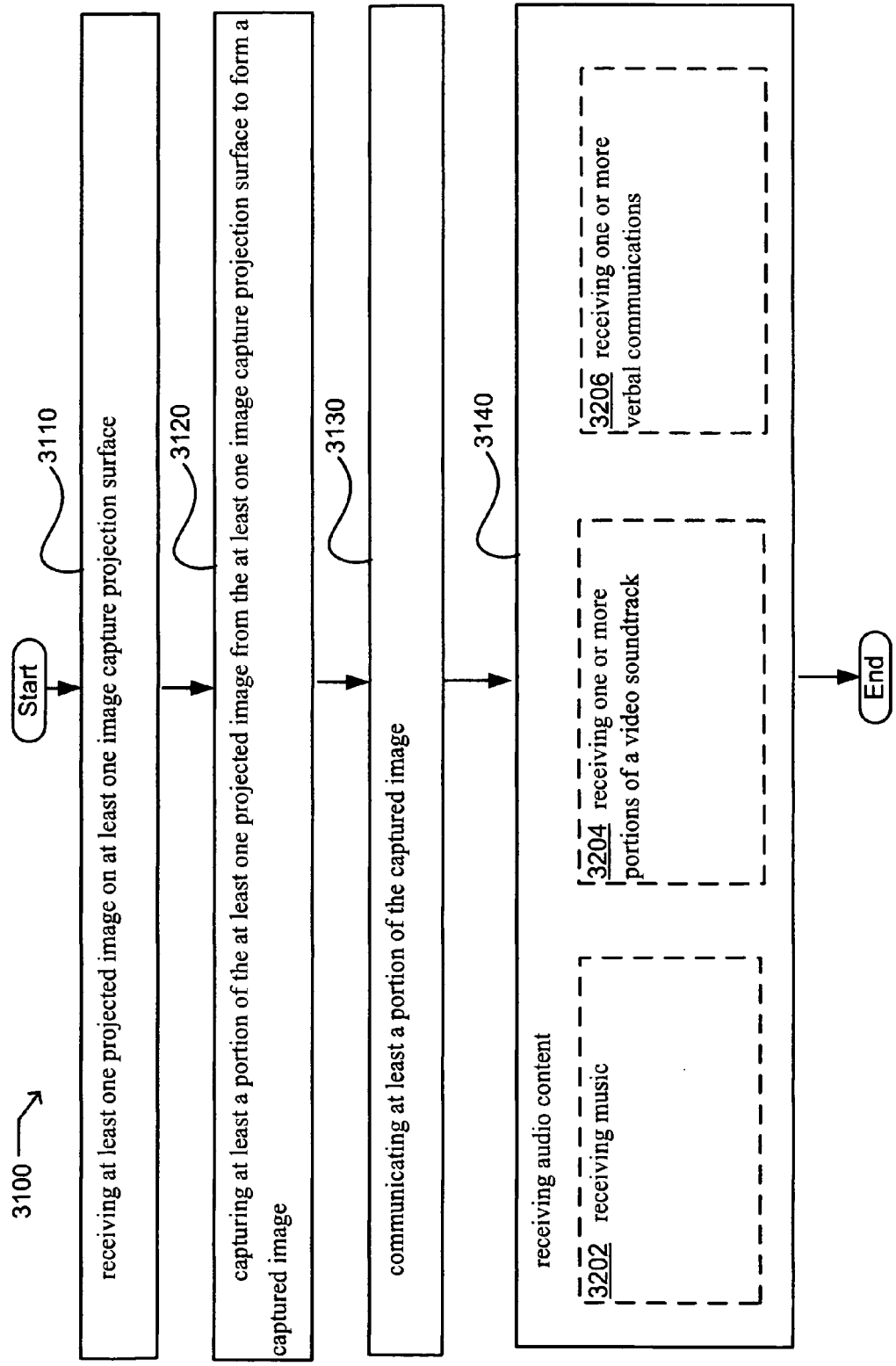
FIG. 32 illustrates alternative embodiments of the example operation flow of FIG. 31.

FIG. 32 illustrates alternative embodiments of the example operational flow 3100 of FIG. 31. FIG. 32 illustrates example embodiments where the receiving operation 3140 may include at least one additional operation. Additional operations may include an operation 3202, an operation 3204, and/or an operation 3206.

At operation 3202, the receiving operation 3140 may include receiving music. In some embodiments, one or more audio/data capture modules 182 may receive music. In some embodiments, one or more audio/data capture modules 182 may receive music from one or more device interface modules 176. In some embodiments, one or more audio/data capture modules 182 may receive music from one or more user interfaces 178. In some embodiments, one or more audio/data capture modules 182 may receive music from one or more memory 174. In some embodiments, one or more audio/data capture modules 182 may receive music from one or more projectors 164. In some embodiments, one or more audio/data capture modules 182 may receive music from one or more sensors 156. In some embodiments, one or more audio/data capture modules 182 may receive music from one or more communications networks 128. In some embodiments, one or more audio/data capture modules 182 may receive music from one or more service provider modules 130. In some embodiments, one or more audio/data capture modules 182 may receive music from one or more user communications devices 112. In some embodiments, one or more audio/data capture modules 182 may receive music from one or more users 110. For example, in some embodiments, music may be a song from one or more users 110. In some embodiments, music may be a song associated with a captured music video. In some embodiments, music may be background music for a projected presentation.

At operation 3204, the receiving operation 3140 may include receiving one or more portions of a video soundtrack. In some embodiments, one or more audio/data capture modules 182 may receive one or more portions of a video soundtrack. In some embodiments, one or more audio/data capture modules 182 may receive one or more portions of a video soundtrack from one or more device interface modules 176. In some embodiments, one or more audio/data capture modules 182 may receive one or more portions of a video soundtrack from one or more user interfaces 178. In some embodiments, one or more audio/data capture modules 182 may receive one or more portions of a video soundtrack from one or more memory 174. In some embodiments, one or more audio/data capture modules 182 may receive one or more portions of a video soundtrack from one or more projectors 164. In some embodiments, one or more audio/data capture modules 182 may receive one or more portions of a video soundtrack from one or more sensors 156. In some embodiments, one or more audio/data capture modules 182 may receive one or more portions of a video soundtrack from one or more communications networks 128. In some embodiments, one or more audio/data capture modules 182 may receive one or more portions of a video soundtrack from one or more service provider modules 130. In some embodiments, one or more audio/data capture modules 182 may receive one or more portions of a video soundtrack from one or more user communications devices 112. In some embodiments, one or more audio/data capture modules 182 may receive one or more portions of a video soundtrack from one or more users 110. For example, in some embodiments, one or more portions of a video soundtrack may be a soundtrack associated with a captured video, television show, or film. In some embodiments, one or more portions of a video soundtrack may be commentary of a captured video. In some embodiments, one or more portions of a video soundtrack may be commentary by one or more audience members of a captured video. In some embodiments, one or more portions of a video soundtrack may be commentary by one or more directors of a captured video.

At operation 3206, the receiving operation 3140 may include receiving one or more verbal communications. In some embodiments, one or more audio/data capture modules 182 may receive one or more verbal communications. In some embodiments, one or more audio/data capture modules 182 may receive one or more verbal communications from one or more device interface modules 176. In some embodiments, one or more audio/data capture modules 182 may receive one or more verbal communications from one or more user interfaces 178. In some embodiments, one or more audio/data capture modules 182 may receive one or more verbal communications from one or more memory 174. In some embodiments, one or more audio/data capture modules 182 may receive one or more verbal communications from one or more projectors 164. In some embodiments, one or more audio/data capture modules 182 may receive one or more verbal communications from one or more sensors 156. In some embodiments, one or more audio/data capture modules 182 may receive one or more verbal communications from one or more communications networks 128. In some embodiments, one or more audio/data capture modules 182 may receive one or more verbal communications from one or more service provider modules 130. In some embodiments, one or more audio/data capture modules 182 may receive one or more verbal communications from one or more user communications devices 112. In some embodiments, one or more audio/data capture modules 182 may receive one or more verbal communications from one or more users 110. For example, in some embodiments, one or more verbal communications may be an explanation relating to a captured image. In some embodiments, one or more verbal communications may be an instruction for a communication or storage action related to a captured image. In some embodiments, one or more verbal communications may be commentary relating to a captured image.

Figure 33:
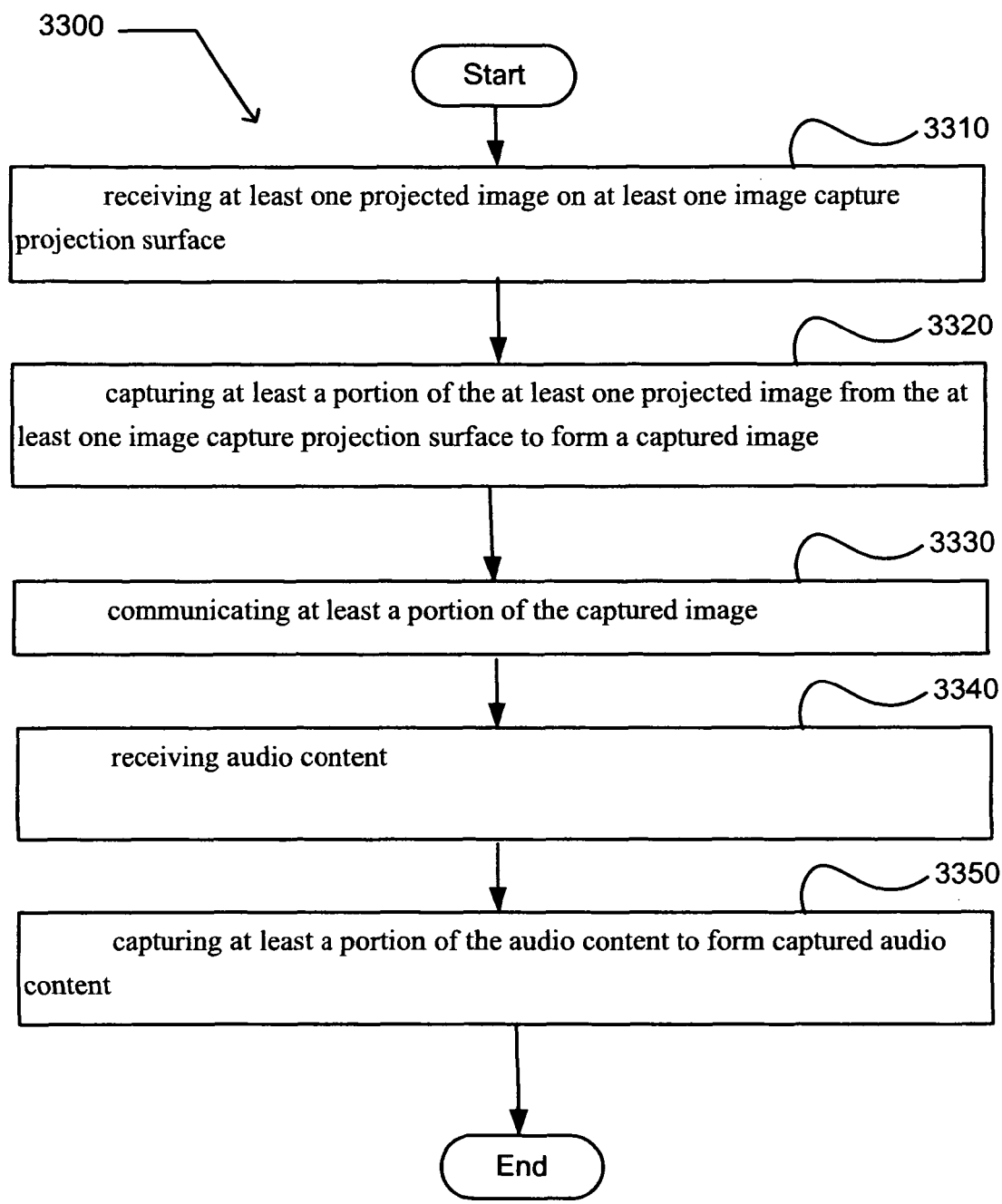
FIG. 33 illustrates an operational flow representing example operations related to receiving at least one projected image on at least one image capture projection surface; capturing at least a portion of the at least one projected image from the at least one image capture projection surface to form a captured image; communicating at least a portion of the captured image; receiving audio content; and capturing at least a portion of the audio content to form captured audio content.

In FIG. 33 and in following figures that include various examples of operations used during performance of various methods, discussion and explanation may be provided with respect to any one or combination of the above-described examples of FIGS. 1-10, and/or with respect to other examples and contexts. In some embodiments, operations 3110, 3120, 3130 and 3140 of FIG. 31 may correspond to operations 3310, 3320, 3330 and 3340 of FIG. 33. However, it should be understood that the operations may be executed in a number of other environments and contexts, and/or modified versions of FIGS. 1-10. Also, although the various operations are presented in the sequence(s) illustrated, it should be understood that the various operations may be performed in other orders than those which are illustrated, or may be performed concurrently.

After a start operation, the operational flow 3300 includes a receiving operation 3310 involving receiving at least one projected image on at least one image capture projection surface. In some embodiments, one or more image capture projection surfaces 166 may receive at least one projected image on at least one image capture projection surface. In some embodiments, one or more image capture projection surfaces 166 may receive at least one projected image projected from one or more projectors 164. In some embodiments, two or more image capture projection surfaces 166 may receive at least one projected image. In some embodiments, one or more image capture projection surfaces 166 may receive at least one projected image acquired from electronic or wireless communication such as via one or more communications networks 128 or one or more user communications devices 112. In some embodiments, one or more image capture projection surfaces 166 may receive at least one projected image in accordance with one or more user instructions from one or more users 110 or financial transactions. In some embodiments, one or more image capture projection surfaces 166 may receive at least one projected image in accordance with one or more user attributes of one or more users 110. In some embodiments, one or more image capture projection surfaces 166 may receive at least one projected image in accordance with one or more user attributes of one or more users 110 obtained from a history, a setting, a proximity determination, a sensor, a security parameter, a membership parameter, an account parameter, a status parameter, a group parameter, an ownership parameter, a role parameter, a capability parameter, a rights parameter, a service parameter, an activity parameter, a privilege parameter, a familial characteristic, a physical characteristic, an individualized parameter, or a contextualized parameter. In some embodiments, one or more image capture projection surfaces 166 may receive at least one projected image where the one or more image capture projection surfaces 166 are associated with a structure or device. In some embodiments, one or more image capture projection surfaces 166 may receive at least one projected image where the one or more image capture projection surfaces 166 are associated with a structure or device such as a tablet, a handheld device, a vehicle, a table, a wall, a desk, or a writing surface. In some embodiments, one or more image capture projection surfaces 166 may receive at least one projected image that relates to user-specified content from one or more users 110. In some embodiments, one or more image capture projection surfaces 166 may receive at least one projected image that relates to user-specified content such as legal content, educational content, healthcare content, business content, or personal content. In some embodiments, one or more image capture projection surfaces 166 may receive at least one projected image as a video. In some embodiments, one or more image capture projection surfaces 166 may receive at least one projected image in association with audio content. For example, in some embodiments, an image capture projection surface 166 may be a writing surface at a grocery checkout stand and a projected image may be a grocery receipt for signature. Alternatively, in some embodiments, an image capture projection surface 166 may be a wall mounted surface at a coffee shop and a projected image may be a business presentation. Also, in some embodiments, an image capture projection surface 166 may be a surface on a vehicle console and a projected image may be a menu for controlling vehicle component operations such as music, visual entertainment, climate control, seat placement, or security. Additionally, in some embodiments, an image capture projection surface 166 may be an instructional board for educational endeavors and a projected image may be educational subject matter.

After a start operation, the operational flow 3300 includes a capture operation 3320 involving capturing at least a portion of the at least one projected image from the at least one image capture projection surface to form a captured image. In some embodiments, one or more image capture modules 172 may capture at least a portion of the at least one projected image from the at least one image capture projection surface to form a captured image. In some embodiments, one or more image capture modules 172 may capture at least a portion of one or more projected images from one or more image capture projection surfaces 166. In some embodiments, one or more projection surface control units 179 may control one or more image capture modules 172 to capture at least a portion of one or more projected images from one or more image capture projection surfaces 166. In some embodiments, one or more projection surface control units 179 may receive control instructions from one or more surface memory 179D, from one or more memory 174, from one or more device interface modules 176, from one or more user interfaces 178, from one or more projectors 164, from one or more sensors 156, from one or more service provider modules 130, from one or more financial entities 122, from one or more user communications devices 112, or through one or more communications networks 128. In some embodiments, one or more image capture modules 172 may capture at least a portion of one or more projected images from two or more image capture projection surfaces 166. In some embodiments, one or more image capture modules 172 may capture at least a portion of one or more projected images in accordance with one or more user attributes of one or more users 110. In some embodiments, one or more image capture modules 172 may capture at least a portion of one or more projected images in accordance with one or more user attributes of one or more users 110 obtained from a history, a setting, a proximity determination, a sensor, a security parameter, a membership parameter, an account parameter, a status parameter, a group parameter, an ownership parameter, a role parameter, a capability parameter, a rights parameter, a service parameter, an activity parameter, a privilege parameter, a familial characteristic, a physical characteristic, an individualized parameter, or a contextualized parameter. In some embodiments, one or more image capture modules 172 may capture at least a portion of one or more projected images in accordance with one or more user instructions from one or more users 110. In some embodiments, one or more image capture modules 172 may capture at least a portion of one or more projected images in accordance with one or more physical instruction or one or more electronic instruction from one or more users 110. In some embodiments, one or more image capture modules 172 may capture at least a portion of one or more projected images in accordance with one or more financial transactions. In some embodiments, one or more image capture modules 172 may capture at least a portion of one or more projected images using full imaging 172A, optical scanning 172L, or mechanical scanning 172AB. In some embodiments, one or more image capture modules 172 may capture at least a portion of one or more projected images as video. In some embodiments, one or more image capture modules 172 may capture at least a portion of one or more projected images in association with audio content captured using one or more audio/data capture modules 182. In some embodiments, one or more image capture modules 172 may capture at least a portion of one or more projected images in accordance with one or more user-specified accounts such as from one or more user data accounts 152, one or more service provider modules 130, or one or more financial entities 122. In some embodiments, one or more image capture modules 172 may capture at least a portion of one or more projected images in association with user input or content from another source. For example, in some embodiments, an image capture module 172 may capture a projected grocery receipt from a writing surface at a grocery checkout stand. The image capture module 172 may further capture a signature provided through user input on a writing surface having a projected grocery receipt. Alternatively, in some embodiments, an image capture module 172 may capture a projected business presentation slide or series of slides from a wall mounted surface at a coffee shop. In some embodiments, the image capture module 172 may further capture writing provided from user input on a wall mounted surface having a projected business presentation. In some embodiments, the audio/data capture module 182 may further capture electronic data or files associated with a projected business presentation slide from one or more user communications devices 112, one or more memory 174, one or more service provider modules 130, one or more sensors 156, or through one or more electronic communications networks 128. Also, in some embodiments, an image capture module 172 may capture user input on a menu from a surface on a vehicle console. Additionally, in some embodiments, an image capture module 172 may capture educational subject matter from an instructional board. In some embodiments, the image capture module 172 may further capture writing provided from user input on an educational board having educational subject matter.

After a start operation, the operational flow 3300 includes a communication operation 3330 involving communicating at least a portion of the captured image. In some embodiments, one or more image capture modules 172 may communicate at least a portion of the captured image. In some embodiments, one or more projection surface control units 179 may communicate at least a portion of one or more captured images. In some embodiments, one or more captured images may be communicated using one or more device interface modules 176. In some embodiments, one or more captured images may be communicated using one or more user interfaces 178. In some embodiments, one or more captured images may be communicated using one or more communications networks 128. In some embodiments, one or more captured images may be communicated to one or more user communications devices 112. In some embodiments, one or more captured images may be communicated to one or more service provider modules 130. In some embodiments, one or more captured images may be communicated to one or more financial entities 122. In some embodiments, one or more captured images may be communicated to one or more sensors 156. In some embodiments, one or more captured images may be communicated to one or more projectors 164. In some embodiments, one or more captured images may be communicated in accordance with one or more user instructions, user attributes, or financial transactions. In some embodiments, one or more captured images may be communicated in accordance with one or more physical instructions or electronic instructions. In some embodiments, one or more captured images may be communicated using electronic communication. In some embodiments, one or more captured images may be communicated using wireless communication. In some embodiments, one or more captured images may be communicated to one or more memory, hardware devices, software applications, user devices, printers, monitor displays, or projectors 164. In some embodiments, one or more captured images may be communicated to two or more memory, hardware devices, software applications, user devices, printers, monitor displays, or projectors. In some embodiments, one or more captured images may be communicated in association with audio content. For example, in some embodiments, a captured grocery receipt and signature may be communicated to one or more email accounts, store accounts, printers, user devices, or the like of one or more users 110. Alternatively, in some embodiments, a captured business presentation slide, series of slides, writing, and/or associated data or files may be communicated to one or more user communications devices 112, email accounts, file locations, printers, projectors, or the like. Also, in some embodiments, captured user input on a menu from a surface on a vehicle console may be communicated to one or more corresponding systems for control. Additionally, in some embodiments, captured educational subject matter and writing may be communicated to one or more desk displays, email accounts, file locations, projectors 164, printers, or internet websites.

After a start operation, the operational flow 3300 includes a receiving operation 3340 involving receiving audio content. In some embodiments, one or more audio/data capture modules 182 may receive audio content. In some embodiments, one or more image capture modules 172 or audio/data capture modules 182 may receive audio content. In some embodiments, one or more projection surface control units 179 may receive audio content. In some embodiments, one or more device interface modules 176 may receive audio content. In some embodiments, one or more user interfaces 178 may receive audio content. In some embodiments, one or more image capture projection surfaces 166 may receive audio content. In some embodiments, one or more projectors 164 may receive audio content. In some embodiments, one or more sensors 156 may receive audio content. In some embodiments, one or more service provider modules 130 may receive audio content. In some embodiments, one or more user communications devices 112 may receive audio content. In some embodiments, audio content may be received from one or more users 152. In some embodiments, audio content may be received from one or more user communications devices 112. In some embodiments, audio content may be received from one or more service provider modules 130. In some embodiments, audio content may be received from one or more communications networks 128. In some embodiments, audio content may be received from one or more sensors 156. In some embodiments, audio content may be received from one or more projectors 164. In some embodiments, audio content may be received from one or more image capture projection surfaces 166. In some embodiments, audio content may be received from one or more memory 174. In some embodiments, audio content may be received from one or more device interface modules 176. In some embodiments, audio content may be received from one or more user interfaces 178. In some embodiments, audio content may be received from one or more image capture modules 172. In some embodiments, audio content may be received from one or more audio/data capture modules 182. In some embodiments, two or more locations may receive audio content. In some embodiments, audio content may be received from electronic or wireless communication such as via one or more communications networks 128 or one or more user communications devices 112. In some embodiments, audio content may be received in accordance with one or more user instructions from one or more users 110 or financial transactions. In some embodiments, audio content may be received in accordance with one or more user attributes of one or more users 110. In some embodiments, audio content may be received in accordance with one or more user attributes of one or more users 110 obtained from a history, a setting, a proximity determination, a sensor, a security parameter, a membership parameter, an account parameter, a status parameter, a group parameter, an ownership parameter, a role parameter, a capability parameter, a rights parameter, a service parameter, an activity parameter, a privilege parameter, a familial characteristic, a physical characteristic, an individualized parameter, or a contextualized parameter. In some embodiments, audio content may be received that relates to user-specified content from one or more users 110. In some embodiments, audio content may be received that relates to user-specified content such as legal content, educational content, healthcare content, business content, or personal content. In some embodiments, audio content may be received in association with a video. In some embodiments, audio content may be received in association with additional audio content. For example, in some embodiments, audio content may be verbal instructions for taking a medication prescribed on a captured prescription. In some embodiments, audio content may be participant questions and speaker answers associated with a captured business presentation. In some embodiments, audio content may be supplemental instructor comments associated with captured classroom board notes. In some embodiments, audio content may be a soundtrack to a captured video. In some embodiments, audio content may be a verbal acceptance of a captured agreement. In some embodiments, audio content may be an explanation of an answer on a captured test answer. In some embodiments, audio content may be a question relating to a captured bill or statement.

After a start operation, the operational flow 3300 includes a capturing operation 3350 involving capturing at least a portion of the audio content to form captured audio content. In some embodiments, one or more audio/data capture modules 182 may capture at least a portion of the audio content to form captured audio content. In some embodiments, one or more audio/data capture modules 182 may capture at least a portion of the audio content. In some embodiments, one or more projection surface control units 179 may control one or more audio/data capture modules 182 to capture at least a portion of the audio content. In some embodiments, one or more projection surface control units 179 may receive control instructions from one or more surface memory 179D, from one or more memory 174, from one or more device interface modules 176, from one or more user interfaces 178, from one or more projectors 164, from one or more sensors 156, from one or more service provider modules 130, from one or more financial entities 122, from one or more user communications devices 112, or through one or more communications networks 128. In some embodiments, one or more audio/data capture modules 182 may capture at least a portion of the audio content from two or more image capture projection surfaces 166. In some embodiments, one or more audio/data capture modules 182 may capture at least a portion of the audio content from one or more user communications devices 112, users 110, service provider modules 130, communications networks 128, sensors 156, or projectors 164. In some embodiments, one or more audio/data capture modules 182 may capture at least a portion of the audio content in accordance with one or more user attributes of one or more users 110. In some embodiments, one or more audio/data capture modules 182 may capture at least a portion of the audio content in accordance with one or more user attributes of one or more users 110 obtained from a history, a setting, a proximity determination, a sensor, a security parameter, a membership parameter, an account parameter, a status parameter, a group parameter, an ownership parameter, a role parameter, a capability parameter, a rights parameter, a service parameter, an activity parameter, a privilege parameter, a familial characteristic, a physical characteristic, an individualized parameter, or a contextualized parameter. In some embodiments, one or more audio/data capture modules 182 may capture at least a portion of the audio content in accordance with one or more user instructions from one or more users 110. In some embodiments, one or more audio/data capture modules 182 may capture at least a portion of the audio content in accordance with one or more physical instruction or one or more electronic instruction from one or more users 110. In some embodiments, one or more audio/data capture modules 182 may capture at least a portion of the audio content in accordance with one or more financial transactions. In some embodiments, one or more audio/data capture modules 182 may capture at least a portion of the audio content using one or more microphones. In some embodiments, one or more audio/data capture modules 182 may capture at least a portion of the audio content in association with video. In some embodiments, one or more audio/data capture modules 182 may capture at least a portion of the audio content in accordance with one or more user-specified accounts such as from one or more user data accounts 152, one or more service provider modules 130, or one or more financial entities 122. In some embodiments, one or more audio/data capture modules 182 may capture at least a portion of the audio content in association with user input or content from another source.

For example, in some embodiments, audio content may be verbal instructions for taking a medication prescribed on a captured prescription. In some embodiments, audio content may be participant questions and speaker answers associated with a captured business presentation. In some embodiments, audio content may be supplemental instructor comments associated with captured classroom board notes. In some embodiments, audio content may be a soundtrack to a captured video. In some embodiments, audio content may be a verbal acceptance of a captured agreement. In some embodiments, audio content may be an explanation of an answer on a captured test answer. In some embodiments, audio content may be a question relating to a captured bill or statement.

Figure 34:
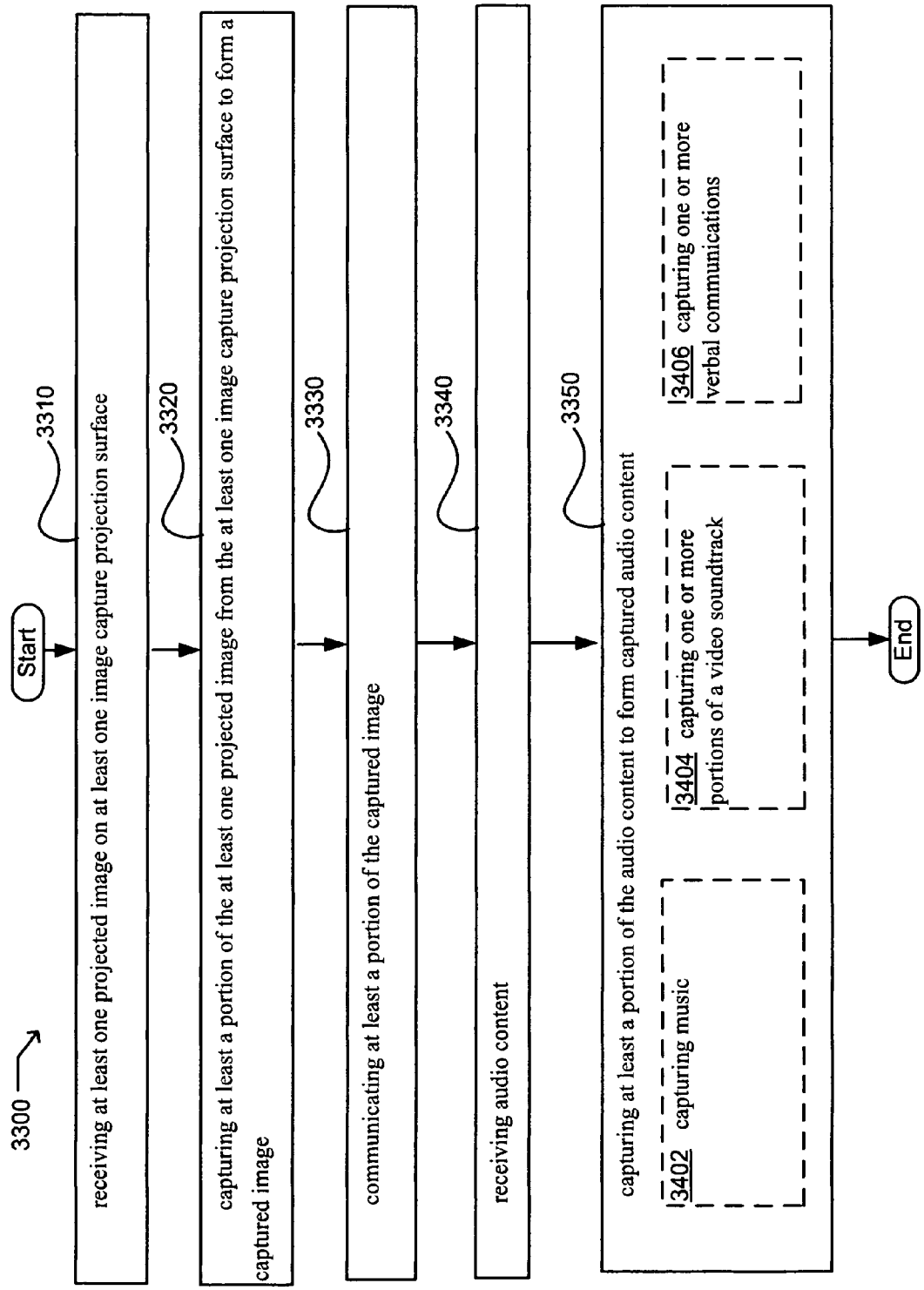
FIG. 34 illustrates alternative embodiments of the example operation flow of FIG. 33.

FIG. 34 illustrates alternative embodiments of the example operational flow 3300 of FIG. 33. FIG. 34 illustrates example embodiments where the capturing operation 3350 may include at least one additional operation. Additional operations may include an operation 3402, an operation 3404, and/or an operation 3406.

At operation 3402, the capturing operation 3350 may include capturing music. In some embodiments, one or more audio/data capture modules 182 may capture music. In some embodiments, one or more audio/data capture modules 182 may capture music using one or more device interface modules 176. In some embodiments, one or more audio/data capture modules 182 may capture music using one or more user interfaces 178. In some embodiments, one or more audio/data capture modules 182 may capture music from one or more memory 174. In some embodiments, one or more audio/data capture modules 182 may capture music from one or more projectors 164. In some embodiments, one or more audio/data capture modules 182 may capture music from one or more sensors 156. In some embodiments, one or more audio/data capture modules 182 may capture music from one or more communications networks 128. In some embodiments, one or more audio/data capture modules 182 may capture music from one or more service provider modules 130. In some embodiments, one or more audio/data capture modules 182 may capture music from one or more user communications devices 112. In some embodiments, one or more audio/data capture modules 182 may capture music from one or more users 110. For example, in some embodiments, music may be a song from one or more users 110. In some embodiments, music may be a song associated with a captured music video. In some embodiments, music may be background music for a projected presentation.

At operation 3404, the capturing operation 3350 may include capturing one or more portions of a video soundtrack. In some embodiments, one or more audio/data capture modules 182 may capture one or more portions of a video soundtrack. In some embodiments, one or more audio/data capture modules 182 may capture one or more portions of a video soundtrack using one or more device interface modules 176. In some embodiments, one or more audio/data capture modules 182 may capture one or more portions of a video soundtrack using one or more user interfaces 178. In some embodiments, one or more audio/data capture modules 182 may capture one or more portions of a video soundtrack from one or more memory 174. In some embodiments, one or more audio/data capture modules 182 may capture one or more portions of a video soundtrack from one or more projectors 164. In some embodiments, one or more audio/data capture modules 182 may capture one or more portions of a video soundtrack from one or more sensors 156. In some embodiments, one or more audio/data capture modules 182 may capture one or more portions of a video soundtrack from one or more communications networks 128. In some embodiments, one or more audio/data capture modules 182 may capture one or more portions of a video soundtrack from one or more service provider modules 130. In some embodiments, one or more audio/data capture modules 182 may capture one or more portions of a video soundtrack from one or more user communications devices 112. In some embodiments, one or more audio/data capture modules 182 may capture one or more portions of a video soundtrack from one or more users 110. For example, in some embodiments, one or more portions of a video soundtrack may be a soundtrack associated with a captured video, television show, or film. In some embodiments, one or more portions of a video soundtrack may be commentary of a captured video. In some embodiments, one or more portions of a video soundtrack may be commentary by one or more audience members of a captured video. In some embodiments, one or more portions of a video soundtrack may be commentary by one or more directors of a captured video.

At operation 3406, the capturing operation 3350 may include capturing one or more verbal communications. In some embodiments, one or more audio/data capture modules 182 may capture one or more verbal communications. In some embodiments, one or more audio/data capture modules 182 may capture one or more verbal communications using one or more device interface modules 176. In some embodiments, one or more audio/data capture modules 182 may capture one or more verbal communications using one or more user interfaces 178. In some embodiments, one or more audio/data capture modules 182 may capture one or more verbal communications from one or more memory 174. In some embodiments, one or more audio/data capture modules 182 may capture one or more verbal communications from one or more projectors 164. In some embodiments, one or more audio/data capture modules 182 may capture one or more verbal communications from one or more sensors 156. In some embodiments, one or more audio/data capture modules 182 may capture one or more verbal communications from one or more communications networks 128. In some embodiments, one or more audio/data capture modules 182 may capture one or more verbal communications from one or more service provider modules 130. In some embodiments, one or more audio/data capture modules 182 may capture one or more verbal communications from one or more user communications devices 112. In some embodiments, one or more audio/data capture modules 182 may capture one or more verbal communications from one or more users 110. For example, in some embodiments, one or more verbal communications may be an explanation relating to a captured image. In some embodiments, one or more verbal communications may be an instruction for a communication or storage action related to a captured image. In some embodiments, one or more verbal communications may be commentary relating to a captured image.

Figure 35:
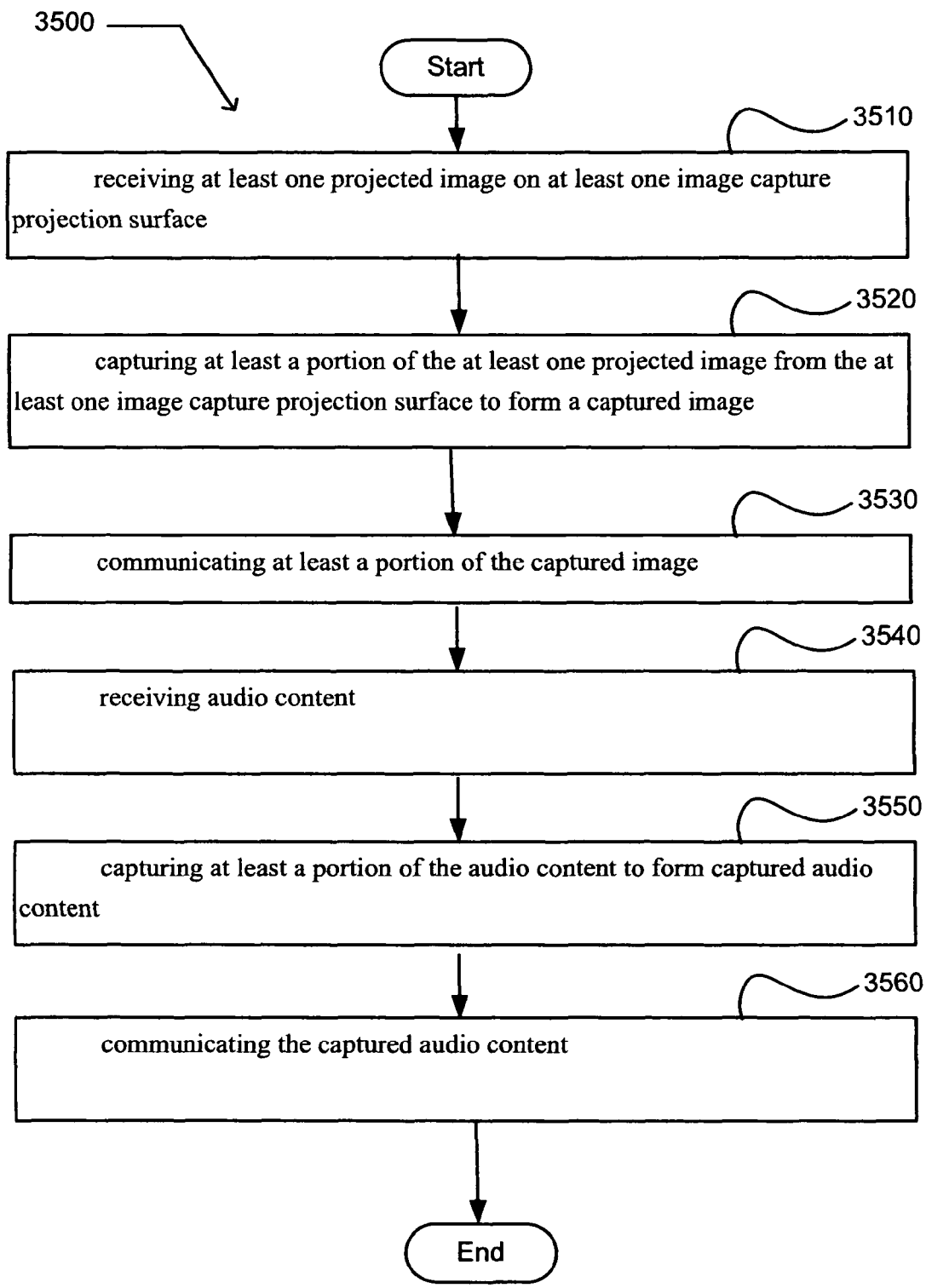
FIG. 35 illustrates an operational flow representing example operations related to receiving at least one projected image on at least one image capture projection surface; capturing at least a portion of the at least one projected image from the at least one image capture projection surface to form a captured image; communicating at least a portion of the captured image; receiving audio content; capturing at least a portion of the audio content to form captured audio content; and communicating the captured audio content.

In FIG. 35 and in following figures that include various examples of operations used during performance of various methods, discussion and explanation may be provided with respect to any one or combination of the above-described examples of FIGS. 1-10, and/or with respect to other examples and contexts. In some embodiments, operations 3310, 3320, 3330 and 3340 of FIG. 33 may correspond to operations 3510, 3520, 3530 and 3540 of FIG. 35. However, it should be understood that the operations may be executed in a number of other environments and contexts, and/or modified versions of FIGS. 1-10. Also, although the various operations are presented in the sequence(s) illustrated, it should be understood that the various operations may be performed in other orders than those which are illustrated, or may be performed concurrently.

After a start operation, the operational flow 3500 includes a receiving operation 3510 involving receiving at least one projected image on at least one image capture projection surface. In some embodiments, one or more image capture projection surfaces 166 may receive at least one projected image on at least one image capture projection surface. In some embodiments, one or more image capture projection surfaces 166 may receive at least one projected image projected from one or more projectors 164. In some embodiments, two or more image capture projection surfaces 166 may receive at least one projected image. In some embodiments, one or more image capture projection surfaces 166 may receive at least one projected image acquired from electronic or wireless communication such as via one or more communications networks 128 or one or more user communications devices 112. In some embodiments, one or more image capture projection surfaces 166 may receive at least one projected image in accordance with one or more user instructions from one or more users 110 or financial transactions. In some embodiments, one or more image capture projection surfaces 166 may receive at least one projected image in accordance with one or more user attributes of one or more users 110. In some embodiments, one or more image capture projection surfaces 166 may receive at least one projected image in accordance with one or more user attributes of one or more users 110 obtained from a history, a setting, a proximity determination, a sensor, a security parameter, a membership parameter, an account parameter, a status parameter, a group parameter, an ownership parameter, a role parameter, a capability parameter, a rights parameter, a service parameter, an activity parameter, a privilege parameter, a familial characteristic, a physical characteristic, an individualized parameter, or a contextualized parameter. In some embodiments, one or more image capture projection surfaces 166 may receive at least one projected image where the one or more image capture projection surfaces 166 are associated with a structure or device. In some embodiments, one or more image capture projection surfaces 166 may receive at least one projected image where the one or more image capture projection surfaces 166 are associated with a structure or device such as a tablet, a handheld device, a vehicle, a table, a wall, a desk, or a writing surface. In some embodiments, one or more image capture projection surfaces 166 may receive at least one projected image that relates to user-specified content from one or more users 110. In some embodiments, one or more image capture projection surfaces 166 may receive at least one projected image that relates to user-specified content such as legal content, educational content, healthcare content, business content, or personal content. In some embodiments, one or more image capture projection surfaces 166 may receive at least one projected image as a video. In some embodiments, one or more image capture projection surfaces 166 may receive at least one projected image in association with audio content. For example, in some embodiments, an image capture projection surface 166 may be a writing surface at a grocery checkout stand and a projected image may be a grocery receipt for signature. Alternatively, in some embodiments, an image capture projection surface 166 may be a wall mounted surface at a coffee shop and a projected image may be a business presentation. Also, in some embodiments, an image capture projection surface 166 may be a surface on a vehicle console and a projected image may be a menu for controlling vehicle component operations such as music, visual entertainment, climate control, seat placement, or security. Additionally, in some embodiments, an image capture projection surface 166 may be an instructional board for educational endeavors and a projected image may be educational subject matter.

After a start operation, the operational flow 3500 includes a capture operation 3520 involving capturing at least a portion of the at least one projected image from the at least one image capture projection surface to form a captured image. In some embodiments, one or more image capture modules 172 may capture at least a portion of the at least one projected image from the at least one image capture projection surface to form a captured image. In some embodiments, one or more image capture modules 172 may capture at least a portion of one or more projected images from one or more image capture projection surfaces 166. In some embodiments, one or more projection surface control units 179 may control one or more image capture modules 172 to capture at least a portion of one or more projected images from one or more image capture projection surfaces 166. In some embodiments, one or more projection surface control units 179 may receive control instructions from one or more surface memory 179D, from one or more memory 174, from one or more device interface modules 176, from one or more user interfaces 178, from one or more projectors 164, from one or more sensors 156, from one or more service provider modules 130, from one or more financial entities 122, from one or more user communications devices 112, or through one or more communications networks 128. In some embodiments, one or more image capture modules 172 may capture at least a portion of one or more projected images from two or more image capture projection surfaces 166. In some embodiments, one or more image capture modules 172 may capture at least a portion of one or more projected images in accordance with one or more user attributes of one or more users 110. In some embodiments, one or more image capture modules 172 may capture at least a portion of one or more projected images in accordance with one or more user attributes of one or more users 110 obtained from a history, a setting, a proximity determination, a sensor, a security parameter, a membership parameter, an account parameter, a status parameter, a group parameter, an ownership parameter, a role parameter, a capability parameter, a rights parameter, a service parameter, an activity parameter, a privilege parameter, a familial characteristic, a physical characteristic, an individualized parameter, or a contextualized parameter. In some embodiments, one or more image capture modules 172 may capture at least a portion of one or more projected images in accordance with one or more user instructions from one or more users 110. In some embodiments, one or more image capture modules 172 may capture at least a portion of one or more projected images in accordance with one or more physical instruction or one or more electronic instruction from one or more users 110. In some embodiments, one or more image capture modules 172 may capture at least a portion of one or more projected images in accordance with one or more financial transactions. In some embodiments, one or more image capture modules 172 may capture at least a portion of one or more projected images using full imaging 172A, optical scanning 172L, or mechanical scanning 172AB. In some embodiments, one or more image capture modules 172 may capture at least a portion of one or more projected images as video. In some embodiments, one or more image capture modules 172 may capture at least a portion of one or more projected images in association with audio content captured using one or more audio/data capture modules 182. In some embodiments, one or more image capture modules 172 may capture at least a portion of one or more projected images in accordance with one or more user-specified accounts such as from one or more user data accounts 152, one or more service provider modules 130, or one or more financial entities 122. In some embodiments, one or more image capture modules 172 may capture at least a portion of one or more projected images in association with user input or content from another source. For example, in some embodiments, an image capture module 172 may capture a projected grocery receipt from a writing surface at a grocery checkout stand. The image capture module 172 may further capture a signature provided through user input on a writing surface having a projected grocery receipt. Alternatively, in some embodiments, an image capture module 172 may capture a projected business presentation slide or series of slides from a wall mounted surface at a coffee shop. In some embodiments, the image capture module 172 may further capture writing provided from user input on a wall mounted surface having a projected business presentation. In some embodiments, the audio/data capture module 182 may further capture electronic data or files associated with a projected business presentation slide from one or more user communications devices 112, one or more memory 174, one or more service provider modules 130, one or more sensors 156, or through one or more electronic communications networks 128. Also, in some embodiments, an image capture module 172 may capture user input on a menu from a surface on a vehicle console. Additionally, in some embodiments, an image capture module 172 may capture educational subject matter from an instructional board. In some embodiments, the image capture module 172 may further capture writing provided from user input on an educational board having educational subject matter.

After a start operation, the operational flow 3500 includes a communication operation 3530 involving communicating at least a portion of the captured image. In some embodiments, one or more image capture modules 172 may communicate at least a portion of the captured image. In some embodiments, one or more projection surface control units 179 may communicate at least a portion of one or more captured images. In some embodiments, one or more captured images may be communicated using one or more device interface modules 176. In some embodiments, one or more captured images may be communicated using one or more user interfaces 178. In some embodiments, one or more captured images may be communicated using one or more communications networks 128. In some embodiments, one or more captured images may be communicated to one or more user communications devices 112. In some embodiments, one or more captured images may be communicated to one or more service provider modules 130. In some embodiments, one or more captured images may be communicated to one or more financial entities 122. In some embodiments, one or more captured images may be communicated to one or more sensors 156. In some embodiments, one or more captured images may be communicated to one or more projectors 164. In some embodiments, one or more captured images may be communicated in accordance with one or more user instructions, user attributes, or financial transactions. In some embodiments, one or more captured images may be communicated in accordance with one or more physical instructions or electronic instructions. In some embodiments, one or more captured images may be communicated using electronic communication. In some embodiments, one or more captured images may be communicated using wireless communication. In some embodiments, one or more captured images may be communicated to one or more memory, hardware devices, software applications, user devices, printers, monitor displays, or projectors 164. In some embodiments, one or more captured images may be communicated to two or more memory, hardware devices, software applications, user devices, printers, monitor displays, or projectors. In some embodiments, one or more captured images may be communicated in association with audio content. For example, in some embodiments, a captured grocery receipt and signature may be communicated to one or more email accounts, store accounts, printers, user devices, or the like of one or more users 110. Alternatively, in some embodiments, a captured business presentation slide, series of slides, writing, and/or associated data or files may be communicated to one or more user communications devices 112, email accounts, file locations, printers, projectors, or the like. Also, in some embodiments, captured user input on a menu from a surface on a vehicle console may be communicated to one or more corresponding systems for control. Additionally, in some embodiments, captured educational subject matter and writing may be communicated to one or more desk displays, email accounts, file locations, projectors 164, printers, or internet websites.

After a start operation, the operational flow 3500 includes a receiving operation 3540 involving receiving audio content. In some embodiments, one or more audio/data capture modules 182 may receive audio content. In some embodiments, one or more image capture modules 172 or audio/data capture modules 182 may receive audio content. In some embodiments, one or more projection surface control units 179 may receive audio content. In some embodiments, one or more device interface modules 176 may receive audio content. In some embodiments, one or more user interfaces 178 may receive audio content. In some embodiments, one or more image capture projection surfaces 166 may receive audio content. In some embodiments, one or more projectors 164 may receive audio content. In some embodiments, one or more sensors 156 may receive audio content. In some embodiments, one or more service provider modules 130 may receive audio content. In some embodiments, one or more user communications devices 112 may receive audio content. In some embodiments, audio content may be received from one or more users 152. In some embodiments, audio content may be received from one or more user communications devices 112. In some embodiments, audio content may be received from one or more service provider modules 130. In some embodiments, audio content may be received from one or more communications networks 128. In some embodiments, audio content may be received from one or more sensors 156. In some embodiments, audio content may be received from one or more projectors 164. In some embodiments, audio content may be received from one or more image capture projection surfaces 166. In some embodiments, audio content may be received from one or more memory 174. In some embodiments, audio content may be received from one or more device interface modules 176. In some embodiments, audio content may be received from one or more user interfaces 178. In some embodiments, audio content may be received from one or more image capture modules 172. In some embodiments, audio content may be received from one or more audio/data capture modules 182. In some embodiments, two or more locations may receive audio content. In some embodiments, audio content may be received from electronic or wireless communication such as via one or more communications networks 128 or one or more user communications devices 112. In some embodiments, audio content may be received in accordance with one or more user instructions from one or more users 110 or financial transactions. In some embodiments, audio content may be received in accordance with one or more user attributes of one or more users 110. In some embodiments, audio content may be received in accordance with one or more user attributes of one or more users 110 obtained from a history, a setting, a proximity determination, a sensor, a security parameter, a membership parameter, an account parameter, a status parameter, a group parameter, an ownership parameter, a role parameter, a capability parameter, a rights parameter, a service parameter, an activity parameter, a privilege parameter, a familial characteristic, a physical characteristic, an individualized parameter, or a contextualized parameter. In some embodiments, audio content may be received that relates to user-specified content from one or more users 110. In some embodiments, audio content may be received that relates to user-specified content such as legal content, educational content, healthcare content, business content, or personal content. In some embodiments, audio content may be received in association with a video. In some embodiments, audio content may be received in association with additional audio content. For example, in some embodiments, audio content may be verbal instructions for taking a medication prescribed on a captured prescription. In some embodiments, audio content may be participant questions and speaker answers associated with a captured business presentation. In some embodiments, audio content may be supplemental instructor comments associated with captured classroom board notes. In some embodiments, audio content may be a soundtrack to a captured video. In some embodiments, audio content may be a verbal acceptance of a captured agreement. In some embodiments, audio content may be an explanation of an answer on a captured test answer. In some embodiments, audio content may be a question relating to a captured bill or statement.

After a start operation, the operational flow 3500 includes a capturing operation 3550 involving capturing at least a portion of the audio content to form captured audio content. In some embodiments, one or more audio/data capture modules 182 may capture at least a portion of the audio content to form captured audio content. In some embodiments, one or more audio/data capture modules 182 may capture at least a portion of the audio content. In some embodiments, one or more projection surface control units 179 may control one or more audio/data capture modules 182 to capture at least a portion of the audio content. In some embodiments, one or more projection surface control units 179 may receive control instructions from one or more surface memory 179D, from one or more memory 174, from one or more device interface modules 176, from one or more user interfaces 178, from one or more projectors 164, from one or more sensors 156, from one or more service provider modules 130, from one or more financial entities 122, from one or more user communications devices 112, or through one or more communications networks 128. In some embodiments, one or more audio/data capture modules 182 may capture at least a portion of the audio content from two or more image capture projection surfaces 166. In some embodiments, one or more audio/data capture modules 182 may capture at least a portion of the audio content from one or more user communications devices 112, users 110, service provider modules 130, communications networks 128, sensors 156, or projectors 164. In some embodiments, one or more audio/data capture modules 182 may capture at least a portion of the audio content in accordance with one or more user attributes of one or more users 110. In some embodiments, one or more audio/data capture modules 182 may capture at least a portion of the audio content in accordance with one or more user attributes of one or more users 110 obtained from a history, a setting, a proximity determination, a sensor, a security parameter, a membership parameter, an account parameter, a status parameter, a group parameter, an ownership parameter, a role parameter, a capability parameter, a rights parameter, a service parameter, an activity parameter, a privilege parameter, a familial characteristic, a physical characteristic, an individualized parameter, or a contextualized parameter. In some embodiments, one or more audio/data capture modules 182 may capture at least a portion of the audio content in accordance with one or more user instructions from one or more users 110. In some embodiments, one or more audio/data capture modules 182 may capture at least a portion of the audio content in accordance with one or more physical instruction or one or more electronic instruction from one or more users 110. In some embodiments, one or more audio/data capture modules 182 may capture at least a portion of the audio content in accordance with one or more financial transactions. In some embodiments, one or more audio/data capture modules 182 may capture at least a portion of the audio content using one or more microphones. In some embodiments, one or more audio/data capture modules 182 may capture at least a portion of the audio content in association with video. In some embodiments, one or more audio/data capture modules 182 may capture at least a portion of the audio content in accordance with one or more user-specified accounts such as from one or more user data accounts 152, one or more service provider modules 130, or one or more financial entities 122. In some embodiments, one or more audio/data capture modules 182 may capture at least a portion of the audio content in association with user input or content from another source. For example, in some embodiments, audio content may be verbal instructions for taking a medication prescribed on a captured prescription. In some embodiments, audio content may be participant questions and speaker answers associated with a captured business presentation. In some embodiments, audio content may be supplemental instructor comments associated with captured classroom board notes. In some embodiments, audio content may be a soundtrack to a captured video. In some embodiments, audio content may be a verbal acceptance of a captured agreement. In some embodiments, audio content may be an explanation of an answer on a captured test answer. In some embodiments, audio content may be a question relating to a captured bill or statement.

After a start operation, the operational flow 3500 includes a communicating operation 3560 involving communicating the captured audio content. In some embodiments, one or more audio/data capture modules 182 may communicate the captured audio content. In some embodiments, one or more projection surface control units 179 may communicate one or more captured audio content. In some embodiments, captured audio content may be communicated using one or more device interface modules 176. In some embodiments, captured audio content may be communicated using one or more user interfaces 178. In some embodiments, captured audio content may be communicated using one or more communications networks 128. In some embodiments, captured audio content may be communicated to one or more user communications devices 112. In some embodiments, captured audio content may be communicated to one or more service provider modules 130. In some embodiments, captured audio content may be communicated to one or more financial entities 122. In some embodiments, captured audio content may be communicated to one or more sensors 156. In some embodiments, captured audio content may be communicated to one or more projectors 164. In some embodiments, captured audio content may be communicated in accordance with one or more user instructions, user attributes, or financial transactions. In some embodiments, captured audio content may be communicated in accordance with one or more physical instructions or electronic instructions. In some embodiments, captured audio content may be communicated using electronic communication. In some embodiments, captured audio content may be communicated using wireless communication. In some embodiments, captured audio content may be communicated to one or more memory, hardware devices, speakers, software applications, user devices, printers, monitor displays, or projectors 164. In some embodiments, captured audio content may be communicated to two or more memory, hardware devices, speakers software applications, user devices, printers, monitor displays, or projectors. For example, in some embodiments, audio content may be verbal instructions for taking a medication prescribed on a captured prescription and may be communicated to a patient's email account. In some embodiments, audio content may be participant questions and speaker answers associated with a captured business presentation and may be communicated to a business network file location. In some embodiments, audio content may be supplemental instructor comments associated with captured classroom board notes and may be communicated to a web server for internet publication. In some embodiments, audio content may be a soundtrack to a captured video and may be communicated to a mobile phone. In some embodiments, audio content may be a verbal acceptance of a captured agreement and may be communicated to a lawyer's email account. In some embodiments, audio content may be an explanation of an answer on a captured test answer and may be communicated to an instructor's email account. In some embodiments, audio content may be a question relating to a captured bill or statement and may be communicated to a company customer service system.

Figure 36:
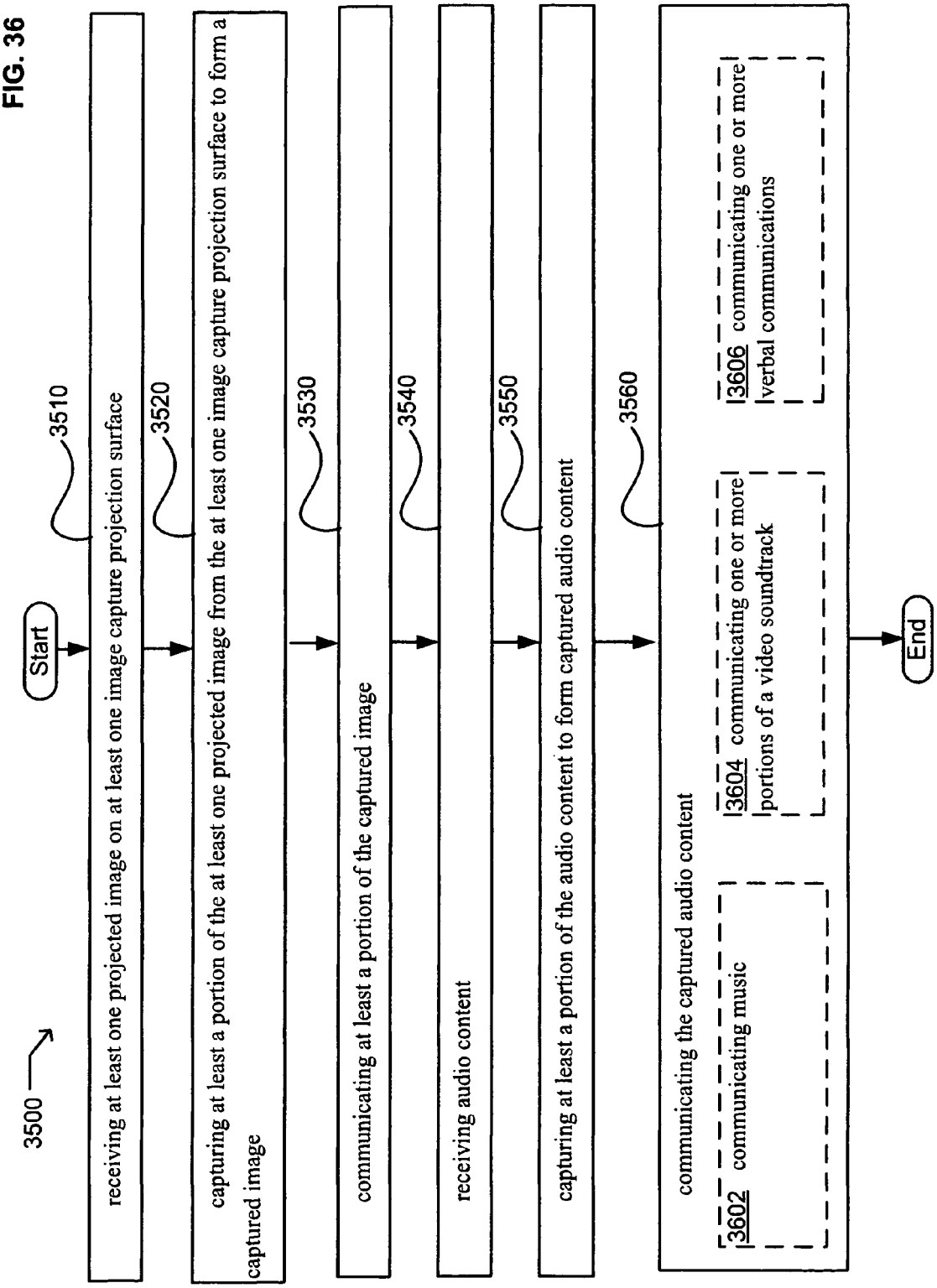
FIG. 36 illustrates alternative embodiments of the example operation flow of FIG. 35.

FIG. 36 illustrates alternative embodiments of the example operational flow 3500 of FIG. 35. FIG. 36 illustrates example embodiments where the communicating operation 3560 may include at least one additional operation. Additional operations may include an operation 3602, an operation 3604, and/or an operation 3606.

At operation 3602, the communicating operation 3560 may include communicating music. In some embodiments, one or more audio/data capture modules 182 may communicate music. In some embodiments, one or more projection surface control units 179 may communicate music. In some embodiments, music may be communicated to one or more memory 174. In some embodiments, music may be communicated using one or more device interface modules 176. In some embodiments, music may be communicated using one or more user interfaces 178. In some embodiments, music may be communicated to one or more projectors 164. In some embodiments, music may be communicated to one or more user communications devices 112. In some embodiments, music may be communicated to one or more service provider modules 130. In some embodiments, music may be communicated to one or more sensors 156. In some embodiments, music may be communicated to one or more communications networks 128. In some embodiments, music may be communicated to one or more financial entities 122. For example, in some embodiments, a song from one or more users 110, a song associated with a captured music video, or background music for a projected presentation may be communicated.

At operation 3604, the communicating operation 3560 may include communicating one or more portions of a video soundtrack. In some embodiments, one or more audio/data capture modules 182 may communicate one or more portions of a video soundtrack. In some embodiments, one or more projection surface control units 179 may communicate one or more portions of a video soundtrack. In some embodiments, one or more portions of a video soundtrack may be communicated to one or more memory 174. In some embodiments, one or more portions of a video soundtrack may be communicated using one or more device interface modules 176. In some embodiments, one or more portions of a video soundtrack may be communicated using one or more user interfaces 178. In some embodiments, one or more portions of a video soundtrack may be communicated to one or more projectors 164. In some embodiments, one or more portions of a video soundtrack may be communicated to one or more user communications devices 112. In some embodiments, one or more portions of a video soundtrack may be communicated to one or more service provider modules 130. In some embodiments, one or more portions of a video soundtrack may be communicated to one or more sensors 156. In some embodiments, one or more portions of a video soundtrack may be communicated to one or more communications networks 128. In some embodiments, one or more portions of a video soundtrack may be communicated to one or more financial entities 122. For example, in some embodiments, a soundtrack associated with a captured video, television show, or film, a commentary of a captured video, a commentary by one or more audience members of a captured video, or a commentary by one or more directors of a captured video may be communicated.

At operation 3606, the communicating operation 3560 may include communicating one or more verbal communications. In some embodiments, one or more audio/data capture modules 182 may communicate one or more verbal communications. In some embodiments, one or more projection surface control units 179 may communicate one or more verbal communications. In some embodiments, one or more verbal communications may be communicated to one or more memory 174. In some embodiments, one or more verbal communications may be communicated using one or more device interface modules 176. In some embodiments, one or more verbal communications may be communicated using one or more user interfaces 178. In some embodiments, one or more verbal communications may be communicated to one or more projectors 164. In some embodiments, one or more verbal communications may be communicated to one or more user communications devices 112. In some embodiments, one or more verbal communications may be communicated to one or more service provider modules 130. In some embodiments, one or more verbal communications may be communicated to one or more sensors 156. In some embodiments, one or more verbal communications may be communicated to one or more communications networks 128. In some embodiments, one or more verbal communications may be communicated to one or more financial entities 122. For example, in some embodiments, an explanation relating to a captured image, an instruction for a communication or storage action related to a captured image, and a commentary relating to a captured image may be communicated.

Figure 37:
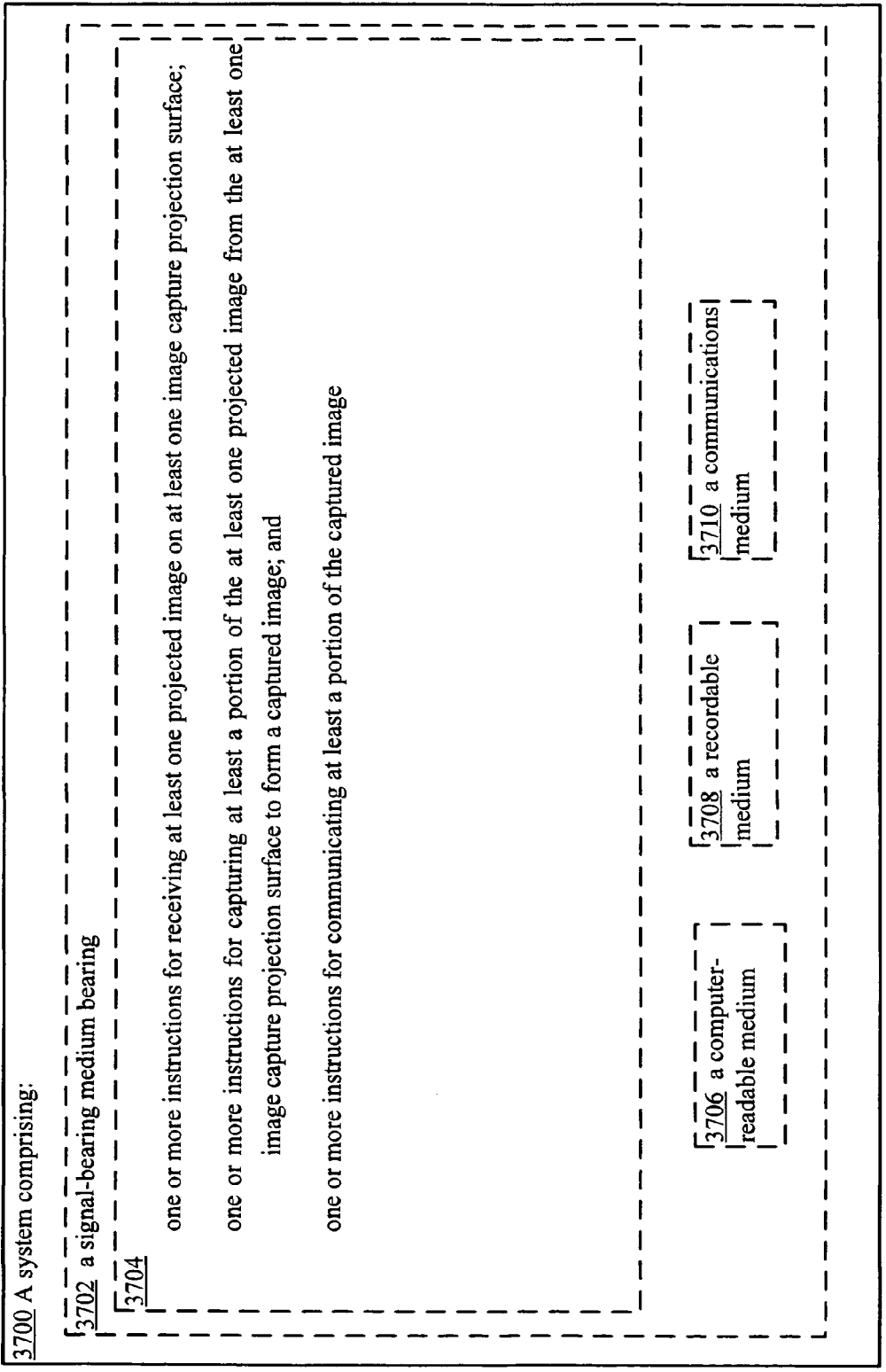

FIG. 37 illustrates a partial view of a system 3700 that includes a computer program 3704 for executing a computer process on a computing device. An embodiment of system 3700 is provided using a signal-bearing medium 3702 bearing one or more instructions for receiving at least one projected image on at least one image capture projection surface, one or more instructions for capturing at least a portion of the at least one projected image from the at least one image capture projection surface to form a captured image, and one or more instructions for communicating at least a portion of the captured image. The one or more directions may be, for example, computer executable and/or logic-implemented instructions. In some embodiments, the signal-bearing medium 3702 may include a computer-readable medium 3706. In some embodiments, the signal-bearing medium 3702 may include a recordable medium 3708. In some embodiments, the signal-bearing medium 3702 may include a communications medium 3710.

Figure 38:
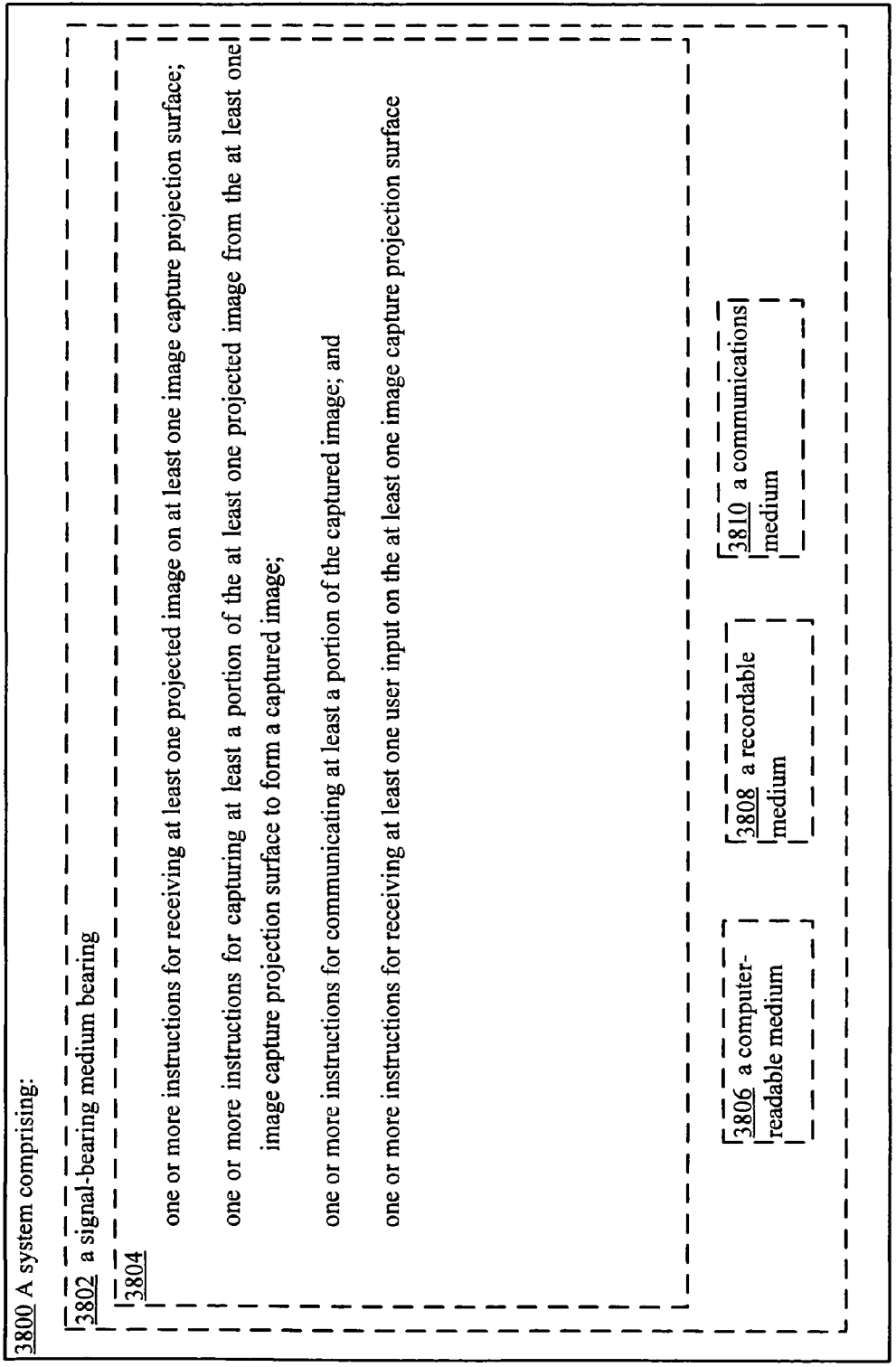

FIG. 38 illustrates a partial view of a system 3800 that includes a computer program 3804 for executing a computer process on a computing device. An embodiment of system 3800 is provided using a signal-bearing medium 3802 bearing one or more instructions for receiving at least one projected image on at least one image capture projection surface, one or more instructions for capturing at least a portion of the at least one projected image from the at least one image capture projection surface to form a captured image, one or more instructions for communicating at least a portion of the captured image, and one or more instructions for receiving at least one user input on the at least one image capture projection surface. The one or more directions may be, for example, computer executable and/or logic-implemented instructions. In some embodiments, the signal-bearing medium 3802 may include a computer-readable medium 3806. In some embodiments, the signal-bearing medium 3802 may include a recordable medium 3808. In some embodiments, the signal-bearing medium 3802 may include a communications medium 3810.

Figure 39:
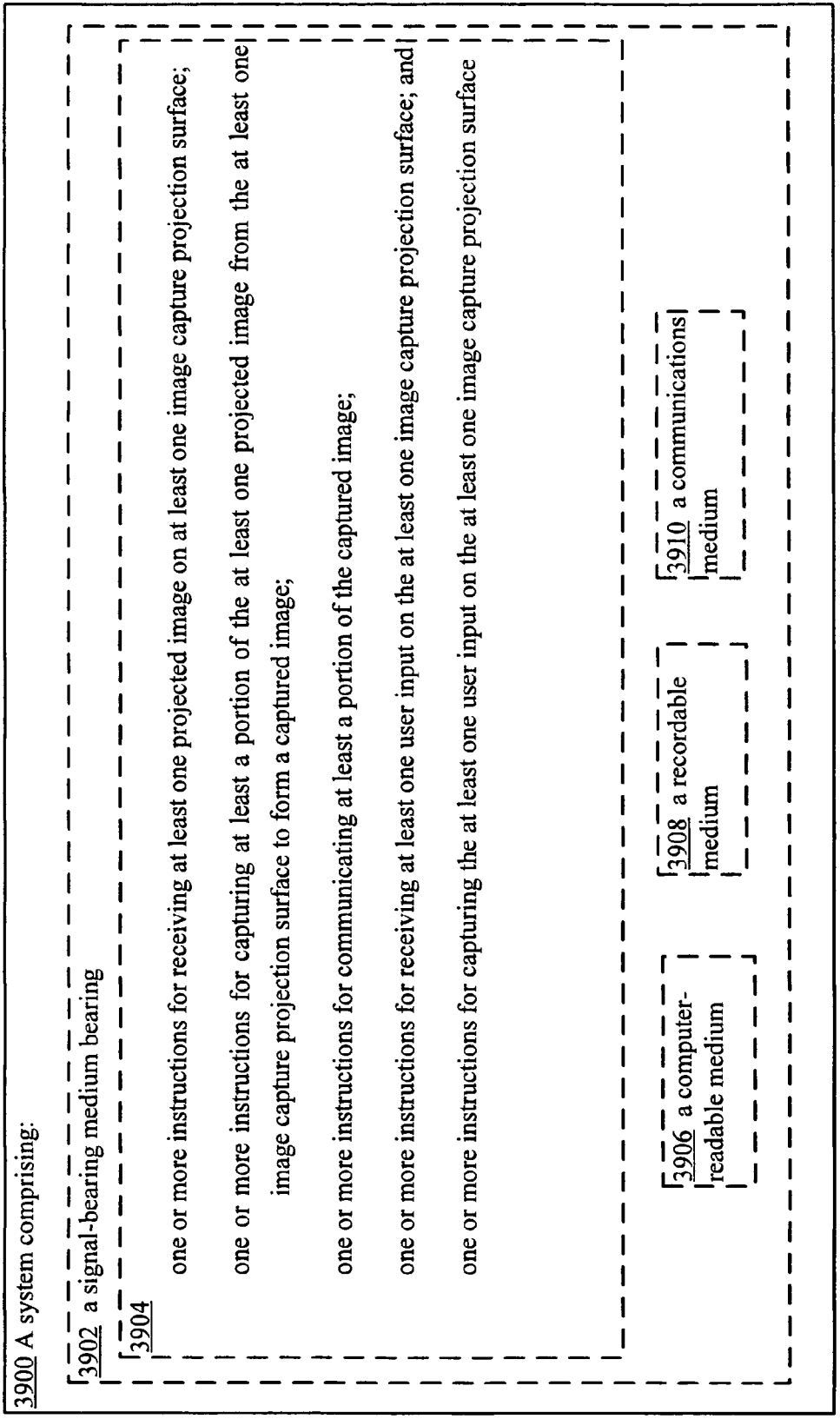

FIG. 39 illustrates a partial view of a system 3900 that includes a computer program 3904 for executing a computer process on a computing device. An embodiment of system 3900 is provided using a signal-bearing medium 3902 bearing one or more instructions for receiving at least one projected image on at least one image capture projection surface, one or more instructions for capturing at least a portion of the at least one projected image from the at least one image capture projection surface to form a captured image, one or more instructions for communicating at least a portion of the captured image, one or more instructions for receiving at least one user input on the at least one image capture projection surface, and one or more instructions for capturing the at least one user input on the at least one image capture projection surface. The one or more directions may be, for example, computer executable and/or logic-implemented instructions. In some embodiments, the signal-bearing medium 3902 may include a computer-readable medium 3906. In some embodiments, the signal-bearing medium 3902 may include a recordable medium 3908. In some embodiments, the signal-bearing medium 3902 may include a communications medium 3910.

FIG. 40 illustrates a partial view of a system 4000 that includes a computer program 4004 for executing a computer process on a computing device. An embodiment of system 4000 is provided using a signal-bearing medium 4002 bearing one or more instructions for receiving at least one projected image on at least one image capture projection surface, one or more instructions for capturing at least a portion of the at least one projected image from the at least one image capture projection surface to form a captured image, one or more instructions for communicating at least a portion of the captured image, one or more instructions for receiving at least one user input on the at least one image capture projection surface, one or more instructions for capturing the at least one user input on the at least one image capture projection surface, one or more instructions for communicating the at least one user input. The one or more directions may be, for example, computer executable and/or logic-implemented instructions. In some embodiments, the signal-bearing medium 4002 may include a computer-readable medium 4006. In some embodiments, the signal-bearing medium 4002 may include a recordable medium 4008. In some embodiments, the signal-bearing medium 4002 may include a communications medium 4010.

Figure 41:
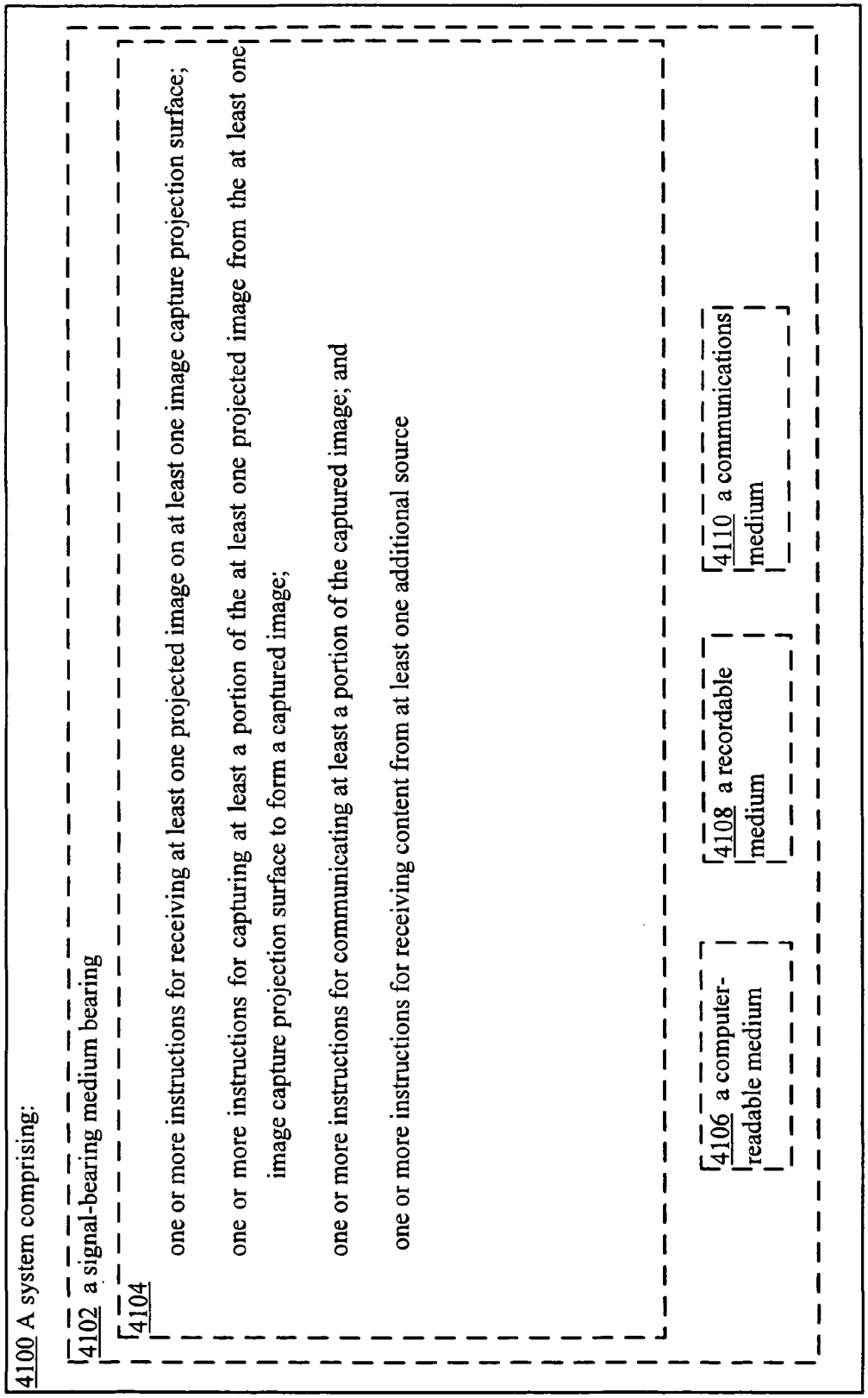

FIG. 41 illustrates a partial view of a system 4100 that includes a computer program 4104 for executing a computer process on a computing device. An embodiment of system 4100 is provided using a signal-bearing medium 4102 bearing one or more instructions for receiving at least one projected image on at least one image capture projection surface, one or more instructions for capturing at least a portion of the at least one projected image from the at least one image capture projection surface to form a captured image, one or more instructions for communicating at least a portion of the captured image, and one or more instructions for receiving content from at least one additional source. The one or more directions may be, for example, computer executable and/or logic-implemented instructions. In some embodiments, the signal-bearing medium 4102 may include a computer-readable medium 4106. In some embodiments, the signal-bearing medium 4102 may include a recordable medium 4108. In some embodiments, the signal-bearing medium 4102 may include a communications medium 4110.

FIG. 42 illustrates a partial view of a system 4200 that includes a computer program 4204 for executing a computer process on a computing device. An embodiment of system 4200 is provided using a signal-bearing medium 4202 bearing one or more instructions for receiving at least one projected image on at least one image capture projection surface, one or more instructions for capturing at least a portion of the at least one projected image from the at least one image capture projection surface to form a captured image, one or more instructions for communicating at least a portion of the captured image, one or more instructions for receiving content from at least one additional source, and one or more instructions for capturing content from the at least one additional source. The one or more directions may be, for example, computer executable and/or logic-implemented instructions. In some embodiments, the signal-bearing medium 4202 may include a computer-readable medium 4206. In some embodiments, the signal-bearing medium 4202 may include a recordable medium 4208. In some embodiments, the signal-bearing medium 4202 may include a communications medium 4210.

Figure 43:
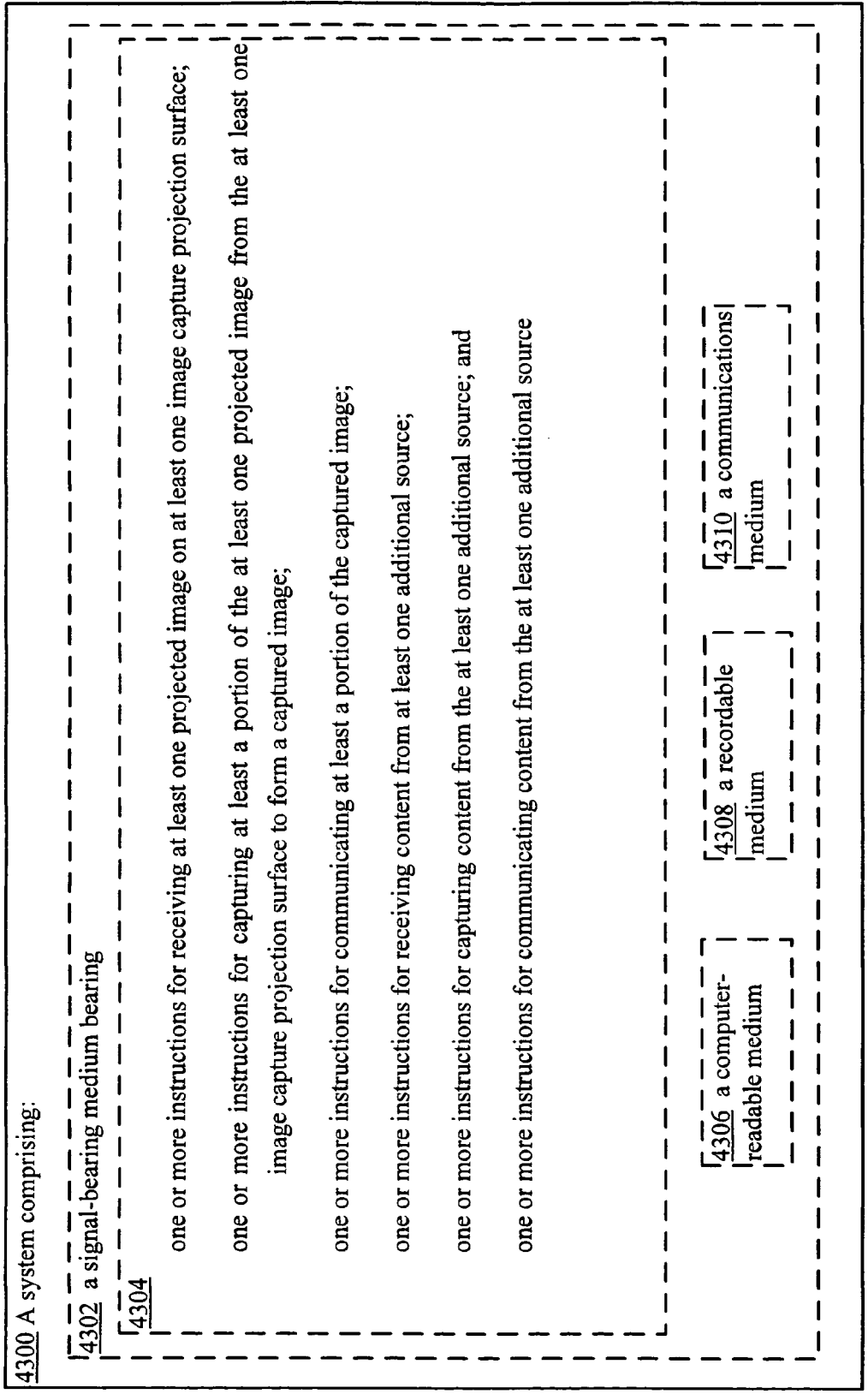

FIG. 43 illustrates a partial view of a system 4300 that includes a computer program 4304 for executing a computer process on a computing device. An embodiment of system 4300 is provided using a signal-bearing medium 4302 bearing one or more instructions for receiving at least one projected image on at least one image capture projection surface, one or more instructions for capturing at least a portion of the at least one projected image from the at least one image capture projection surface to form a captured image, one or more instructions for communicating at least a portion of the captured image, one or more instructions for receiving content from at least one additional source, one or more instructions for capturing content from the at least one additional source, and one or more instructions for communicating the content received from the at least one additional source. The one or more directions may be, for example, computer executable and/or logic-implemented instructions. In some embodiments, the signal-bearing medium 4302 may include a computer-readable medium 4306. In some embodiments, the signal-bearing medium 4302 may include a recordable medium 4308. In some embodiments, the signal-bearing medium 4302 may include a communications medium 4310.

Figure 44:
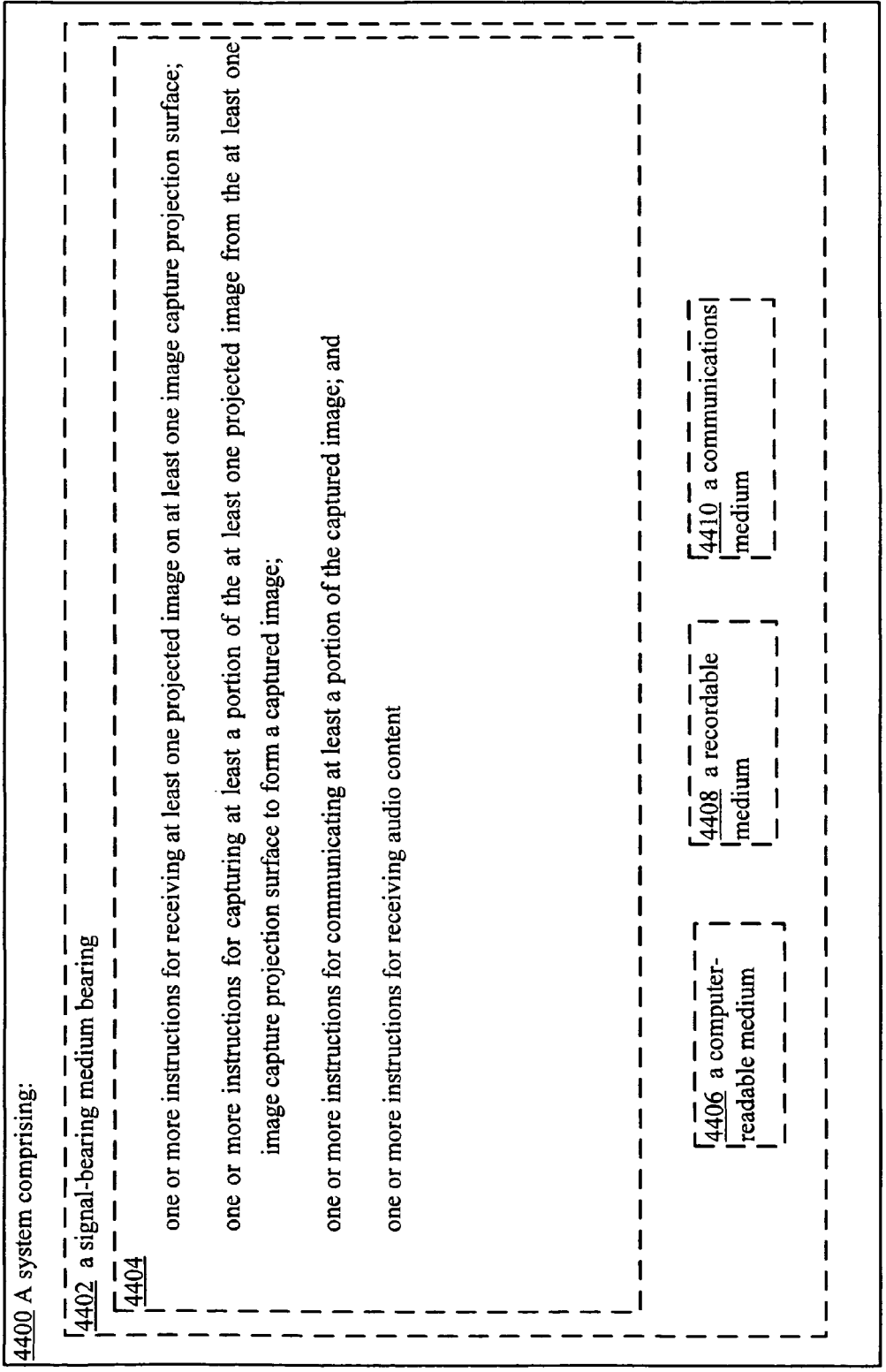

FIG. 44 illustrates a partial view of a system 4400 that includes a computer program 4404 for executing a computer process on a computing device. An embodiment of system 4400 is provided using a signal-bearing medium 4402 bearing one or more instructions for receiving at least one projected image on at least one image capture projection surface, one or more instructions for capturing at least a portion of the at least one projected image from the at least one image capture projection surface to form a captured image, one or more instructions for communicating at least a portion of the captured image, and one or more instructions for receiving audio content. The one or more directions may be, for example, computer executable and/or logic-implemented instructions. In some embodiments, the signal-bearing medium 4402 may include a computer-readable medium 4406. In some embodiments, the signal-bearing medium 4402 may include a recordable medium 4408. In some embodiments, the signal-bearing medium 4402 may include a communications medium 4410.

Figure 45:
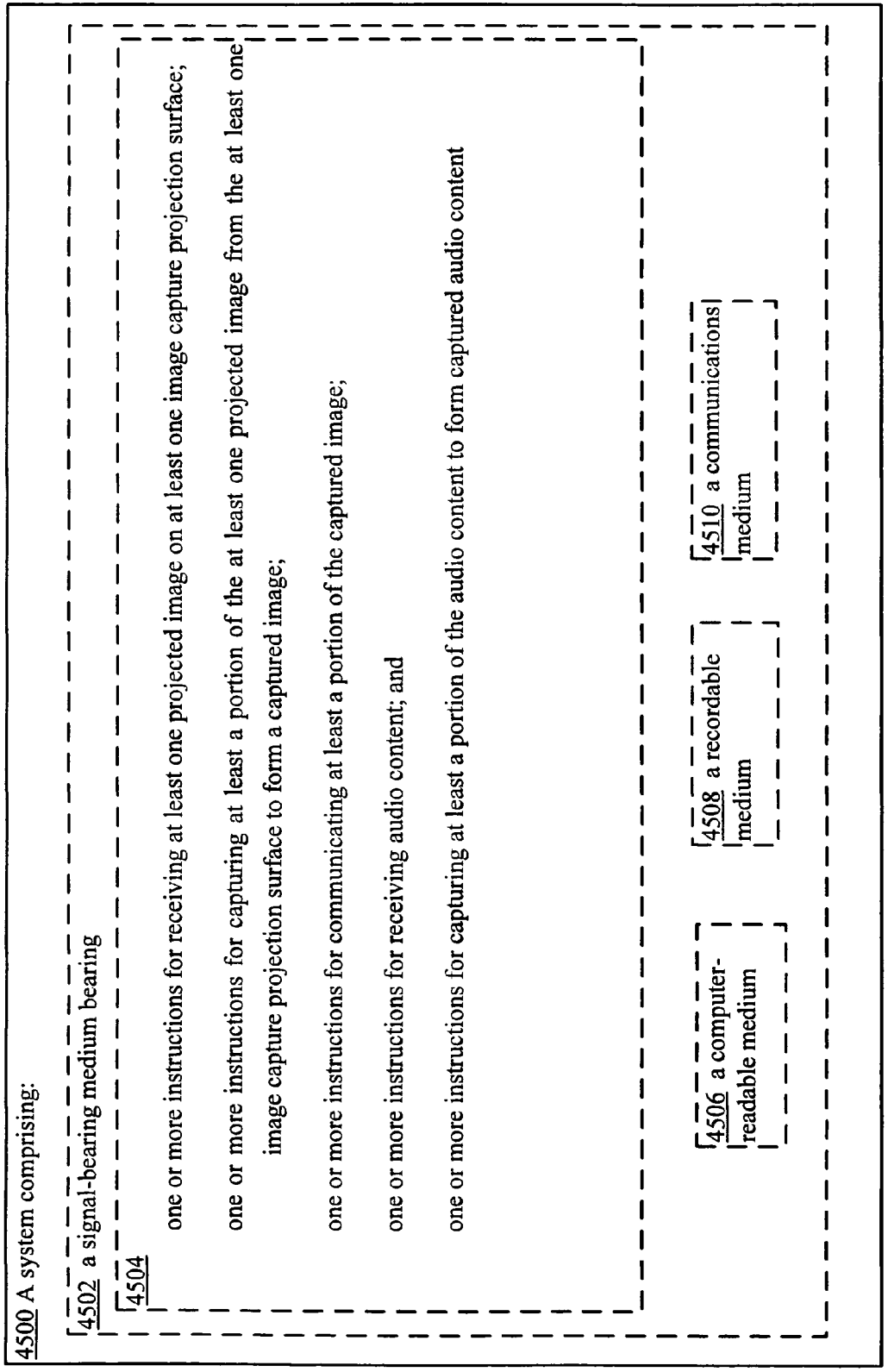

FIG. 45 illustrates a partial view of a system 4500 that includes a computer program 4504 for executing a computer process on a computing device. An embodiment of system 4500 is provided using a signal-bearing medium 4502 bearing one or more instructions for receiving at least one projected image on at least one image capture projection surface, one or more instructions for capturing at least a portion of the at least one projected image from the at least one image capture projection surface to form a captured image, one or more instructions for communicating at least a portion of the captured image, one or more instructions for receiving audio content, and one or more instructions for capturing at least a portion of the audio content to form captured audio content. The one or more directions may be, for example, computer executable and/or logic-implemented instructions. In some embodiments, the signal-bearing medium 4502 may include a computer-readable medium 4506. In some embodiments, the signal-bearing medium 4502 may include a recordable medium 4508. In some embodiments, the signal-bearing medium 4502 may include a communications medium 4510.

Figure 46:
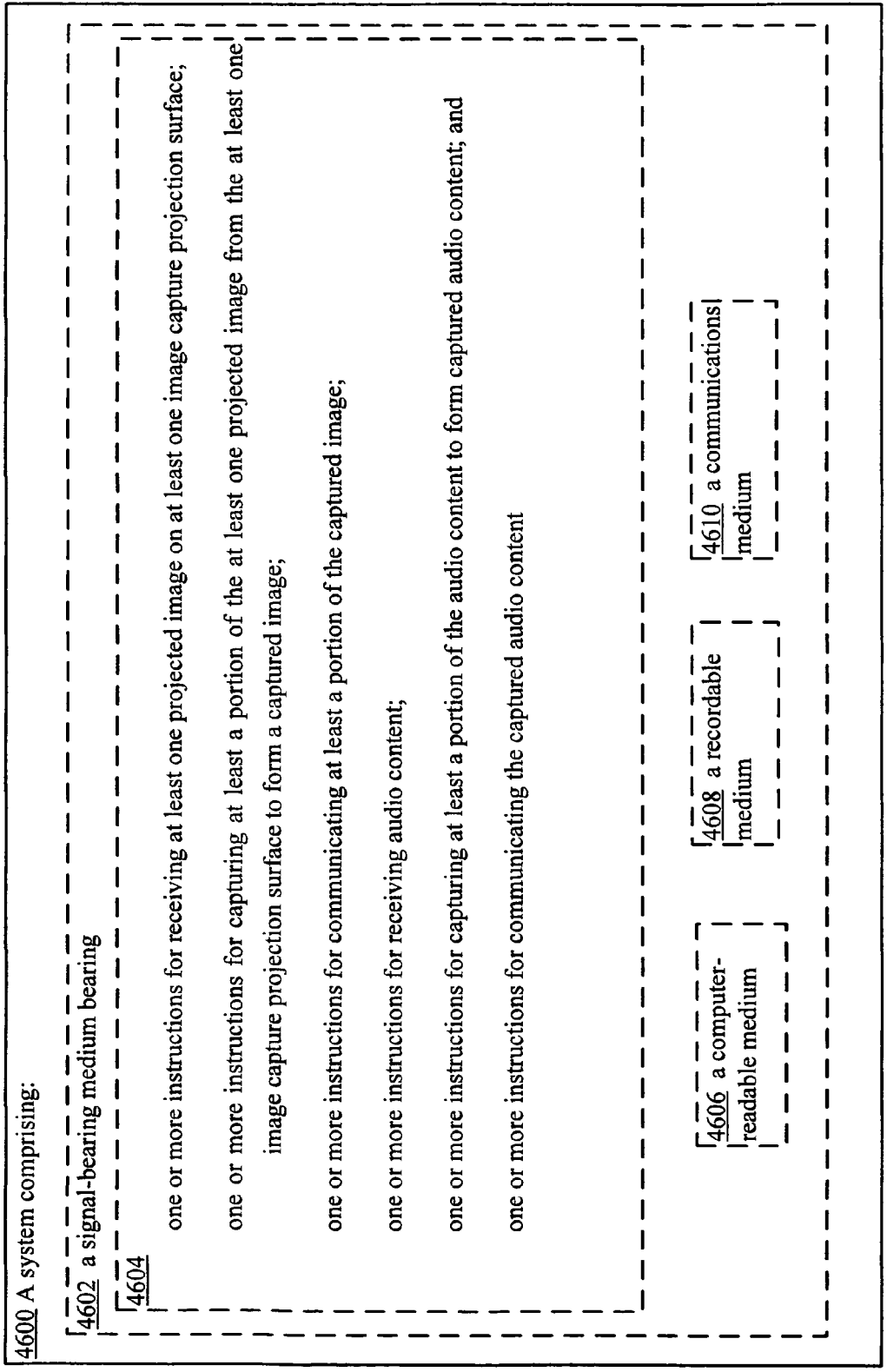
Figure 47:
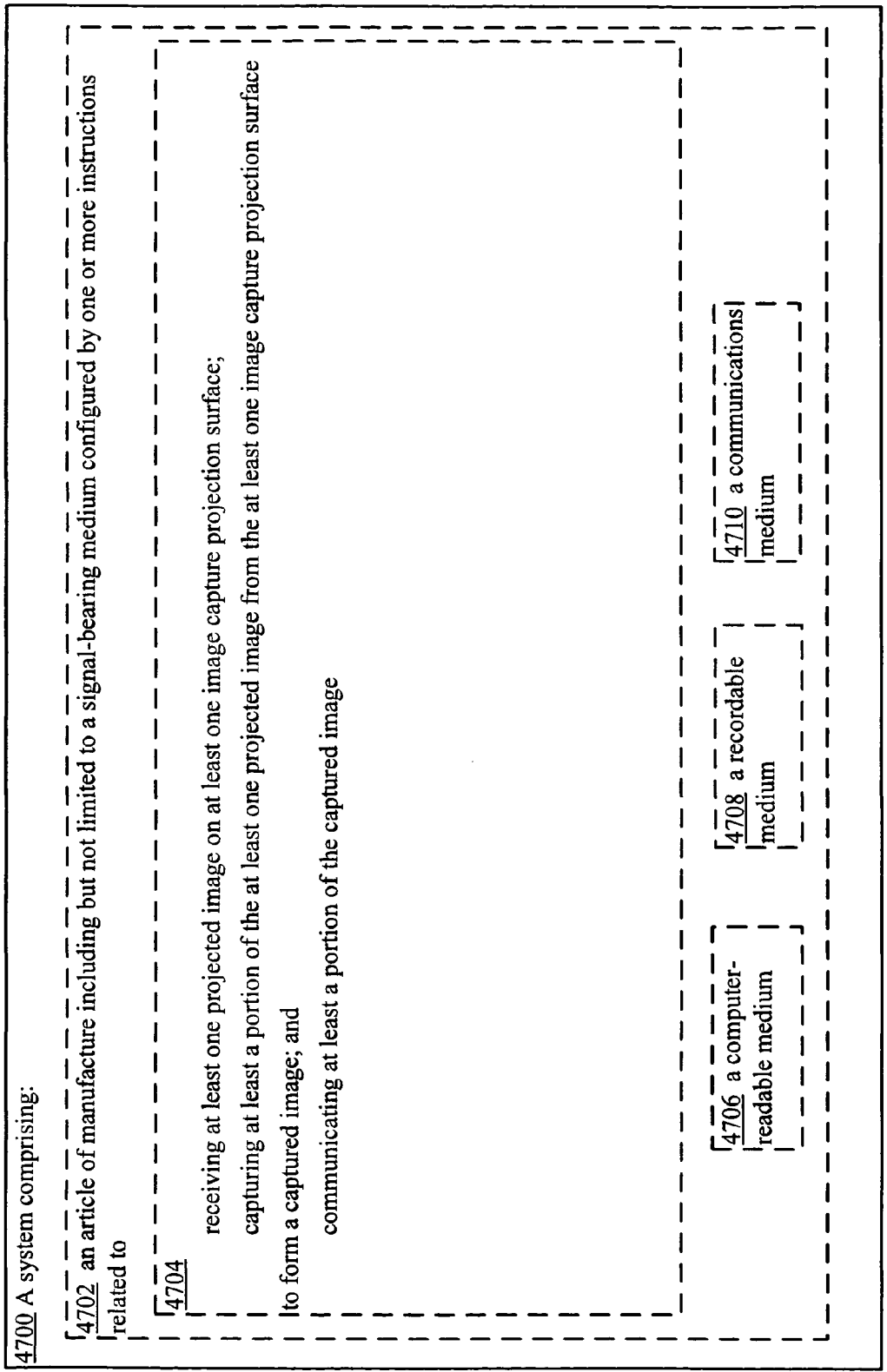
Figure 49:
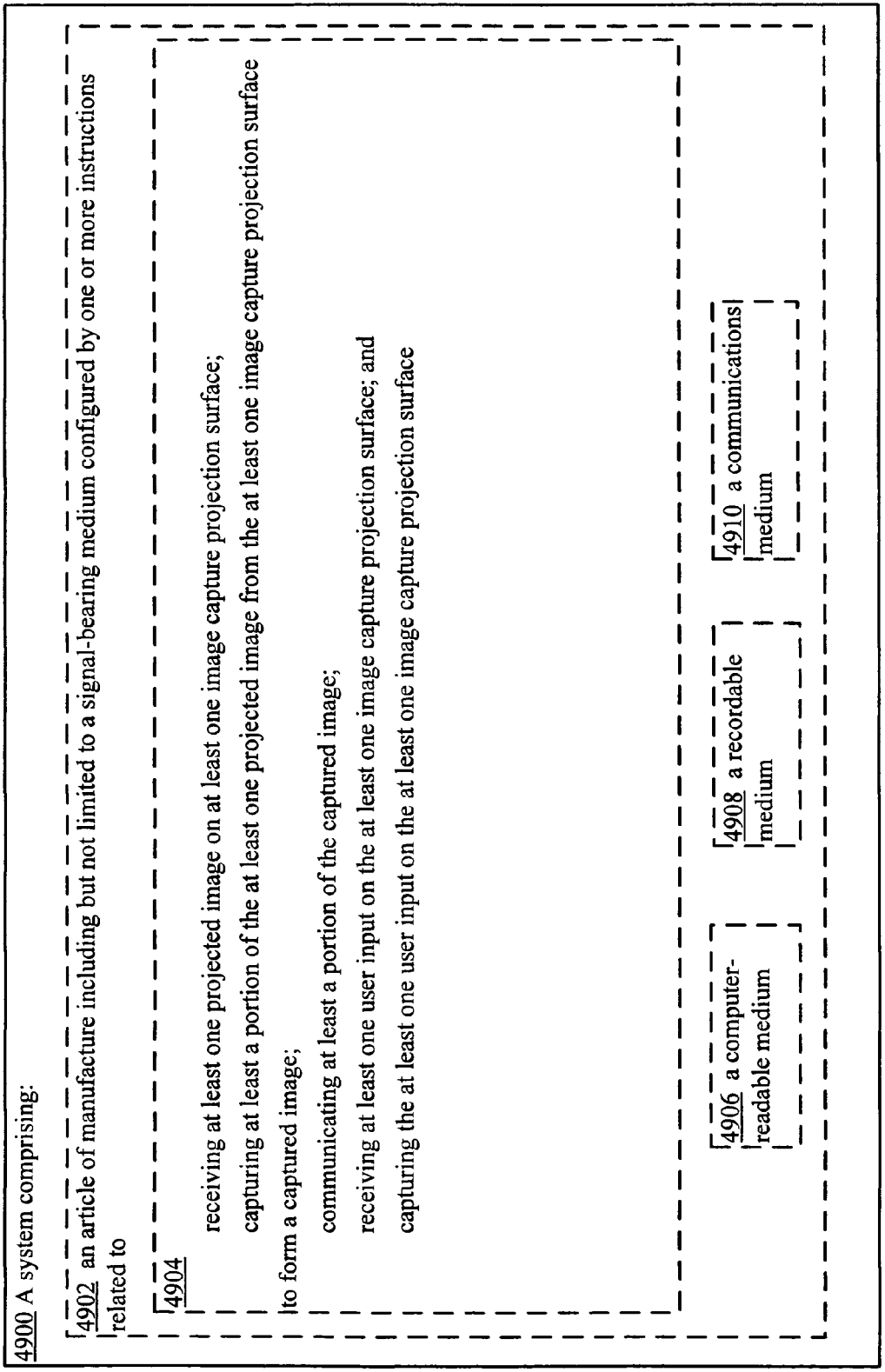
Figure 50:
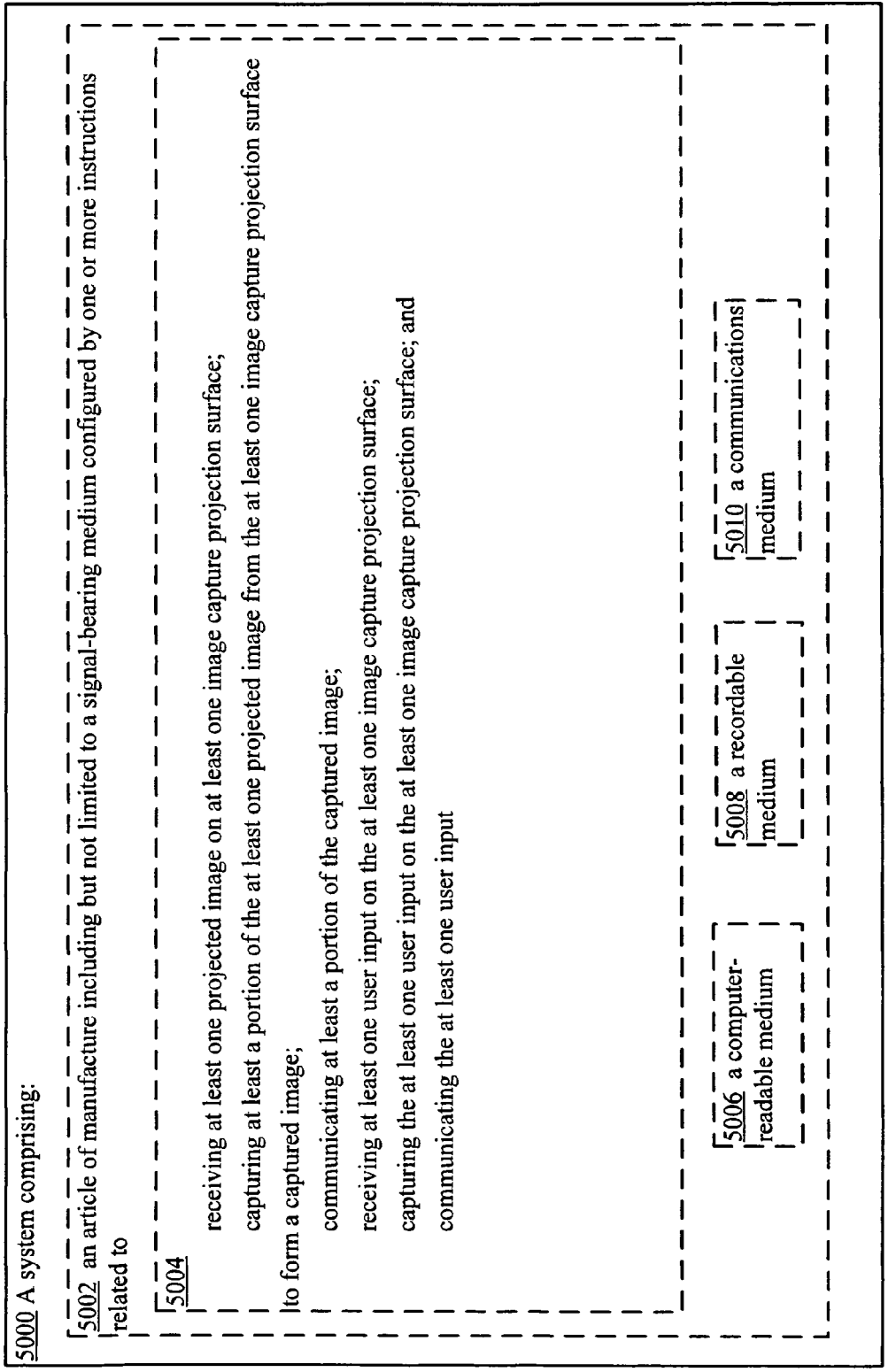
Figure 51:
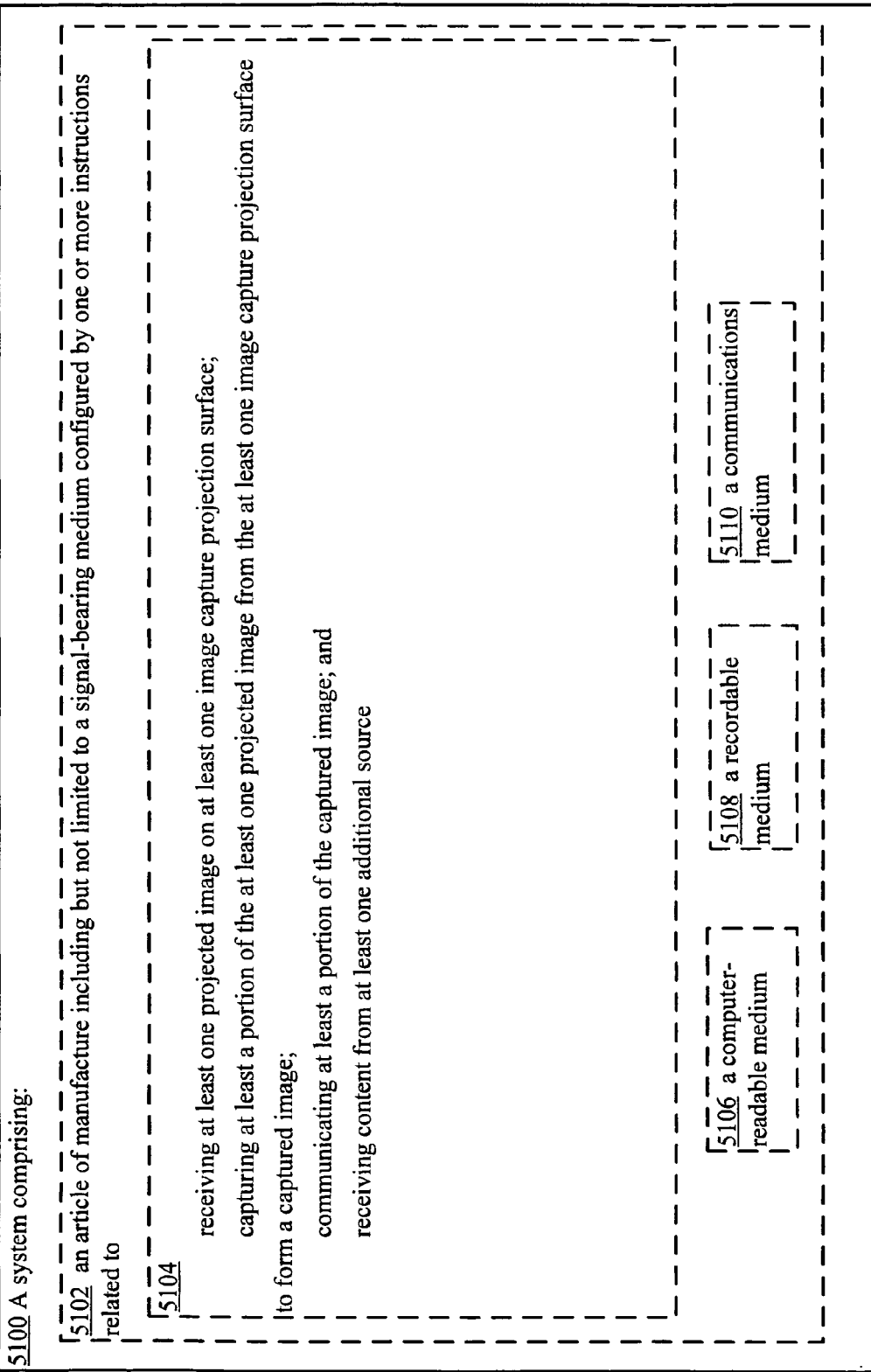
Figure 52:
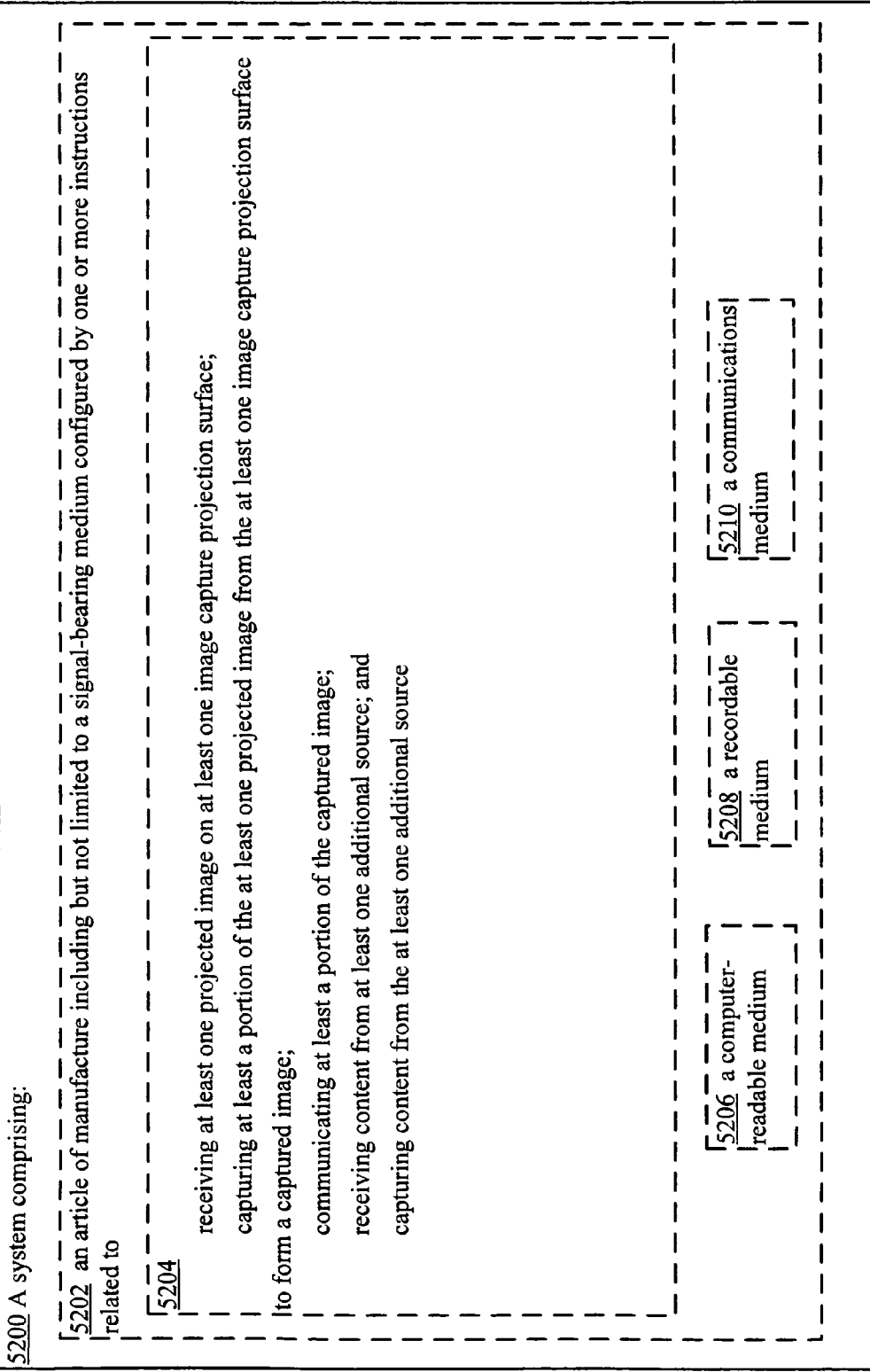
Figure 53:
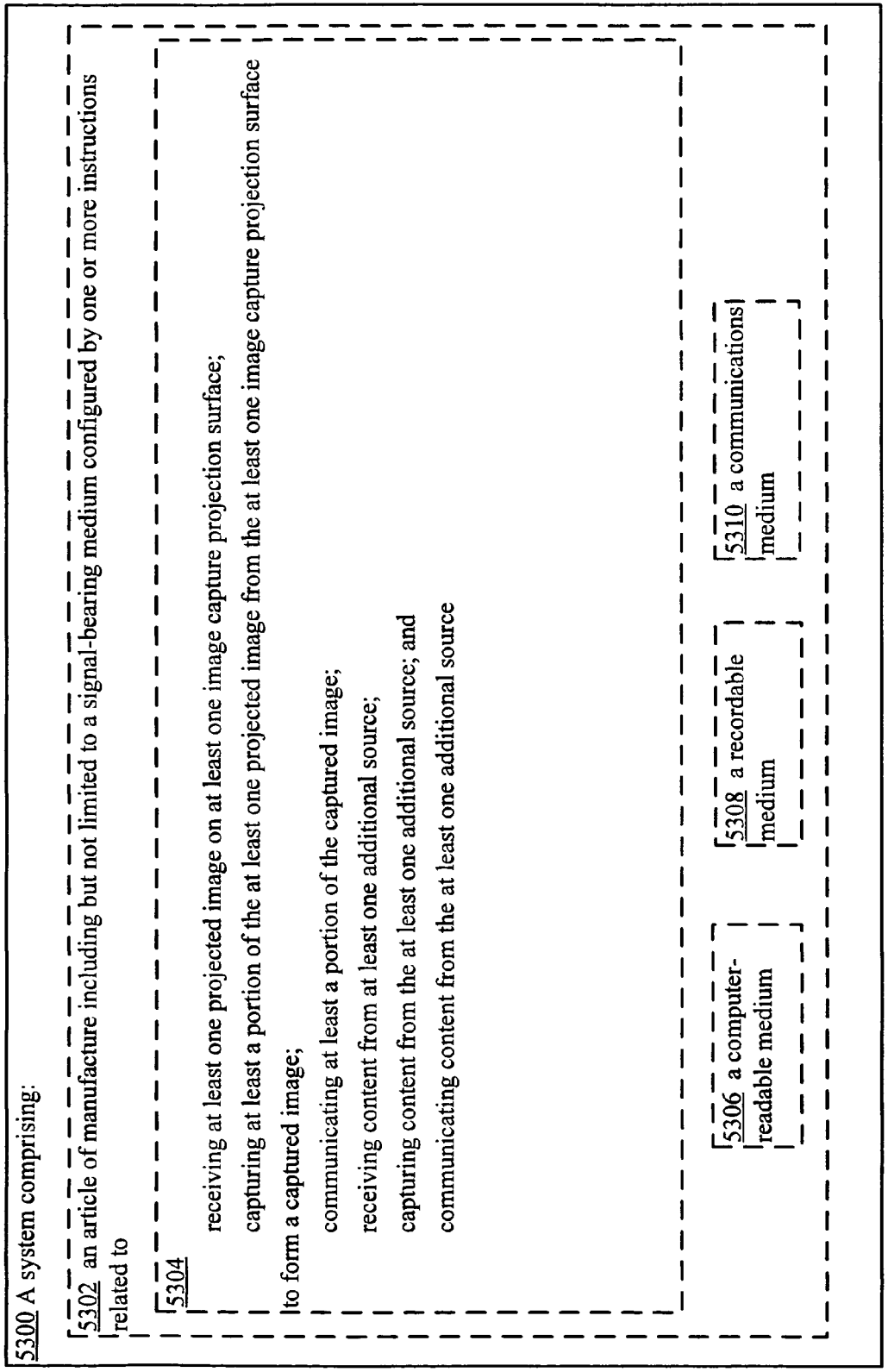
Figure 54:
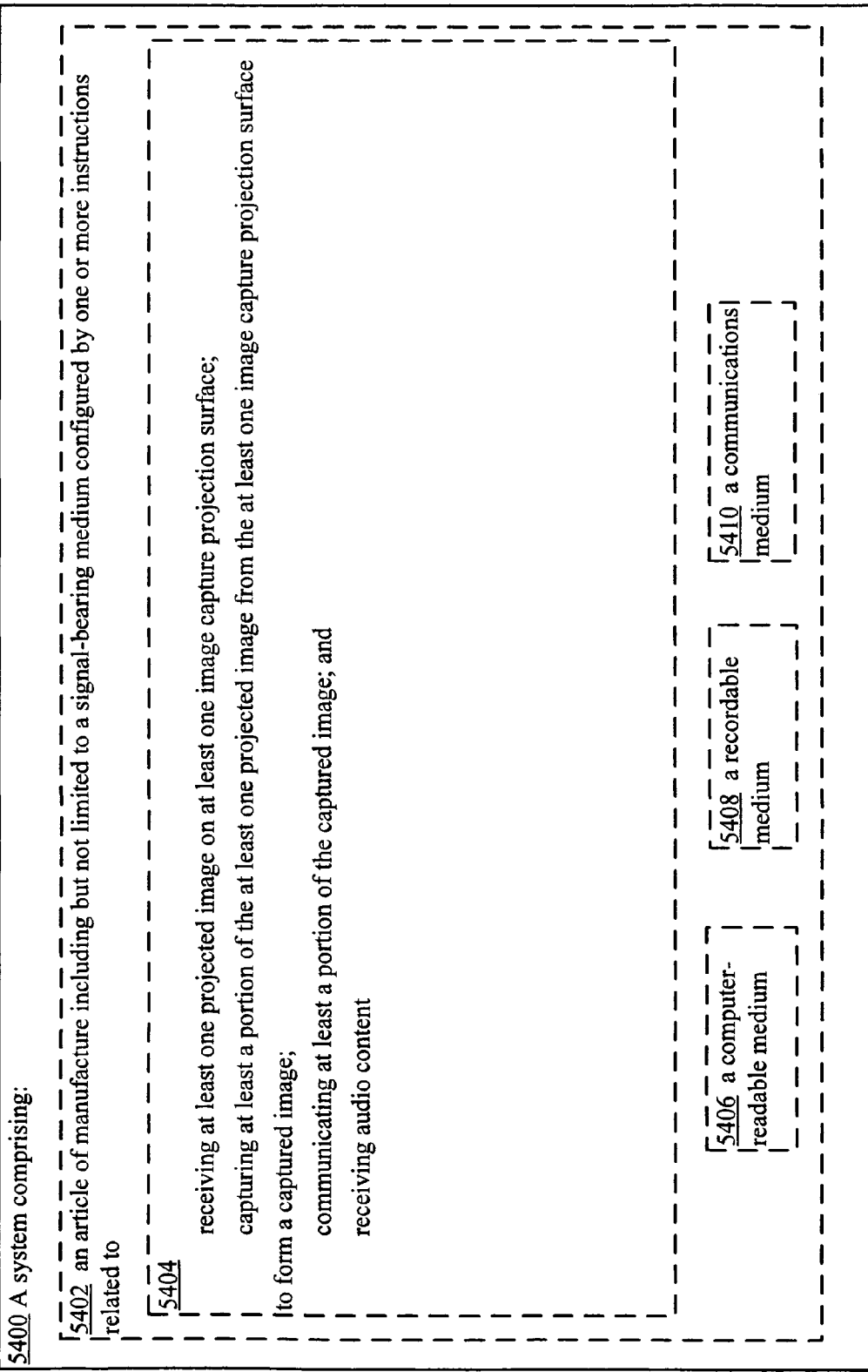

FIG. 46 illustrates a partial view of a system 4600 that includes a computer program 4604 for executing a computer process on a computing device. An embodiment of system 4600 is provided using a signal-bearing medium 4602 bearing one or more instructions for receiving at least one projected image on at least one image capture projection surface, one or more instructions for capturing at least a portion of the at least one projected image from the at least one image capture projection surface to form a captured image, one or more instructions for communicating at least a portion of the captured image, one or more instructions for receiving audio content, one or more instructions for capturing at least a portion of the audio content to form captured audio content, and one or more instructions for communicating the captured audio content. The one or more directions may be, for example, computer executable and/or logic-implemented instructions. In some embodiments, the signal-bearing medium 4602 may include a computer-readable medium 4606. In some embodiments, the signal-bearing medium 4602 may include a recordable medium 4608. In some embodiments, the signal-bearing medium 4602 may include a communications medium 4610.

Those having skill in the art will recognize that the state of the art has progressed to the point where there is little distinction left between hardware, software, and/or firmware implementations of aspects of systems; the use of hardware, software, and/or firmware is generally (but not always, in that in certain contexts the choice between hardware and software can become significant) a design choice representing cost vs. efficiency tradeoffs. Those having skill in the art will appreciate that there are various vehicles by which processes and/or systems and/or other technologies described herein can be effected (e.g., hardware, software, and/or firmware), and that the preferred vehicle will vary with the context in which the processes and/or systems and/or other technologies are deployed. For example, if an implementer determines that speed and accuracy are paramount, the implementer may opt for a mainly hardware and/or firmware vehicle; alternatively, if flexibility is paramount, the implementer may opt for a mainly software implementation; or, yet again alternatively, the implementer may opt for some combination of hardware, software, and/or firmware. Hence, there are several possible vehicles by which the processes and/or devices and/or other technologies described herein may be effected, none of which is inherently superior to the other in that any vehicle to be utilized is a choice dependent upon the context in which the vehicle will be deployed and the specific concerns (e.g., speed, flexibility, or predictability) of the implementer, any of which may vary. Those skilled in the art will recognize that optical aspects of implementations will typically employ optically-oriented hardware, software, and or firmware.

In some implementations described herein, logic and similar implementations may include software or other control structures. Electronic circuitry, for example, may have one or more paths of electrical current constructed and arranged to implement various functions as described herein. In some implementations, one or more media may be configured to bear a device-detectable implementation when such media hold or transmit device detectable instructions operable to perform as described herein. In some variants, for example, implementations may include an update or modification of existing software or firmware, or of gate arrays or programmable hardware, such as by performing a reception of or a transmission of one or more instructions in relation to one or more operations described herein. Alternatively or additionally, in some variants, an implementation may include special-purpose hardware, software, firmware components, and/or general-purpose components executing or otherwise invoking special-purpose components. Specifications or other implementations may be transmitted by one or more instances of tangible transmission media as described herein, optionally by packet transmission or otherwise by passing through distributed media at various times.

Alternatively or additionally, implementations may include executing a special-purpose instruction sequence or invoking circuitry for enabling, triggering, coordinating, requesting, or otherwise causing one or more occurrences of virtually any functional operations described herein. In some variants, operational or other logical descriptions herein may be expressed as source code and compiled or otherwise invoked as an executable instruction sequence. In some contexts, for example, implementations may be provided, in whole or in part, by source code, such as C++, or other code sequences. In other implementations, source or other code implementation, using commercially available and/or techniques in the art, may be compiled//implemented/translated/converted into a high-level descriptor language (e.g., initially implementing described technologies in C or C++ programming language and thereafter converting the programming language implementation into a logic-synthesizable language implementation, a hardware description language implementation, a hardware design simulation implementation, and/or other such similar mode(s) of expression). For example, some or all of a logical expression (e.g., computer programming language implementation) may be manifested as a Verilog-type hardware description (e.g., via Hardware Description Language (HDL) and/or Very High Speed Integrated Circuit Hardware Descriptor Language (VHDL)) or other circuitry model which may then be used to create a physical implementation having hardware (e.g., an Application Specific Integrated Circuit). Those skilled in the art will recognize how to obtain, configure, and optimize suitable transmission or computational elements, material supplies, actuators, or other structures in light of these teachings.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or virtually any combination thereof. In one embodiment, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive, a Compact Disc (CD), a Digital Video Disk (DVD), a digital tape, a computer memory, etc.; and a transmission type medium such as a digital and/or an analog communication medium (e.g., a fiber optic cable, a waveguide, a wired communications link, a wireless communication link (e.g., transmitter, receiver, transmission logic, reception logic, etc.), etc.).

In a general sense, those skilled in the art will recognize that the various embodiments described herein can be implemented, individually and/or collectively, by various types of electromechanical systems having a wide range of electrical components such as hardware, software, firmware, and/or virtually any combination thereof, and a wide range of components that may impart mechanical force or motion such as rigid bodies, spring or torsional bodies, hydraulics, electromagnetically actuated devices, and/or virtually any combination thereof. Consequently, as used herein "electromechanical system" includes, but is not limited to, electrical circuitry operably coupled with a transducer (e.g., an actuator, a motor, a piezoelectric crystal, a Micro Electro Mechanical System (MEMS), etc.), electrical circuitry having at least one discrete electrical circuit, electrical circuitry having at least one integrated circuit, electrical circuitry having at least one application specific integrated circuit, electrical circuitry forming a general purpose computing device configured by a computer program (e.g., a general purpose computer configured by a computer program which at least partially carries out processes and/or devices described herein, or a microprocessor configured by a computer program which at least partially carries out processes and/or devices described herein), electrical circuitry forming a memory device (e.g., forms of memory (e.g., random access, flash, read only, etc.)), electrical circuitry forming a communications device (e.g., a modem, communications switch, optical-electrical equipment, etc.), and/or any non-electrical analog thereto, such as optical or other analogs. Those skilled in the art will also appreciate that examples of electro-mechanical systems include but are not limited to a variety of consumer electronics systems, medical devices, as well as other systems such as motorized transport systems, factory automation systems, security systems, and/or communication/computing systems. Those skilled in the art will recognize that electromechanical as used herein is not necessarily limited to a system that has both electrical and mechanical actuation except as context may dictate otherwise.

In a general sense, those skilled in the art will recognize that the various aspects described herein which can be implemented, individually and/or collectively, by a wide range of hardware, software, firmware, and/or any combination thereof can be viewed as being composed of various types of "electrical circuitry." Consequently, as used herein "electrical circuitry" includes, but is not limited to, electrical circuitry having at least one discrete electrical circuit, electrical circuitry having at least one integrated circuit, electrical circuitry having at least one application specific integrated circuit, electrical circuitry forming a general purpose computing device configured by a computer program (e.g., a general purpose computer configured by a computer program which at least partially carries out processes and/or devices described herein, or a microprocessor configured by a computer program which at least partially carries out processes and/or devices described herein), electrical circuitry forming a memory device (e.g., forms of memory (e.g., random access, flash, read only, etc.)), and/or electrical circuitry forming a communications device (e.g., a modem, communications switch, optical-electrical equipment, etc.). Those having skill in the art will recognize that the subject matter described herein may be implemented in an analog or digital fashion or some combination thereof.

Those skilled in the art will recognize that at least a portion of the devices and/or processes described herein can be integrated into an image processing system. Those having skill in the art will recognize that a typical image processing system generally includes one or more of a system unit housing, a video display device, memory such as volatile or non-volatile memory, processors such as microprocessors or digital signal processors, computational entities such as operating systems, drivers, applications programs, one or more interaction devices (e.g., a touch pad, a touch screen, an antenna, etc.), control systems including feedback loops and control motors (e.g., feedback for sensing lens position and/or velocity; control motors for moving/distorting lenses to give desired focuses). An image processing system may be implemented utilizing suitable commercially available components, such as those typically found in digital still systems and/or digital motion systems.

Those skilled in the art will recognize that at least a portion of the devices and/or processes described herein can be integrated into a data processing system. Those having skill in the art will recognize that a data processing system generally includes one or more of a system unit housing, a video display device, memory such as volatile or non-volatile memory, processors such as microprocessors or digital signal processors, computational entities such as operating systems, drivers, graphical user interfaces, and applications programs, one or more interaction devices (e.g., a touch pad, a touch screen, an antenna, etc.), and/or control systems including feedback loops and control motors (e.g., feedback for sensing position and/or velocity; control motors for moving and/or adjusting components and/or quantities). A data processing system may be implemented utilizing suitable commercially available components, such as those typically found in data computing/communication and/or network computing/communication systems.

Those skilled in the art will recognize that at least a portion of the devices and/or processes described herein can be integrated into a mote system. Those having skill in the art will recognize that a typical mote system generally includes one or more memories such as volatile or non-volatile memories, processors such as microprocessors or digital signal processors, computational entities such as operating systems, user interfaces, drivers, sensors, actuators, applications programs, one or more interaction devices (e.g., an antenna USB ports, acoustic ports, etc.), control systems including feedback loops and control motors (e.g., feedback for sensing or estimating position and/or velocity; control motors for moving and/or adjusting components and/or quantities). A mote system may be implemented utilizing suitable components, such as those found in mote computing/communication systems. Specific examples of such components entail such as Intel Corporation's and/or Crossbow Corporation's mote components and supporting hardware, software, and/or firmware.

Those skilled in the art will recognize that it is common within the art to implement devices and/or processes and/or systems, and thereafter use engineering and/or other practices to integrate such implemented devices and/or processes and/or systems into more comprehensive devices and/or processes and/or systems. That is, at least a portion of the devices and/or processes and/or systems described herein can be integrated into other devices and/or processes and/or systems via a reasonable amount of experimentation. Those having skill in the art will recognize that examples of such other devices and/or processes and/or systems might include—as appropriate to context and application—all or part of devices and/or processes and/or systems of (a) an air conveyance (e.g., an airplane, rocket, helicopter, etc.), (b) a ground conveyance (e.g., a car, truck, locomotive, tank, armored personnel carrier, etc.), (c) a building (e.g., a home, warehouse, office, etc.), (d) an appliance (e.g., a refrigerator, a washing machine, a dryer, etc.), (e) a communications system (e.g., a networked system, a telephone system, a Voice over IP system, etc.), (f) a business entity (e.g., an Internet Service Provider (ISP) entity such as Comcast Cable, Qwest, Southwestern Bell, etc.), or (g) a wired/wireless services entity (e.g., Sprint, Cingular, Nextel, etc.), etc.

In certain cases, use of a system or method may occur in a territory even if components are located outside the territory. For example, in a distributed computing context, use of a distributed computing system may occur in a territory even though parts of the system may be located outside of the territory (e.g., relay, server, processor, signal-bearing medium, transmitting computer, receiving computer, etc. located outside the territory). A sale of a system or method may likewise occur in a territory even if components of the system or method are located and/or used outside the territory. Further, implementation of at least part of a system for performing a method in one territory does not preclude use of the system in another territory.

One skilled in the art will recognize that the herein described components (e.g., operations), devices, objects, and the discussion accompanying them are used as examples for the sake of conceptual clarity and that various configuration modifications are contemplated. Consequently, as used herein, the specific exemplars set forth and the accompanying discussion are intended to be representative of their more general classes. In general, use of any specific exemplar is intended to be representative of its class, and the non-inclusion of specific components (e.g., operations), devices, and objects should not be taken limiting.

Although user 110 is shown/described herein as a single illustrated figure, those skilled in the art will appreciate that user 110 may be representative of a human user, a robotic user (e.g., computational entity), and/or substantially any combination thereof (e.g., a user may be assisted by one or more robotic agents) unless context dictates otherwise. Those skilled in the art will appreciate that, in general, the same may be said of "sender" and/or other entity-oriented terms as such terms are used herein unless context dictates otherwise.

With respect to the use of substantially any plural and/or singular terms herein, those having skill in the art can translate from the plural to the singular and/or from the singular to the plural as is appropriate to the context and/or application. The various singular/plural permutations are not expressly set forth herein for sake of clarity.

The herein described subject matter sometimes illustrates different components contained within, or connected with, different other components. It is to be understood that such depicted architectures are merely exemplary, and that in fact many other architectures may be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled," to each other to achieve the desired functionality, and any two components capable of being so associated can also be viewed as being "operably couplable," to each other to achieve the desired functionality. Specific examples of operably couplable include but are not limited to physically mateable and/or physically interacting components, and/or wirelessly interactable, and/or wirelessly interacting components, and/or logically interacting, and/or logically interactable components.

In some instances, one or more components may be referred to herein as "configured to," "configurable to," "operable/operative to," "adapted/adaptable," "able to," "conformable/conformed to," etc. Those skilled in the art will recognize that such terms (e.g. "configured to") can generally encompass active-state components and/or inactive-state components and/or standby-state components, unless context requires otherwise.

While particular aspects of the present subject matter described herein have been shown and described, it will be apparent to those skilled in the art that, based upon the teachings herein, changes and modifications may be made without departing from the subject matter described herein and its broader aspects and, therefore, the appended claims are to encompass within their scope all such changes and modifications as are within the true spirit and scope of the subject matter described herein. It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to claims containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that typically a disjunctive word and/or phrase presenting two or more alternative terms, whether in the description, claims, or drawings, should be understood to contemplate the possibilities of including one of the terms, either of the terms, or both terms unless context dictates otherwise. For example, the phrase "A or B" will be typically understood to include the possibilities of "A" or "B" or "A and B."

With respect to the appended claims, those skilled in the art will appreciate that recited operations therein may generally be performed in any order. Also, although various operational flows are presented in a sequence(s), it should be understood that the various operations may be performed in other orders than those which are illustrated, or may be performed concurrently. Examples of such alternate orderings may include overlapping, interleaved, interrupted, reordered, incremental, preparatory, supplemental, simultaneous, reverse, or other variant orderings, unless context dictates otherwise. Furthermore, terms like "responsive to," "related to," or other past-tense adjectives are generally not intended to exclude such variants, unless context dictates otherwise.

All of the above U.S. patents, U.S. patent application publications, U.S. patent applications, foreign patents, foreign patent applications and non-patent publications referred to in this specification and/or listed in any Application Data Sheet, are incorporated herein by reference, to the extent not inconsistent herewith.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. A method comprising:
   receiving at least a portion of one image projected by a projecting device on at least one image capture projection surface, the at least a portion of one image stored in a memory for projection by the projecting device;
   receiving at least one user attribute from at least one of: a motion sensor, an inertial sensor, a contact sensor, a gyroscopic sensor, an ultrasonic sensor, a pressure sensor, or a range sensor, the at least one user attribute indicating at least one of: a height, a weight, an age or a sex of at least one user;
   capturing at least a portion of the at least one image projected by the projecting device from the at least one image capture projection surface to form a captured image, the portion of the at least one image projected by the projecting device on the at least one image capture projection surface based on the at least one user attribute; and
   communicating the portion of the captured image.

2. The method of claim 1, wherein the receiving at least a portion of one image projected by the projecting device on at least one image capture projection surface comprises:
   receiving at least the portion of one image projected by the projecting device on two or more image capture projection surfaces.

3. The method of claim 1, wherein the receiving at least a portion of one image projected by the projecting device on at least one image capture projection surface comprises:
   receiving at least the portion of one image projected by the projecting device on at least one image capture projection surface in accordance with at least one user instruction or financial transaction.

4. The method of claim 1, wherein the receiving at least a portion of one image projected by the projecting device on at least one image capture projection surface comprises:
   receiving at least the portion of one projected image on at least one image capture projection surface in accordance with at least one user attribute.

5. The method of claim 1, wherein the receiving at least a portion of one image projected by the projecting device on at least one image capture projection surface comprises:
   receiving at least the portion of one image projected by the projecting device on at least one image capture projection surface in accordance with at least one user attribute obtained from a history, a setting, a proximity determination, a sensor, a security parameter, a membership parameter, an account parameter, a status parameter, a group parameter, an ownership parameter, a role parameter, a capability parameter, a rights parameter, a service parameter, an activity parameter, a privilege parameter, a familial characteristic, a physical characteristic, an individualized parameter, or a contextualized parameter.

6. The method of claim 1, wherein the receiving at least a portion of one image projected by a projecting device on at least one image capture projection surface comprises:
   receiving at least the portion of one image projected by the projecting device on at least one image capture projection surface that is associated with a tablet, a handheld device, a vehicle, a table, a wall, a desk, or a writing surface.

7. The method of claim 1, wherein the receiving at least a portion of one image projected by a projecting device on at least one image capture projection surface comprises:
   receiving at least the portion of one image projected by the projecting device on the at least one image capture projection surface that relates to a user-specified content that includes a legal content, an educational content, a healthcare content, a business content, or a personal content.

8. The method of claim 1, wherein the receiving at least a portion of one image projected by a projecting device on at least one image capture projection surface comprises:
   receiving at least the portion of one image projected by the projecting device in association with audio content.

9. The method of claim 1, wherein capturing at least a portion of the at least one image projected by the projecting device from the at least one image capture projection surface to form a captured image comprises:
   capturing a portion of the at least one image projected by the projecting device in accordance with at least one user attribute.

10. The method of claim 1, wherein capturing a portion of the at least one image projected by the projecting device from the at least one image capture projection surface to form a captured image comprises:
    capturing at least a portion of the at least one image projected by the projecting device in accordance with at least one user attribute, wherein the at least one user attribute is obtained from a history, a setting, a proximity determination, a sensor, a security parameter, a membership parameter, an account parameter, a status parameter, a group parameter, an ownership parameter, a role parameter, a capability parameter, a rights parameter, a service parameter, an activity parameter, a privilege parameter, a familial characteristic, a physical characteristic, an individualized parameter, or a contextualized parameter.

11. The method of claim 1, wherein capturing at least a portion of the at least one image projected by the projecting device from the at least one image capture projection surface to form a captured image comprises:
    capturing at least a portion of the at least one image projected by the projecting device in accordance with at least one physical user instruction or at least one electronic user instruction.

12. The method of claim 1, wherein capturing at least a portion of the at least one image projected by the projecting device from the at least one image capture projection surface to form a captured image comprises: capturing at least a portion of the at least one image projected by the projecting device in accordance with at least one financial transaction obtained via a communications network.

13. The method of claim 1, wherein capturing at least a portion of the at least one image projected by the projecting device from the at least one image capture projection surface to form a captured image comprises: capturing at least a portion of the at least one image projected by the projecting device using mechanical scanning.

14. The method of claim 1, wherein capturing at least one portion of the at least one image projected by the projecting device from the at least one image capture projection surface to form a captured image comprises: capturing at least a portion of the at least one image projected by the projecting device related to at least one user-specified content.

15. The method of claim 1, wherein the communicating at least a portion of the captured image comprises:
communicating at least a portion of the captured image in accordance with a user instruction or a user attribute.

16. The method of claim 1, wherein the communicating the portion of the captured image comprises:
communicating at least a portion of the captured image to a memory, a hardware device, a software application, a user device, a printer, a monitor display, or a projector.

17. The method of claim 1, wherein the communicating the portion of the captured image comprises:
communicating at least a portion of the captured image in association with audio content.

18. The method of claim 1, wherein the communicating the portion of the captured image comprises:
communicating at least a portion of the captured image in association with audio content.

19. The method of claim 18, further comprising:
receiving at least one user input on the at least one image capture projection surface.

20. The method of claim 19, wherein the receiving at least one user input on the at least one image capture projection surface comprises:
receiving at least one physical user input on the at least one image capture projection surface.

21. The method of claim 19, wherein the receiving at least one user input on the at least one image capture projection surface comprises:
receiving at least one electronic user input on the at least one image capture projection surface.

22. The method of claim 19, further comprising:
capturing the at least one user input on the at least one image capture projection surface.

23. The method of claim 22, wherein the capturing the at least one user input on the at least one image capture projection surface comprises:
capturing at least one physical user input from the at least one image capture projection surface.

24. The method of claim 1, further comprising: receiving content from at least one additional source.

25. The method of claim 24, wherein the receiving content from at least one additional source comprises:
receiving content from two or more image capture projection surfaces.

26. The method of claim 1, further comprising:
receiving content from at least one additional source.

27. The method of claim 26, wherein the receiving content from at least one additional source comprises:
receiving content from two or more image capture projection surfaces.

28. The method of claim 27, wherein the capturing the content received from the at least one additional source comprises:
capturing content received from two or more image capture projection surfaces.

29. The method of claim 26, wherein the receiving content from at least one additional source comprises:
receiving audio content.

30. The method of claim 26, further comprising:
capturing the content received from the at least one additional source.

31. The method of claim 30, wherein the capturing the content received from the at least one additional source comprises:
capturing content received from at least one electronic file location.

32. The method of claim 30, wherein the capturing the content received from the at least one additional source comprises:
capturing audio content.

33. The method of claim 31, wherein the receiving audio content comprises:
receiving one or more portions of a video soundtrack.

34. The method of claim 31, wherein the receiving audio content comprises:
receiving one or more verbal communications.

35. The method of claim 31, further comprising:
capturing at least a portion of the audio content to form captured audio content.

36. The method of claim 35, wherein the capturing at least a portion of the audio content to form captured audio content comprises:
capturing music.

37. The method of claim 1, further comprising: receiving audio content.

38. The method as recited in claim 1, further comprising analyzing the at least one image projected by the projecting device on the at least one image capture projection surface to retrieve the user attribute.

39. The method as recited in claim 1, wherein receiving the at least one user attribute includes determining the height, the weight, the age or the sex of the at least one user attribute by analyzing content in the at least one projected image from the projecting device.

40. The method as recited in claim 1, wherein the projecting device includes at least one of a printer, or a monitor display.

41. The method as recited in claim 1, wherein the image indicates at least one of a receipt, a menu, legal content, or healthcare content.

42. The method as recited in claim 1, wherein the image projected by the projecting device is a video.

43. The method as recited in claim 1, wherein receiving at least one user attribute includes receiving the at least one user attribute from a motion sensor, an inertial sensor, a contact sensor, a gyroscopic sensor, or a range sensor.

44. The method as recited in claim 1, wherein receiving at least one user attribute includes receiving the at least one user attribute from a service provider via a tele-communications network.

45. The method as recited in claim 1, wherein the height, the weight, the age or the sex of the at least one user indicated by the at least one user attribute is determined from analyzing content of the image projected by the projecting device; and wherein the portion of the one image captured from the at least one image capture projection surface is based on the determined at least one user height, weight, age or sex of the at least one user.

46. The method of claim 1, wherein the receiving at least a portion of one image projected by a projecting device on at least one image capture projection surface comprises: receiving at least the portion of one image projected by the projecting device on at least one image capture projection surface in accordance with at least one user attribute obtained from a proximity determination of a least one user or user device to the capture projection surface.

47. The method of claim 1, wherein the receiving at least a portion of one image projected by a projecting device on at least one image capture projection surface comprises:
receiving at least the portion of one image projected by the projecting device on at least one image capture projection surface in accordance with at least one user attribute obtained from a proximity determination, a security parameter, a membership parameter, an account parameter, a status parameter, a group parameter, an ownership parameter, a role parameter, a capability parameter, a rights parameter, a service parameter, an activity parameter, a privilege parameter, or a familial characteristic.

48. The method of claim 1, wherein capturing at least a portion of the at least one image projected by the projecting device from the at least one image capture projection surface to form a captured image, the portion of the at least one image projected by the projecting device on the at least one image capture projection surface based on the at least one user attribute comprises:

capturing at least a portion of the at least one image projected by the projecting device from the at least one image capture projection surface to form a captured image, the portion of the at least one image projected by the projecting device on the at least one image capture projection surface based on at least one of:

a presence of the user proximate to the image capture projection surface, a person density, a foot traffic volume, a sales volume, a conversation or sound volume, a time of day, a weather condition, a language type spoken by a user proximate to the image capture projection surface, educational level of proximate users as to the image capture projection surface as determined by language type used by the user, interests of proximate users to the image capture projection surface as determined by language used by a user proximate to the image capture projection surface, age of users as determined by a height or a language used by a user proximate to the image capture projection surface, or at least one or more images nearby but not on the image capture projection surface.

49. A system comprising:

an article of manufacture including but not limited to a non-transitory signal-bearing medium configured by one or more instructions related to:

receiving at least one projected image projected by a projecting device on at least one image capture projection surface, the at least one projected image stored in a memory for projection by the projecting device;

capturing at least a portion of the at least one projected image from the at least one image capture projection surface to form a captured image, the portion of the captured image projected based at least one of: a height, a weight, an age or a sex of at least one user in a vicinity of the at least one image capture projection surface received from at least one of a motion sensor, an inertial sensor, a contact sensor, a gyroscopic sensor, ultrasonic sensor, pressure sensor, or a range sensor; and communicating at least a portion of the captured image.

50. The system as recited in claim 49, further comprising capturing at least a second portion of the at least one projected image from the at least one image capture projection surface to form a second captured image in response to a signal from a controller, the portion of the second captured image captured from the at least one image capture projection surface based on a height, a weight, an age or a sex of a second user received by the controller via a communications network.

51. A system comprising:

means for receiving at least one image projected by a projecting device on at least one image capture projection surface, at least a portion of the at least one image projected on the at least one image capture projection surface after retrieval from a memory from the projecting device;

means for receiving via a communications network a user attribute that includes at least one of: a height, a weight, an age or a sex of at least one user received from at least one of a motion sensor, ultrasonic sensor, pressure sensor, an inertial sensor, a contact sensor, a gyroscopic sensor, or a range sensor;

means for determining a portion of the at least one image to be captured from the at least one image capture projection surface based on the received at least one of: the height, the weight, the age or the sex of the at least one user included in the user attribute;

means for capturing the determined portion of the at least one image from the at least one image capture projection surface and projected by the projecting device to form a captured image; and means for communicating the captured image.

52. The method as recited in claim 1, wherein a least one of the motion sensor, the inertial sensor, the contact sensor, the gyroscopic sensor, the ultrasonic sensor, the pressure sensor, or the range sensor includes at least one of a camera, a light sensor, an imaging sensor, or an ultraviolet sensor.

53. The system as recited in claim 49, wherein a least one of the motion sensor, the inertial sensor, the contact sensor, the gyroscopic sensor, the ultrasonic sensor, the pressure sensor, or the range sensor includes at least one of a camera, a light sensor, an imaging sensor, or an ultraviolet sensor.

54. The system as recited in claim 51, wherein a least one of the motion sensor, the inertial sensor, the contact sensor, the gyroscopic sensor, the ultrasonic sensor, the pressure sensor, or the range sensor includes at least one of a camera, a light sensor, an imaging sensor, or an ultraviolet sensor.

* * * * *

UNITED STATES PATENT AND TRADEMARK OFFICE
CERTIFICATE OF CORRECTION

| | | |
|---|---|---|
| PATENT NO. | : 8,723,787 B2 | Page 1 of 1 |
| APPLICATION NO. | : 12/454184 | |
| DATED | : May 13, 2014 | |
| INVENTOR(S) | : Edward K. Y. Jung et al. | |

It is certified that error appears in the above-identified patent and that said Letters Patent is hereby corrected as shown below:

IN THE CLAIMS

In Column 129, Lines 1-2, Claim 15 please delete text "wherein the communicating at least a portion of the captured image comprises:" and replace with --wherein the communicating the portion of the captured image comprises:--

Signed and Sealed this
Third Day of November, 2015

Michelle K. Lee
*Director of the United States Patent and Trademark Office*